United States Patent
Fujii et al.

(10) Patent No.: US 8,604,565 B2
(45) Date of Patent: Dec. 10, 2013

(54) PHYSICAL QUANTITY DETECTION DEVICE AND METHOD FOR MANUFACTURING THE SAME

(75) Inventors: Tetsuo Fujii, Toyohashi (JP); Minekazu Sakai, Kariya (JP); Takumi Shibata, Kariya (JP)

(73) Assignee: DENSO CORPORATION, Kariya (JP)

( * ) Notice: Subject to any disclaimer, the term of this patent is extended or adjusted under 35 U.S.C. 154(b) by 142 days.

(21) Appl. No.: 13/083,732

(22) Filed: Apr. 11, 2011

(65) Prior Publication Data

US 2011/0248363 A1  Oct. 13, 2011

(30) Foreign Application Priority Data

Apr. 12, 2010  (JP) .................................. 2010-91410

(51) Int. Cl.
*H01L 29/82* (2006.01)
(52) U.S. Cl.
USPC .................................. 257/415; 257/E29.324
(58) Field of Classification Search
USPC .................................. 257/419, 415, E29.324
See application file for complete search history.

(56) References Cited

U.S. PATENT DOCUMENTS

| | | | |
|---|---|---|---|
| 5,870,482 A | 2/1999 | Loeppert et al. | |
| 6,131,466 A | 10/2000 | Vigna et al. | |
| 6,584,852 B2* | 7/2003 | Suzuki et al. | 73/718 |
| 6,847,090 B2 | 1/2005 | Loeppert | |
| 7,132,307 B2 | 11/2006 | Wang et al. | |
| 2002/0154860 A1* | 10/2002 | Fernald et al. | 385/37 |
| 2004/0065932 A1* | 4/2004 | Reichenbach et al. | 257/415 |
| 2005/0196933 A1* | 9/2005 | Nunan et al. | 438/400 |
| 2007/0165888 A1* | 7/2007 | Weigold | 381/174 |
| 2008/0030205 A1 | 2/2008 | Fujii et al. | |
| 2008/0283912 A1 | 11/2008 | Shibata et al. | |

FOREIGN PATENT DOCUMENTS

| | | |
|---|---|---|
| JP | A-63-175737 | 7/1988 |
| JP | U-H1-013158 | 1/1989 |
| JP | U-S64-13158 | 1/1989 |
| JP | A-H11-183287 | 7/1999 |
| JP | A-11-220137 | 8/1999 |
| JP | A-2001-201418 | 7/2001 |
| JP | A-2002-039895 | 2/2002 |
| JP | A-2004-245760 | 9/2004 |
| JP | A-2007-259439 | 10/2007 |
| JP | A-2008-271568 | 11/2008 |

OTHER PUBLICATIONS

Office Action mailed Apr. 10, 2012 in corresponding JP Application No. 2010-091410 (and English translation).

* cited by examiner

*Primary Examiner* — Wael Fahmy
*Assistant Examiner* — Sarah Salerno
(74) *Attorney, Agent, or Firm* — Posz Law Group, PLC

(57) ABSTRACT

A physical quantity detection device includes: an insulating layer; a semiconductor layer on the insulating layer; and first and second electrodes in the semiconductor layer. Each electrode has a wall part, one of which includes two diaphragms and a cover part. The diaphragms facing each other provide a hollow cylinder having an opening covered by the cover part. One diaphragm faces the other wall part or one diaphragm in the other wall part. A distance between the one diaphragm and the other wall part or the one diaphragm in the other wall part is changed with pressure difference between reference pressure in the hollow cylinder and pressure of an outside when a physical quantity is applied to the diaphragms. The physical quantity is detected by a capacitance between the first and second electrodes.

30 Claims, 92 Drawing Sheets

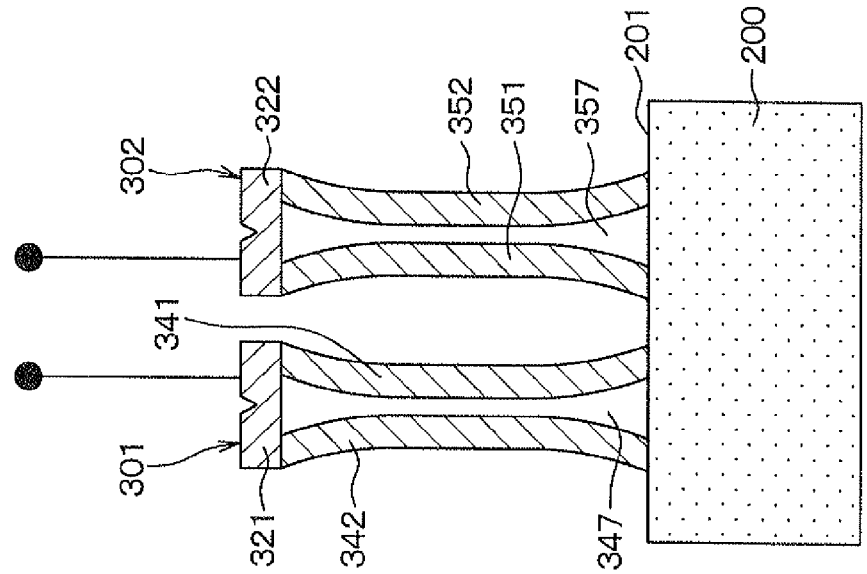
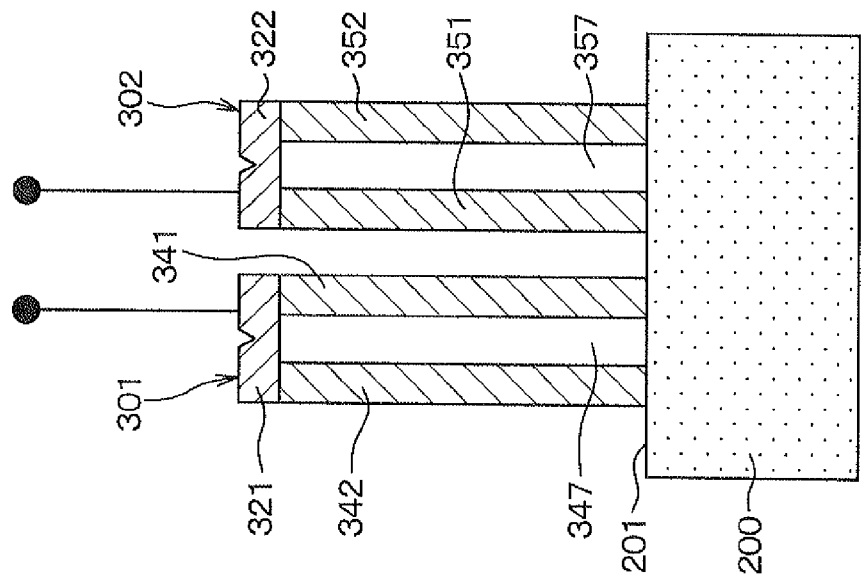

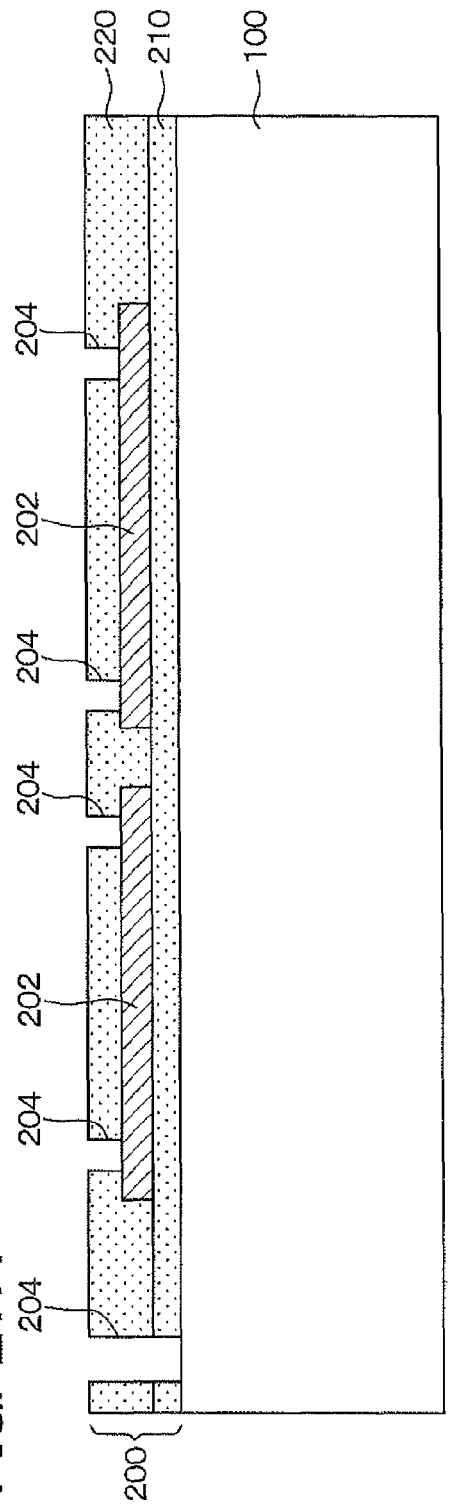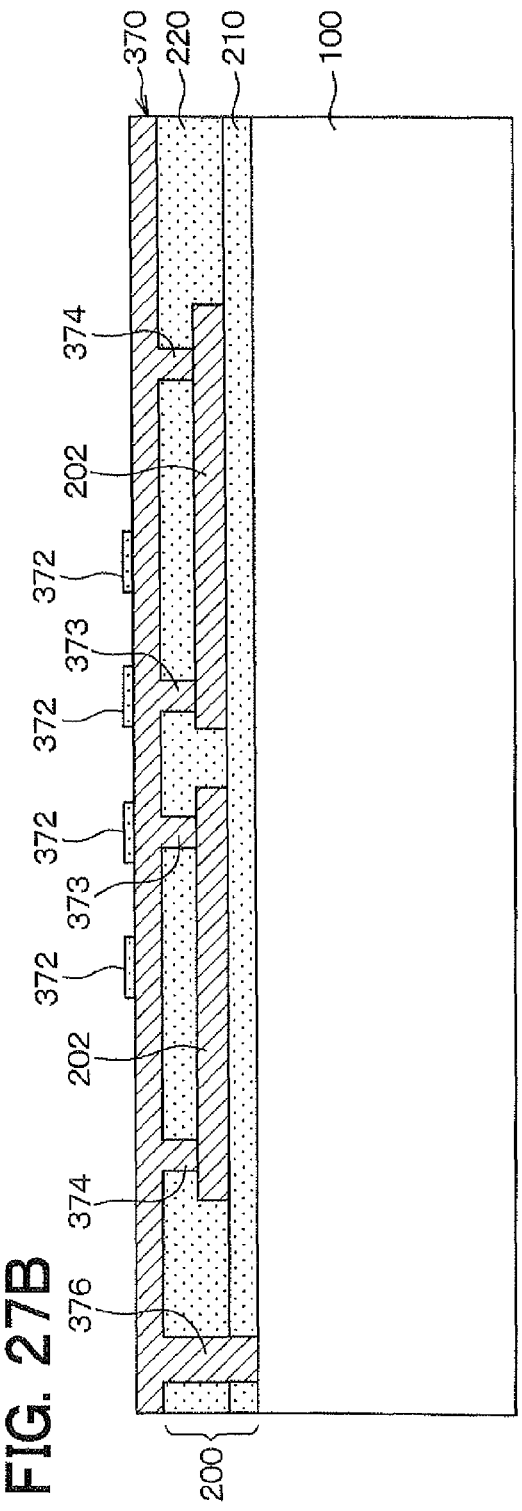

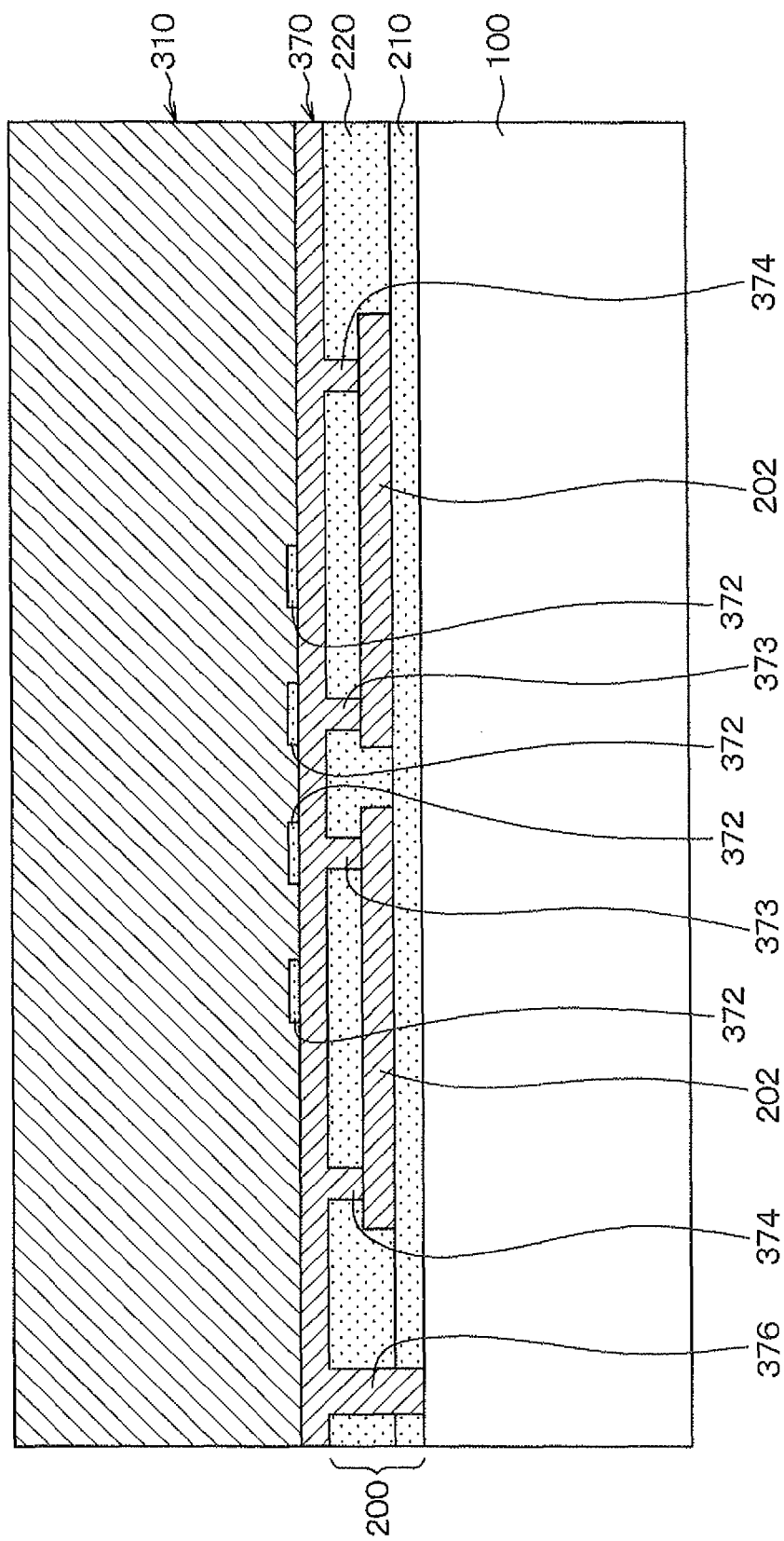

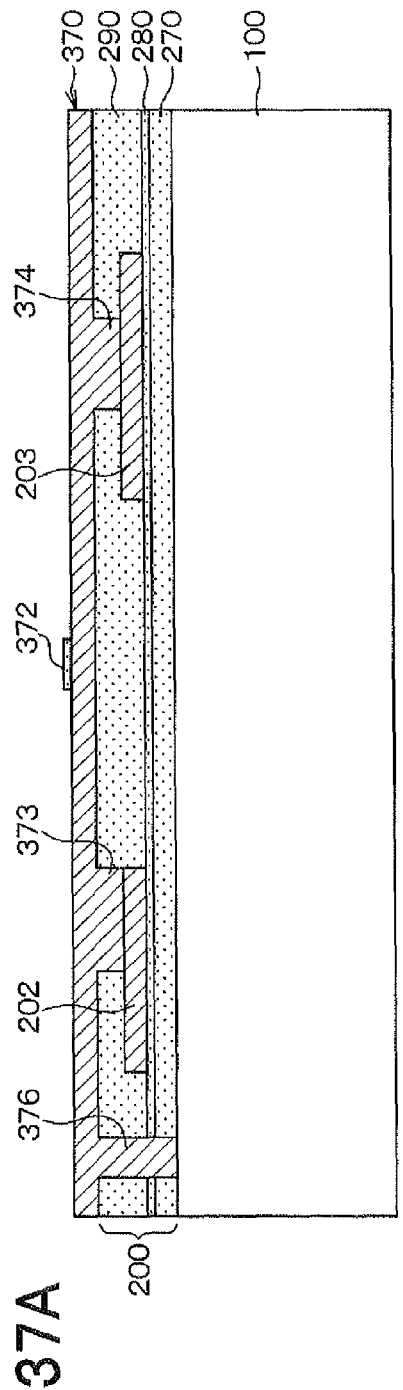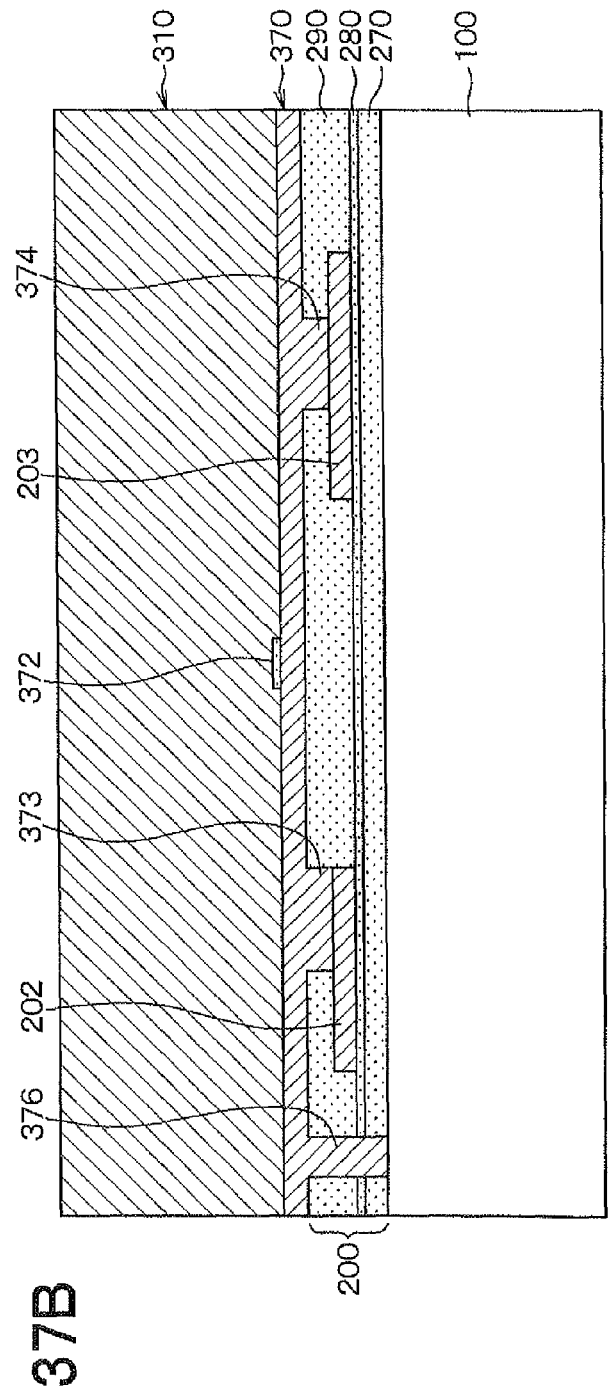

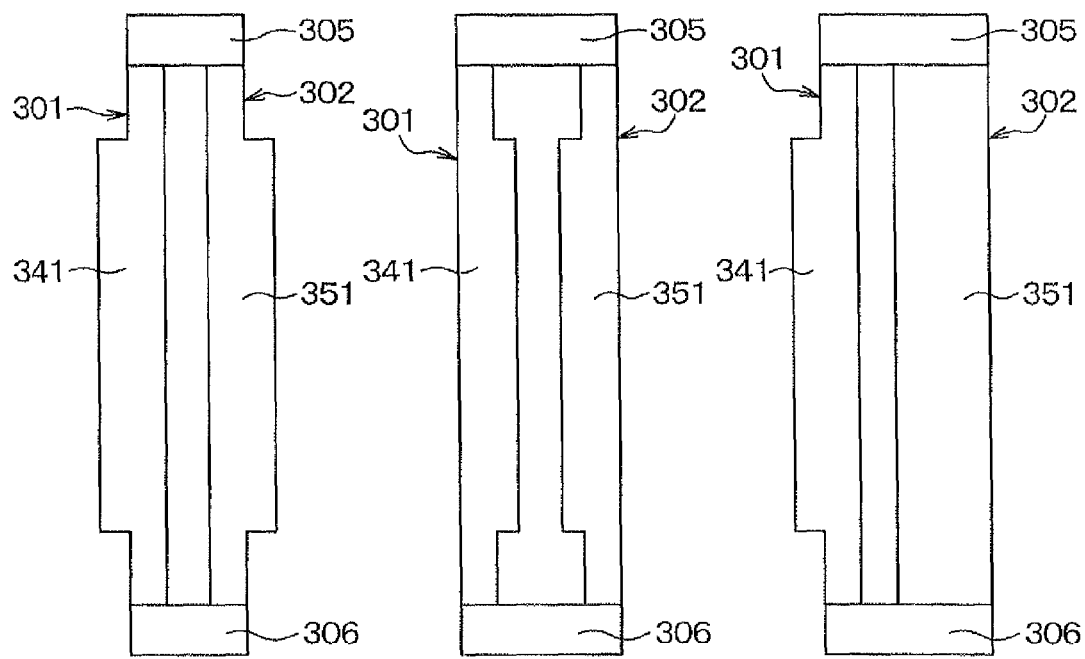
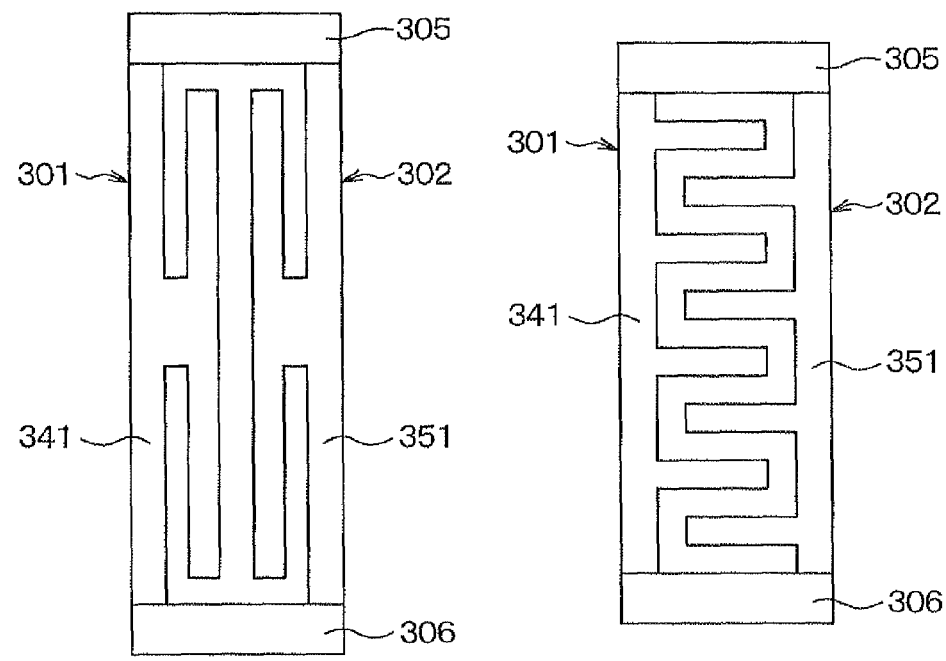

PHYSICAL QUANTITY DETECTION DEVICE AND METHOD FOR MANUFACTURING THE SAME

CROSS REFERENCE TO RELATED APPLICATION

This application is based on Japanese Patent Application No. 2010-91410 filed on Apr. 12, 2010, the disclosure of which is incorporated herein by reference.

TECHNICAL FIELD

The present invention relates to a physical quantity detection device for detecting a physical quantity on the basis of the deformation of a diaphragm and a method of manufacturing the physical quantity detection device.

BACKGROUND

A pressure sensor for detecting pressure by diaphragms constructed of trenches formed in a semiconductor substrate has been proposed by, for example, patent documents 1 and 2.

Specifically, in the patent document 1, a first trench having a specified depth is formed in an N-type substrate and a second trench having a specified depth is formed in such a way as to surround the first trench. In this way, a wall between the first trench and the second trench is constructed as a diaphragm. Further, in order to prevent portions opposite to each other in the diaphragms from being electrically connected to each other, P-type impurities are introduced into the diaphragms. Further, the upper portion of the first trench is covered with an insulating film and hence the interior of the first trench is hermetically sealed, whereby a reference pressure chamber is constructed.

According to this construction, the diaphragm is deformed in response to a pressure difference between the inside and the outside of the first trench, so that a distance between the p-type impurity regions of the respective diaphragms is varied and hence a capacitance between the p-type impurity regions of the respective diaphragms is varied. Hence, when a variation in the capacitance between the p-type impurity regions is taken out, the pressure can be detected.

Further, in the patent document 2, for example, an N-type semiconductor thin film is formed over a support substrate via an insulating separation film, and a first trench and a second trench are formed in this semiconductor thin film in such a way as to be parallel to each other. Further, of the semiconductor thin film, a portion sandwiched by the respective trenches is constructed as a diaphragm which can be elastically deformed. This diaphragm has, for example, P-type impurities introduced therein at a high concentration. Further, the semiconductor thin film has a fixed electrode part formed therein, the fixed electrode part having P-type impurities introduced into a position corresponding to the diaphragm via the first trench at a high concentration. The first trench is hermetically sealed by a sealing film, and this hermetically sealed space is made a pressure reference chamber.

According to this construction, a capacitor in which capacitance is varied in response to the deformation of the diaphragm is formed between the diaphragm and the fixed electrode. Hence, by taking out a variation in the capacitance, the pressure can be detected.
[Patent document 1] JP-A-S63-175737
[Patent document 2] JP-A-H11-220137

However, in the patent document 1, the P-type impurity region for detecting the capacitance is formed in the N-type diaphragm, so that a PN junction part is formed between the N-type diaphragm and the P-type impurity region. Similarly, in the patent document 2, the P-type fixed electrode part is formed in the N-type semiconductor thin film, so that a PN junction part is formed between the fixed electrode part and the semiconductor thin film.

In this way, in the related art described above, the electrode for detecting the capacitance is formed of a separation structure by the PN junction. For this reason, when the pressure is detected in a high temperature atmosphere, minority carriers are increased by a temperature increase and hence a leak current essential to the PN junction flows. This presents a problem that capacitance detection characteristics such as sensitivity and accuracy are made unstable depending on the temperature.

Although there has been described above the problem presented in the case of detecting the pressure, the same problem can be said for the physical quantity which can be detected by taking out a variation in the capacitance which is caused by the deformation of the diaphragm.

SUMMARY

In view of the above-described problem, it is an object of the present disclosure to provide a physical quantity detection device for detecting a physical quantity on the basis of the deformation of a diaphragm. The physical quantity detection device is capable of preventing capacitance detection characteristics from being made unstable by a PN junction part. Further, it is another object of the present disclosure to provide a method of manufacturing the physical quantity detection device.

According to a first aspect of the present disclosure, a physical quantity detection device includes: an insulating layer; a semiconductor layer disposed on a surface of the insulating layer; and a first electrode and a second electrode for detecting a physical quantity disposed in the semiconductor layer. The first electrode has a first wall part disposed in the semiconductor layer and protruding along with a direction crossing the surface of the insulating layer. The second electrode has a second wall part disposed in the semiconductor layer and protruding along with a direction crossing the surface of the insulating layer. At least one of the first wall part and the second wall part includes a pair of diaphragms and a cover part. The pair of diaphragms faces each other so that a hollow cylinder having an opening opposite to the insulating layer is provided. The cover part covers the opening of the hollow cylinder. One of the pair of diaphragms faces the other one of the first wall part and the second wall part or one of a pair of diaphragms in the other one of the first wall part and the second wall part. The hollow cylinder provides a hollow portion having a predetermined reference pressure. A distance between the one of the pair of diaphragms and the other one of the first wall part and the second wall part or a distance between the one of the pair of diaphragms and the one of the pair of diaphragms in the other one of the first wall part and the second wall part is changed in accordance with pressure difference between the predetermined reference pressure and a pressure of an outside of the hollow portion when a physical quantity is applied to the pair of diaphragms. The physical quantity is detected based on a capacitance between the first electrode and the second electrode, the capacitance being varied with the distance.

According to the above device, in the first electrode and the second electrode, the respective wall parts formed in the semiconductor layer are independent of each other over the insulating layer and are electrically separated from each other, so that the respective wall parts do not need a semiconductor region for making the respective wall parts function as respective electrodes. For this reason, a PN junction part is not formed in the respective wall parts, which can prevent capacitance detection characteristics from being made unstable by this PN junction part. Hence, the capacitance detection characteristics can be held very stable for the temperature of the physical quantity detection device and disturbance such as the outside atmosphere.

According to a second aspect of the present disclosure, a physical quantity detection device includes: an insulating layer; a semiconductor layer disposed on a surface of the insulating layer; a first electrode and a second electrode for detecting a physical quantity disposed in the semiconductor layer; a first insulating wall part and a second insulating wall part; and a cover part made of insulating material. The first electrode has a first diaphragm in the semiconductor layer, which extends vertically to the surface of the insulating layer. The second electrode has a second diaphragm in the semiconductor layer, which extends vertically to the surface of the insulating layer. The first diaphragm and the second diaphragm face each other. One end of the first diaphragm and a corresponding end of the second diaphragm are coupled with each other via the first insulating wall part. The other end of the first diaphragm and a corresponding end of the second diaphragm are coupled with each other via the second insulating wall part. The first insulating wall part and the second insulating wall part face each other. The first diaphragm, the second diaphragm, the first insulating wall part and the second insulating wall part provide a wall part having a hollow cylinder with an opening opposite to the insulating layer. The cover part covers the opening of the wall part. When a physical quantity is applied to the first electrode and the second electrode, the first diaphragm and the second diaphragm are deformed according to pressure difference between a hollow portion of the wall part and an outside of the hollow portion. The physical quantity is detected on the basis of a capacitance between the first electrode and the second electrode, which is varied with deformation of the first diaphragm and the second diaphragm.

According to the above device, the diaphragm of the first electrode and the diaphragm of the second electrode are independent of each other and electrically separated from each other over the insulting layer, so that the respective diaphragms do not need a semiconductor region for making the respective diaphragms function as the electrodes. For this reason, a PN junction part is not formed in the respective electrodes, which can prevent capacitance detection characteristics from being made unstable by this PN junction part. Hence, the capacitance detection characteristics can be held very stable for the temperature of the physical quantity detection device and disturbance such as the outside atmosphere. Further, each of the electrodes is constructed of one of the diaphragms, so that the electrode can be reduced in size in a plane direction of the one surface of the insulating layer.

According to a third aspect of the present disclosure, a physical quantity detection device includes: an insulating layer; a semiconductor layer disposed on a surface of the insulating layer; a first electrode and a second electrode for detecting a physical quantity disposed in the semiconductor layer; and an insulating cover layer. The first electrode extends along with a direction crossing the surface of the insulating layer. The first electrode extends along with a direction crossing the surface of the insulating layer. At least one of the first electrode and the second electrode includes a pair of diaphragms. The pair of diaphragms faces each other so that a hollow cylinder having an opening opposite to the insulating layer is provided. One of the pair of diaphragms faces the other one of the first electrode and the second electrode or one of a pair of diaphragms in the other one of the first electrode and the second electrode. The insulating cover layer is disposed on semiconductor layer, and covers the opening of the hollow cylinder. The insulating layer and the insulating cover layer provide a space portion between the insulating layer and the insulating cover layer. The space portion is independent from a hollow portion of the hollow cylinder. The insulating cover layer has a through hole for connecting the space portion and an outside of the space portion. The hollow portion has a predetermined reference pressure. A distance between the one of the pair of diaphragms and the other one of the first electrode and the second electrode or a distance between the one of the pair of diaphragms and one of a pair of diaphragms in the other one of the first electrode and the second electrode is changed in accordance with pressure difference between the hollow portion and the space portion when a physical quantity is applied to the pair of diaphragms. The physical quantity is detected based on a capacitance between the first electrode and the second electrode, the capacitance being varied with the distance.

According to the above device, the respective electrodes are independent of each other and hence electrically separated from each other between the insulating layer and the insulating cover layer, so that the respective electrodes formed in the semiconductor layer do not need to have a semiconductor region. For this reason, the respective electrodes do not have a PN junction part formed therein, which can prevent capacitance detection characteristics of the respective electrodes from being made unstable by the PN junction part. Hence, the capacitance detection characteristics of can be held very stable for the temperature of the physical quantity detection device and disturbance such as the outside atmosphere.

According to a fourth aspect of the present disclosure, a physical quantity detection device includes: an insulating layer; a semiconductor layer disposed on a surface of the insulating layer; and a variable electrode, a movable electrode and a fixed electrode, which are disposed in the semiconductor layer, for detecting a physical quantity. The variable electrode has a wall part and a cover part. The wall part has a hollow cylinder with a diaphragm and a fixed part. The diaphragm is disposed on the surface of the insulating layer and extending along with a direction perpendicular to the surface of the insulating layer. The fixed part faces the diaphragm. The cover part covers an opening of the wall part, which is opposite to the insulating layer. The diaphragm faces the fixed electrode, and the fixed part faces the movable electrode. The diaphragm is deformable in accordance with pressure difference between a hollow portion of the variable electrode and an outside of the hollow portion. A physical quantity is detected on the basis of a capacitance between the variable electrode and the fixed electrode, the capacitance being varied with deformation of the diaphragm. When another physical quantity is applied to the movable electrode in a planar direction of the surface of the insulating layer, a distance between the movable electrode and the fixed part is varied with the another physical quantity. The another physical quantity is detected on the basis of a capacitance between the movable electrode and the fixed part, the capacitance being varied with the distance between the movable electrode and the fixed part.

According to the above device, pressure, acceleration, or angular velocity can be detected as a physical quantity, respectively. Further, the variable electrode is independent of and electrically separated from the movable electrode and the fixed electrode on the insulating layer, so that the diaphragm and the fixed part do not need to have a semiconductor region for making the diaphragm and the fixed part function as the electrodes. For this reason, a PN junction part is not formed in the diaphragm and the fixed part. Hence, this can prevent capacitance detection characteristics of the diaphragm and the fixed part from being made unstable by the PN junction part. Therefore, the capacitance detection characteristics can be held very stable for the temperature of the physical quantity detection device and disturbance such as the outside atmosphere.

According to a fifth aspect of the present disclosure, a method of manufacturing a physical quantity detection device includes: forming a semiconductor layer on a surface of an insulating layer so that a stacking structure is provided; forming a trench in the semiconductor layer so that a first wall part and a second wall part are provided, wherein the first wall part extends along with a direction crossing the surface of the insulating layer, and the second wall part extends along with a direction crossing the surface of the insulating layer, wherein at least one of the first wall part and the second wall part includes a pair of diaphragms, wherein the pair of diaphragms faces each other so that a hollow cylinder having an opening opposite to the insulating layer is provided, and wherein one of the pair of diaphragms faces the other one of the first wall part and the second wall part or one of a pair of diaphragms in the other one of the first wall part and the second wall part; and forming a cover part to cover the opening of the hollow cylinder.

According to the above method, in the first electrode and the second electrode, the respective wall parts formed in the semiconductor layer are independent of each other over the insulating layer and are electrically separated from each other, so that the respective wall parts do not need a semiconductor region for making the respective wall parts function as respective electrodes. For this reason, a PN junction part is not formed in the respective wall parts, which can prevent capacitance detection characteristics from being made unstable by this PN junction part. Hence, the capacitance detection characteristics can be held very stable for the temperature of the physical quantity detection device and disturbance such as the outside atmosphere.

According to a sixth aspect of the present disclosure, a method of manufacturing a physical quantity detection device includes: forming a first semiconductor layer on a surface of an insulating layer so that a stacking structure is provided; forming a stopper film on the first semiconductor layer; forming a second semiconductor layer over the first semiconductor layer to cover the stopper film; etching the first semiconductor layer and the second semiconductor layer with using the stopper film as a stopper in order to form a first wall part and a second wall part, wherein the first wall part is disposed over a first bottom part of the first semiconductor layer and extends along with a direction crossing the surface of the insulating layer, wherein the second wall part is disposed over a second bottom part of the first semiconductor layer and extends along with a direction crossing the surface of the insulating layer, wherein the etching of the first semiconductor layer is stopped at the stopper film so that at least one of the first wall part and the second wall part includes a pair of diaphragms, wherein the pair of diaphragms faces each other so that a hollow cylinder having an opening opposite to the insulating layer is provided, and wherein one of the pair of diaphragms faces the other one of the first wall part and the second wall part or one of a pair of diaphragms in the other one of the first wall part and the second wall part; forming a third semiconductor layer over the second semiconductor layer, the third semiconductor layer covering a hollow portion of the hollow cylinder; and etching the third semiconductor layer to form a cover part over the at least one of the first wall part and the second wall part so as to cover the opening of the hollow cylinder.

According to the above method, the diaphragm of the first electrode and the diaphragm of the second electrode are independent of each other and electrically separated from each other over the insulting layer, so that the respective diaphragms do not need a semiconductor region for making the respective diaphragms function as the electrodes. For this reason, a PN junction part is not formed in the respective electrodes, which can prevent capacitance detection characteristics from being made unstable by this PN junction part. Hence, the capacitance detection characteristics can be held very stable for the temperature of the physical quantity detection device and disturbance such as the outside atmosphere. Further, each of the electrodes is constructed of one of the diaphragms, so that the electrode can be reduced in size in a plane direction of the one surface of the insulating layer.

According to a seventh aspect of the present disclosure, a method of manufacturing a physical quantity detection device includes: forming a semiconductor layer on a surface of an insulating layer so that a stacking structure is provided; forming a pair of first trenches in the semiconductor layer and embedding an insulating material in each first trench to form a first insulating wall part and a second insulating wall part; forming a second trench in the semiconductor layer to form a pair of diaphragms between the first insulating wall part and the second insulating wall part, wherein each diaphragm contacts a corresponding one of the first insulating wall part and the second insulating wall part, faces each other, and extends along with a direction perpendicular to the surface of the insulating layer, and wherein the pair of diaphragms, the first insulating wall part and the second insulating wall part provide a wall part having a hollow cylinder with an opening opposite to the surface of the insulating layer; and forming a cover part made of an insulating material to cover the opening portion of the wall part.

According to the above method, the respective electrodes are independent of each other and hence electrically separated from each other between the insulating layer and the insulating cover layer, so that the respective electrodes formed in the semiconductor layer do not need to have a semiconductor region. For this reason, the respective electrodes do not have a PN junction part formed therein, which can prevent capacitance detection characteristics of the respective electrodes from being made unstable by the PN junction part. Hence, the capacitance detection characteristics of can be held very stable for the temperature of the physical quantity detection device and disturbance such as the outside atmosphere.

According to an eighth aspect of the present disclosure, a method of manufacturing a physical quantity detection device includes: forming a semiconductor layer on a surface of an insulating layer so that a stacking structure is provided; forming a first electrode and a second electrode in the semiconductor layer in such a manner that the first electrode and the second electrode extend along with a direction crossing the surface of the insulating layer, wherein at least one of the first electrode and the second electrode includes a pair of diaphragms, which faces each other and provides a hollow cylinder with an opening opposite to the surface of the insulating layer, wherein one of the pair of diaphragms faces the other one of the first electrode and the second electrode or one of a pair of diaphragms in the other one of the first electrode and the second electrode; forming an insulating cover layer over the semiconductor layer to cover the opening of the hollow cylinder so that a hollow portion of the hollow cylinder is hermetically sealed and to form a space portion between the insulating layer and the insulating cover layer, wherein the space portion is different from the hollow portion; and forming a through hole in the insulating cover layer for coupling between the space portion and an outside of the space portion.

According to the above method, pressure, acceleration, or angular velocity can be detected as a physical quantity, respectively. Further, the movable electrode is independent of and electrically separated from the movable electrode and the fixed electrode on the insulating layer, so that the diaphragm and the fixed part do not need to have a semiconductor region for making the diaphragm and the fixed part function as the electrodes. For this reason, a PN junction part is not formed in the diaphragm and the fixed part. Hence, this can prevent capacitance detection characteristics of the diaphragm and the fixed part from being made unstable by the PN junction part. Therefore, the capacitance detection characteristics can be held very stable for the temperature of the physical quantity detection device and disturbance such as the outside atmosphere.

BRIEF DESCRIPTION OF THE DRAWINGS

The above and other objects, features and advantages of the present invention will become more apparent from the following detailed description made with reference to the accompanying drawings. In the drawings:

FIGS. 3A and 3B are section views of the diaphragms of the first electrode and the second electrode before and after the first electrode and the second electrode having pressure applied thereto;

FIGS. 27A and 27B are views to show steps subsequent to the steps of the process shown in FIGS. 26A, 26B;

FIG. 28 is a view to show a step subsequent to the steps of the process shown in FIGS. 27A, 27B;

FIGS. 37A, 37B are views to show steps subsequent to the steps of the process shown in FIGS. 36A, 36B;

FIGS. 91A, 91B, 91C, 91D, and 91E are views to show variations in the plane structure of the respective diaphragms in the other embodiments.

DETAILED DESCRIPTION

First Embodiment

Hereinafter, a 1st embodiment of the present invention will be described with reference to the drawings. A physical quantity detection device according to the present embodiment is constructed in such a way as to detect pressure as a physical quantity.

Figure 1:
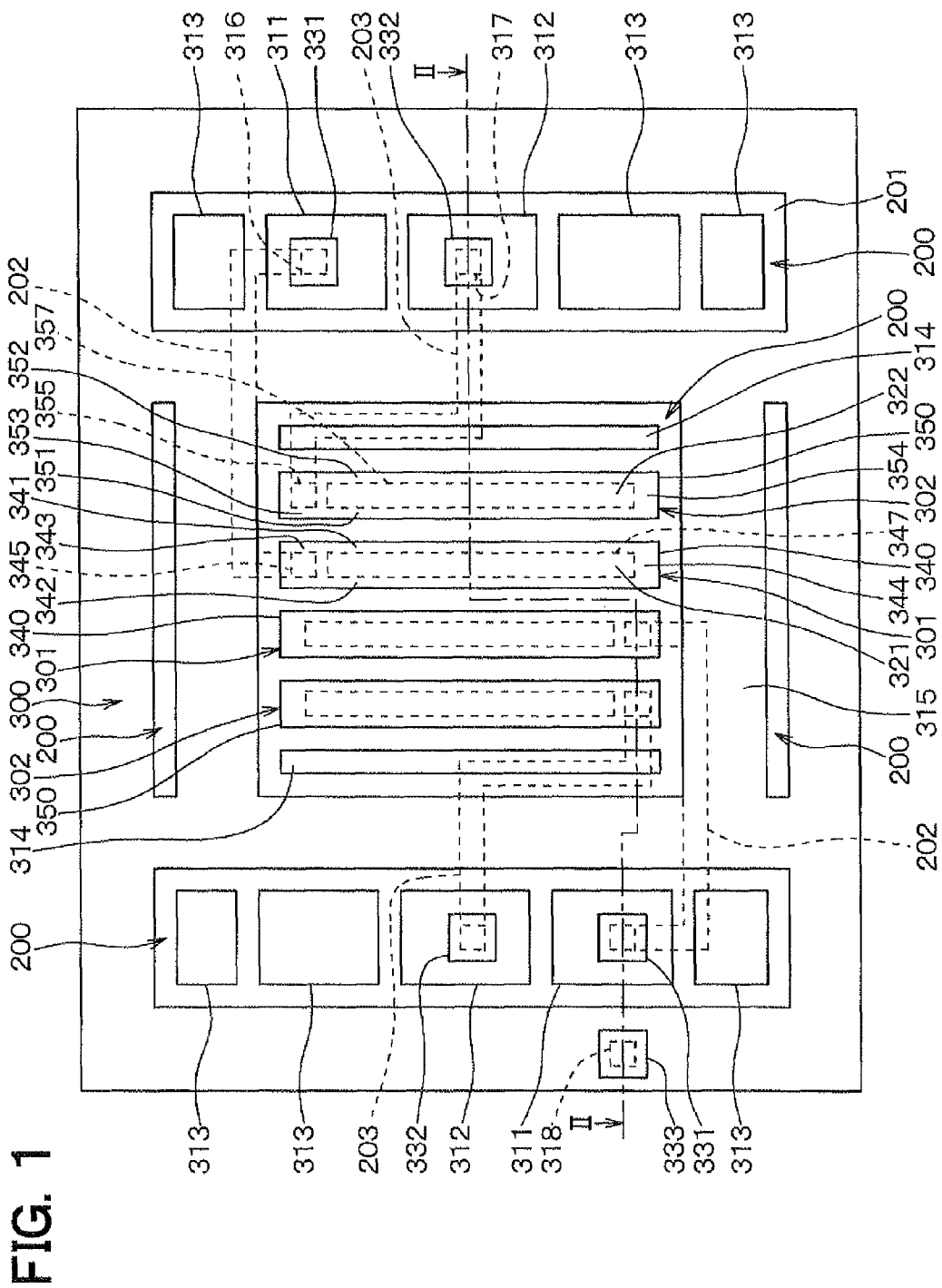
FIG. 1 is a plan view of a physical quantity detection device according to a 1st embodiment.
Figure 2:
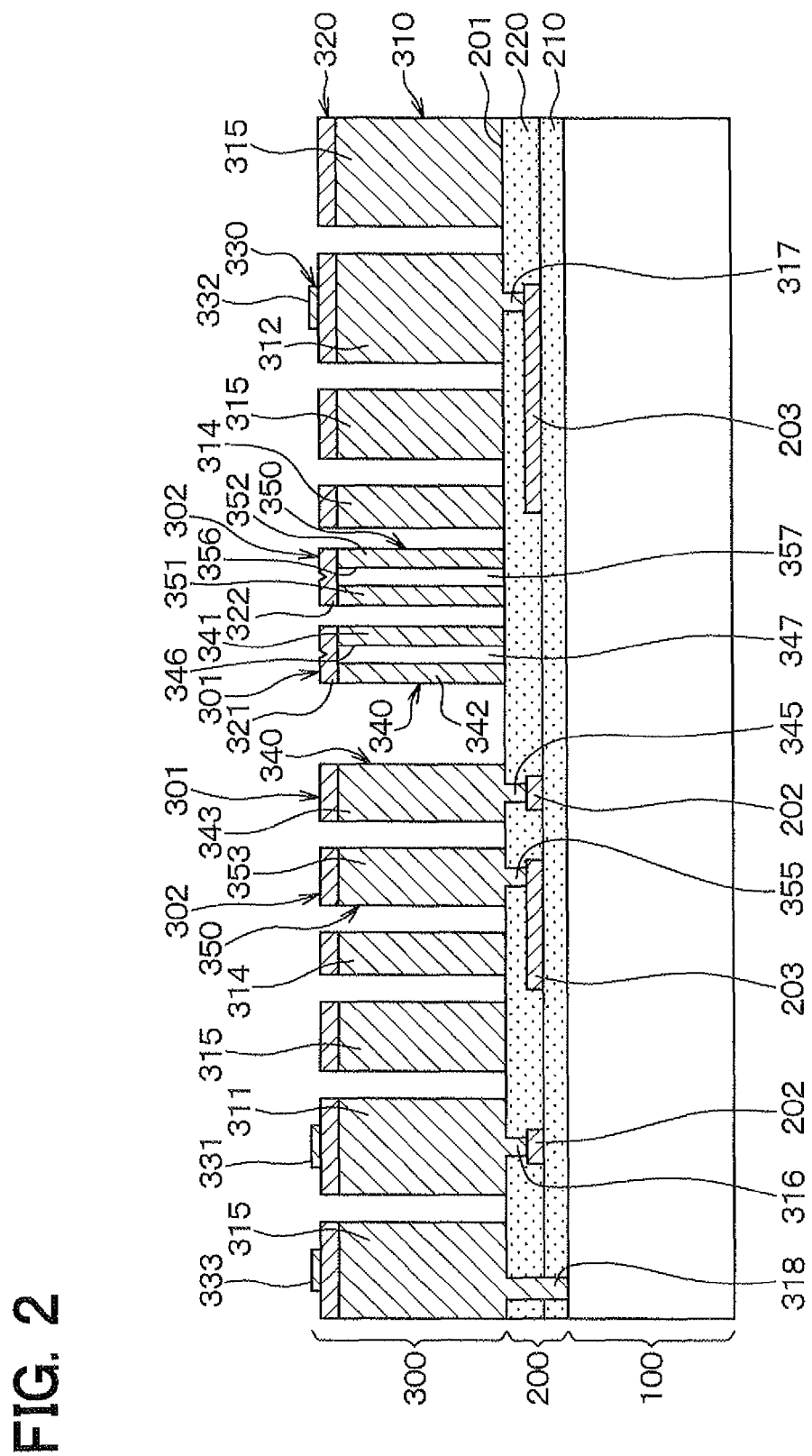
FIG. 2 is a section view taken on a line II-II in FIG. 1.

FIG. 1 is a plan view of a physical quantity detection device according to the present embodiment. FIG. 2 is a section view taken on a line A-A' in FIG. 1. Hereinafter, the structure of the physical quantity detection device will be described with reference to FIG. 1 and FIG. 2.

As shown in FIG. 2, the physical quantity detection device has a laminated structure in which an insulating layer 200 is formed over a semiconductor substrate 100 and in which an electrode layer 300 is formed over one surface 201 of this insulating layer 200. In this construction, the semiconductor substrate 100 is a support substrate and, for example, a single crystal silicon substrate is employed as the semiconductor substrate 100.

The insulating layer 200 has a laminated structure in which a plurality of wiring patterns 202, 203 are formed between a first insulating layer 210 and a second insulating layer 220 formed over the first insulating layer 210.

The first insulating layer 210 is formed over the semiconductor substrate 100. Each of the wiring patterns 202, 203 is a wiring in which polysilicon (polycrystalline silicon) containing impurities at a high concentration and having a low resistance or metal (such as W, Mo, Al) is patterned in a specified pattern. The second insulating layer 220 is formed over the first insulating layer 210 in such a way as to cover the wiring patterns 202, 203. As for the first insulating layer 210 and the second insulating layer 220, an insulating substance such as SiO$_2$ is employed.

The electrode layer 300 is a layer in which a first electrode 301 and a second electrode 302 for detecting a physical quantity are formed. The electrode layer 300 like this is constructed of a first semiconductor layer 310, a second semiconductor layer 320, and a metal layer 330.

The first semiconductor layer 310 is formed over one surface 201 of the insulating layer 200. As shown in FIG. 1, the first semiconductor layer 310 is partitioned into connection parts 311, 312, dummy connection parts 313, a first wall part 340, a second wall part 350, dummy wall parts 314, and a peripheral part 315.

The connection parts 311, 312 are relay parts for electrically connecting the respective electrodes 301, 302 to external parts, respectively. For example, one connection part 311 is electrically connected to the first electrode 301 via the wiring pattern 202, whereas the other connection part 312 is electrically connected to the second electrode 302 via the wiring pattern 203.

The dummy connection parts 313 are parts necessary for making the width of the peripheral part 315 a specified width and are arranged together with the connection parts 311, 312. Hence, two connection parts 311, 312 and three dummy connection parts 313 are arranged on one outer edge side of the one surface 201 of the insulating layer 200.

The first wall part 340 is formed in the shape of a hollow cylinder and includes two diaphragms 341, 342 which are provided in a direction to cross a plane direction of the one surface 201 of the insulating layer 200 and which are arranged opposite to each other. Further, the two diaphragms 341, 342 which are arranged opposite to each other are coupled to each other at their ends by coupling parts 343, 344. In this way, the first wall part 340 is made a cylindrical wall whose periphery is closed, and the respective diaphragms 341, 342 can be deformed in the plane direction of the one surface 201 of the insulating layer 200.

One coupling part 343 of the respective coupling parts 343, 344, as shown in FIG. 1 and FIG. 2, is electrically connected to the one wiring pattern 202 via a contact part 345. For this reason, the one coupling part 343 is formed in a larger thickness than the other coupling part 344. This wiring pattern 202 has the one connection part 311 electrically connected thereto via a contact part 316. Hence, the first wall part 340 is electrically connected the one connection part 311 via the wiring pattern 202 and is electrically connected to an external circuit via the wiring pattern 202 and the one connection part 311.

Similarly, the second wall part 350 is formed in the shape of a hollow cylinder and includes two diaphragms 351, 352 which are provided in a direction to cross the plane direction of the one surface 201 of the insulating layer 200 and which are arranged opposite to each other. Further, the two diaphragms 351, 352 which are arranged opposite to each other are coupled to each other at their ends by coupling parts 353, 354. In this way, the second wall part 350 is made a cylindrical wall whose periphery is closed and the respective diaphragms 351, 352 can be deformed in the plane direction of the one surface 201 of the insulating layer 200.

One coupling part 353 of the respective coupling parts 353, 354 is electrically connected to the other wiring pattern 203 via a contact part 355. For this reason, the one coupling part 353 is formed in a larger thickness than the other coupling part 354. This wiring pattern 203 has the other connection part 312 electrically connected thereto via a contact part 317.

Hence, the second wall part 350 is electrically connected to an external circuit via the wiring pattern 203 and the other connection part 312.

Here, "the direction to cross the plane direction of the one surface 201 of the insulating layer 200" means a direction vertical to the one surface 201 of the insulating layer 200. Hence, the diaphragms 341, 342 of the first wall part 340 and the diaphragms 351, 352 of the second wall part 350, as shown in FIG. 2, are provided in such a way as to erect vertically to the one surface 201 of the insulating layer 200, respectively.

In the first wall part 340 and the second wall part 350, one diaphragm 341 of the first wall part 340 and one diaphragm 351 of the second wall part 350 are arranged opposite to each other at a specified interval.

The dummy wall part 314, as in the case of the dummy connection part 313, is a part necessary for making the width of the peripheral part 315 a specified width. The dummy wall part 314 is arranged next to the second wall part 350 in such a way as that the dummy wall part 314 and the first wall part 340 sandwich the second wall part 350.

In the present embodiment, the first semiconductor layer 310 has two sets of parts formed therein, each set of parts including the respective wall parts 314, 340, 350, two connection parts 311, 312, and three dummy connection parts 313. That is, a plan structure shown in FIG. 1 is, in effect, a structure symmetrical with respect to a point or a line. The wiring patterns 202, 203 also are provided for each of the sets.

The peripheral part 315 is a part formed in such a way as to surround the periphery of the two connection parts 311, 312 and three dummy connection parts 313, which are juxtaposed with each other, and to surround the periphery of the respective wall parts 314, 340, 350. This peripheral part 315 is electrically connected to the semiconductor substrate 100 via a contact part 318 formed in the insulating layer 200. In this manner, the semiconductor substrate 100 is electrically connected to the external circuit via the peripheral part 315.

The connection parts 311, 312, the dummy connection parts 313, the dummy wall part 314, and the peripheral part 315, similarly to the respective wall parts 340, 350, are also provided in such a way as to erect vertically to the one surface 201 of the insulating layer 200, respectively.

The second semiconductor layer 320, as shown in FIG. 2, is formed over the first semiconductor layer 310 and is patterned in the same shapes as the connection parts 311, 312, the dummy connection parts 313, the respective wall parts 314, 340, 350, and the peripheral part 315, which are formed over the first semiconductor layer 310.

Further, of the second semiconductor layer 320, a part formed over the first wall part 340 is made a first cover part 321. The first cover part 321 closes an opening portion 346, which is positioned on the opposite side of the insulating layer 200 side, of the first wall part 340. In other words, the first cover part 321 closes the opening portion 346 of the first wall part 340. In this manner, a hollow portion 347 in the first wall part 340 is hermetically sealed by the insulating layer 200, the respective diaphragms 341, 342, the respective coupling parts 343, 344, and the first cover part 321 and is hence separated from a space outside the first wall part 340.

Similarly, of the second semiconductor layer 320, a part formed over the second wall part 350 is made a second cover part 322. The second cover part 322 closes an opening portion 356, which is positioned on the opposite side of the insulating layer 200 side, of the second wall part 350. In this manner, a hollow portion 357 in the second wall part 350 is hermetically sealed by the insulating layer 200, the respective diaphragms 351, 352, the respective coupling parts 353, 354, and the second cover part 322 and is hence separated from a space outside the second wall part 350.

The respective hollow portions 347, 357 of the respective wall parts 340, 350 are set at the same pressure and are made reference pressure chambers at the time of detecting pressure. In the present embodiment, the respective hollow portions 347, 357 are set at a vacuum. Here, the respective hollow portions 347, 357 do not need to be set at a vacuum but may be set at a specified pressure.

A semiconductor material such as polysilicon is employed as the material of the first semiconductor layer 310 and the second semiconductor layer 320. Hence, the respective wall parts 340, 350 and the respective cover parts 321, 322 are formed of the semiconductor material, so that the properties of the electrodes 301, 302 each of which is constructed of each of the wall parts 340, 350 and each of the cover parts 321, 322 are stabilized.

The metal layer 330 is formed over the second semiconductor layer 320 and is patterned into the respective connection parts 311, 312, and the peripheral part 315. In this way, pads 331 to 333 are formed in the metal layer 330. The pad 331 is formed in correspondence with one connection part 311, and the pad 332 is formed in correspondence with the other connection part 312. Further, the pad 333 is formed in correspondence with the peripheral part 315. When these pads 331 to 333 have bonding wires (not shown) connected thereto, the physical quantity detection device can be electrically connected to the external circuit.

A method for detecting pressure as a physical quantity in the structure described above will be described with reference to FIG. 3. FIGS. 3A and 3B are section views of the respective diaphragms 341, 342, 351, 352 before and after applying pressure to the respective electrodes 301, 302.

First, as shown in FIG. 3A, when a pressure is not applied to the respective electrodes 301, 302, the respective diaphragms 341, 342, 351, 352 are not deformed. It is performed to detect a capacitance between the first electrode 301 and the second electrode 302, the capacitance being varied in response to a distance between the diaphragm 341 of the first wall part 340 and the diaphragm 351 of the second wall part 350 which are arranged opposite to each other.

Subsequently, as shown in FIG. 3B, when a pressure is applied to the first electrode 301 and the second electrode 302, the respective diaphragms 341, 342, 351, 352 are deformed along the plane direction of the one surface 201 of the insulating layer 200 in response to a pressure difference between the hollow portions 347, 357 of the respective wall parts 340, 350 and the outside of the respective wall parts 340, 350.

Specifically, the respective diaphragms 341, 342 of the first electrode 301 are deformed in such a way that a distance between them becomes shorter, and the respective diaphragms 351, 352 of the second electrode 302 are deformed in such a way that a distance between them becomes shorter. When the respective diaphragms 341, 342, 351, 352 are deformed in this manner, a distance between the diaphragm 341 of the first electrode 301 and the diaphragm 351 of the second electrode 302 is made longer. For this reason, a capacitance between the first electrode 301 and the second electrode 302 is varied with respect to the capacitance when the pressure is not applied to the first electrode 301 and the second electrode 302. In this way, the pressure can be detected on the basis of the capacitance between the first electrode 301 and the second electrode 302, the capacitance being varied when the diaphragm 341 of the first wall part 340 and the diaphragm 351 of the second wall part 350, which are arranged opposite to each other, are deformed respectively.

That is, a variation in the capacitance of a capacitor constructed of the first electrode 301 and the second electrode 302 is outputted to the external circuit provided outside the physical quantity detection device. The variation in the capacitance is transformed to a voltage, and the voltage is used as the data of the pressure.

Up to this point, the general construction of the physical quantity detection device according to the present embodiment has been described. The material and the quality of the material of the respective parts of the physical quantity detection device described above will be described below in detail in a method for manufacturing the physical quantity detection device.

Next, the method for manufacturing the physical quantity detection device shown in FIG. 1 and FIG. 2 will be described with reference to FIGS. 4A, 4B to FIG. 9. FIGS. 4A, 4B to FIG. 9 correspond to the section views taken on a line A-A' in FIG. 1. When the physical quantity detection device is manufactured, the physical quantity detection devices are manufactured in the state of a wafer, and the wafer is finally divided into respective chips of the physical quantity detection devices, whereby the physical quantity detection device can be acquired. Hence, in the respective processes shown below, the physical quantity detection device is manufactured in the state of the wafer. For this reason, the semiconductor substrate 100 and the like described above is a portion of the wafer.

Figure 4A:
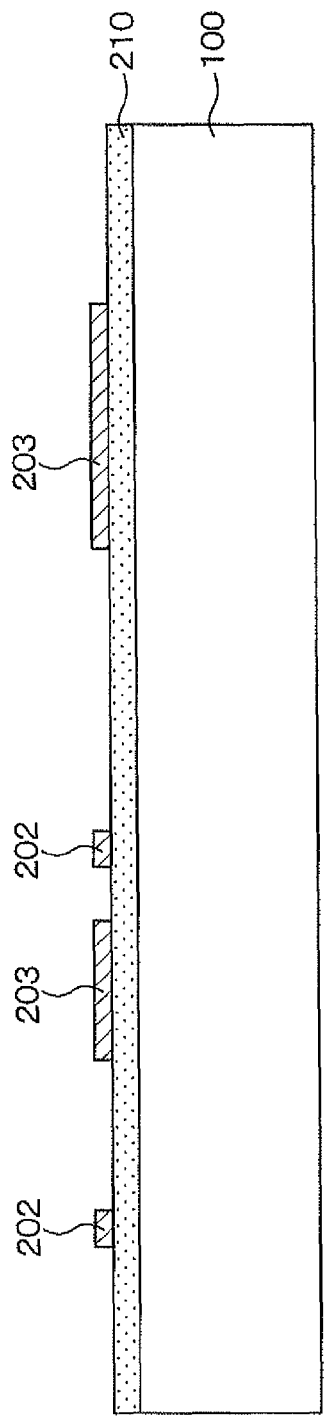
FIGS. 4A, 4B are views to show the steps of a process of manufacturing the physical quantity detection device according to the 1st embodiment.

In the process shown in FIG. 4A, first, the semiconductor substrate 100 is prepared. As to the semiconductor substrate 100, a single crystal silicon substrate containing impurities, for example, P, As, Sb at a high concentration and having a specific resistance of 0.001 to 0.1Ω·cm and having an n+ type (100) surface is employed. The thickness of the semiconductor substrate 100 is, for example, 200 to 600 μm.

The surface of this semiconductor substrate 100 is thermally oxidized or processed by a CVD method. In this way, a $SiO_2$ film having a thickness of 0.1 to 2 μm is formed as the first insulating layer 210 over the semiconductor substrate 100.

Thereafter, a first n+ type polysilicon layer containing impurities at a high concentration is formed in a thickness of 0.1 to 2 μm. Then, the first polysilicon layer is patterned by a photolithography etching technique in such a way as to couple one coupling part 343 of the first wall part 340 to one connection part 311 and to couple one coupling part 353 of the second wall part 350 to the other connection part 312. In this way, the wiring patterns 202, 203 are formed.

Figure 4B:
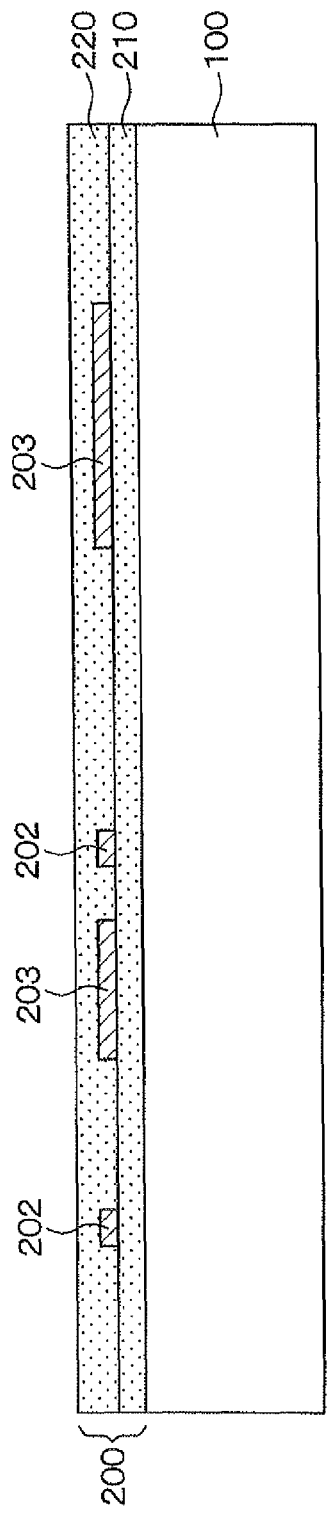

In the process shown in FIG. 4B, a $SiO_2$ film is formed as the second insulating layer 220 over the first insulating layer 210 by the CVD method or the like in such a way as to cover the wiring patterns 202, 203. Although the $SiO_2$ film is acceptable as it is, as required, the surface of the $SiO_2$ film may be planarized by a CMP method or the like. In this way, there is brought about a state in which the insulting layer 200 is formed over the semiconductor substrate 100.

Figure 5:
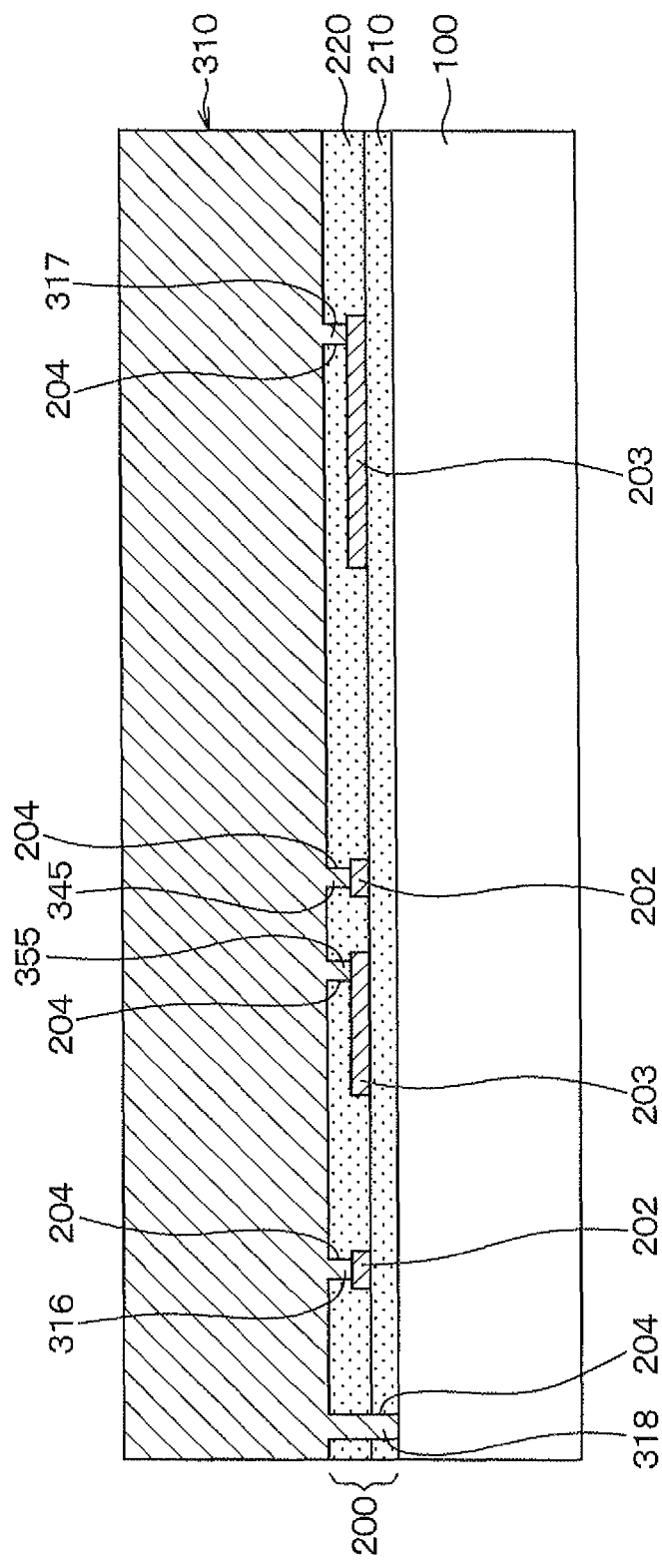
FIG. 5 is a view to show a step subsequent to the steps of the process shown in FIGS. 4A, 4B.

In the process shown in FIG. 5, a contact hole 204 is formed at a position corresponding to the peripheral part 315 of the insulating layer 200 in such a way that a portion of the semiconductor substrate 100 is exposed. Further, the contact holes 204 are formed at positions corresponding to the coupling part 343 of the first wall part 340, the coupling part 353 of the second wall part 350, and the connection parts 311, 312 of the insulating layer 200 in such a way that portions of the wiring patterns 202, 203 are exposed.

Then, polysilicon is embedded in the respective contact holes 204. In this way, the contact parts 316 to 318, 345, 355 are formed and a second polysilicon layer containing impurities at a high concentration is formed as the first semiconductor layer 310 in a thickness of 5 to 200 μm over the insulating layer 200.

Figure 6:
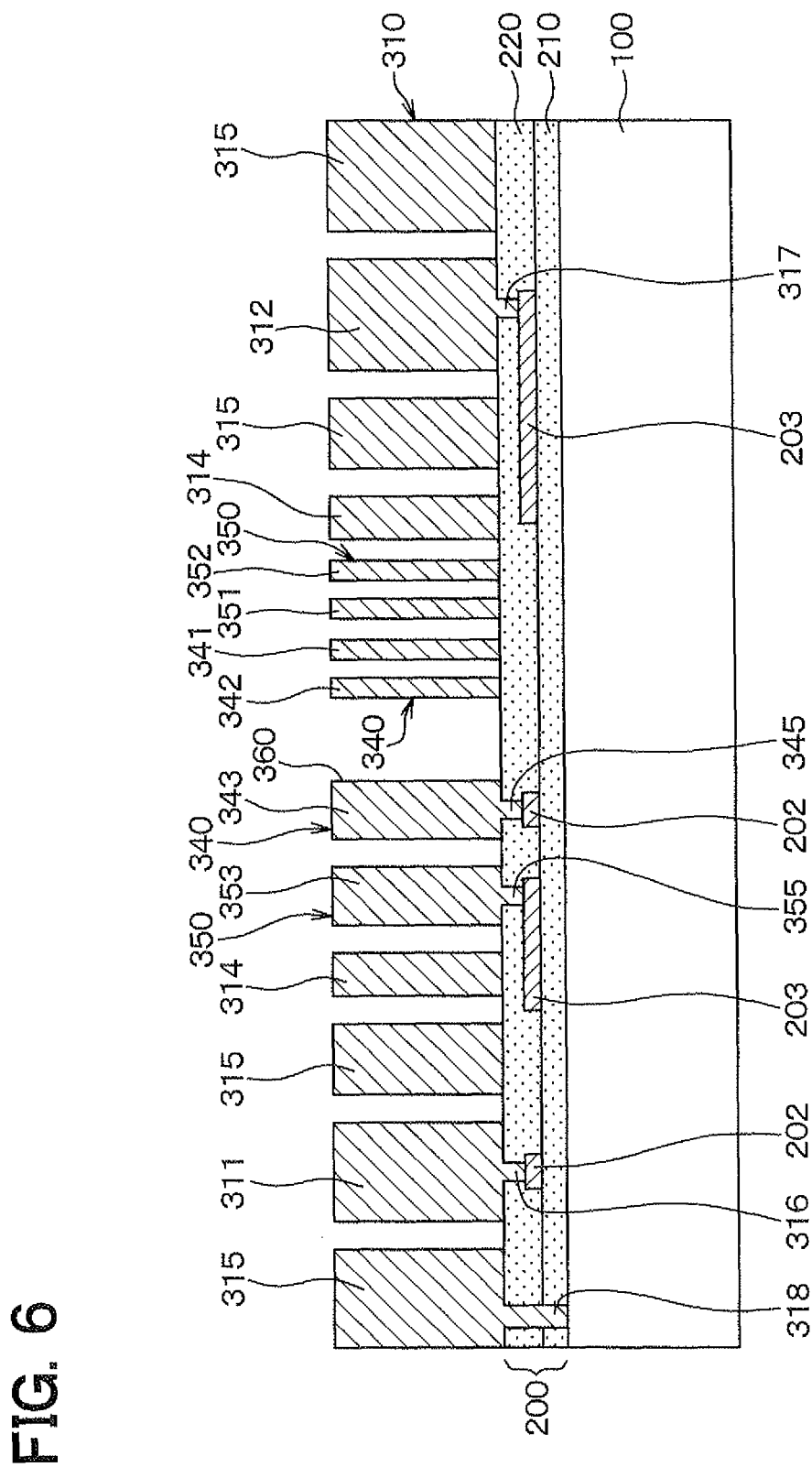
FIG. 6 is a view to show a step subsequent to the step of the process shown in FIG. 5.

In the process shown in FIG. 6, trenches 360 are formed in the second polysilicon layer by a photolithography etching technique to form the first wall part 340 formed in the shape of a hollow cylinder, the second wall part 350 formed in the shape of a hollow cylinder, the connection parts 311, 312, the dummy connection parts 313, the dummy wall part 314, and the peripheral part 315 in a direction to cross the one surface 201 of the insulating layer 200. Here, "a direction to cross the one surface 201 of the insulating layer 200", as described above, is a direction vertical to the one surface 201 of the insulating layer 200.

The first wall part 340 is formed in the shape of a hollow cylinder in which two diaphragms 341, 342 are arranged opposite to each other and are coupled by the two coupling parts 343, 344. Further, the second wall part 350 is formed in the shape of a hollow cylinder in which two diaphragms 351, 352 are arranged opposite to each other and are coupled by the two coupling parts 343, 344. Still further, the respective wall parts 340, 350 are formed in such a way that one diaphragm 341 of the first wall part 340 and one diaphragm 351 of the second wall part 350 are arranged opposite to each other at a specified interval.

In this way, when the second polysilicon layer is patterned, the width of the trench 360 is made a specified width. That is, a distance between the respective diaphragms 341 and 342, a distance between the respective diaphragms 351 and 352, a distance between the peripheral part 315 and the connection part 311, a distance between the peripheral part 315 and the connection part 312, and distances between the other respective parts are made a specified distance. Hence, in order to make the width of the peripheral part 315 a specified width, the trench 360 is formed in the second polysilicon layer, whereby the dummy connection parts 313 and the dummy wall part 314 are also formed.

Figure 7:
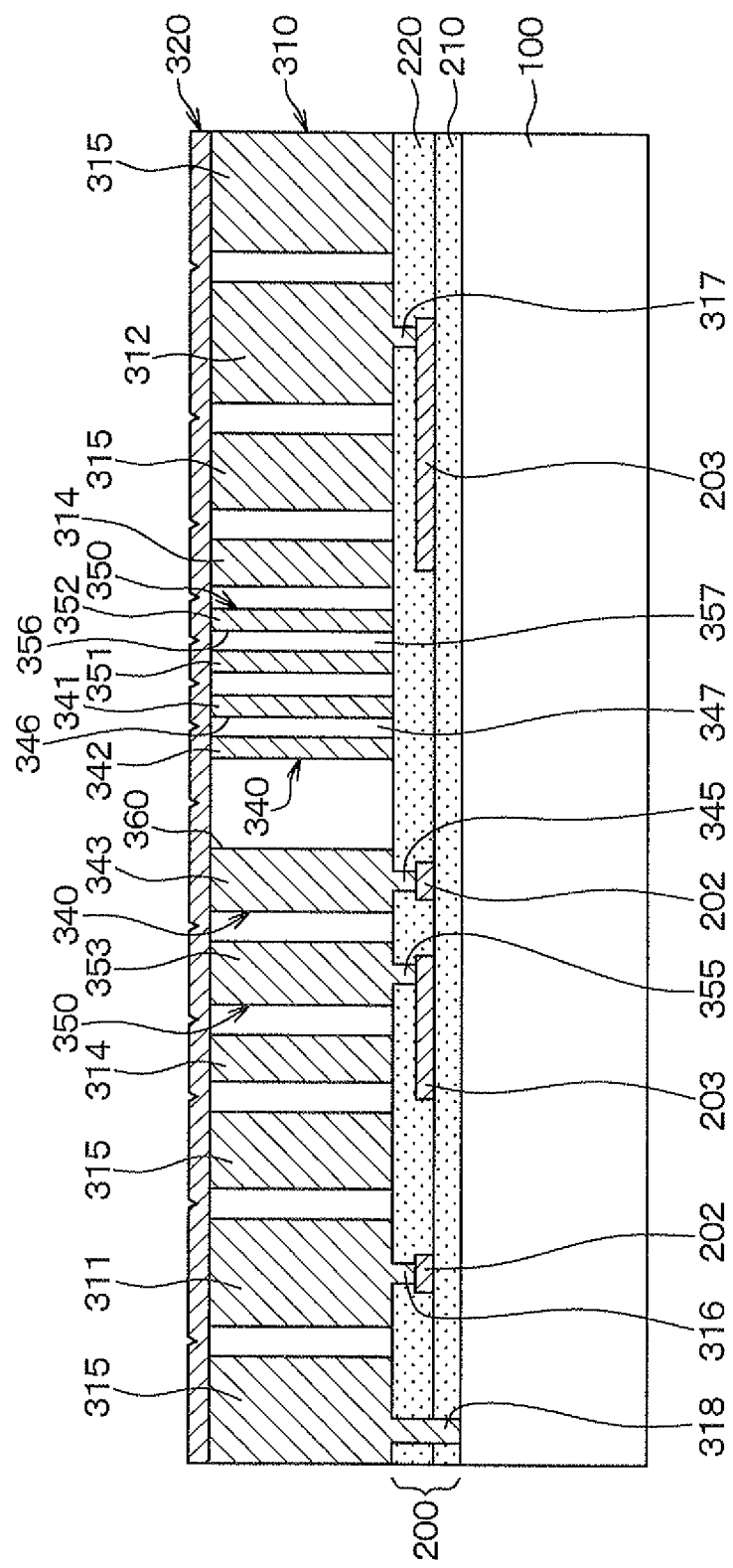
FIG. 7 is a view to show a step subsequent to the step of the process shown in FIG. 6.

In the process shown in FIG. 7, a third n+ type polysilicon layer is formed as the second semiconductor layer 320 in a thickness of 2 to 10 μm over the first semiconductor layer 310 by, for example, an LPCVD method or the like. In this way, as shown in FIG. 7, the third polysilicon layer is formed, for example, in a vacuum (including a state close to the vacuum) in such a way as to close the openings of the trenches 360. Further, since this second semiconductor layer 320 is formed, of the respective wall parts 340, 350, the opening portions 346, 356 on the opposite side of the insulating layer 200 are closed and hence the hollow portions 347, 357 of the respective wall parts 340, 350 are sealed. In this way, the hollow portions 347, 357 of the respective wall parts 340, 350 function as the reference pressure chambers (vacuum).

Subsequently, in the process shown in FIG. 8, an Al layer is formed as the metal layer 330 in a thickness of 0.1 to 2 μm over the second semiconductor layer 320 and then is patterned by the photolithography etching technique to form the connection parts 311, 312 and the pads 331 to 333 of the peripheral part 315. Thereafter, the second semiconductor layer 320 is covered with a resist 361 in such a way that of the second semiconductor layer 320, parts formed over the respective wall parts 340, 350 are left.

In this way, when the second semiconductor layer 320 is covered with the resist 361, as for portions corresponding to the respective wall parts 340, 350 of the second semiconductor layer 320, the resist 361 is formed in such a way as to cover not only a portion corresponding to the end face of each of the wall parts 340, 350 but also an entire area covered by the outer periphery of each of the wall parts 340, 350. In other words, of the second semiconductor layer 320, portions corresponding to the respective hollow portions 347, 357 are also covered with the resist 361.

Figure 9:
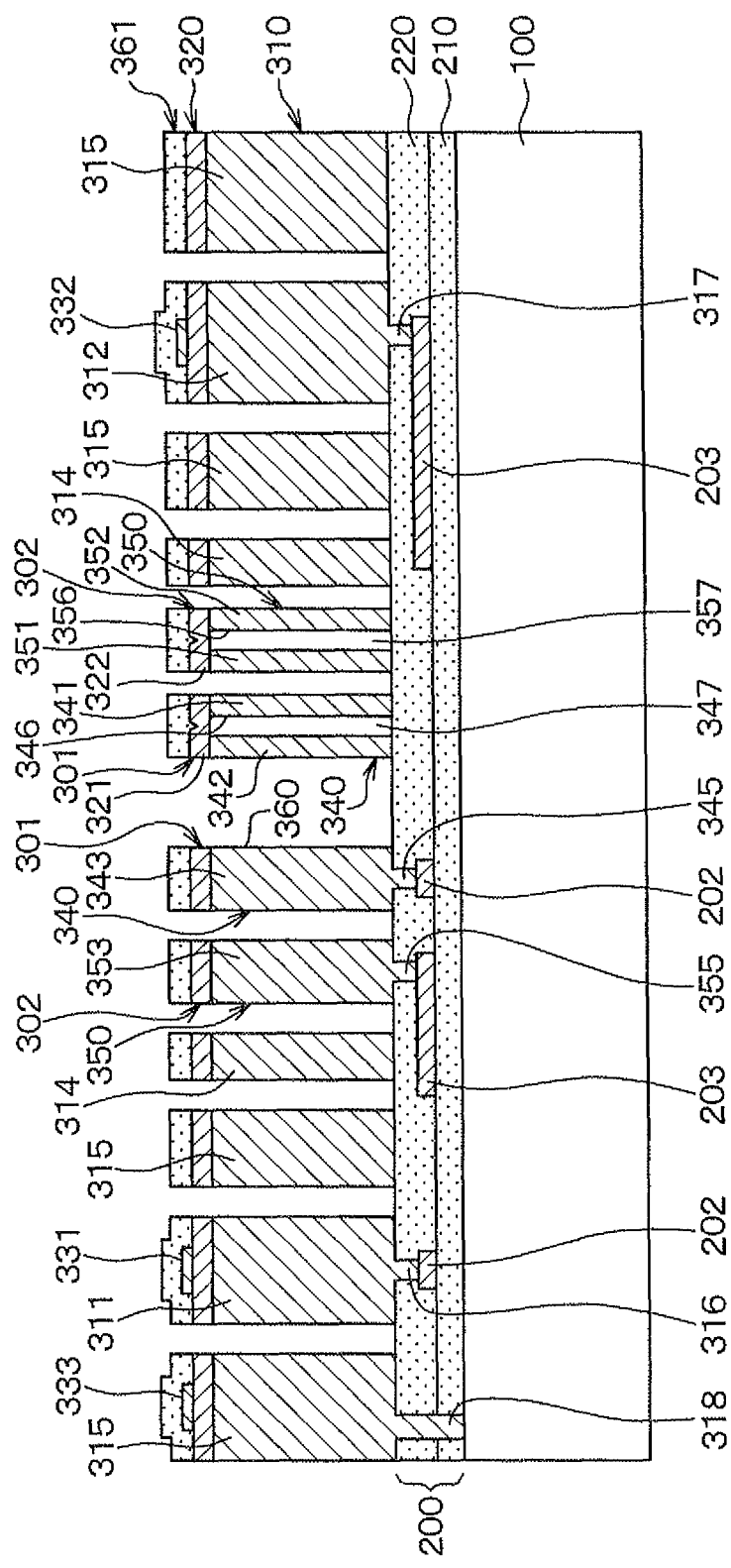
FIG. 9 is a view to show a step subsequent to the step of the process shown in FIG. 8.

Then, in the process shown in FIG. 9, of the second semiconductor layer 320, portions exposed from the resist 361, that is, portions corresponding to the trenches 360 formed in the first semiconductor layer 310 are removed. In this way, the first electrode 301 in which the opening portion 346 of the first wall part 340 is closed by the first cover part 321 and the second electrode 302 in which the opening portion 356 of the first wall part 350 is closed by the second cover part 322 are constructed.

Thereafter, the resist 361 on the second semiconductor layer 320 is removed. Since a plurality of physical quantity detection devices are formed in the state of a wafer, the wafer is divided into the respective physical quantity detection devices. In this way, the physical quantity detection device is shown in FIG. 1 and FIG. 2 is completed. When the physical quantity detection device formed in a chip has, for example, bonding wires (not shown) connected to the pads 331 to 333 thereof, the physical quantity detection device is electrically connected to the external circuit and is operated. As described above, the reference pressure chambers of the respective wall parts 340, 350 are set at a vacuum, so that the physical quantity detection device is used as an absolute pressure sensor.

Although an example has been described above in which the n+ type polysilicon layer is used as the semiconductor layer, for example, a p+ type polysilicon containing boron at a high concentration may be used as the semiconductor layer. Further, although the structure having two sets of first electrode 301 and second electrode 302 has been shown, when a multiple sets of first electrode 301 and second electrode 302 are provided, the sensitivity of detection of the pressure can be enhanced. In this case, when the thicknesses of the diaphragms 341, 342, 351, 352 of the set of first electrode 301 and second electrode 302 are varied in several steps, the sensitivity of detection of the pressure can be also varied in several steps.

As described above, the present embodiment is characterized in that the first electrode 301 and the second electrode 302 are formed over the insulating layer 200, respectively. In this way, the first electrode 301 and the second electrode 302, which are formed in the electrode layer 300, are independent of each other on the insulating layer 200 and are electrically separated from each other. Hence, this can eliminate the need for providing the diaphragms 341, 342, 351, 352 of the respective wall parts 340, 350, which are formed in the first semiconductor layer 310, with semiconductor regions for making them function as electrodes. That is, there is provided a construction in which a semiconductor material different in conductivity type from a semiconductor material constructing the respective electrodes 301, 302 is not formed in the respective electrodes 301, 302. In this way, a PN junction part is not formed in the respective electrodes 301, 302, so that capacitance detection characteristics are not made unstable by the PN junction part. This makes it possible to keep the capacitance detection characteristics very stable for the temperature of the physical quantity detection device and the disturbance of the outside atmosphere or the like.

Further, the respective diaphragms 341, 342, 351, 352 are erected vertically to the one surface 201 of the insulating layer 200, so that the physical quantity detection device can have the width reduced in the plane direction of the one surface 201 of the insulating layer 200. Even in the case where there are provided a multiple sets of respective electrodes 301, 302, the sets of respective electrodes 301, 302 can be arranged in the plane direction of the one surface 201 of the insulating layer 200, so that one physical quantity detection device can have many diaphragms 341, 342, 351, 352 formed therein. In this case, since the respective diaphragms 341, 342, 351, 352 are erected vertically to the one surface 201 of the insulating layer 200, there is provided an advantage that although one physical quantity detection device has many diaphragms 341, 342, 351, 352 formed therein, the width of the physical quantity detection device is not enlarged.

In the example described in the present embodiment, it has been described that both of the first wall part 340 and the second wall part 350 are formed in the shape of a hollow cylinder. However, in order for the first wall part 340 or the second wall part 350 to function as a pressure sensor or the like, it is essential only that at least one of the first wall part 340 and the second wall part 350 is formed in the shape of a hollow cylinder and forms a diaphragm. That is, it is acceptable that the other of the first wall part 340 and the second wall part 350 is a wall part, which is not formed in the shape of a hollow cylinder, and functions as an opposite electrode. This is ditto for the embodiments to be described below.

As for a correspondence relationship between the description of this embodiment and the description of the scope of claims, the first semiconductor layer 310 and the second semiconductor layer 320 correspond to "a semiconductor layer" of the scope of claims.

2nd Embodiment

Figure 10:
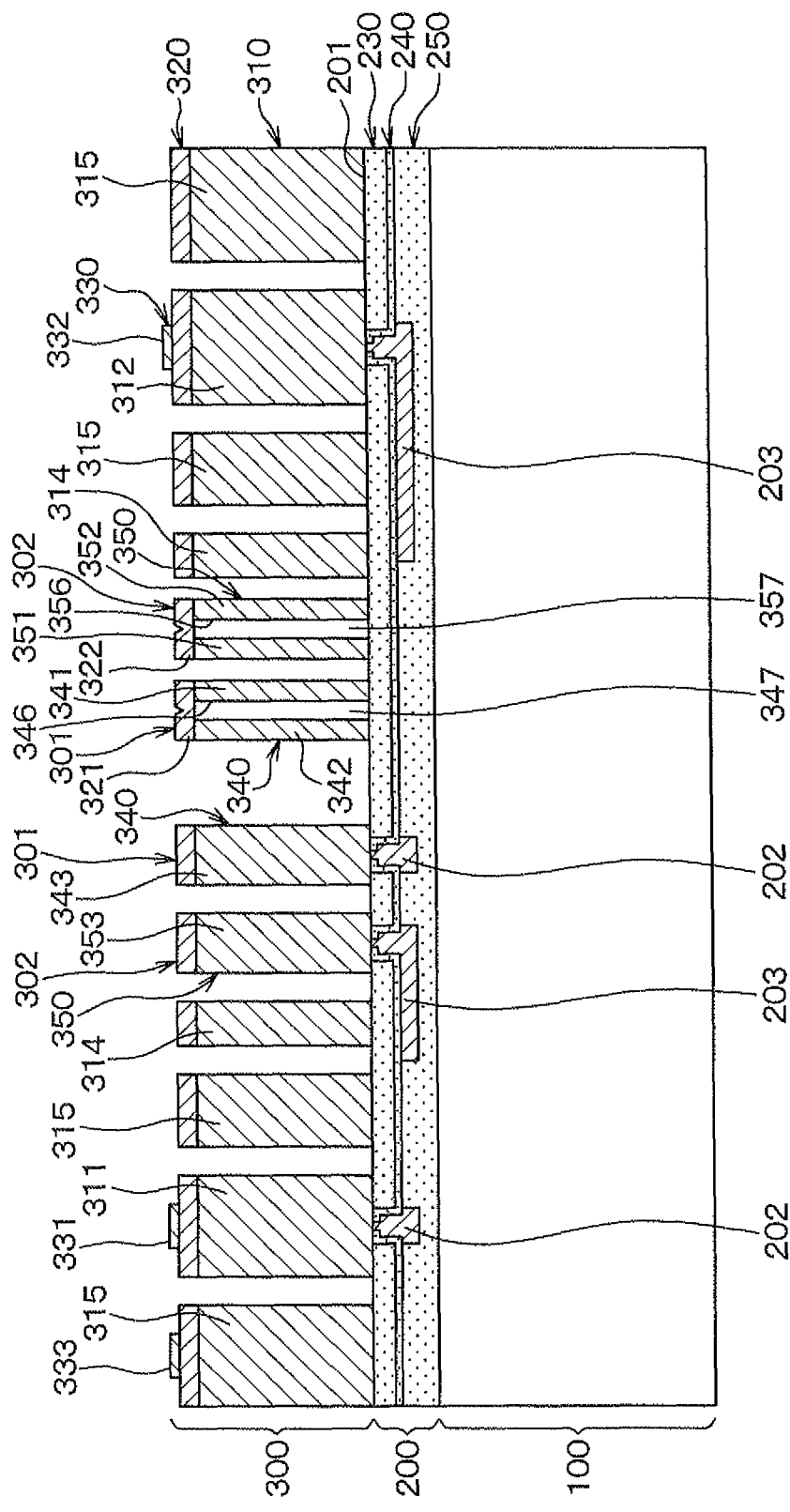
FIG. 10 is a section view of a physical quantity detection device according to a 2nd embodiment.

In this embodiment, parts different from the 1st embodiment will be described. FIG. 10 is a section view of a physical quantity detection device according to this embodiment and is a view corresponding to a section view taken on a line A-A' in FIG. 1.

As shown in FIG. 10, the insulating layer 200 has a laminated structure in which a third insulating layer 230, a fourth insulating layer 240, wiring patterns 202, 203, and a fifth insulating layer 250 are laminated.

The third insulating layer 230 is formed over the first semiconductor layer 310. Further, the third insulating layer 230 is patterned in such a way to open at positions corresponding to the coupling part 343 of the first wall part 340, the coupling part 353 of the second wall part 350, and the connection parts 311, 312. A $SiO_2$ film or the like is employed as the third insulating layer 230.

The fourth insulating layer 240 is a layer patterned in such a way to cover the third insulating layer 230 and to expose the coupling part 343 of the first wall part 340, the coupling part 353 of the second wall part 350, and the connection parts 311, 312.

The wiring patterns 202, 203 are formed over the fourth insulating layer 240 and are patterned respectively in such a way as to connect one coupling part 343 of the first wall part 340 to one connecting part 311 and to connect one coupling part 353 of the second wall part 350 to the other connecting part 312.

The fifth insulating layer 250 covers the wiring patterns 202, 203 and is formed over the fourth insulating layer 240. A semiconductor substrate 100 is provided on this fifth insulating layer 250.

According to this structure of the insulating layer 200, the wiring patterns 202, 203 are brought into direct contact with the coupling part 343 of the first wall part 340, the coupling part 353 of the second wall part 350, and the connection parts 311, 312 without the contact parts 316 to 318, 345, 355 and are electrically connected to them, respectively.

Further, in this embodiment, the first electrode 301 and the second electrode 302 are formed of single crystal silicon, respectively. For this reason, the respective electrodes 301, 302 can be made stable in their properties and characteristics, and the respective diaphragms 341, 342, 351, 352 can be increased in strength.

Next, a method for manufacturing a physical quantity detection device shown in FIG. 10 will be described with reference to FIGS. 11A, 11B to FIG. 16. Also in this embodiment, the physical quantity detection device is manufactured in the state of a wafer.

In the process shown in FIG. 11A, a single crystal silicon substrate containing impurities at a high concentration and having an n+ type (100) surface is prepared as the first semiconductor layer 310. A $SiO_2$ film is formed as the third insulating layer 230 in a thickness of 0.1 to 2 μm over this first semiconductor layer 310. Contact holes 231 are formed at positions corresponding to the coupling part 343 of the first wall part 340, the coupling part 353 of the second wall part 350, and the connection parts 311, 312 of the first semiconductor layer 310 in such a way that portions of the first semiconductor layer 310 are exposed.

Further, a $Si_3N_4$ film is formed as the fourth insulating layer 240 in a thickness of 0.01 to 0.2 μm over the third insulating layer 230 by an LPCVD method or the like. Then, contact holes 241 are formed in such a way that portions of the first semiconductor layer 310 are exposed from the fourth insulating layer 240 formed in the contact holes 231 of the third insulating layer 230.

In the process shown in FIG. 11B, an n+ type polysilicon layer is formed in a thickness of 0.1 to 2 μm over the fourth insulating layer 240 in such a way as to embed the contact holes 241 of the fourth insulating layer 240. Then, as in the case of the process shown in FIG. 4A, the polysilicon layer is patterned by the photolithography etching technique to form the wiring patterns 202, 203. In this way, the respective wiring patterns 202, 203 are bought into direct contact with the first semiconductor layer 310 and are electrically connected to the first semiconductor layer 310.

Figure 12:
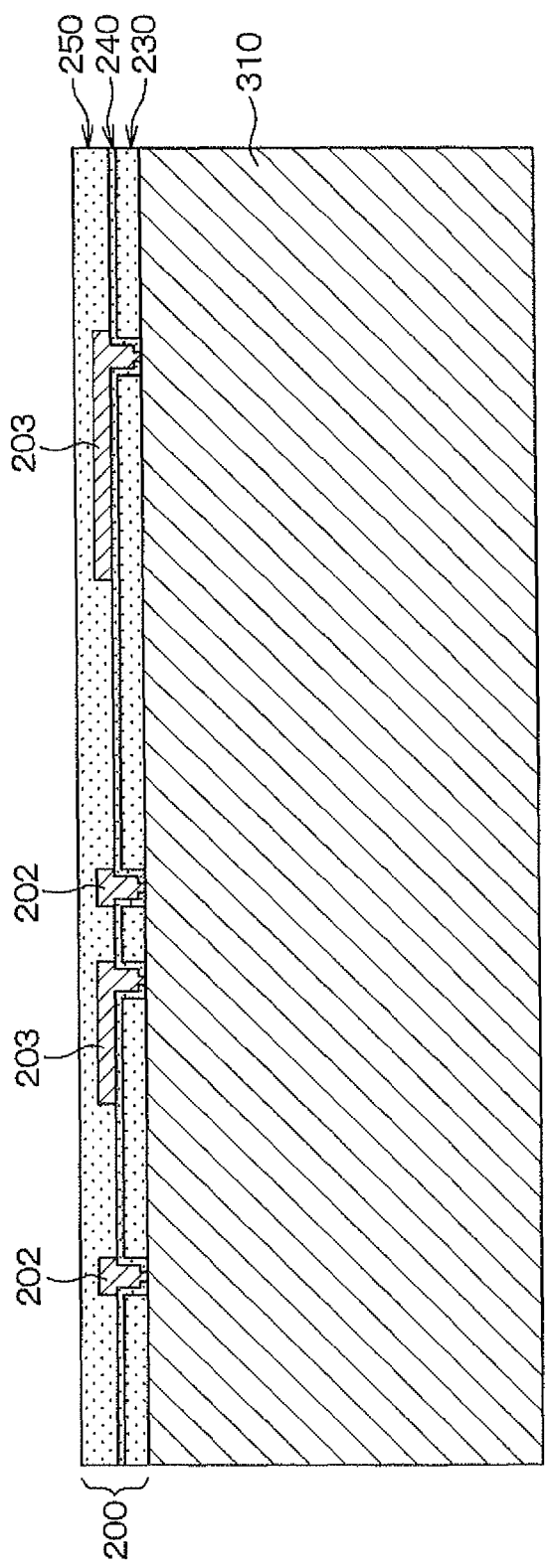
FIG. 12 is a view to show a step subsequent to the steps of the process shown in FIGS. 11A, 11B.

In the process shown in FIG. 12, a $Si_2O$ film is formed as the fifth insulating layer 250 in a thickness of 1 to 3 μm over the fourth insulating layer 240 by the CVD method or the like in such a way as to cover the wiring patterns 202, 203. Thereafter, if necessary, the surface of the fifth insulating layer 250 is mirror-polished by a CMP method. In this way, there is brought about a state in which the insulating layer 200 is formed over the first semiconductor layer 310.

Subsequently, in the process shown in FIG. 13, a single crystal silicon substrate containing impurities at a high concentration and having an n+ type (100) surface is prepared as the semiconductor substrate 100. Then, the mirror-polished surface of the fifth insulating layer 250 and the surface of the semiconductor substrate 100 are activated by argon ions or the like and are directly joined to each other at normal temperature of from room temperature to 500° C., that is, the so-called normal-temperature direct junction is performed.

It is also possible to perform high-temperature junction at a temperature of 1000 to 1200° C. other than the normal-temperature direct junction. In the case of the normal-temperature direct junction, a malfunction such as the warp of the wafer caused by a thermal stress can be reduced.

Then, the first semiconductor layer 310 is thinned to a thickness of 5 to 200 μm by grinding, polishing, etching, or the like. In this way, the first semiconductor layer 310 is thinned to a thickness shown by a broken line in FIG. 13.

Figure 14:
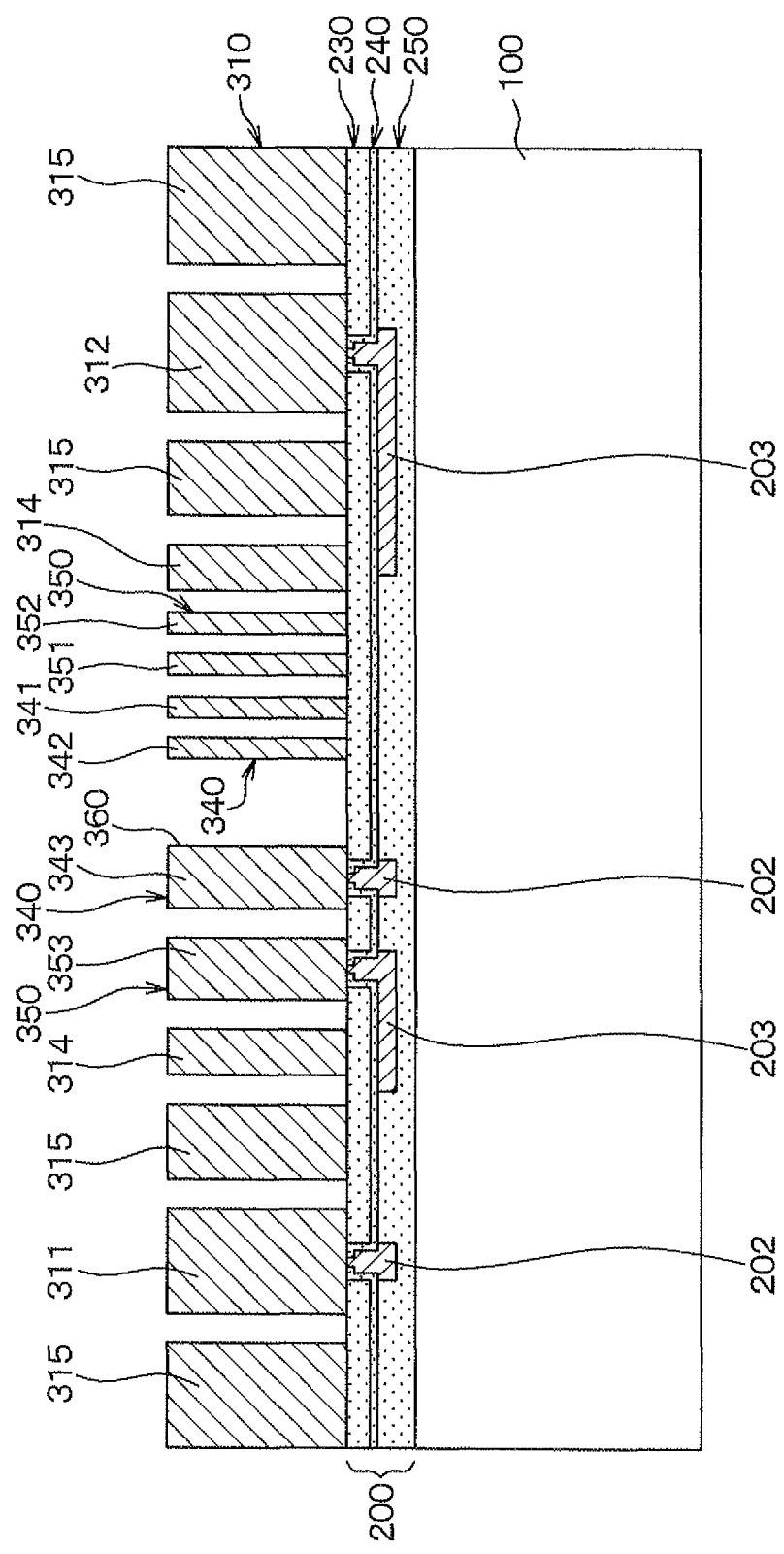
FIG. 14 is a view to show a step subsequent to the step of the process shown in FIG. 13.

In the process shown in FIG. 14, as in the case of the process shown in FIG. 6, trenches 360 are formed in the first semiconductor layer 310. In this case, the trenches 360 are formed in such a way that the surfaces of the respective diaphragms 341, 342, 351, 352 are made (110) surfaces.

Figure 15:
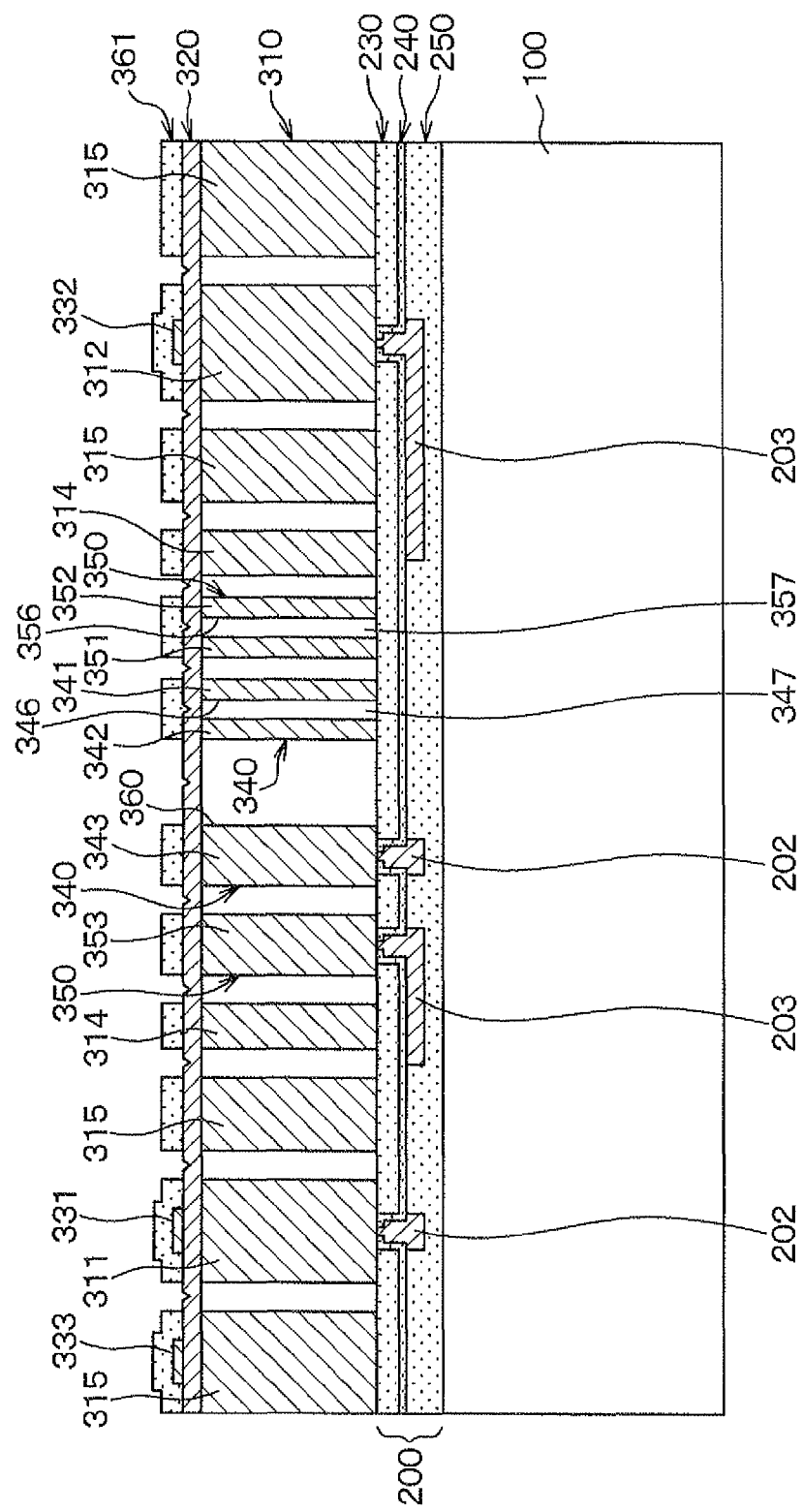
FIG. 15 is a view to show a step subsequent to the step of the process shown in FIG. 14.

In the process shown in FIG. 15, the second semiconductor layer 320 is epitaxially grown by the use of a silicon source gas (for example, $SiH_2Cl_2$ or the like) by the LPCVD method. Specifically, a $PH_3$ gas or the like is made to flow as an impurity supply gas at a vacuum level of 20 to 100 Torr at a temperature of 800 to 1150° C. to thereby epitaxially grow an n+ type single crystal silicon layer as the second semiconductor layer 320 in a thickness of 2 to 10 μm over the first semiconductor layer 310. In this way, the hollow portions 347, 357 of the respective wall parts 340, 350 are sealed and made the reference pressure chambers.

In the case where the second semiconductor layer 320 is formed in this way, when the wall surface of the trench 360 is made the (110) surface, the second semiconductor layer 320 is grown only on the surface of the first semiconductor layer 310. Hence, the second semiconductor layer 320, which covers the trenches 360 and is made of the n+ type single crystal silicon, can be formed at an early stage.

Figure 8:
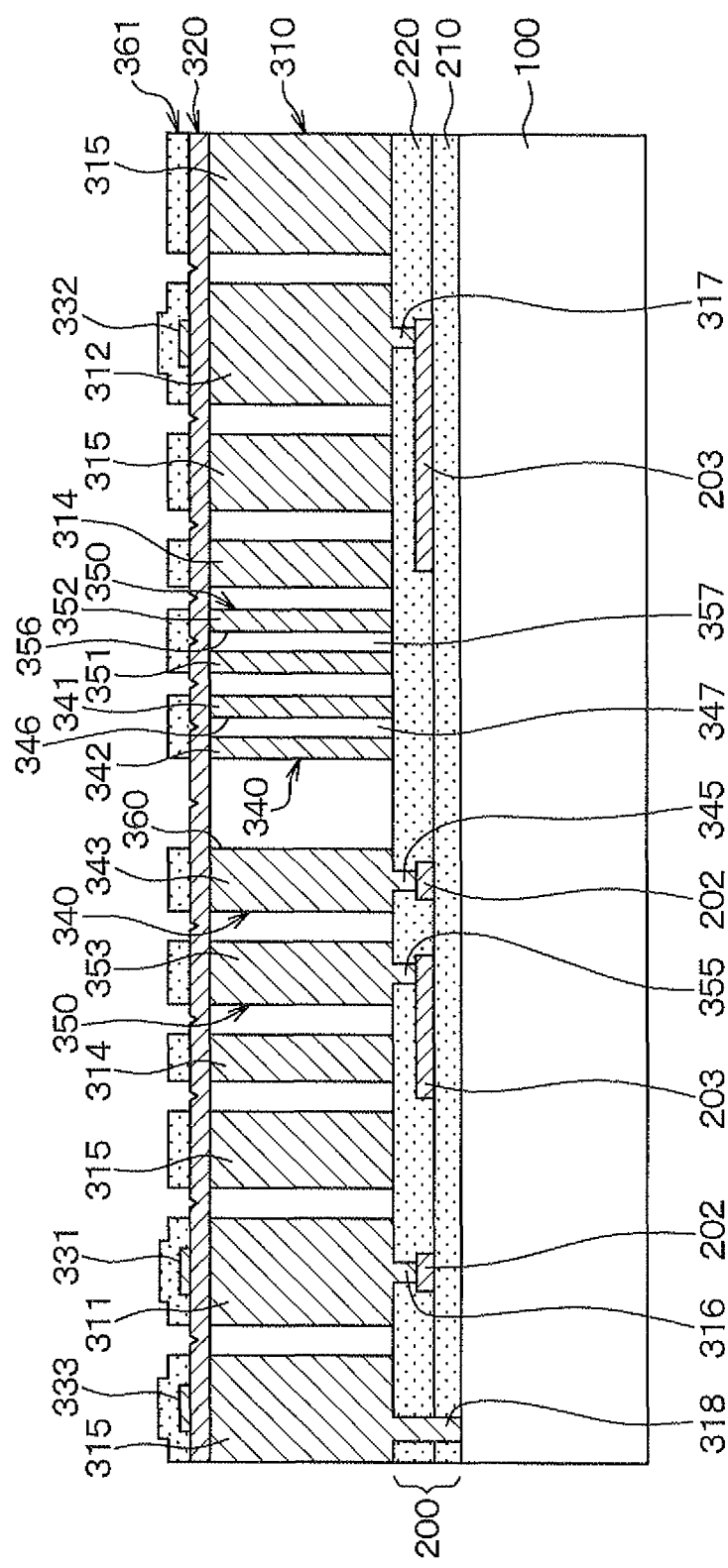
FIG. 8 is a view to show a step subsequent to the step of the process shown in FIG. 7.

Further, as in the case of the process shown in FIG. 8, an Al layer is formed as the metal layer 330 over the second semiconductor layer 320 and is patterned to thereby form the pads 331 to 333 of the connection parts 311, 312 and the peripheral part 315. Still further, the second semiconductor layer 320 is covered with the resist 361 in such a way that portions corresponding to the respective wall parts 340, 350 of the second semiconductor layer 320 are left.

Figure 16:
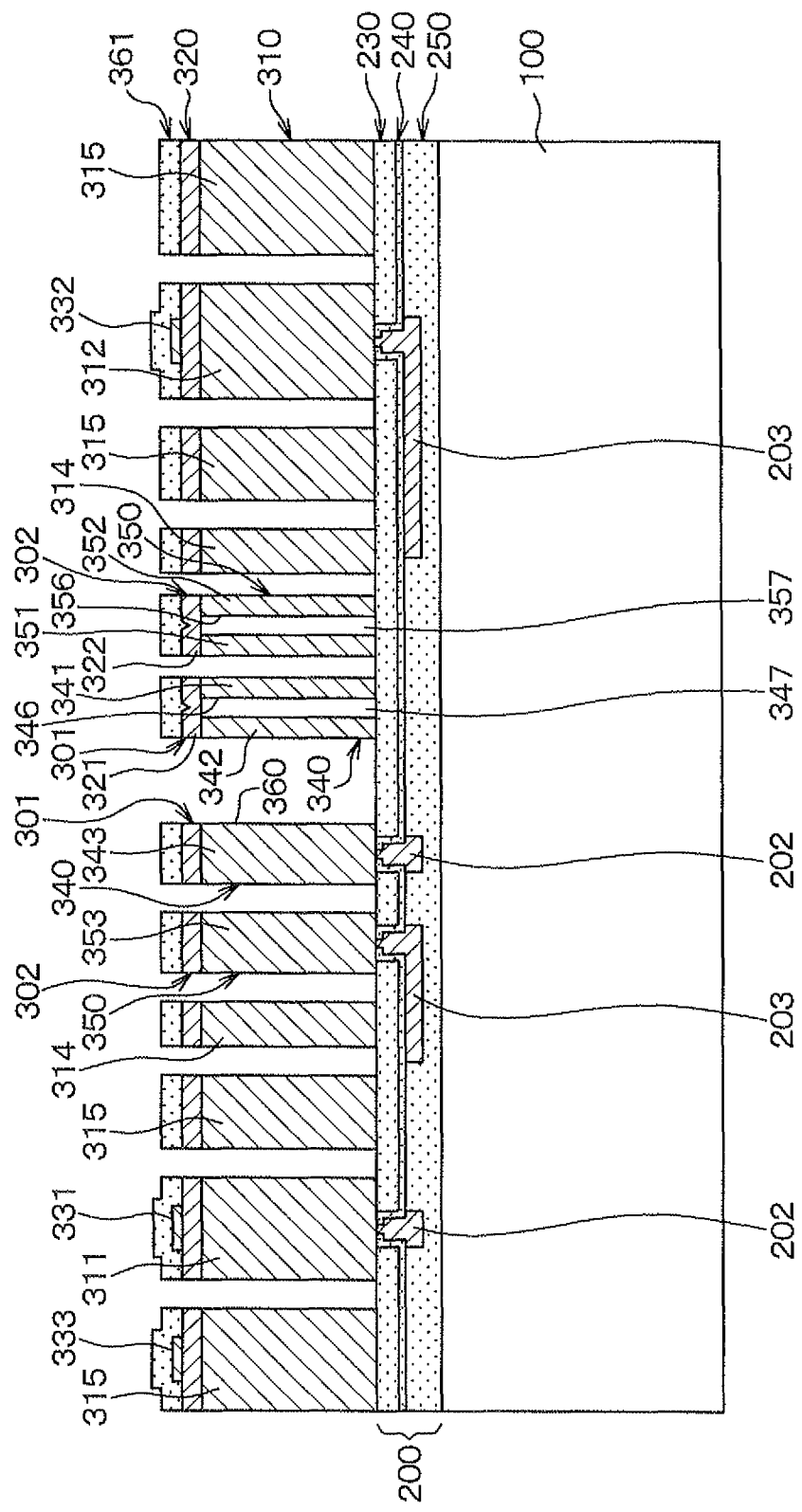
FIG. 16 is a view to show a step subsequent to the step of the process shown in FIG. 15.

In the process shown in FIG. 16, as in the case of the process shown in FIG. 9, of the second semiconductor layer 320, portions exposed from the resist 361 are removed to thereby acquire the first electrode 301 constructed of the first wall part 340 and the first cover part 321 and the second electrode 302 constructed of the second wall part 350 and the second cover part 322.

Figure 11:
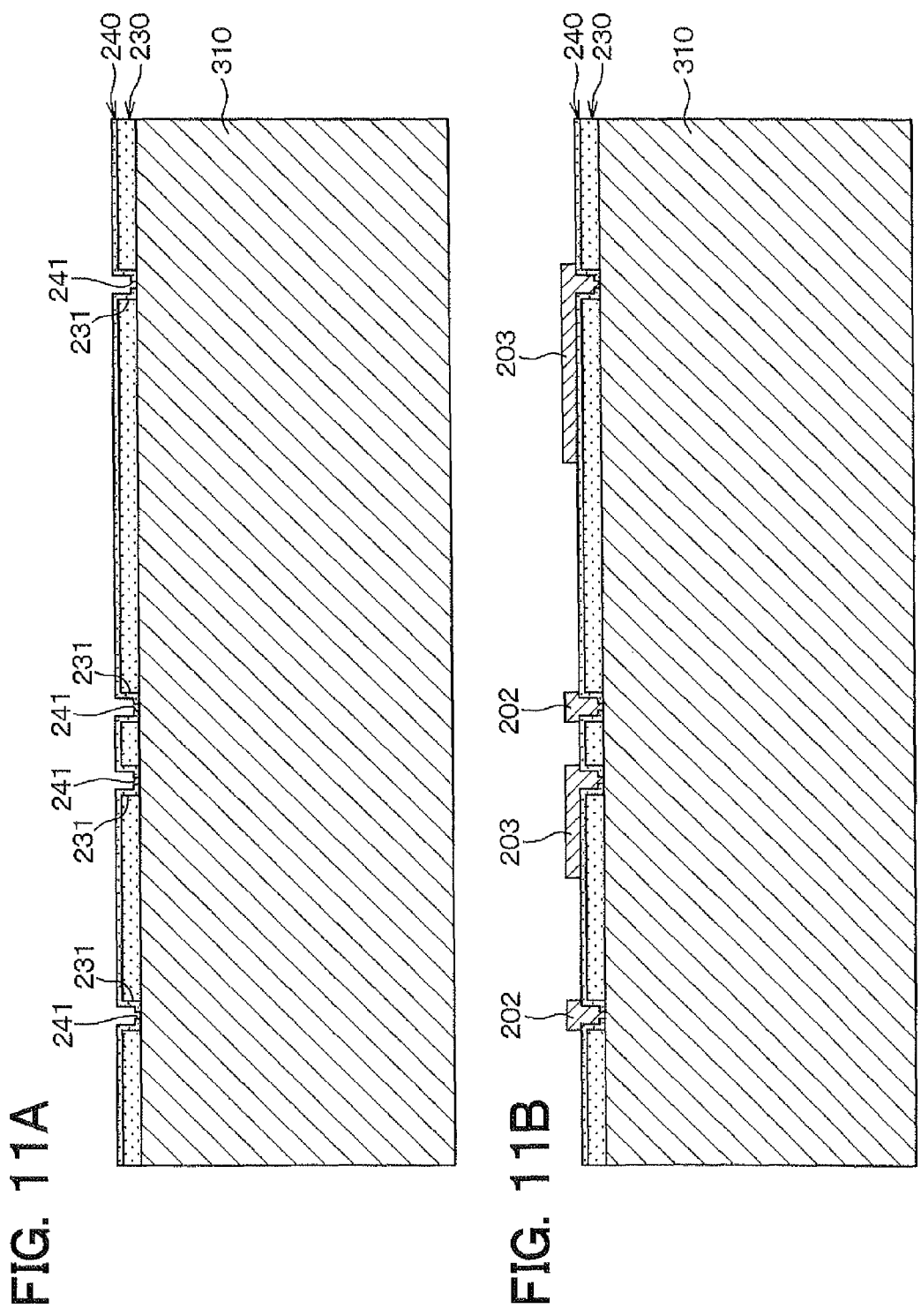
FIGS. 11A and 11B are views to show the steps of a process of manufacturing the physical quantity detection device according to the 2nd embodiment.

Thereafter, the resist 361 on the second semiconductor layer 320 is removed and the wafer is divided into the respective physical quantity detection devices. In this way, the physical quantity detection device shown in FIG. 11 is completed.

Although the second semiconductor layer 320 is formed of the single crystal silicon, the second semiconductor layer 320 may be formed of an n+ type polysilicon. Further, instead of the n+ type single crystal silicon, a p+ type single crystal silicon may be employed. In this way, even when the second semiconductor layer 320 is formed of polysilicon, since the respective wall parts 340, 350 to construct the respective electrodes 301, 302 are formed of the single crystal silicon, the strengths of the diaphragms 341, 342, 351, 352 can be secured and the characteristics of the respective electrodes 301, 302 can be made stable.

As described above, the present embodiment is characterized in that in order to directly electrically connect the wiring patterns 202, 203 to the respective parts of the first semiconductor layer 310, the insulating layer 200 has the wiring patterns 202, 203 formed therein. This eliminates the need for providing the contact parts 316 to 318, 345, 355 and can join the single crystal silicon substrate directly to the insulating layer 200, whereby by extension, the respective electrodes 301, 302 can be constructed of the single crystal silicon. For this reason, the capacitance detection characteristics of the respective electrodes 301, 302 can be made stable.

3rd Embodiment

Figure 17:
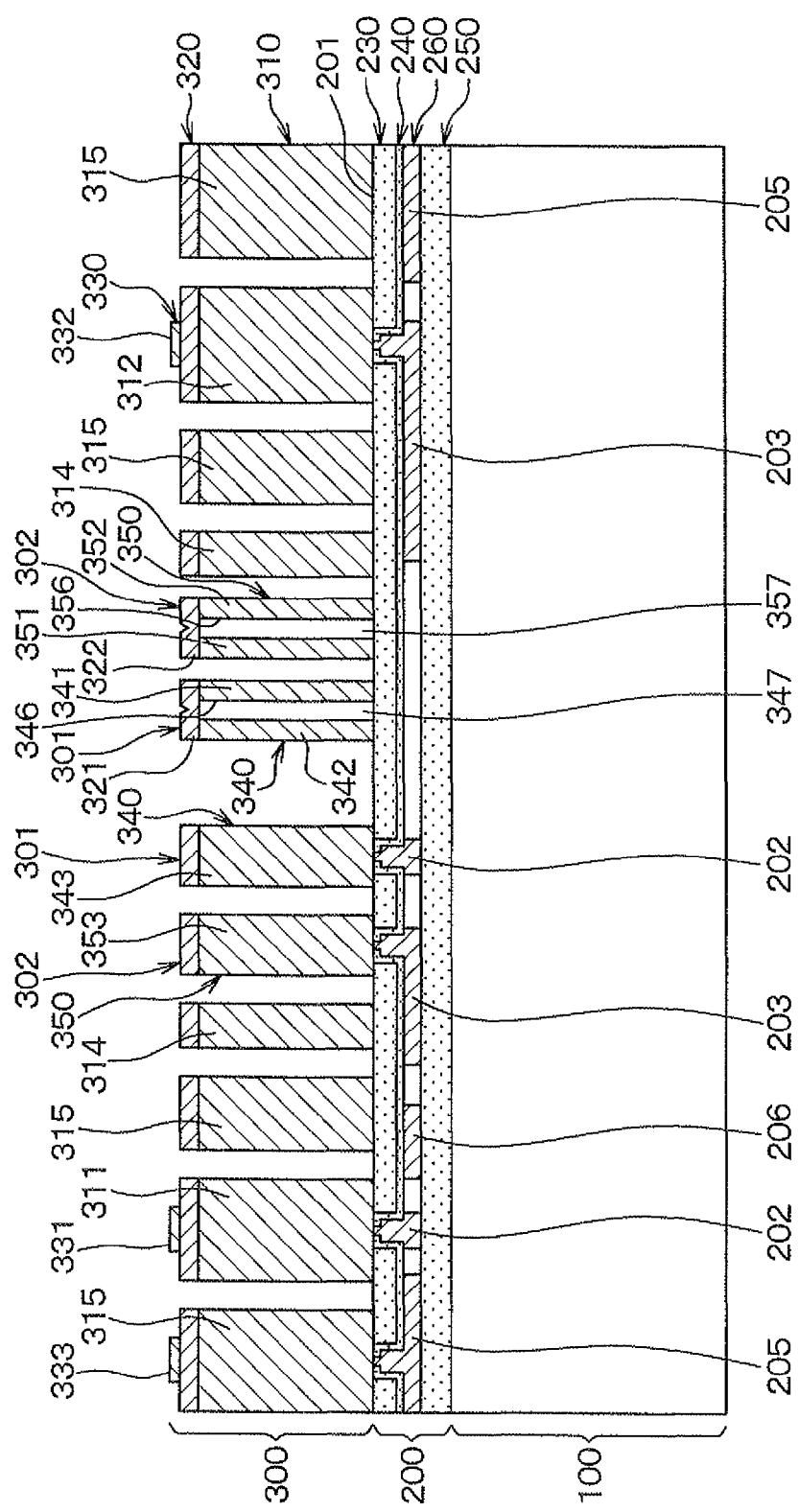
FIG. 17 is a section view of a physical quantity detection device according to a 3rd embodiment.
Figure 18:
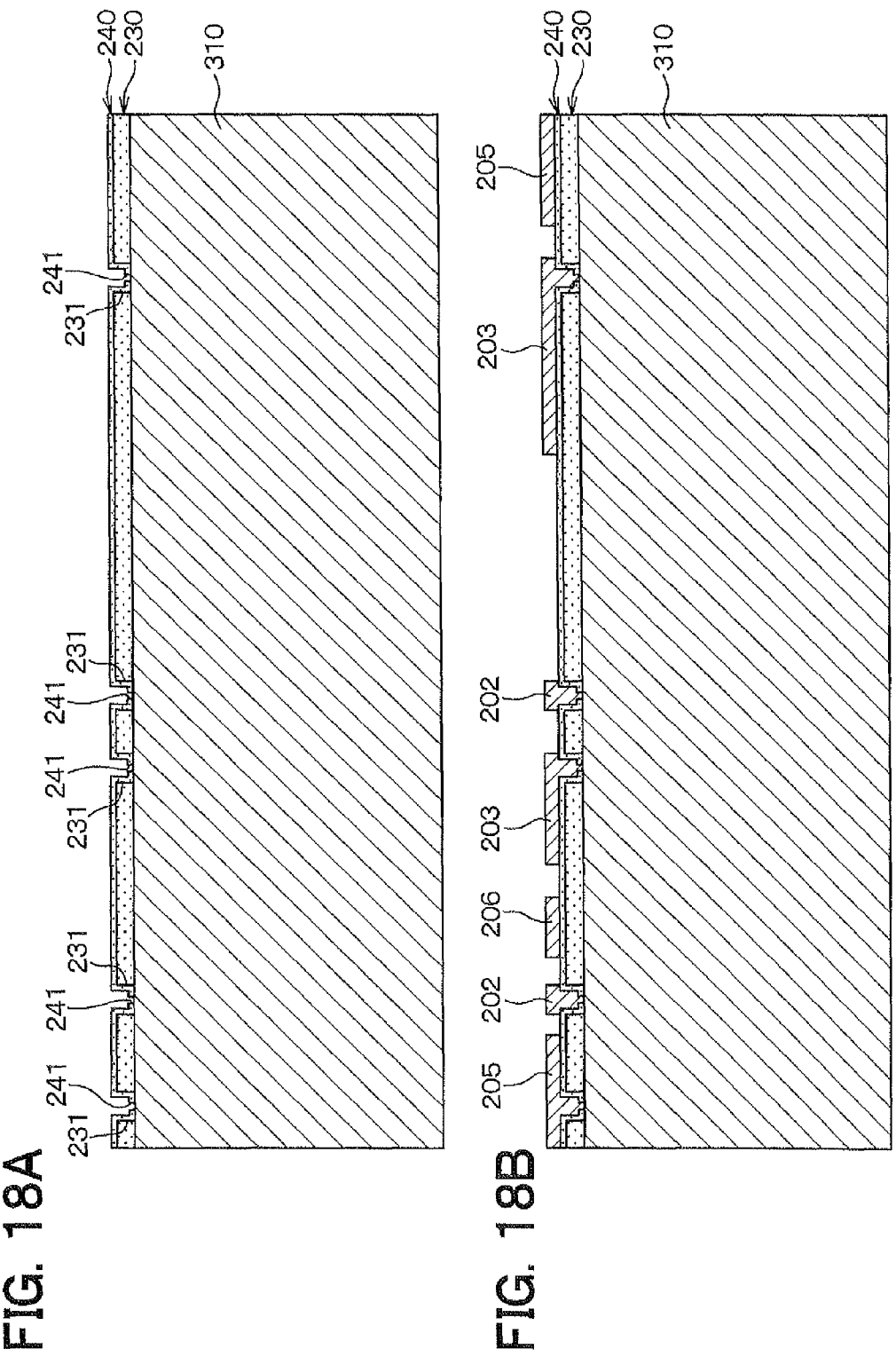
FIGS. 18A and 18B are views to show the steps of a process of manufacturing the physical quantity detection device according to the 3rd second embodiment.

In this embodiment, parts different from the 1st and 2nd embodiments will be described. FIG. 17 is a section view of a physical quantity detection device according to this embodiment and is a view corresponding to a section view taken on a line A-A' in FIG. 1.

As shown in FIG. 17, the insulating layer 200 has a laminated structure in which the third insulating layer 230, the fourth insulating layer 240, a metal layer 260, and the fifth insulating layer 250 are laminated. Of these layers, the third insulating layer 230 and the fourth insulating layer 240 are the same as the structure shown in the second embodiment.

Further, the metal layer 260 is a layer in which the above-mentioned wiring patterns 202, 203, a wiring pattern 205, and a wiring pattern 206 are formed.

The wiring pattern 205 is a ring-shaped pattern which surrounds the periphery of the wiring patterns 202, 203, which connect the respective electrodes 301, 302 to the respective connection parts 311, 312, and the dummy wiring pattern 206 and which is patterned at a position corresponding to the peripheral part 315. In this embodiment, the ring-shaped wiring pattern 205 is electrically connected to the peripheral part 315. Further, the wiring pattern 206 is a dummy pattern arranged between the fourth insulating layer 240 and the fifth insulating layer 250. This wiring pattern 206 is arranged in a hermetically sealed space in order to increase the joint strength of this dummy pattern.

As to the metal layer 260 patterned in this manner, metal such as Al, W, Ni, Au, Cu, a compound of these metals, or a laminated film of these metals is employed. In this embodiment, an Al film is employed as the metal layer 260.

Next, a method for manufacturing a physical quantity detection device shown in FIG. 17 will be described with reference to FIGS. 18A, 18B to FIG. 24. Also in this embodiment, the physical quantity detection device is manufactured in the state of a wafer.

In the process shown in FIG. 18A, as in the case of the process shown in FIG. 11A, the third insulating layer 230 is formed over the first semiconductor layer 310 constructed of the n+ type single crystal silicon substrate and then the contact holes 231 are formed. Further, the fourth insulating layer 240 is formed over the third insulating layer 230 and the contact holes 241 are formed in such a way that portions of the first semiconductor layer 310 are exposed.

In the process shown in FIG. 18B, an Al layer is formed in a thickness of 0.1 to 2 μm over the fourth insulating layer 240 in such a way as to embed the contact holes 241 of the fourth insulating layer 240. Further, if necessary, the surface of the Al layer is mirror-polished. Then, as in the case of the process shown in FIG. 4A, the Al layer is patterned by the photolithography etching technique to form the wiring patterns 202, 203, 205, 206.

Figure 19:
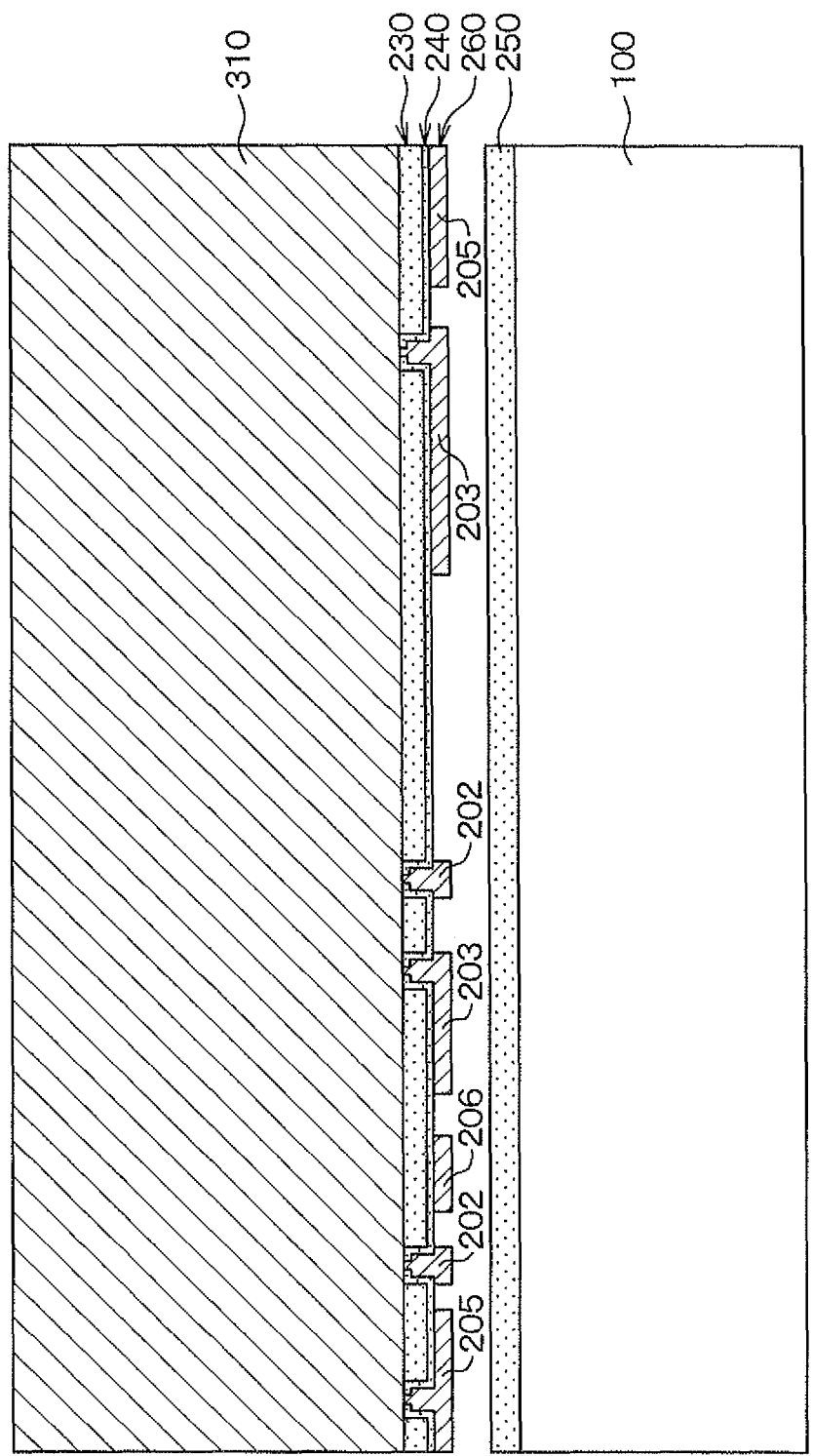
FIG. 19 is a view to show a step subsequent to the steps of the process shown in FIGS. 18A, 18B.

Subsequently, in the process shown in FIG. 19, an n+ type single crystal silicon substrate having a (100) surface is prepared as the semiconductor substrate 100. Then, the surface of the single crystal silicon substrate is thermally oxidized or processed by the CVD method or the like to form a $Si_2O$ film as the fifth insulating layer 250 in a thickness of 0.1 to 2 μm.

Thereafter, the wiring patterns 202, 203, 205, 206 are opposed to the fifth insulating layer 250, and the surfaces of the wiring patterns 202, 203, 205, 206 and the surface of the fifth insulating layer 250 are activated by argon ions or the like and are directly joined to each other at normal temperature. As described above, the wiring pattern 205 is a closed pattern shaped like a ring in correspondence with the peripheral part 315, so that the wiring patterns 202, 203 and the dummy wiring pattern 205 are hermetically sealed between the fourth insulating layer 240 and the fifth insulating layer 250. In this way, the wiring patterns 202, 203 can contribute to the stabilization of the characteristics of the respective electrodes 301, 302.

Figure 13:
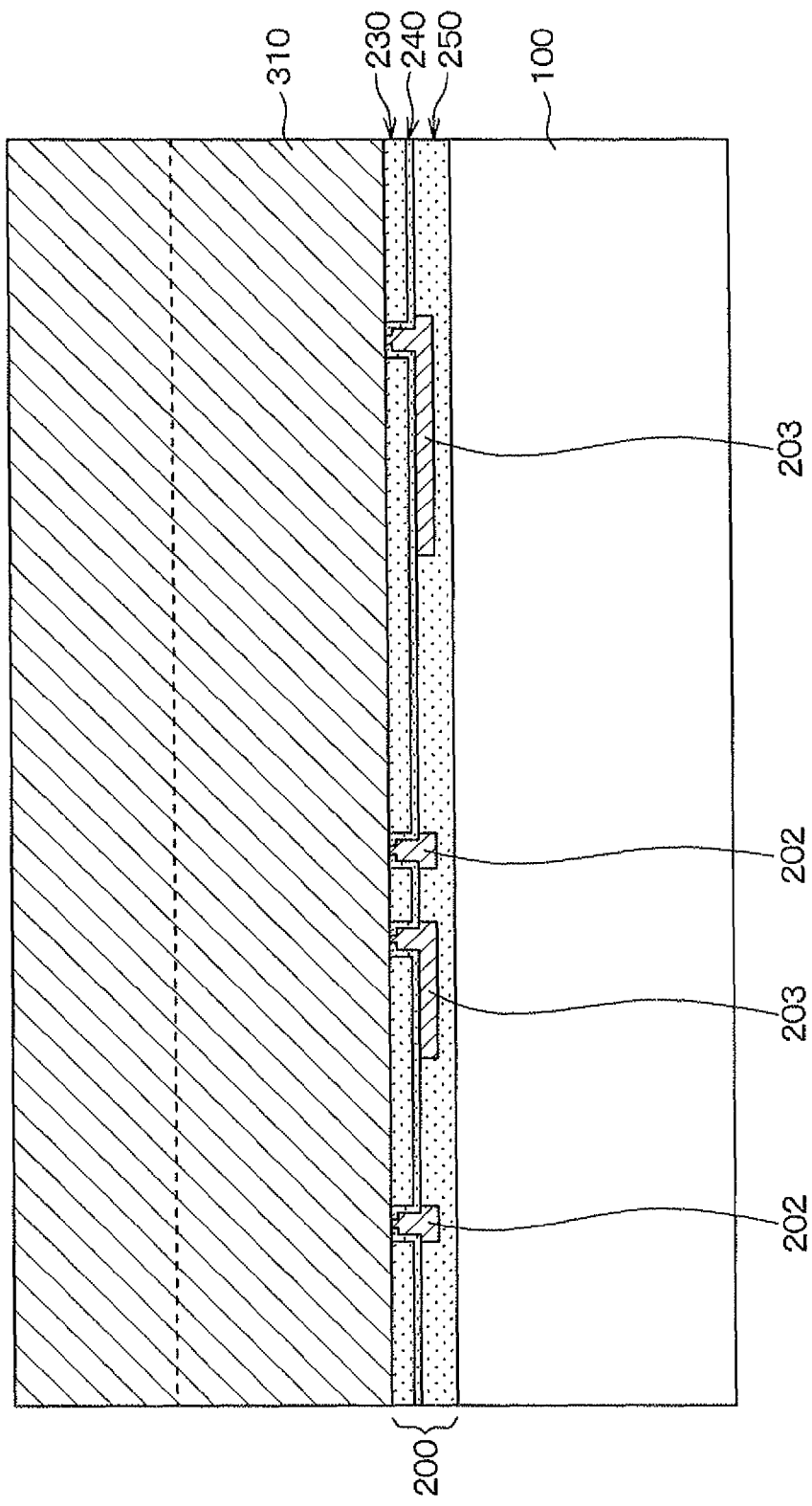
FIG. 13 is a view to show a step subsequent to the step of the process shown in FIG. 12.
Figure 20:
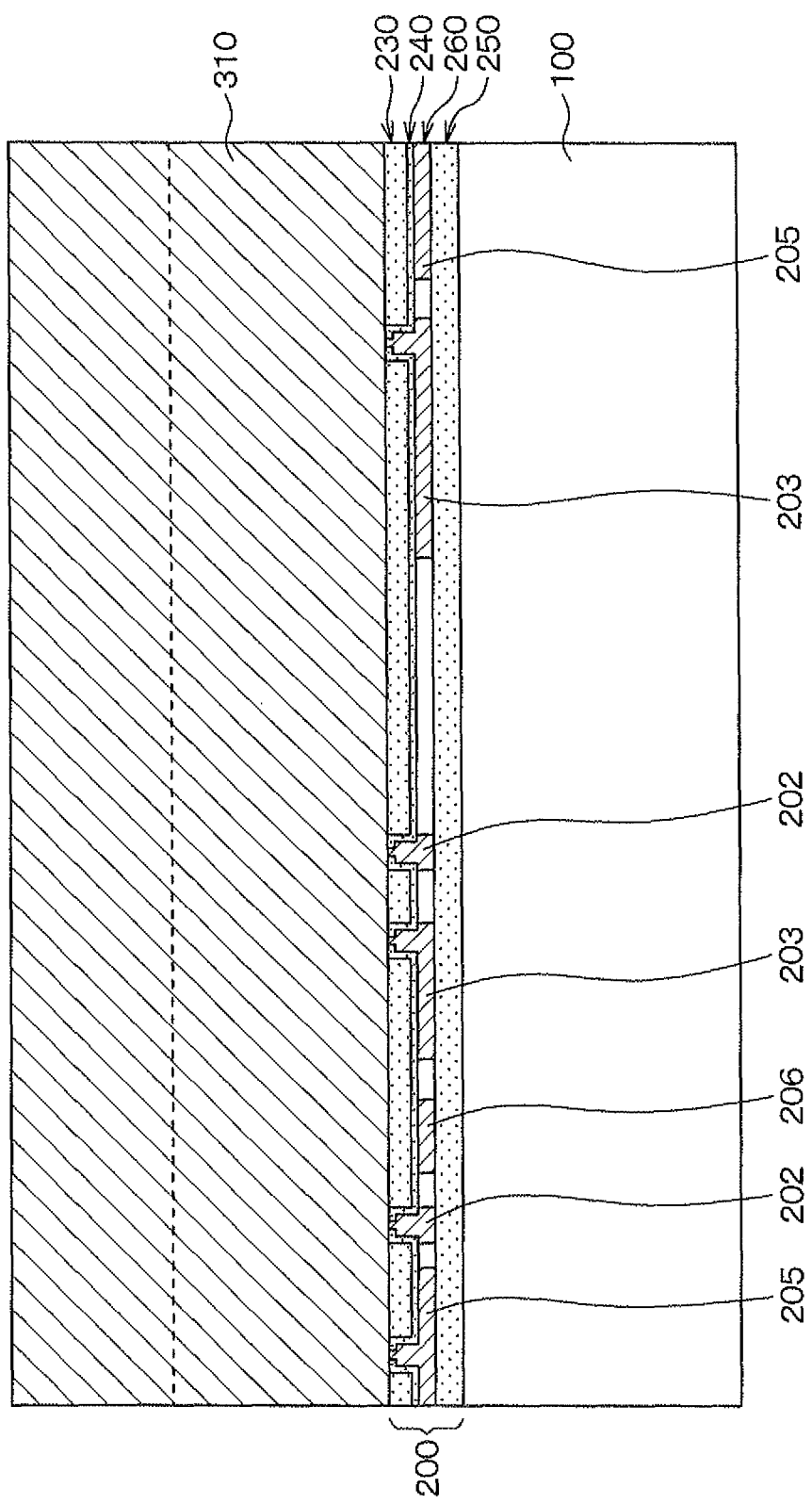
FIG. 20 is a view to show a step subsequent to the step of the process shown in FIG. 19.

Thereafter, in the process shown in FIG. 20, as in the case of the process shown in FIG. 13, the first semiconductor layer 310 is thinned to a thickness shown by a broken line in FIG. 20 by grinding or the like.

Figure 21:
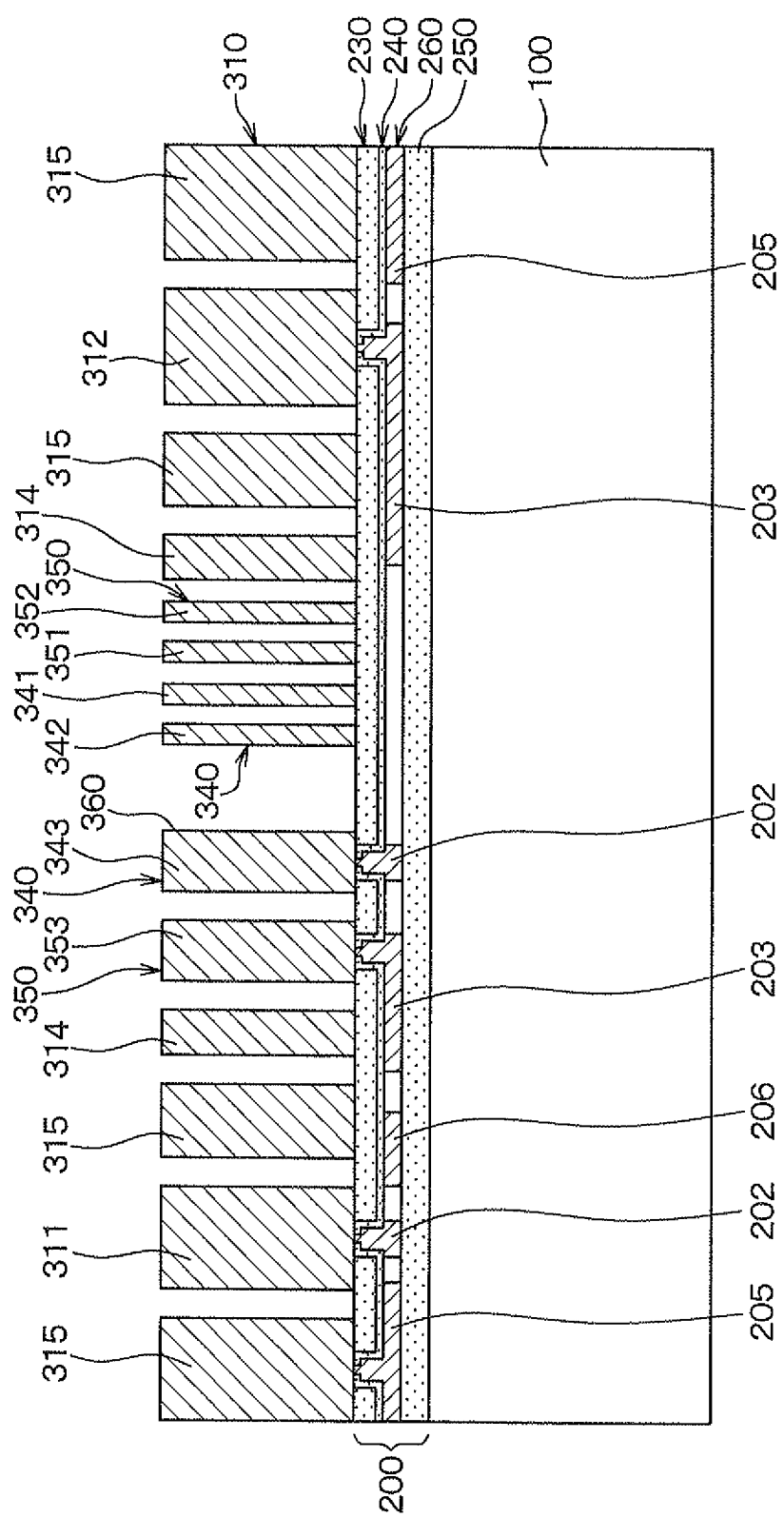
FIG. 21 is a view to show a step subsequent to the step of the process shown in FIG. 20.

In the process shown in FIG. 21, as in the case of the process shown in FIG. 6, the trenches 360 are formed in the first semiconductor layer 310. In this way, the respective parts of the respective wall parts 340, 350 and the like are formed in the first semiconductor layer 310.

Figure 22:
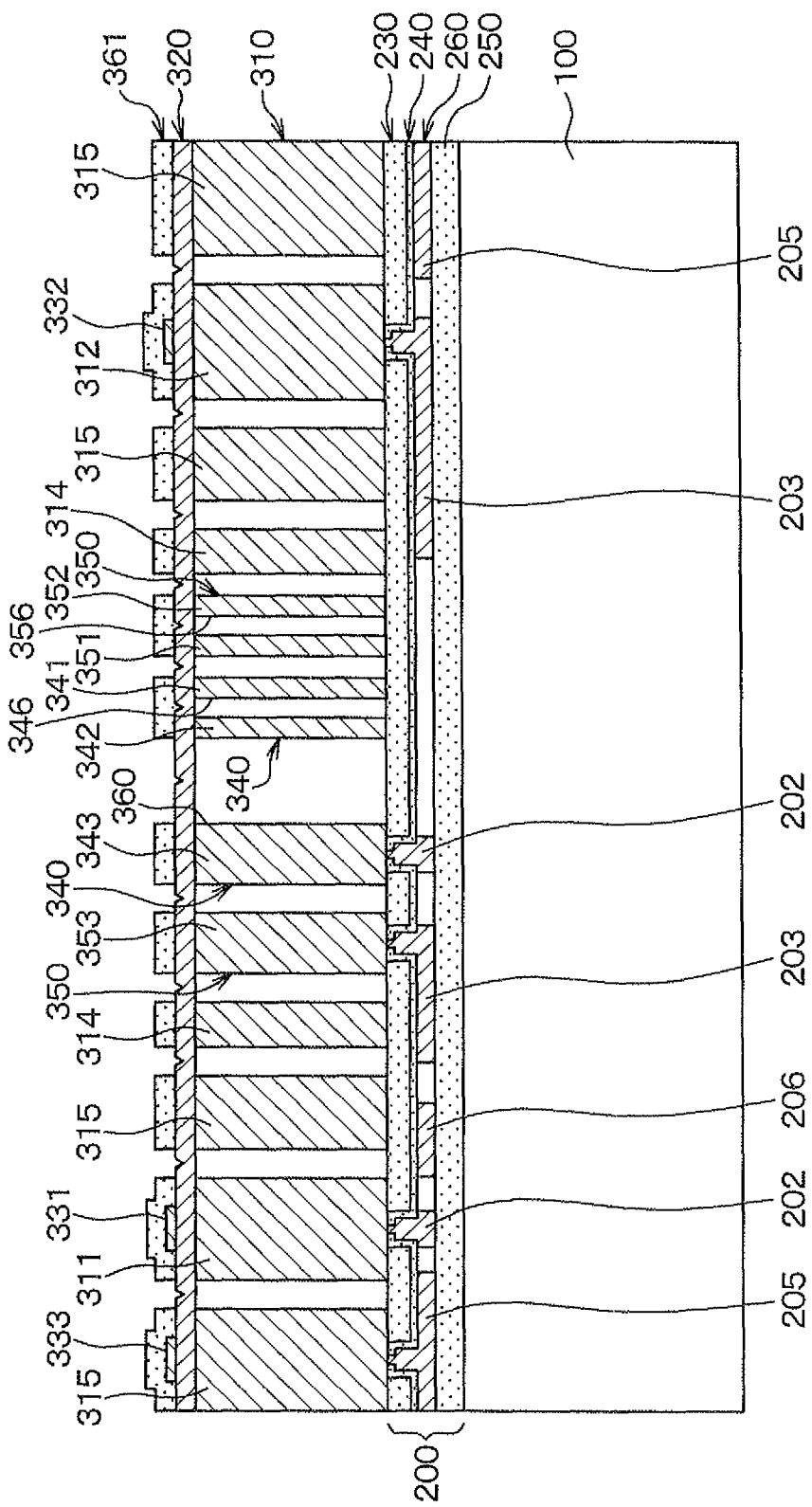
FIG. 22 is a view to show a step subsequent to the step of the process shown in FIG. 21.

In the process shown in FIG. 22, a polysilicon layer or an amorphous silicon layer is formed as the second semiconductor layer 320 at a low temperature of about 450° C. In this way, the opening portions of the trenches 360 formed in the first semiconductor layer 310 are covered to thereby seal the hollow portions 347, 357 of the respective wall parts 340, 350.

Further, n+ type impurities are implanted into the second semiconductor layer 320 by an ion-implanting method. Thereafter, the n+ type impurities are activated by a lamp annealing method or the like.

Further, as in the case of the process shown in FIG. 8, an Al layer is formed as the metal layer 330 over the second semiconductor layer 320 and is patterned to thereby form the pads 331 to 333. Then, the second semiconductor layer 320 is covered with the resist 361 in such a way that portions corresponding to the respective wall parts 340, 350 of the second semiconductor layer 320 are left. Then, of the second semiconductor layer 320, the portions not covered with the resist 361 are removed.

Figure 23:
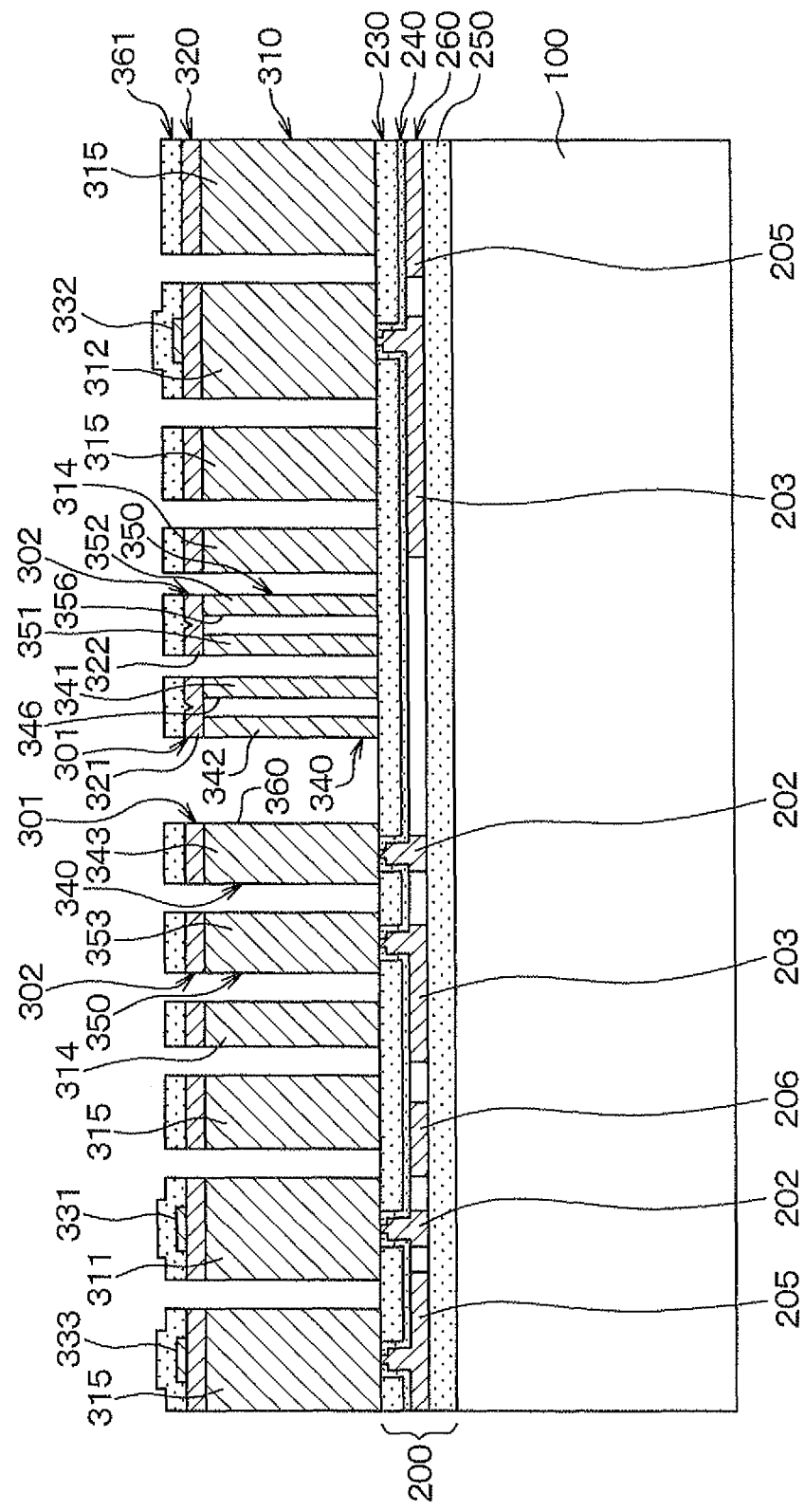
FIG. 23 is a view to show a step subsequent to the step of the process shown in FIG. 22.

Thereafter, in the process shown in FIG. 23, as in the case of the process shown in FIG. 9, of the second semiconductor layer 320, portions exposed from the resist 361 are removed. In this way, the respective electrodes 301, 302 can be acquired.

As described above, in this embodiment, the insulating layer 200 has the wiring patterns 202, 203, 205, 206 formed between the fourth insulating layer 240 and the fifth insulating layer 250, and the wiring patterns 202, 203, 205, 206 are formed of the metal material such as Al. In this way, the wiring patterns 202, 203, 205, 206 and the fifth insulating layer 250 can be directly joined to each other at a normal temperature with comparative ease and with stability.

When the same patterns as the wiring patterns 202, 203, 205, 206 are formed of Al over the fifth insulating layer 250 formed over the semiconductor substrate 100 of a support substrate, the wiring patterns 202, 203, 205, 206 and the fifth insulating layer 250 can be directly joined to each other by an Al—Al direct junction at a normal temperature, which can further enhance the stability of the junction.

Further, in this embodiment, the ring-shaped wiring pattern 205 is electrically connected to the peripheral part 315, so that when a specified potential, for example, the ground potential is applied to the wiring pattern 205 via the peripheral part 315, the effect that the wiring patterns 202, 203 receive from a disturbance can be reduced.

4th Embodiment

Figure 24:
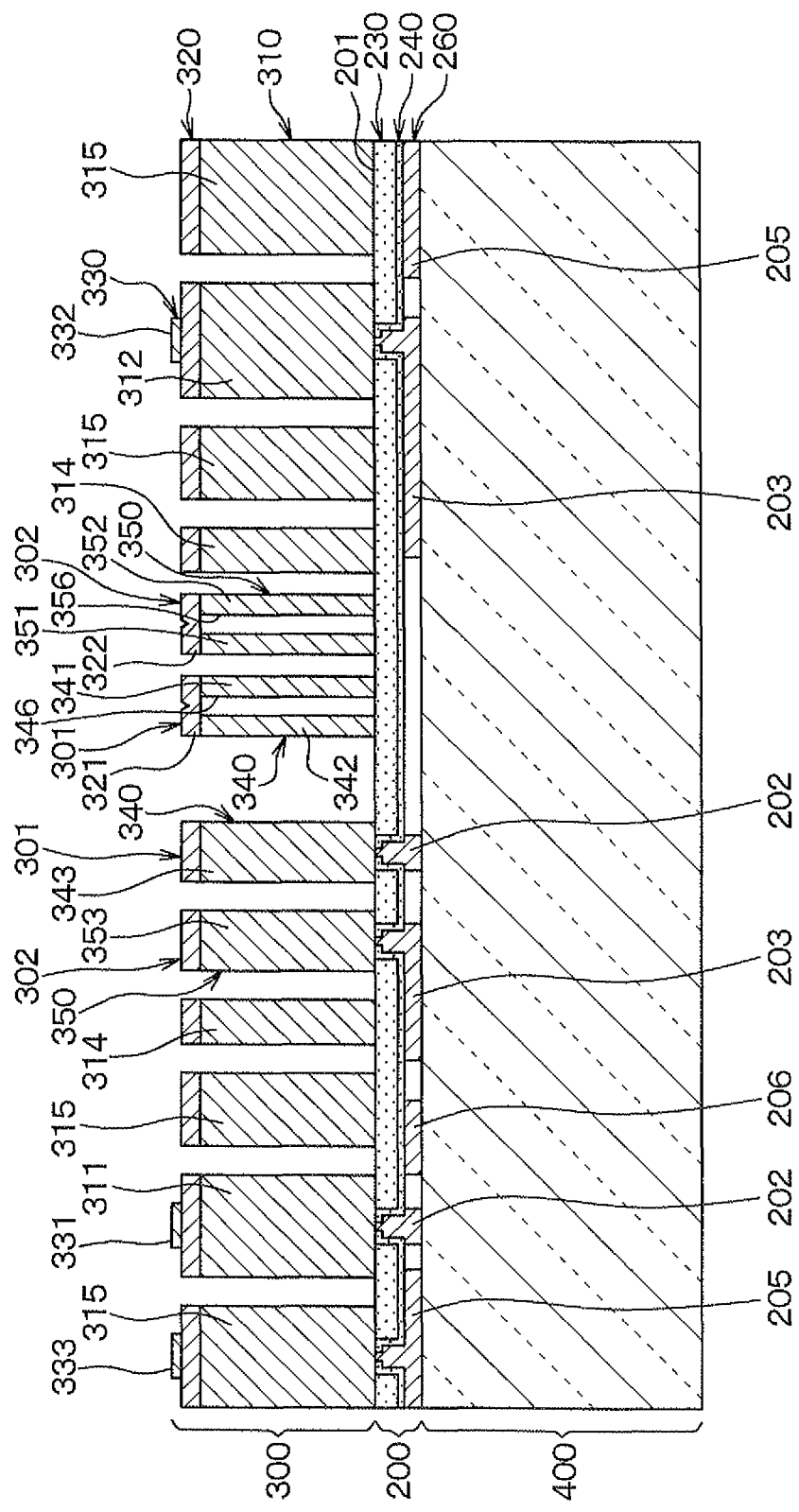
FIG. 24 is a section view of a physical quantity detection device according to a 4th embodiment.

In this embodiment, parts different from the 1st to 3rd embodiments will be described. FIG. 24 is a section view of a physical quantity detection device according to this embodiment and is a view corresponding to a section view taken on a line A-A' in FIG. 1. As shown in this drawing, in this embodiment, a glass substrate 400 which is nearly equal in thermal expansion coefficient to silicon is employed instead of the semiconductor substrate 100.

Since the glass is nearly equal in thermal expansion coefficient to the silicon, a stress caused by a difference in the thermal expansion coefficient is hardly applied to the respective electrodes 301, 302 formed in the first semiconductor layer 310. Further, a parasitic capacitance between the respective electrodes 301, 302 and the glass substrate 400 is decreased to decrease noises, so that it is possible to enhance the accuracy of the physical quantity detection device for detecting a variation in the capacitance of each of the electrodes 301, 302 and to stabilize the capacitance detection characteristics of the device.

5th Embodiment

Figure 25:
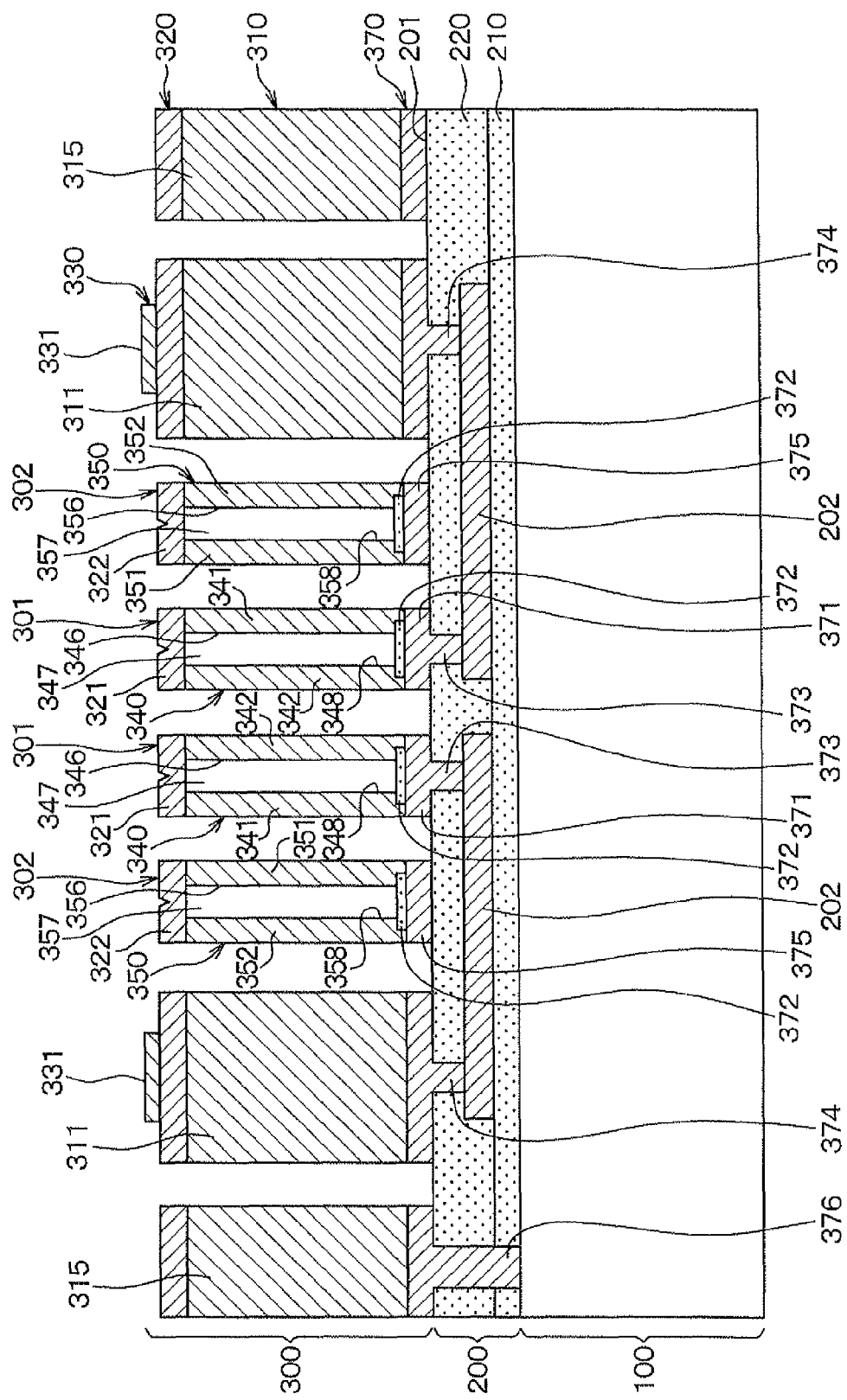
FIG. 25 is a section view of a physical quantity detection device according to a 5th embodiment.

In this embodiment, parts different from the 1st to 4th embodiments will be described. FIG. 25 is a section view of a physical quantity detection device according to this embodiment. As shown in this drawing, the electrode layer 300 has a laminated structure in which the first semiconductor layer 310, the second semiconductor layer 320, a third semiconductor layer 370, and the metal layer 330 are laminated. The insulating layer 200 has the same construction as shown in the 1st embodiment.

The third semiconductor layer 370 is formed over one surface 201 of the insulating layer 200, and the first semiconductor layer 310 is formed over this third semiconductor layer 370. Further, the second semiconductor layer 320 is formed over the first semiconductor layer 310. Polysilicon is employed for the third semiconductor layer 370. The first semiconductor layer 310 and the second semiconductor layer 320 are also formed of the polysilicon.

The third semiconductor layer 370 is patterned in the same layout as the connection parts 311, 312, the respective wall parts 314, 340, 350, and the peripheral part 315, which are formed in the first semiconductor layer 310, under these respective parts. That is, as in the case of the second semiconductor layer 320, the third semiconductor layer 370 is patterned in the shapes of the respective parts of the first semiconductor layer 310.

Further, of the third semiconductor layer 370, a part formed under the first wall part 340 is made a first bottom part 371. This first bottom part 371 closes an opening portion 348 on the insulating layer 200 side of the first wall part 340. Here, an insulating film 372 is formed over the first bottom part 371, and the first wall part 340 is provided on the first bottom part 371 in such a way as to cover the outer edge portion of this insulating film 372. In this way, the first wall part 340 is electrically connected to the first bottom part 371. Further, the opening portions 346, 348 on both sides of the first wall part 340 are closed by the first cover part 321 and the first bottom part 371, whereby the hollow portion 347 of the first wall part 340 is made, for example, vacuum.

The first bottom part 371 is electrically connected to the wiring pattern 202 via a contact part 373 formed in the insulating layer 200. Further, of the third semiconductor layer 370, a part formed under the connection part 311 is electrically connected to the wiring pattern 202 via a contact part 374 formed in the insulating layer 200. In this way, the first electrode 301 is electrically connected to the connection part 311 via the wiring pattern 202.

Similarly, of the third semiconductor layer 370, a part formed under a second wall part 350 is made a second bottom part 375. This second bottom part 375 closes an opening portion 358 on the insulating layer 200 side of the second wall part 350. The insulating film 372 is formed over the second bottom part 375, and the second wall part 350 is provided on the second bottom part 375 in such a way as to cover the outer edge portion of this insulating film 372. In this way, the second wall part 350 is electrically connected to the second bottom part 375. Further, the opening portions 356, 358 on both sides of the second wall part 350 are closed by the second cover part 322 and the second bottom part 375, whereby the hollow portion 357 of the second wall part 350 is made, for example, vacuum.

Although not shown in FIG. 25, contact parts are provided also on the second bottom part 375 and a bottom portion of the connection part 312 of the third semiconductor layer 370 and are electrically connected to the wiring pattern 203, respectively. In this way, the second electrode 302 is electrically connected to the connection part 312 via the wiring pattern 203.

In this way, each of the electrodes 301, 302 is constructed in the shape of a hollow box. Further, since the respective semiconductor layers 310, 320, 370 are formed of the polysilicon, the respective hollow portions 347, 357, which will be made the reference pressure chambers, are surrounded by the same semiconductor material. For this reason, this produces a construction capable of further enhancing the reliability of the reference pressure chamber. The insulating film 372 provided on the respective electrodes 301, 302 is a film used for forming the respective electrodes 301, 302. As the insulating film 372 is employed, for example, a $Si_3N_4$ film.

Further, of the third semiconductor layer 370, a part formed under the peripheral part 315 is electrically connected to the semiconductor substrate 100 via a contact part 376 formed in the insulating layer 200. In this way, the semiconductor substrate 100 can be electrically connected to an external circuit via the peripheral part 315.

Next, a method for manufacturing a physical quantity detection device shown in FIG. 25 will be described with reference to FIG. 26 to FIG. 33. Also in this embodiment, the physical quantity detection device is manufactured in the state of a wafer.

Figure 26A:
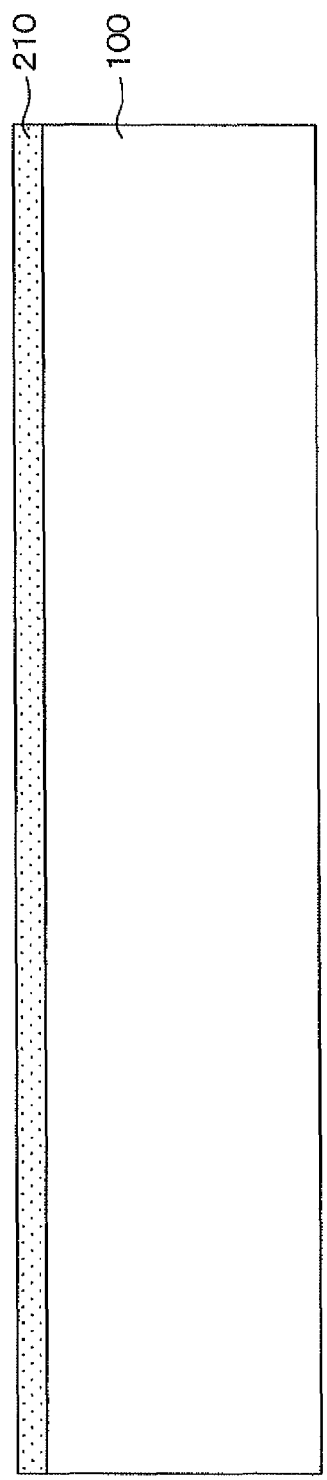
FIGS. 26A and 26B are views to show the steps of a process of manufacturing the physical quantity detection device according to the 5th embodiment.
Figure 26B:
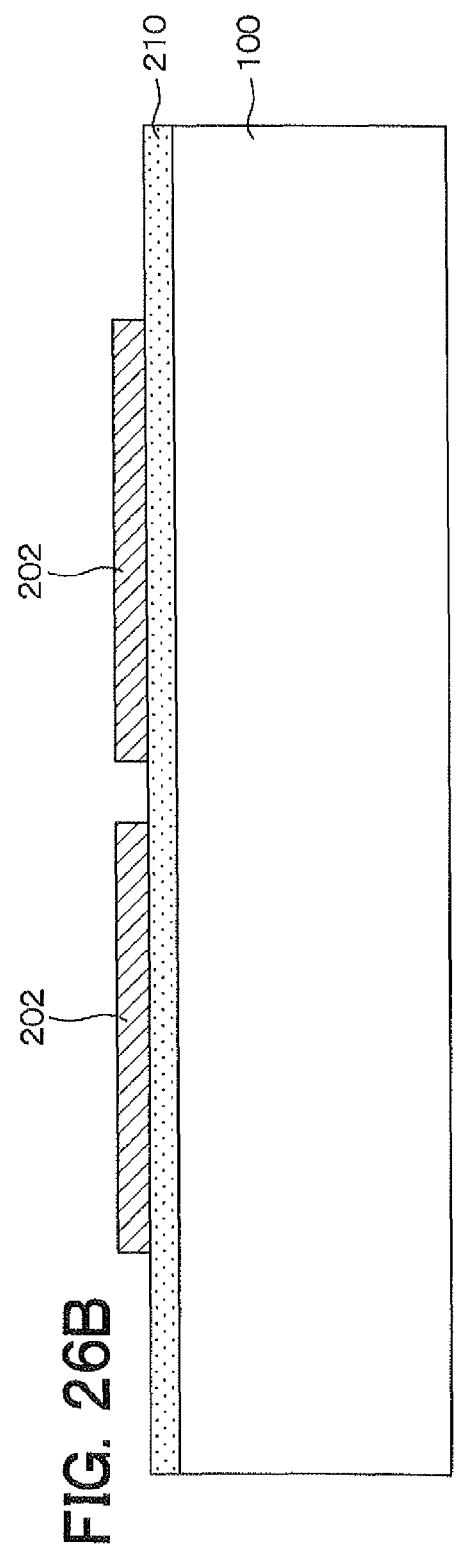

In the process shown in FIG. 26A, an n+ type single crystal silicon substrate is prepared as the first semiconductor substrate 100, and a $SiO_2$ film is formed as the first insulating layer 210 over this single crystal silicon substrate. Then, in the process shown in FIG. 26B, an n+ type polysilicon layer is formed in a thickness of 0.1 to 2 μm over the first insulating layer 210 and is patterned into the respective wiring patterns 202, 203.

Subsequently, in the process shown in FIG. 27A, as in the case of the process shown in FIG. 4B, a $SiO_2$ film is formed as the second insulating layer 220 over the first insulating layer 210 by the CVD method or the like to construct the insulating layer 200. Further, as in the case of the process shown in FIG. 5, the contact holes 204 are formed at positions corresponding to the peripheral part 315, the coupling part 343 of the first wall part 340, the coupling part 353 of the second wall part 350, and the connection parts 311, 312 of the insulating layer 200.

In the process shown in FIG. 27B, an n+ type polysilicon layer is formed in a thickness of 0.1 to 2 μm over the insulating layer 200 having the contact holes 204 formed therein in such a way as to embed the contact holes 241. In this way, the third semiconductor layer 370 and the contact parts 373, 374, 376 are formed.

Further, an etching stopper layer made of $SiO_2$, $Si_3N_4$, or metal such as W and Mo is formed as the insulating film 372 over the third semiconductor layer 370 by the CVD method or the like. In this embodiment, a $Si_3N_4$ film is formed as the insulating film 372 in a thickness of 0.01 to 2 μm by the LPCVD method and is patterned in a square shape in such a way as that parts which will be made the bottom surfaces of the hollow portions 347, 357 of the respective wall parts 340, 350 in future are left.

Thereafter, in the process shown in FIG. 28, an n+ type polysilicon layer is formed as the first semiconductor layer 310 in a thickness of 5 to 200 μm over the third semiconductor layer 370 in such a way as to cover the insulating film 372.

Figure 29:
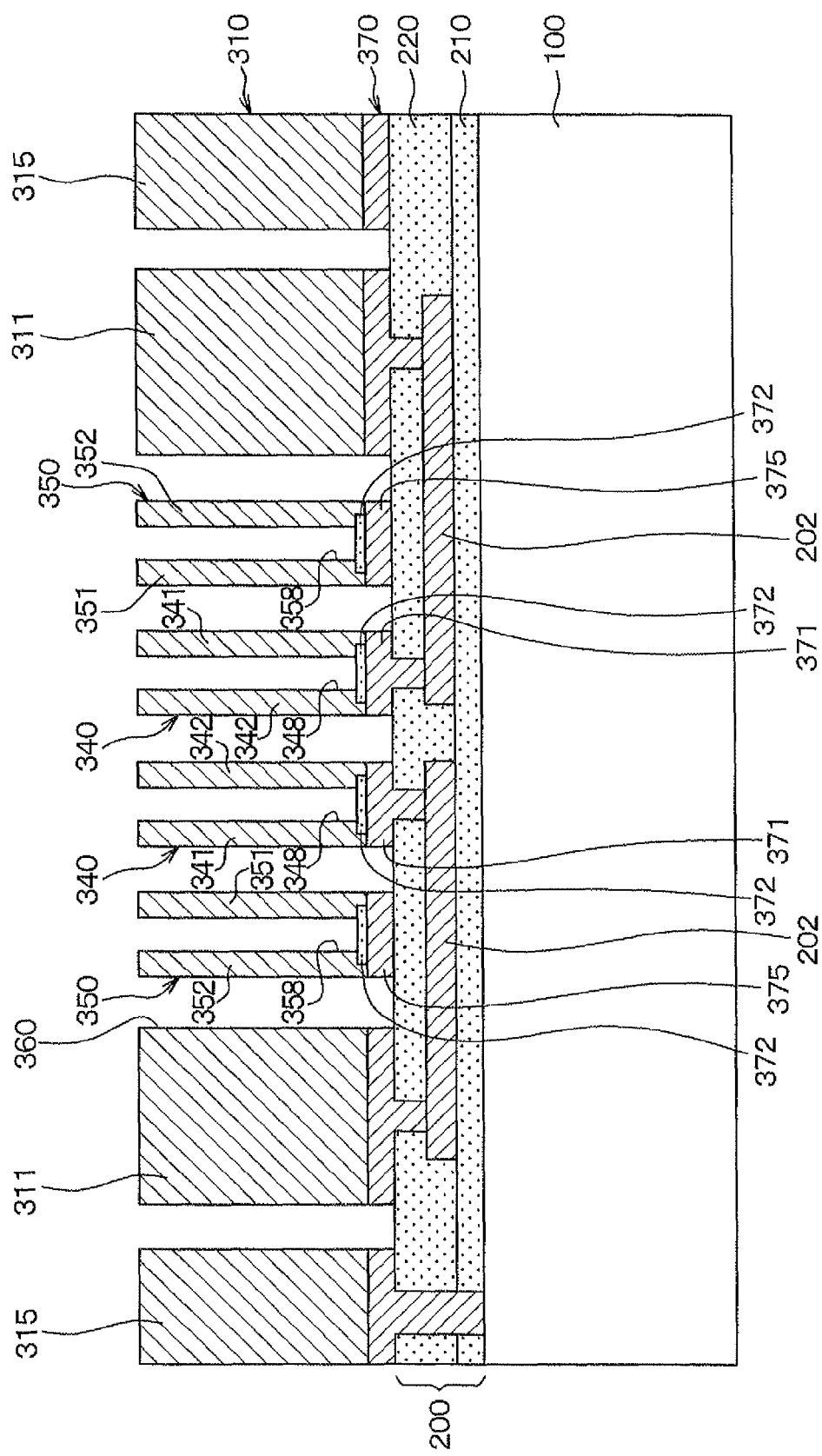
FIG. 29 is a view to show a step subsequent to the step of the process shown in FIG. 28.

In the process shown in FIG. 29, trenches 360 are formed in the first semiconductor layer 310 by dry etching or the like to form the respective wall part 340, 350, the connection parts 311, 312, and the peripheral part 315. At this time, the etching of the first semiconductor layer 310 is stopped by the insulating film 372 of the etching stopper layer, but in a region where the insulating film 372 is not formed over the third semiconductor layer 370, not only the first semiconductor layer 310 but also the third semiconductor layer 370 is etched off.

In this way, of the third semiconductor layer 370, parts under the respective wall parts 340, 350 are not etched off but are left and made the first bottom part 371 and the second bottom part 375. For this reason, there is provided a structure in which the first bottom part 371 closes the opening portion 348 on the insulating layer 200 side of the first wall part 340 and in which the second bottom part 375 closes the opening portion 358 on the insulating layer 200 side of the second wall part 350. In this way, the first wall part 340 is formed which includes two diaphragms 341, 342 arranged opposite to each other on the first bottom part 371 and which is formed in the shape of a hollow cylinder, and the second wall part 350 is formed which includes two diaphragms 351, 352 arranged opposite to each other on the second bottom part 375 and which is formed in the shape of a hollow cylinder.

On the other hand, of the third semiconductor layer 370, a region where the insulating film 372 is not formed is partitioned into the connection parts 311, 312 and the peripheral part 315.

When the $Si_3N_4$ film of the insulating film 372 is formed in a size smaller than the outside width of the reference pressure chamber, the first wall part 340 formed of the vertical walls of the reference pressure chamber (that is, diaphragms 341, 342, 351, 352) can be electrically connected to the first bottom part 371. This is ditto for the second wall part 350 and the second bottom part 375.

Figure 30:
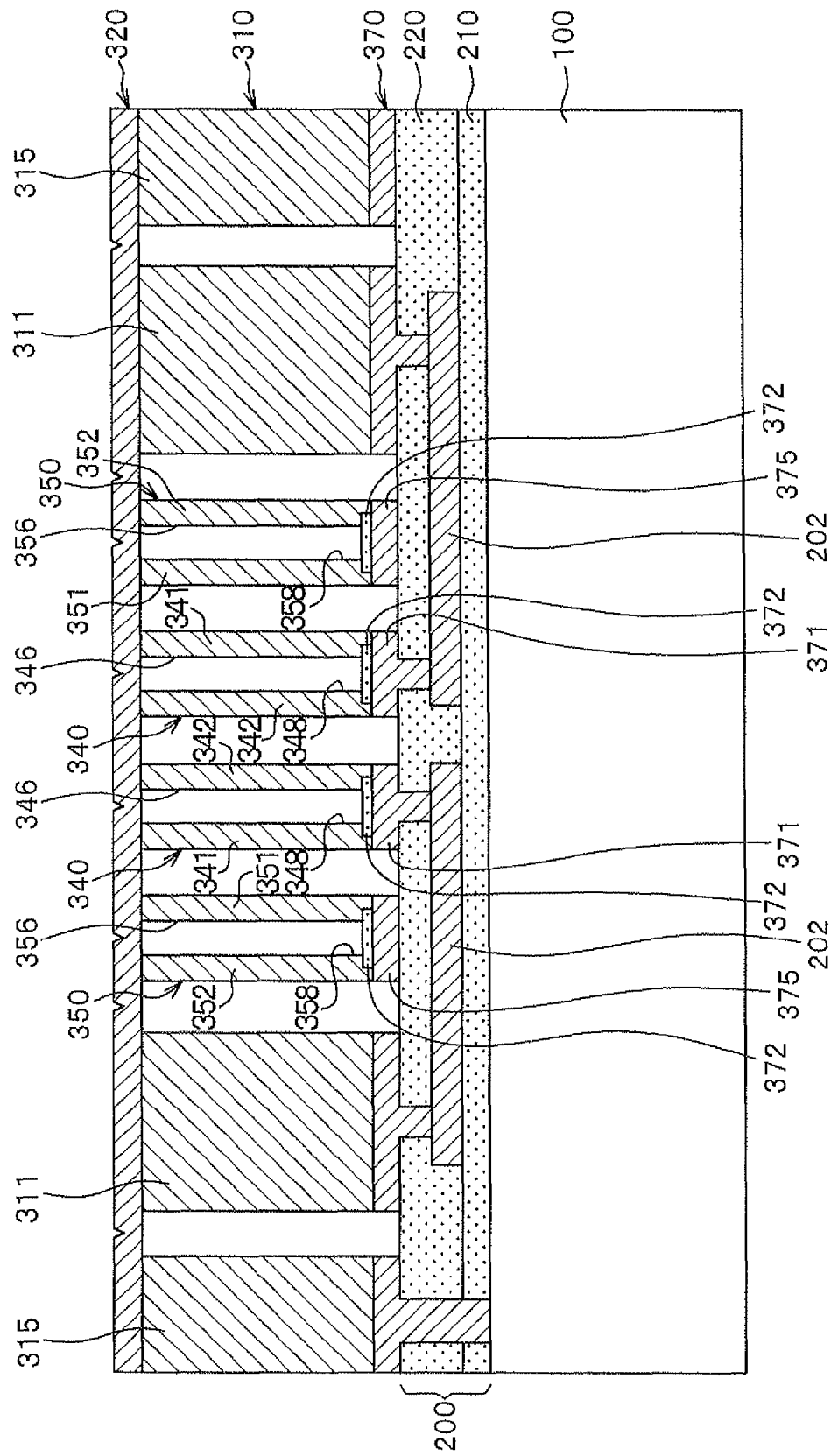
FIG. 30 is a view to show a step subsequent to the step of the process shown in FIG. 29.
Figure 31:
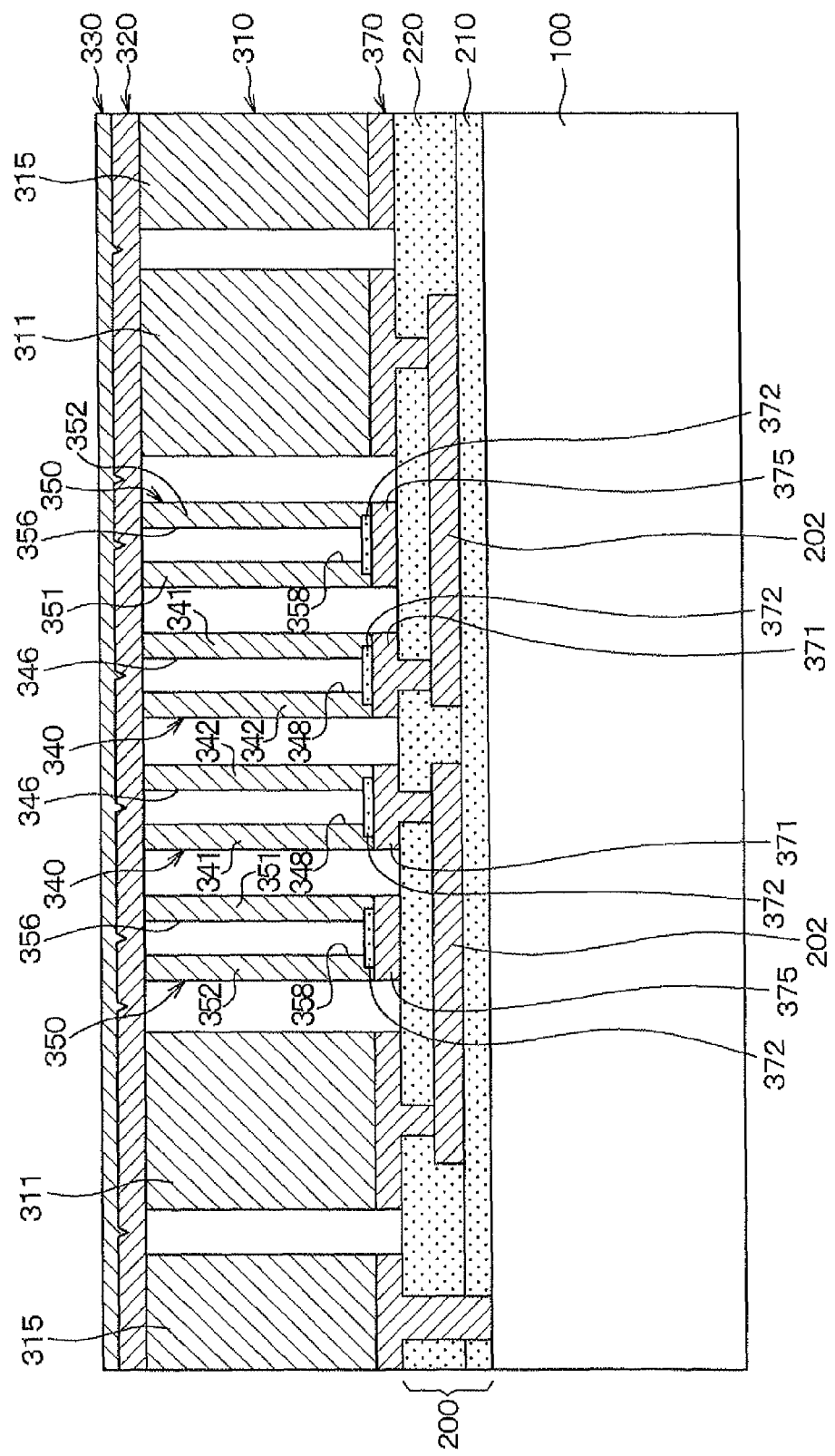
FIG. 31 is a view to show a step subsequent to the step of the process shown in FIG. 30.

In the process shown in FIG. 30, as in the case of the process shown in FIG. 7, an n+ type polysilicon layer is formed in a vacuum as the second semiconductor layer 320 over the first semiconductor layer 310. In this way, the respective hollow portions 347, 357 of the respective wall parts 340, 350 are sealed by the respective cover parts 321, 322. Thereafter, in the process shown in FIG. 31, as in the case of the process shown in FIG. 8, an Al layer is formed as the metal layer 330 over the second semiconductor layer 320 and is patterned, whereby the pads 331 to 333 are formed.

Figure 32:
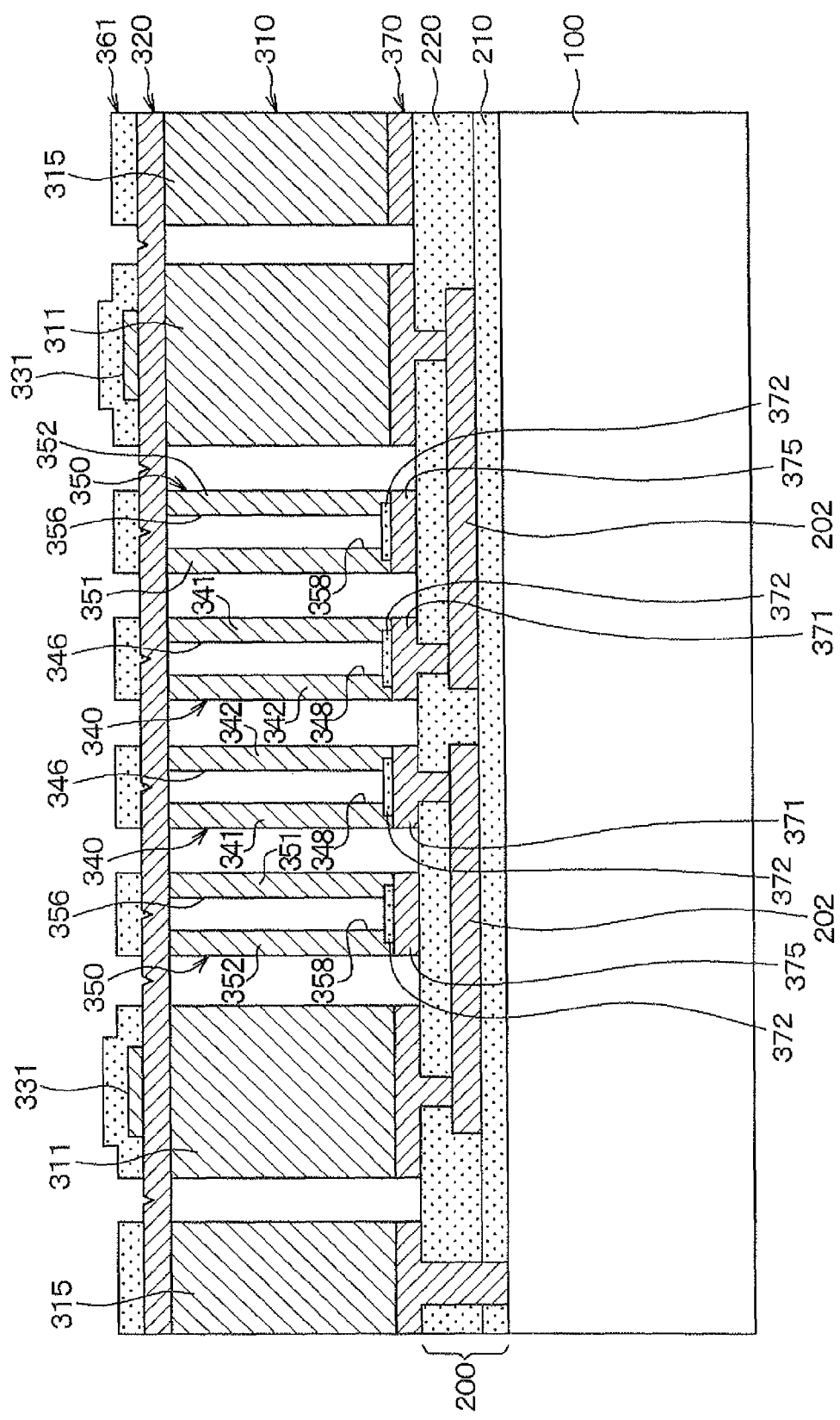
FIG. 32 is a view to show a step subsequent to the step of the process shown in FIG. 31.

In the process shown in FIG. 32, as in the case of the process shown in FIG. 8, the second semiconductor layer 320 is covered with the resist 361 in such a way that parts formed on the respective wall parts 340, 350 of the second semiconductor layer 320 are left. Then, in the process shown in FIG. 33, as in the case of the process shown in FIG. 9, of the second semiconductor layer 320, parts exposed from the resist 361 are removed and the resist 361 on the second semiconductor layer 320 is removed, whereby the respective electrodes 301, 302 are acquired.

Thereafter, the wafer is divided into the respective physical quantity detection devices. In this way, the respective physical quantity detection device shown in FIG. 25 is completed.

As described above, each of the electrodes 301, 302 is provided with each of the bottom parts 371, 375 and is formed in the shape of a hollow box and the entire portion of the electrode is formed of the same material, so that the property of the electrode can be made stable. Hence, the reliability of each of the hollow portions 347, 357 (reference pressure chamber) can be further enhanced.

As for the correspondence relationship between the description of this embodiment and the description of the scope of claims, the insulating film 372 corresponds to "a stopper film" of the scope of claims. Further, the third semiconductor layer 370 corresponds to "a first semiconductor layer" of the scope of claims, and the first semiconductor layer 310 corresponds to "a second semiconductor layer" of the scope of claims, and the second semiconductor layer 320 corresponds to "a third semiconductor layer" of the scope of claims.

6th Embodiment

Figure 34:
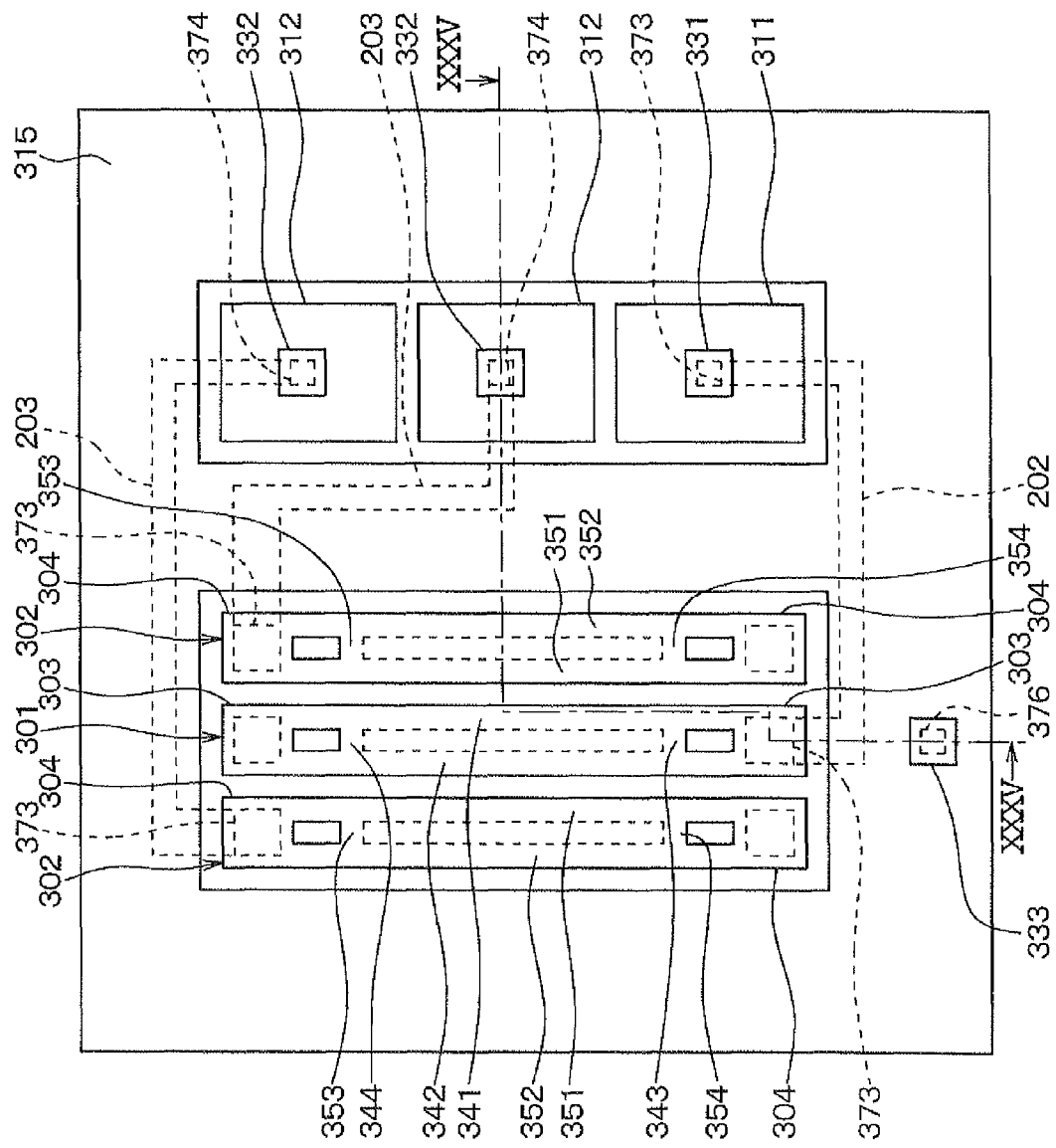
FIG. 34 is a plan view of a physical quantity detection device according to a 6th embodiment.

In this embodiment, parts different from the 5th embodiment will be described. FIG. 34 is a plan view of a physical quantity detection device according to this embodiment. Further, FIG. 35 is a view corresponding to a section view taken on a line B-B' in FIG. 34.

Figure 35:
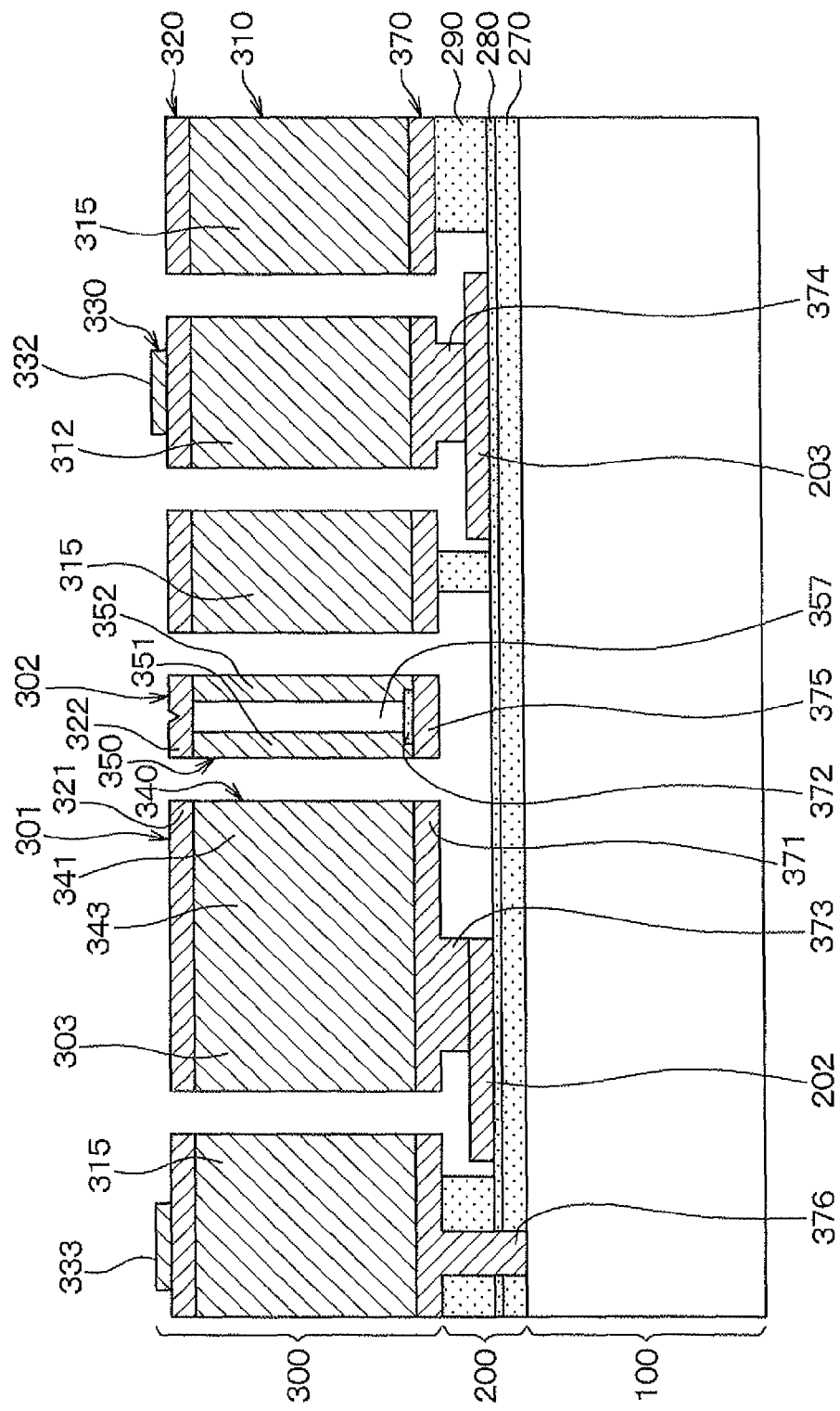
FIG. 35 is a section view taken on a line XXXV-XXXV in FIG. 34.

As shown in FIG. 35, the insulating layer 200 formed over the semiconductor substrate 100 has a laminated structure in which a seventh insulating layer 280 is formed over a sixth insulating layer 270 and in which an eighth insulating layer 290 and the wiring patterns 202, 203 are formed over the seventh insulating layer 280.

The electrode layer 300 has a laminated structure in which the first semiconductor layer 310, the second semiconductor layer 320, the third semiconductor layer 370, and the metal layer 330 are laminated. As shown in FIG. 34, the first semiconductor layer 310 is partitioned into one first wall part 340, two second wall parts 350, one connection part 311, two connection parts 312, and the peripheral part 315.

The second semiconductor layer 320 and the third semiconductor layer 370 are patterned in such a way as to fit to the layout of the respective electrodes 301, 302, the respective connection parts 311, 312, and the peripheral part 315. In this case, as shown in FIG. 35, as for parts corresponding to the respective wall parts 340, 350 of the second semiconductor layer 320 and the third semiconductor layer 370, the second semiconductor layer 320 is patterned in such a way as to close the opening portion 346 on the second semiconductor 320 side of the first wall part 340 and to close the opening portion 356 on the second semiconductor 320 side of the second wall part 350. Further, the third semiconductor layer 370 is patterned in such a way as to close the opening portion 348 on the third semiconductor 370 side of the first wall part 340 and to close the opening portion 358 on the third semiconductor 370 side of the second wall part 350. In this way, the hollow portions 347, 357 of respective electrodes 301, 302 are sealed for example, in vacuum. As in the case of the 5th embodiment, the insulting film 372 of the etching stopper layer is left on respective bottom parts 371, 375.

As shown in FIG. 34, the respective electrodes 301, 302 are arranged in such a way as to sandwich the first electrode 301 by the two second electrodes 302. In this way, one diaphragm 341 of the first wall part 340 and one diaphragm 351 of one of the second wall parts 350 are arranged opposite to each other. Further, the other diaphragm 342 of the first wall part 340 and one diaphragm 351 of the other second wall part 350 are arranged opposite to each other. In this way, a capacitance between the first electrode 301 and one of the second electrodes 302 is detected, the capacitance corresponding to a distance between the diaphragm 341 of the first wall part 340 and the diaphragm 351 of one of the second wall parts 350, the diaphragm 341 of the first wall part 340 and the diaphragm 351 of one of the second wall parts 350 being arranged opposite to each other. Further, a capacitance between the first electrode 301 and the other second electrode 302 is detected, the capacitance corresponding to a distance between the diaphragm 342 of the first wall part 340 and the diaphragm 351 of the other second wall part 350, the diaphragm 342 of the first wall part 340 and the diaphragm 351 of the other second wall part 350 being arranged opposite to each other.

Further, the electrode layer 300 (that is, the first to third semiconductor layers 310, 320, 370) has a first support part 303 and a second support part 304 formed therein. The first support part 303 is provided on the coupling parts 343, 344 side of the first electrode 301 and is coupled to the respective coupling parts 343, 344. The respective coupling parts 343, 344 are coupled to the first support part 303 by a beam. On the other hand, the second support part 304 is provided on the coupling parts 353, 354 side of the second electrode 302 and is coupled to the respective coupling parts 353, 354. The respective coupling parts 353, 354 are coupled to the second support part 304 by a beam.

In this way, the respective electrodes 301, 302 are supported by the respective support parts 303, 304, so that as shown in FIG. 35, the respective electrodes 301, 302 are separated from the insulating layer 200. In other words, the eighth insulating layer 290 under the respective bottom parts 371, 375 is removed, whereby the respective electrodes 301, 302 are floated away from the insulating layer 200. Hence, this can reduce the effect of parasitic capacitance produced when the respective electrodes 301, 302 are in contact with the insulating layer 200.

The first support part 303 is electrically connected to the wiring pattern 202 via the contact part 373 formed in the insulating layer 200. Further, of the third semiconductor layer 370, a part formed under the connection part 311 is electrically connected to the wiring pattern 202 via the contact part 374 formed in the insulating layer 200. In this way, as shown in FIG. 34, the first electrode 301 is electrically connected to the connection part 311 via the first support part 303 and the wiring pattern 202.

Similarly, the second support part 304 is electrically connected to the wiring pattern 202 via the contact part 373 formed in the insulating layer 200, and the connection part 312 is electrically connected to the wiring pattern 203 via the contact part 374. In this way, the second electrode 302 is electrically connected to the connection part 312 via the second support part 304 and the wiring pattern 203.

Further, the peripheral part 315 is laid out in such a way as to surround the peripheries of the respective electrodes 301, 302 and the peripheries of the respective connection parts 311, 312. Of the third semiconductor layer 370, a part formed under the peripheral part 315 is electrically connected to the semiconductor substrate 100 via the contact part 376 formed in the insulating layer 200.

Of the second semiconductor layer 320, parts corresponding to the respective connection parts 311, 312 and the peripheral part 315 have the pads 331 to 333 formed thereon, the pads 331 to 333 electrically connecting these parts to an external device. Up to this point, the construction of the physical quantity detection device according to this embodiment has been described.

Next, a method for manufacturing the physical quantity detection device shown in FIG. 34 and FIG. 35 will be described with reference to FIG. 36 to FIG. 40. Also in this embodiment, the physical quantity detection device is manufactured in the state of a wafer.

Figure 36A:
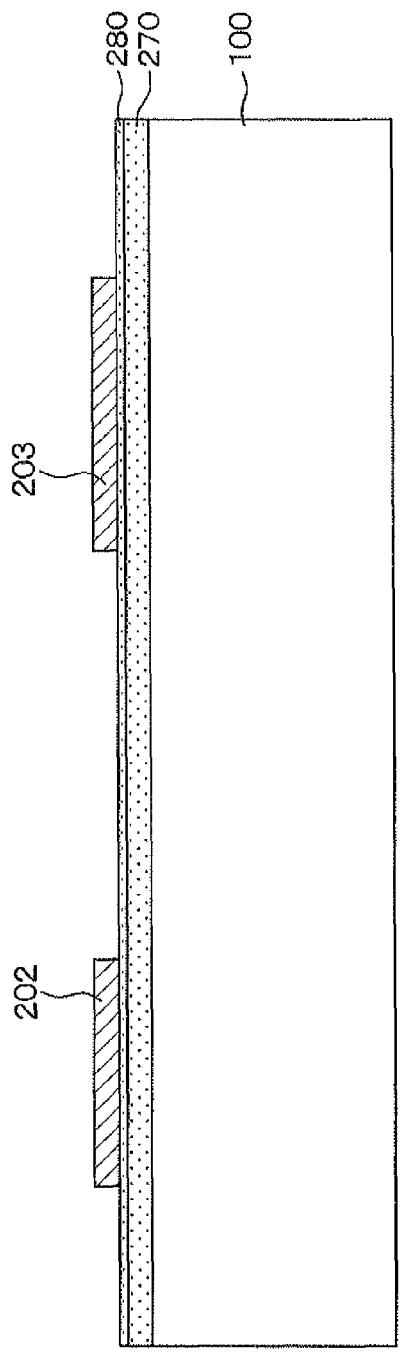
FIGS. 36A and 36B are views to show the steps of a process of manufacturing a physical quantity detection device according to the 6th embodiment.

First, in the process shown in FIG. 36A, an n+ type single crystal silicon substrate is prepared as the semiconductor substrate 100. A $SiO_2$ film is formed as the sixth insulating layer 270 over this single crystal silicon substrate by the CVD method or the thermal oxidation. Further, a $Si_3N_4$ film is formed as the seventh insulating layer 280 over the sixth insulating layer 270 by the LPCVD method. Further, an n+ type polysilicon layer is formed over the seventh insulating layer 280 and is patterned. In this way, the respective wiring patterns 202, 203 are formed.

Figure 36B:
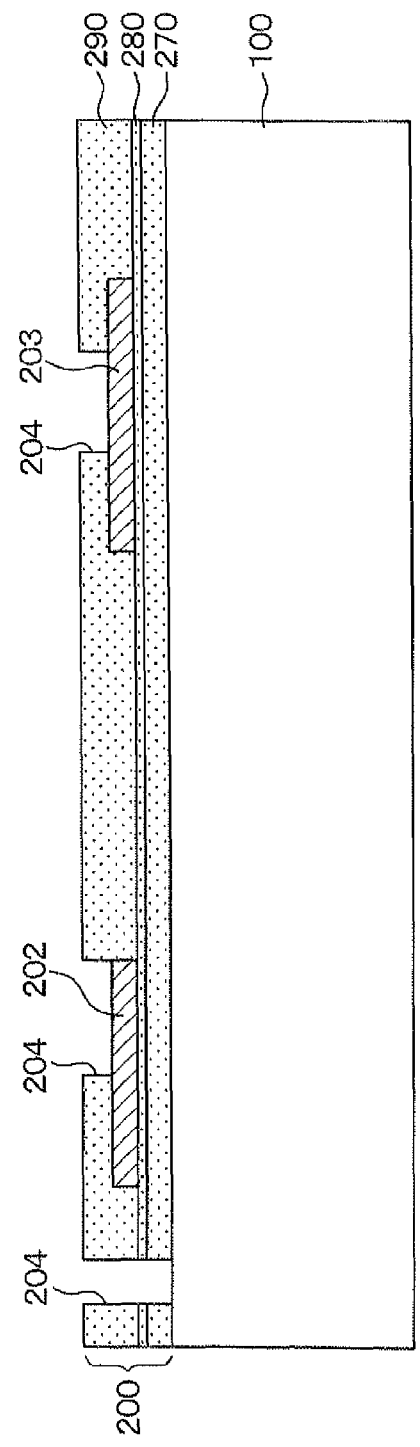

In the process shown in FIG. 36B, as in the case of the process shown in FIG. 27A, a $SiO_2$ film is formed as the eighth insulating layer 290 over the seventh insulating layer 280 by the CVD method or the like to construct the insulating layer 200. Further, the contact holes 204 are formed at positions corresponding to the peripheral part 315, the respective support parts 303, 304 coupled to the respective wall parts 340, 350, and the connection parts 311, 312 of the insulating layer 200.

In the process shown in FIG. 37A, as in the case of the process shown in FIG. 27B, an n+ type polysilicon layer is formed over the insulating layer 200 in such a way as to embed the contact holes 204. In this way, the contact parts 373, 374, 376, which are electrically connected to the wiring patterns 202, 203, and the third semiconductor layer 370 are formed. Further, a $Si_3N_4$ film is formed as the insulating film 372 over the third semiconductor layer 370 by the CVD method or the like and is patterned in such a way that parts to be made the bottom surfaces of the hollow portions 347, 357 of the respective wall parts 340, 350 are left.

In the process shown in FIG. 37B, as in the case of the process shown in FIG. 28, an n+ type polysilicon layer is formed as the first semiconductor layer 310 over the third semiconductor layer 370 in such a way as to cover the insulating film 372.

Figure 38:
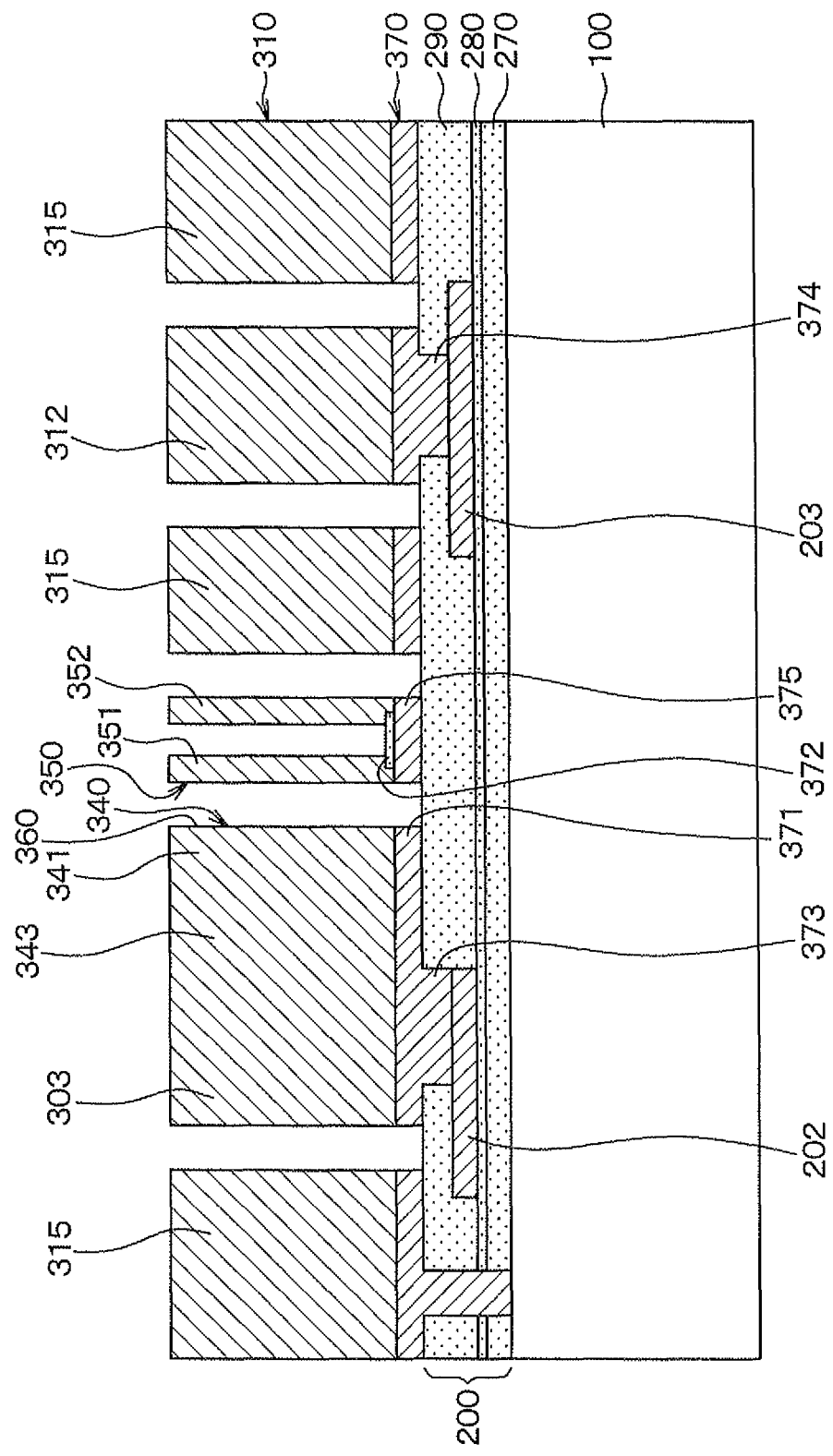
FIG. 38 is a view to show a step subsequent to the steps of the process shown in FIGS. 37A, 37B.

In the process shown in FIG. 38, for example, as in the case of the process shown in FIG. 29, the trenches 360 are formed in the first semiconductor layer 310 and the second semiconductor layer 320 by dry etching or the like. The etching at the time of forming the respective wall parts 340, 350 is stopped by the insulating film 372 of the etching stopper layer. This brings about a state in which the respective bottom parts 371, 375 are left under the respective wall parts 340, 350. Further, the first semiconductor layer 310 and the second semiconductor layer 320 are partitioned into the respective wall parts 340, 350, the respective support parts 303, 304, the respective connection parts 311, 312, and the peripheral part 315 by the trenches 360 reaching the insulating layer 200.

Figure 39:
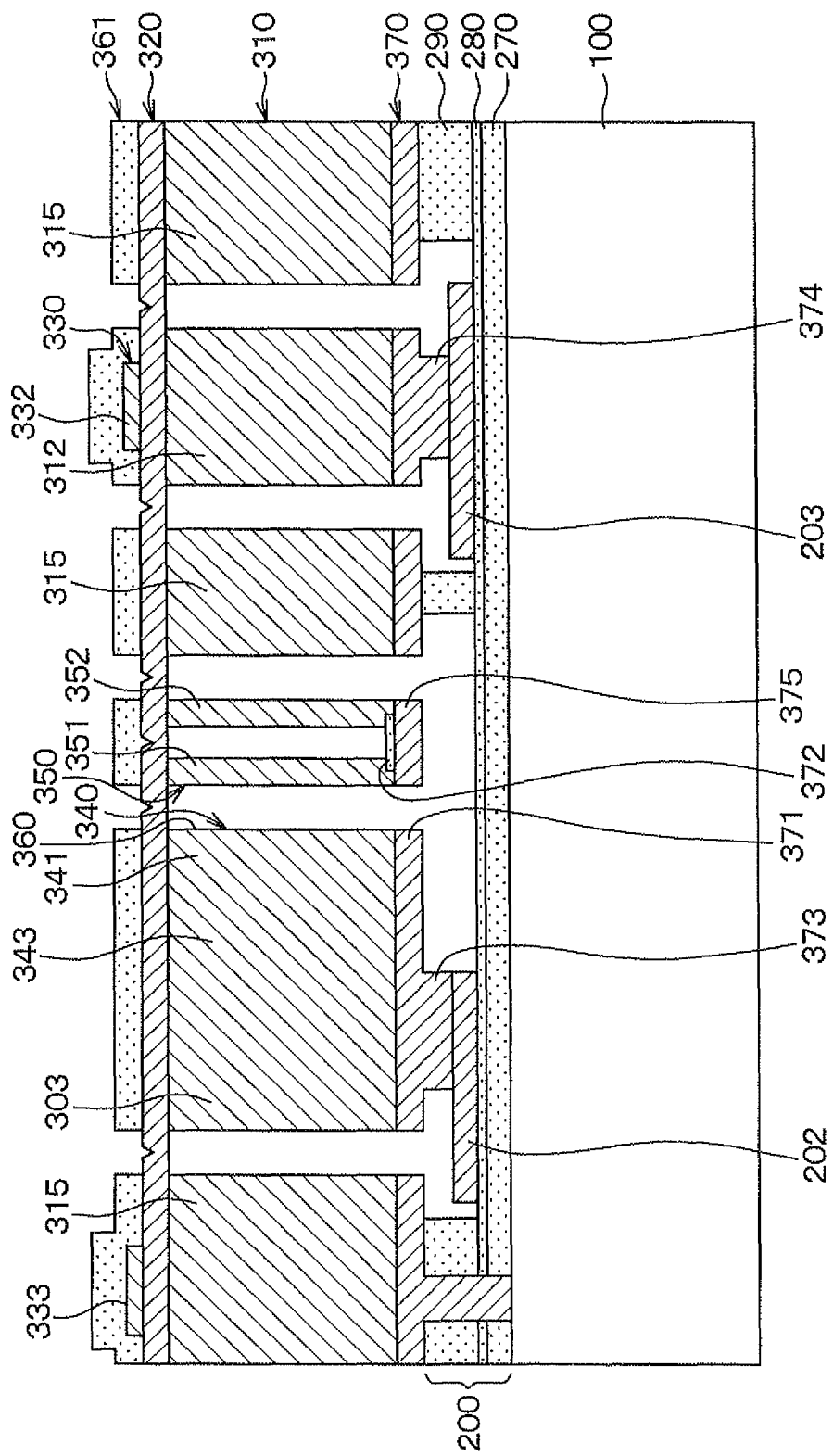
FIG. 39 is a view to show a step subsequent to the step of the process shown in FIG. 38.

In the process shown in FIG. 39, for example, as in the case of the process shown in FIG. 30, an n+ type polysilicon layer is formed in a vacuum as the second semiconductor layer 320 over the first semiconductor layer 310 to thereby seal the respective hollow portions 347, 357 of the respective wall parts 340, 350. Further, as in the case of the processes shown in FIG. 31 and FIG. 32, the metal layer 330 is formed over the second semiconductor layer 320 and is patterned to thereby form the pads 331 to 333. Then, the second semiconductor layer 320 is covered with the resist 361 in such a way that parts corresponding to the respective wall parts 340, 350 of the second semiconductor layer 320 are left.

Figure 33:
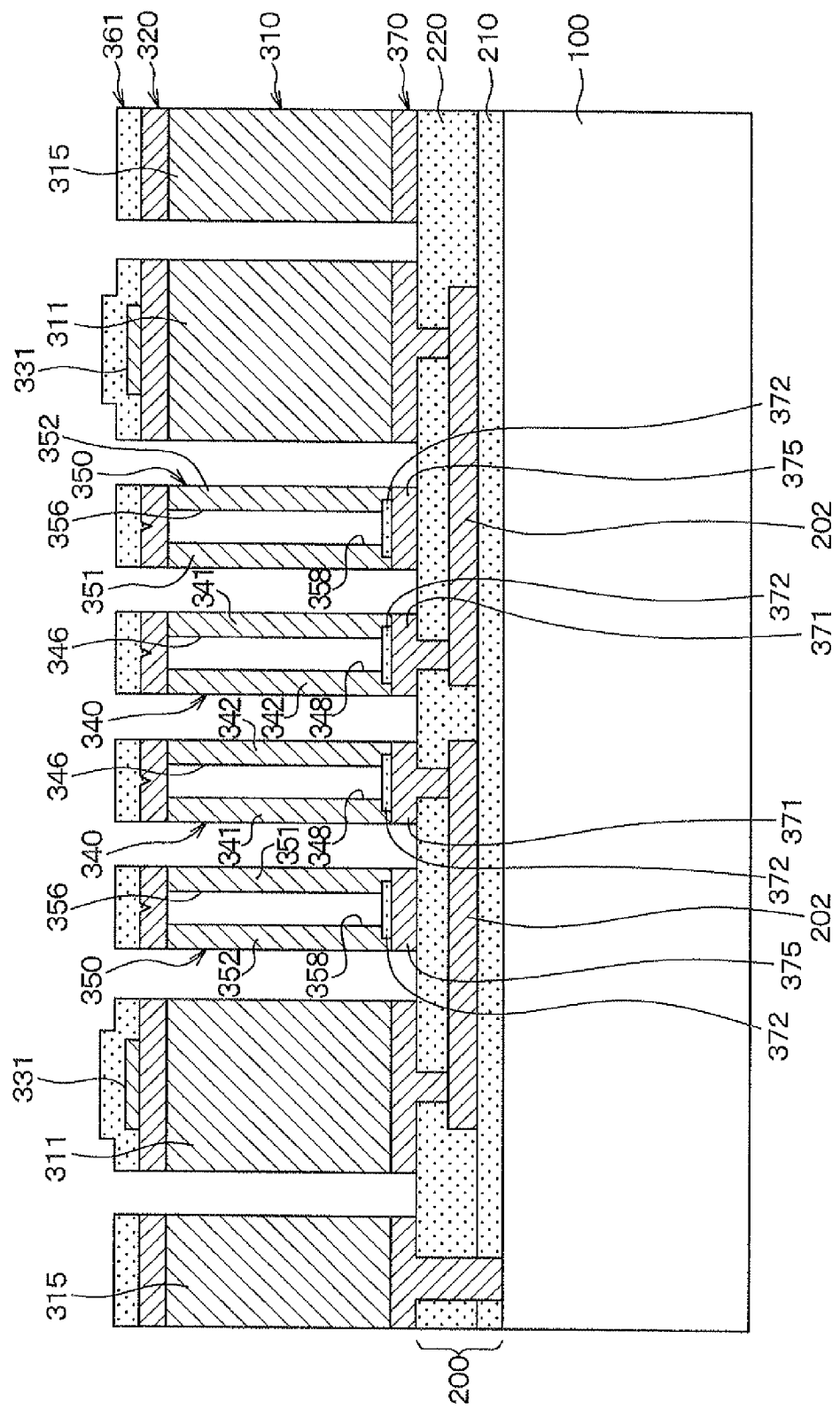
FIG. 33 is a view to show a step subsequent to the step of the process shown in FIG. 32.
Figure 40:
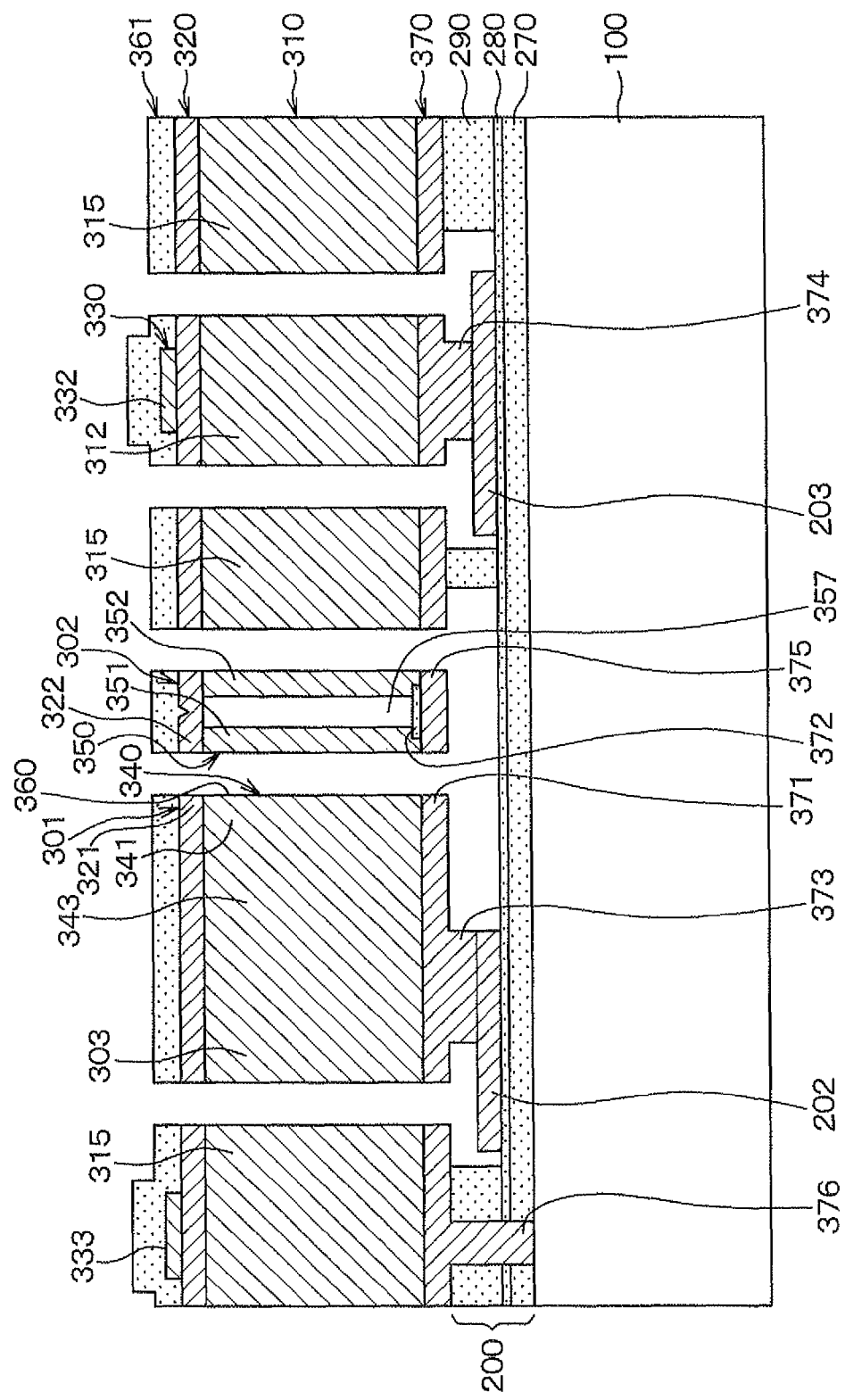
FIG. 40 is a view to show a step subsequent to the step of the process shown in FIG. 39.

In the process shown in FIG. 40, first, as in the case of the process shown in FIG. 33, of the second semiconductor layer 320, parts exposed from the resist 361 are removed. Subsequently, of the insulating layer 200, the eighth insulating layer 290 is etched off via the trenches 360 formed in the first to third semiconductor layers 310, 320, 370 by using the resist 361 as a mask. In this case, of the eighth insulating layer 290, parts positioned under the respective bottom parts 371, 375 are removed. In this way, the first electrode 301 constructed of the first wall part 340, the first bottom part 371, and the first cover part 321 is separated from the insulating layer 200, and the second electrode 302 constructed of the second wall part 350, the second bottom part 375, and the second cover part 322 is separated from the insulating layer 200.

Thereafter, the wafer is divided into the respective physical quantity detection devices. In this way, the physical quantity detection device shown in FIG. 34 and FIG. 35 is completed.

As described above, in this embodiment, the first electrode 301 and the second electrode 302 are not in contact with the insulating layer 200 but are floated away from the insulating layer 200. For this reason, the effect of parasitic capacitance produced when the first electrode 301 is in contact with the insulating layer 200 can be reduced, and the effect of parasitic capacitance produced when the second electrode 302 is in contact with the insulating layer 200 can be reduced. Further, the effect of the stress which the peripheral part 315 is applied to the first electrode 301 and the second electrode 302 can be reduced.

7th Embodiment

In this embodiment, parts different from the 1st to 6th embodiments will be described. In particular, in this embodiment, parts different from the 1st embodiment will be described.

Figure 41:
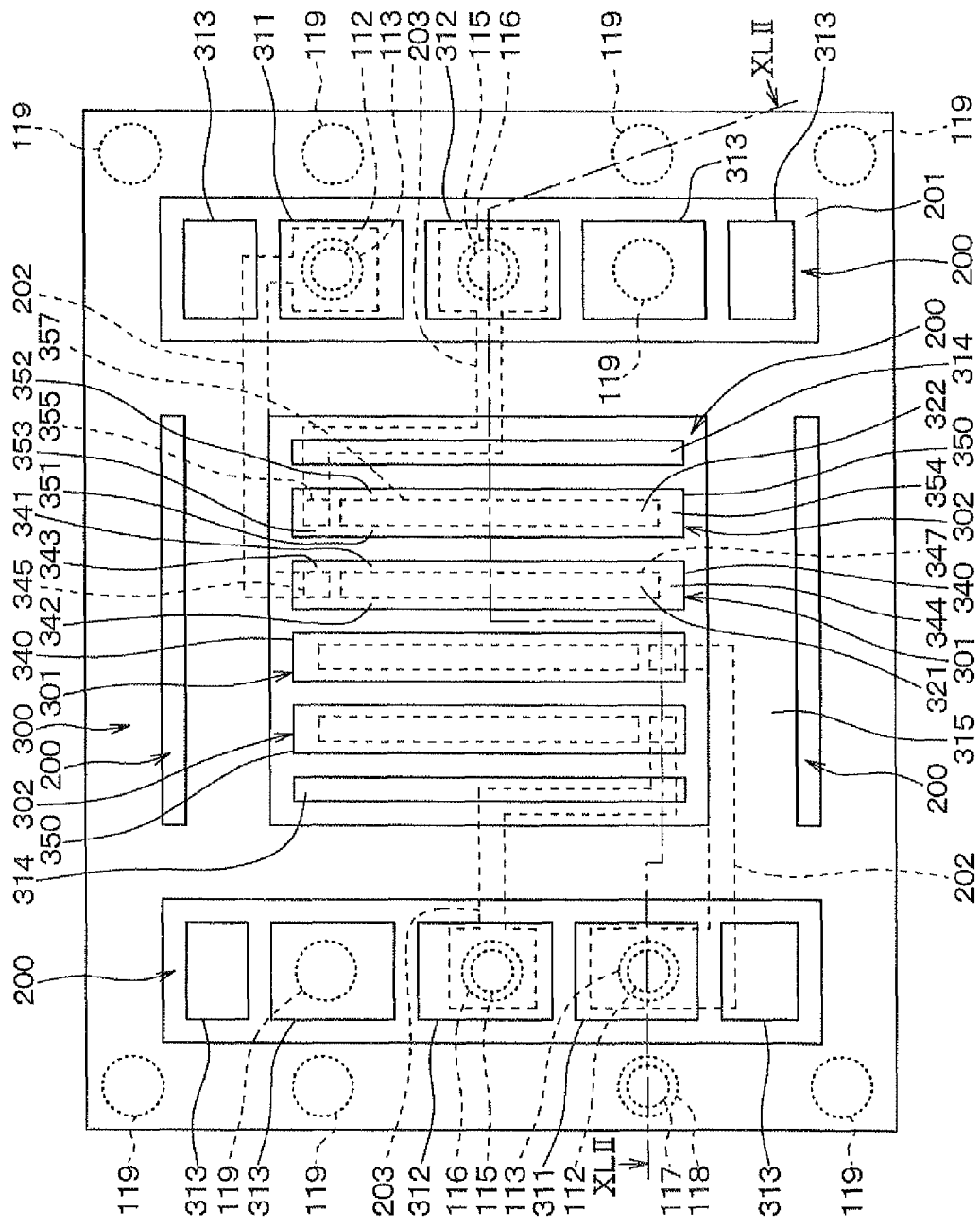
FIG. 41 is a plan view of a physical quantity detection device according to a 7th embodiment.

FIG. 41 is a plan view of a physical quantity detection device according to this embodiment. Further, FIG. 42 is a section view taken on a line C-C' in FIG. 41.

First, as shown in FIG. 41, the pads 331 to 333 are not provided on the parts corresponding to respective connection parts 311, 312 and the peripheral part 315. That is, this embodiment employs a structure in which instead of the electrode layer 300 side, the semiconductor substrate 100 side is connected to the external device. For this reason, the connection parts 311, 312 formed in the first semiconductor layer 310 are not electrically connected to the external device and the respective connection parts 311, 312 are dummy parts.

Figure 42:
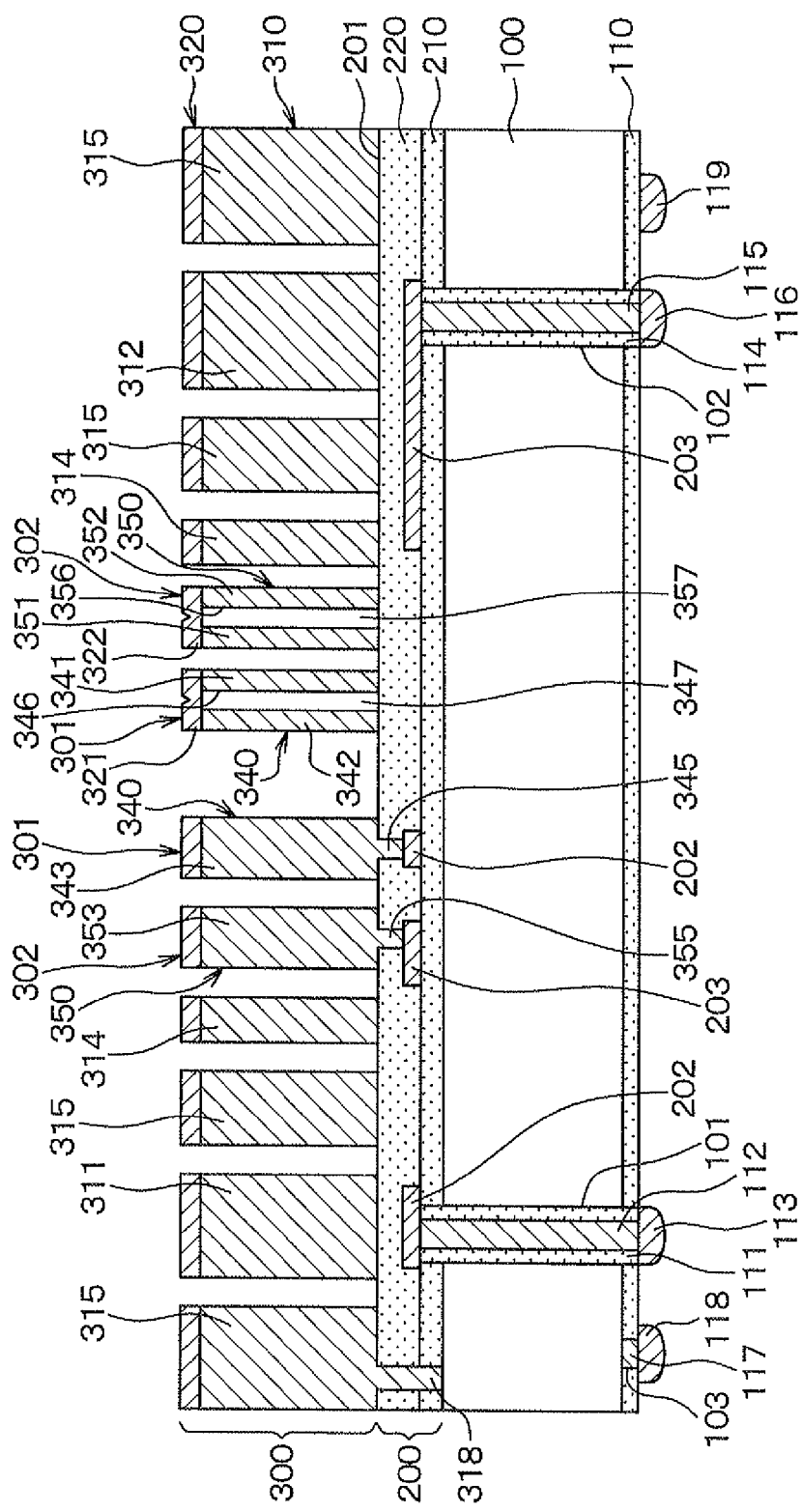
FIG. 42 is a section view taken on a line XLII-XLII in FIG. 41.

Specifically, as shown in FIG. 42, the semiconductor substrate 100 has an insulating film 110 formed on a surface on the opposite side of a surface having the insulating layer 200 formed thereon. Of the semiconductor substrate 100 and the insulating film 110, a part corresponding to the wiring pattern 202 has a hole portion 101 formed therein, the hole portion 101 reaching the wiring pattern 202. An insulating film 111 is formed on the wall surface of this hole portion 101. This insulating film 111 has a first through electrode part 112 provided thereon, the first through electrode part 112 having one end electrically connected to the wiring pattern 202. Further, the first through electrode part 112 has a bonding ball bump 113 formed on the other end thereof.

Similarly, of the semiconductor substrate 100 and the insulating film 110, a part corresponding to the wiring pattern 203 has a hole portion 102 formed therein, the hole portion 102 reaching the wiring pattern 203. This hole portion 102 has an insulating film 114 formed on the wall surface thereof. This insulating film 114 has a second through electrode part 115 provided thereon, the second through electrode part 115 having one end electrically connected to the wiring pattern 203. Further, the second through electrode part 115 has a bonding ball bump 116 formed on the other end thereof.

Of the insulating film 110, a part corresponding to the peripheral part 315 has a hole portion 103 formed therein, the hole portion 103 reaching the semiconductor substrate 100. This hole portion 103 has a third through electrode part 117 provided therein, the third through electrode part 117 having one end electrically connected to the semiconductor substrate 100. Further, the third through electrode part 117 has a bonding ball bump 118 formed on the other end thereof.

Further, of the insulating film 110, a part corresponding to the peripheral part 315 has a dummy ball bump 119 formed thereon. This dummy ball bump 119 is a balance bump for preventing the physical quantity detection device from being inclined when the respective bonding ball bumps 113, 116, 118 are mounted directly to a ceramic module substrate or a printed wiring board. As shown in FIG. 41, the dummy ball bumps 119 are plurally formed on the peripheral part 315 and the connection parts 311, 312.

The respective through electrode parts 112, 115, 117, the bonding ball bumps 113, 116, 118, and the dummy ball bumps 119 may be formed after the insulating layer 200 is formed over the semiconductor substrate 100 or may be formed after the respective electrodes 301, 302 and the like are formed over the insulating layer 200.

As described above, when the through electrode parts 112, 115, 117 are formed on the semiconductor substrate 100 side, the physical quantity detection device can be mounted directly on a wiring board or the like.

8th Embodiment

Figure 43:
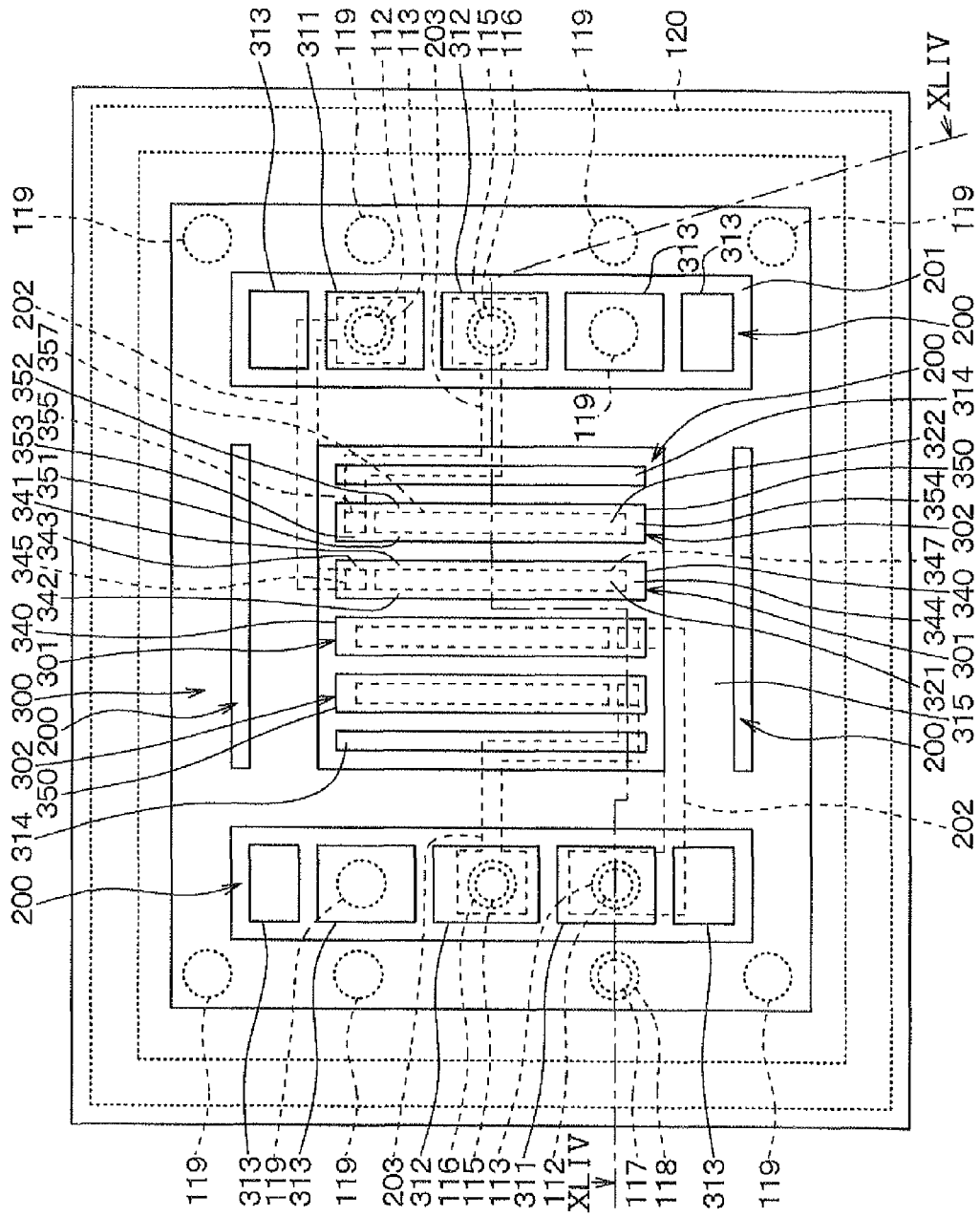
FIG. 43 is a plan view of a physical quantity detection device according to an 8th embodiment.

In this embodiment, parts different from the 7th embodiment will be described. FIG. 43 is a plan view of a physical quantity detection device according to this embodiment. Further, FIG. 44 is a section view taken on a line D-D' in FIG. 43.

Figure 44:
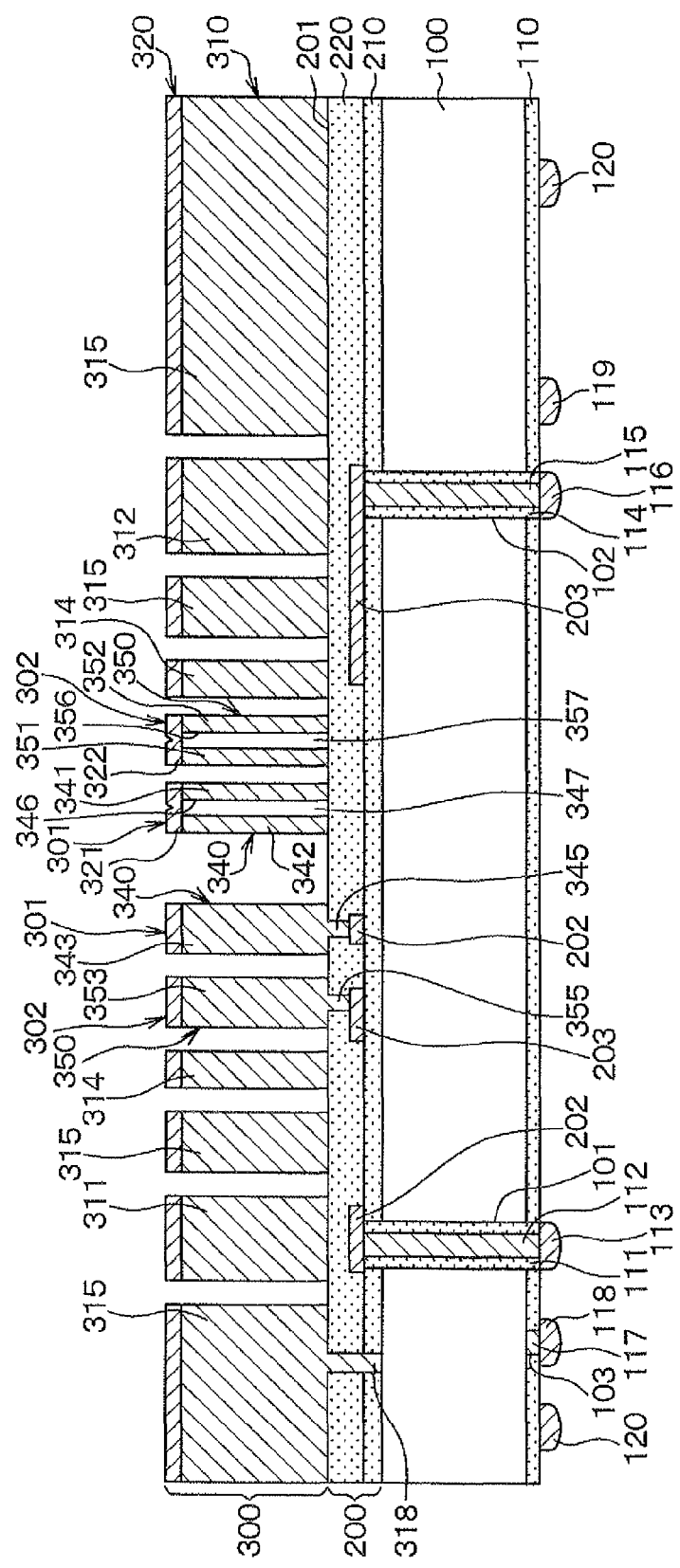
FIG. 44 is a section view taken on a line XLIV-XLIV in FIG. 43.

As shown in FIG. 44, in this embodiment, of the insulating film 110, a part corresponding to the peripheral part 315 has an air-tight ring 120 formed on a portion outside at the dummy ball bumps 119. This air-tight ring 120, as shown in FIG. 43, is formed in the shape of a ring surrounding respective connection parts 311, 312 and respective electrodes 301, 302, which are formed in the first semiconductor layer 310.

In this way, when the physical quantity detection device is mounted on a wiring board or the like, the air-tight ring 120 can protect the bonding ball bumps 113, 116, 118 from the outside atmosphere.

In the 7th embodiment and the 8th embodiment, the first through electrode part 112 and the second through electrode part 115 are electrically connected to the wiring patterns 202, 203, respectively. However, instead of forming the wiring patterns 202, 203 in the insulating layer 200, the first through electrode part 112 and the second through electrode part 115 may be electrically connected directly to the coupling parts 343, 353 of the respective wiring patterns 202, 203. According to this structure, the connection parts 311, 312 do not need to be formed and hence the manufacturing cost can be reduced.

9th Embodiment

In this embodiment, parts different from the 1st to 8th embodiments will be described. In particular, in this embodiment, parts different from the 1st embodiment will be described.

Figure 45:
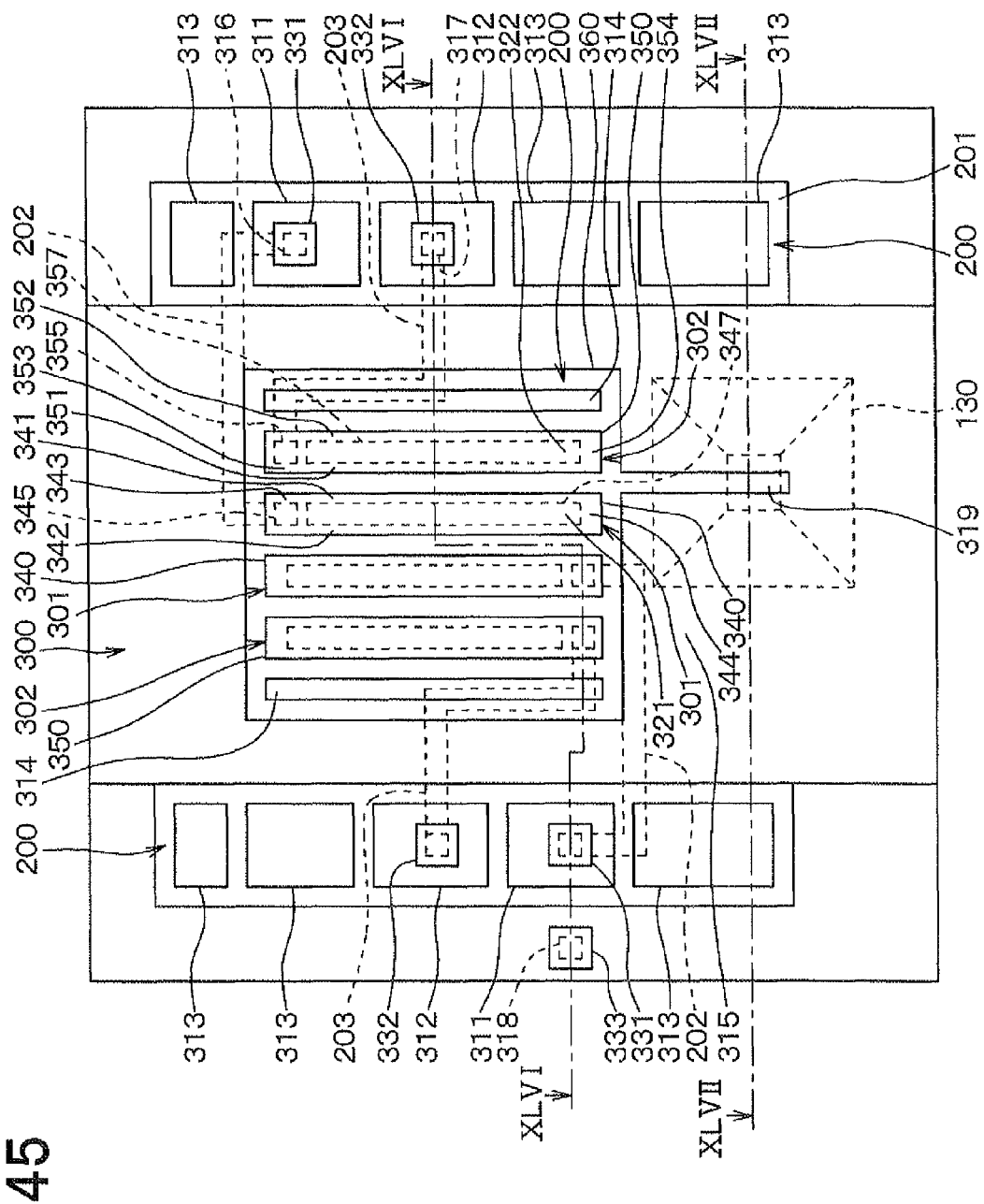
FIG. 45 is a plan view of a physical quantity detection device according to a 9th embodiment.

FIG. 45 is a plan view of a physical quantity detection device according to this embodiment. Further, FIG. 46 is a section view taken on a line E-E' in FIG. 45, and FIG. 47 is a section view taken on a line F-F' in FIG. 45.

Figure 46:
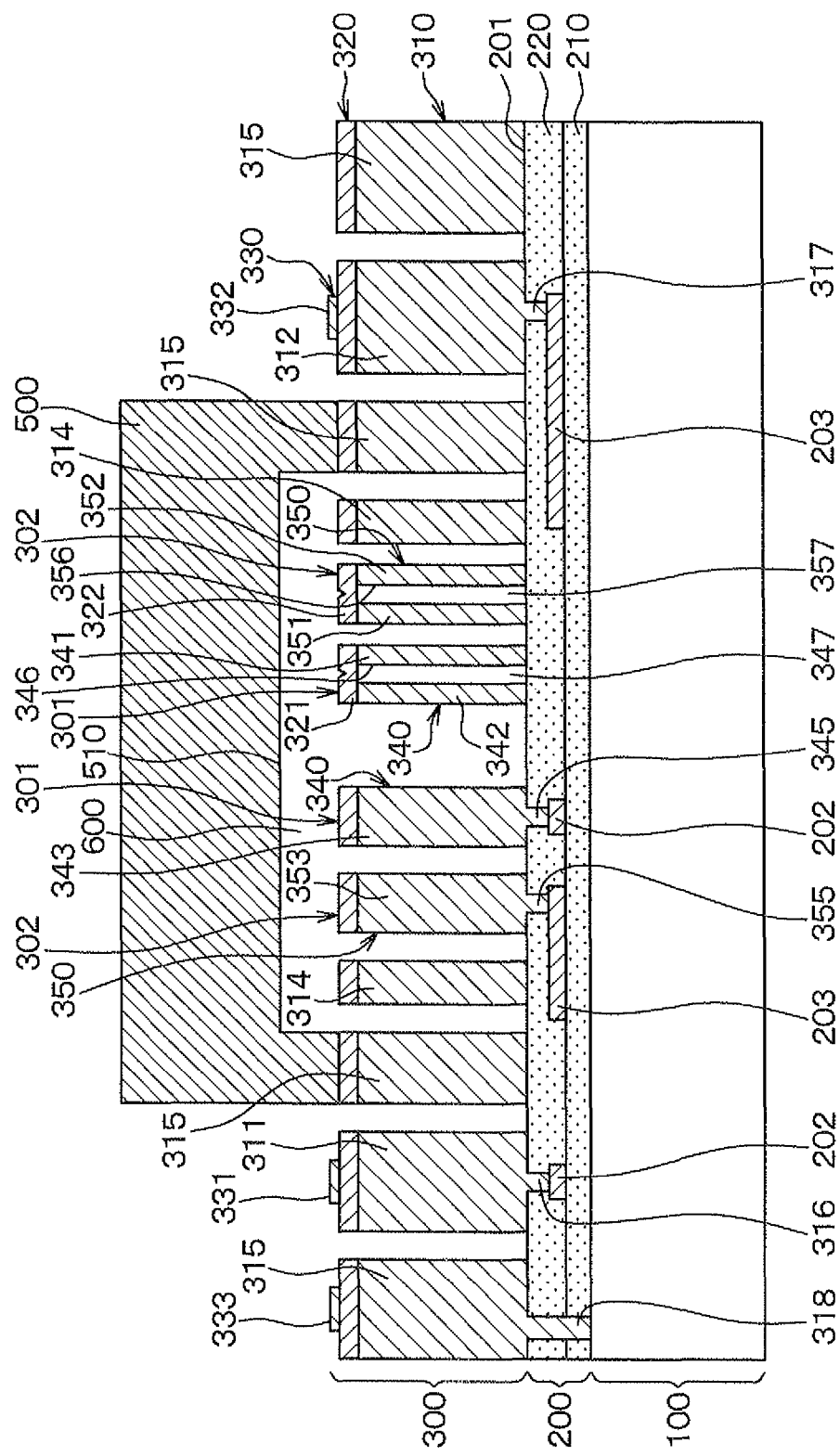
FIG. 46 is a section view taken on a line XLVI-XLVI in FIG. 45.
Figure 47:
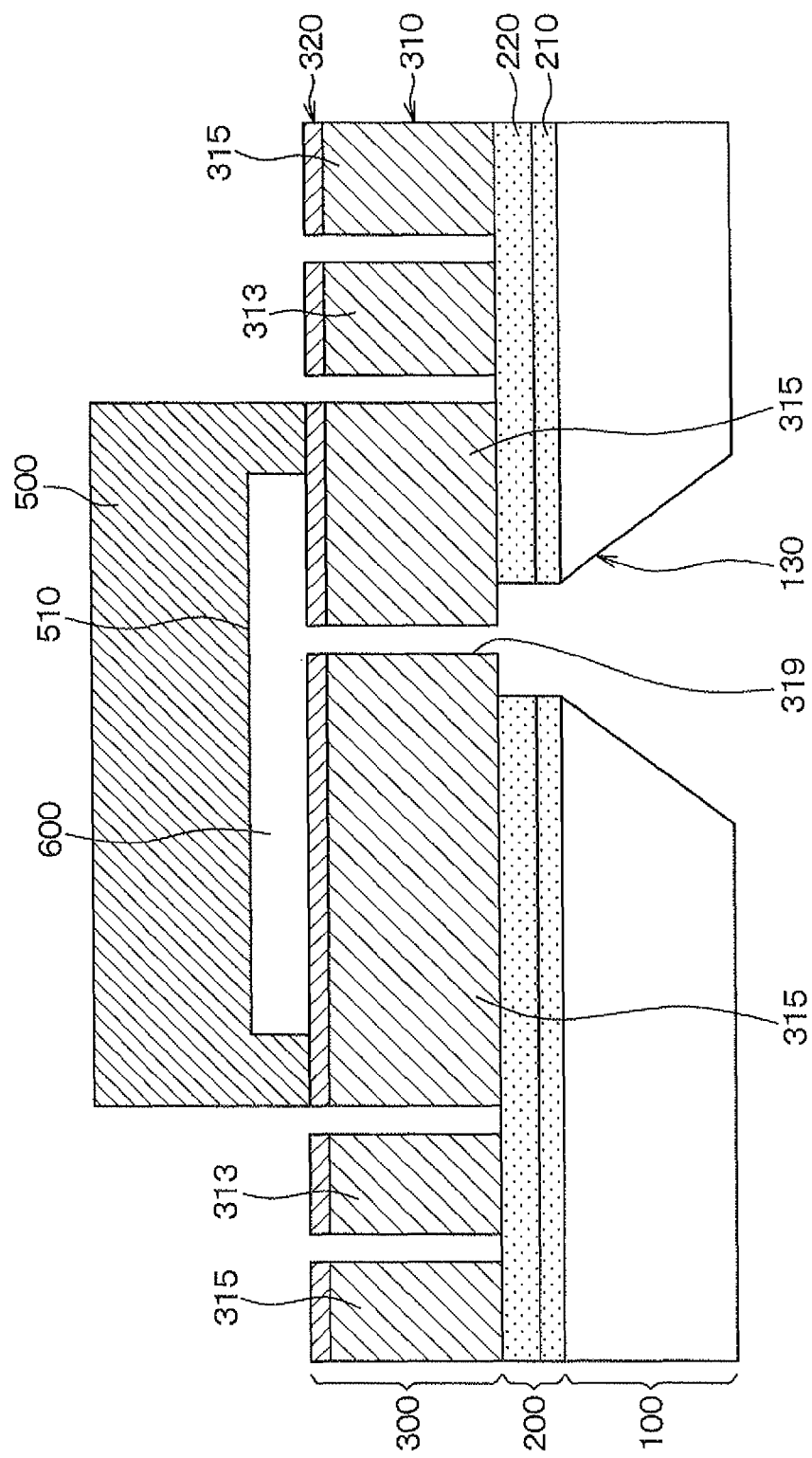
FIG. 47 is a section view taken on a line XLVII-XLVII in FIG. 45.

As shown in FIG. 46 and FIG. 47, in this embodiment, a cap 500 is provided on the electrode layer 300. The cap 500 is a part for preventing water and other foreign matters from intruding into respective electrodes 301, 302. The cap 500 is provided with a depressed part 510 in which, of the cap 500, a part opposite to a region where the respective electrodes 301, 302 are formed, that is, a portion of a surface directed to the electrode layer 300 is depressed.

This depressed part 510 is provided in order to prevent the cap 500 from being brought into contact with the respective electrodes 301, 302 when the cap 500 is bonded to the electrode layer 300. When one surface of the cap 500 is bonded to the peripheral part 315, the respective electrodes 301, 302 are arranged in a space portion 600 constructed of the concavity portion 510, the peripheral part 315, and the insulating layer 200. As the cap 500 is employed, for example, an n+ type single crystal silicon substrate.

Further, as shown in FIG. 47, the semiconductor substrate 100 and the insulating layer 200 have a downside pressure introduction hole 130 formed at a position corresponding to the concavity portion 510 of the cap 500, the downside pressure introduction hole 130 passing through a semiconductor substrate 100 and the insulating layer 200. Further, the peripheral part 315 has another downside pressure introduction hole 319 formed therein, the another downside pressure introduction hole 319 connecting the downside pressure introduction hole 130 to the space portion 600.

Of these downside pressure introduction holes 130 and 319, the downside pressure introduction hole 319 formed in the peripheral part 315, as shown in FIG. 45, is a hole in which the trench 360 of partitioning the respective electrodes 301, 302 is extended to the peripheral part 315 separated from the respective electrodes 301, 302. Further, the downside pressure introduction hole 130 formed in the semiconductor substrate 100 and the insulating layer 200 is formed at a position corresponding to the downside pressure introduction hole 319 formed in the peripheral part 315.

In this structure, an outside pressure is introduced into the space portion 600 through the downside pressure introduction holes 130, 319, so that a pressure can be detected in response to a pressure difference between the space portion 600 and the hollow portions 347, 357 of the respective electrodes 301, 302.

The downside pressure introduction holes 130, 319 can be formed in the following manner. First, the downside pressure introduction holes 319 of the peripheral part 315, as described above, is formed at the same time when the respective wall parts 340, 350 are formed in the first semiconductor layer 310 and the second semiconductor layer 320.

On the other hand, the downside pressure introduction hole 130 of the semiconductor substrate 100 and the insulating layer 200 is formed in the following manner: first, a specified mask is formed on a surface on the opposite side of the insulating layer 200 of the semiconductor substrate 100, and then the semiconductor substrate 100 of the single crystal silicon substrate is etched by the anisotropic etching using, for example, a KOH liquid, whereby when a substrate having a (100) surface is used as the semiconductor substrate 100, a hole shaped like a pyramid is formed; thereafter, the insulating layer 200 exposed from the semiconductor substrate 100 is etched off, whereby the downside pressure introduction hole 130 formed in the semiconductor substrate 100 and the insulating layer 200 can be connected to the downside pressure introduction holes 319 of the peripheral part 315.

Further, as to the cap 500, the cap 500 in which the concavity portion 510 is previously formed is prepared. The cap 500 is also formed of a wafer, so that the wafer having many concavity portions 510 formed therein is prepared. The wafer is an n+ type single crystal silicon substrate. The cap 500 is joined directly to the peripheral part 315 at a normal temperature, whereby the respective electrodes 301, 302 can be covered with the cap 500.

The cap 500 is brought into the same potential as the peripheral part 315, in other words, the first semiconductor layer 310 and the second conductor layer 320 and hence functions as a shield layer. In this way, the respective electrodes 301, 302 can be protected from the outside noises.

As described above, when the peripheral part 315 is provided with the cap 500 and a pressure medium is introduced into the space portion 600 from the semiconductor substrate 100 side, the pressure of the pressure medium can be detected. In this regard, instead of forming the downside pressure introduction holes 130, 319 in the semiconductor substrate 100, the insulating layer 200, and the peripheral part 315, a through hole for connecting the space portion 600 to the outside may be formed in the cap 500. This structure will be described later.

As to the correspondence relationship between the description of this embodiment and the description of the scope of claims, the downside pressure introduction holes 130, 319 correspond to "a through hole" of the scope of claims.

10th Embodiment

In this embodiment, parts different from the 9th embodiment will be described. In particular, in this embodiment, parts different from the 1st embodiment will be described.

Figure 48:
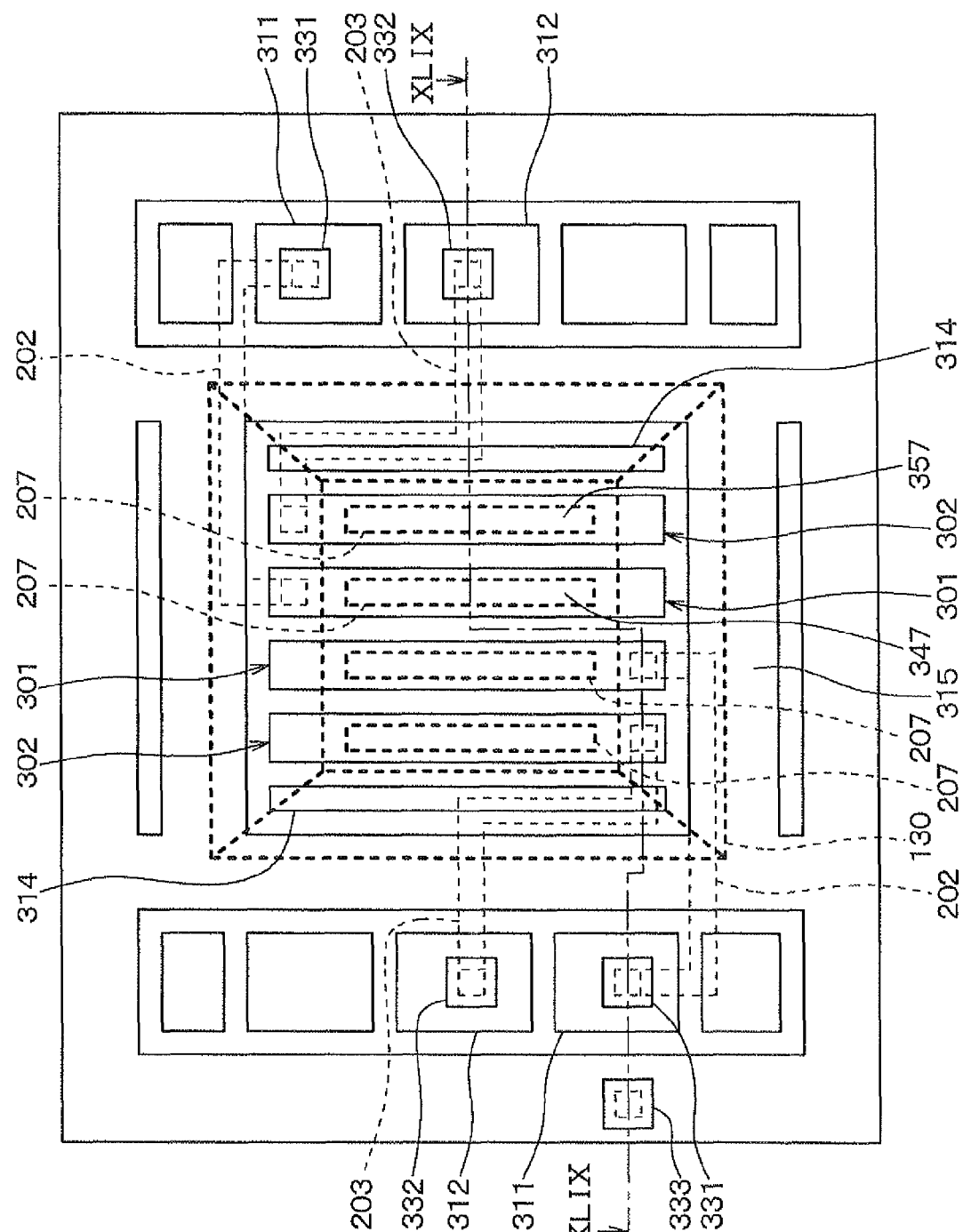
FIG. 48 is a plan view of a physical quantity detection device according to a 10th embodiment.
Figure 49:
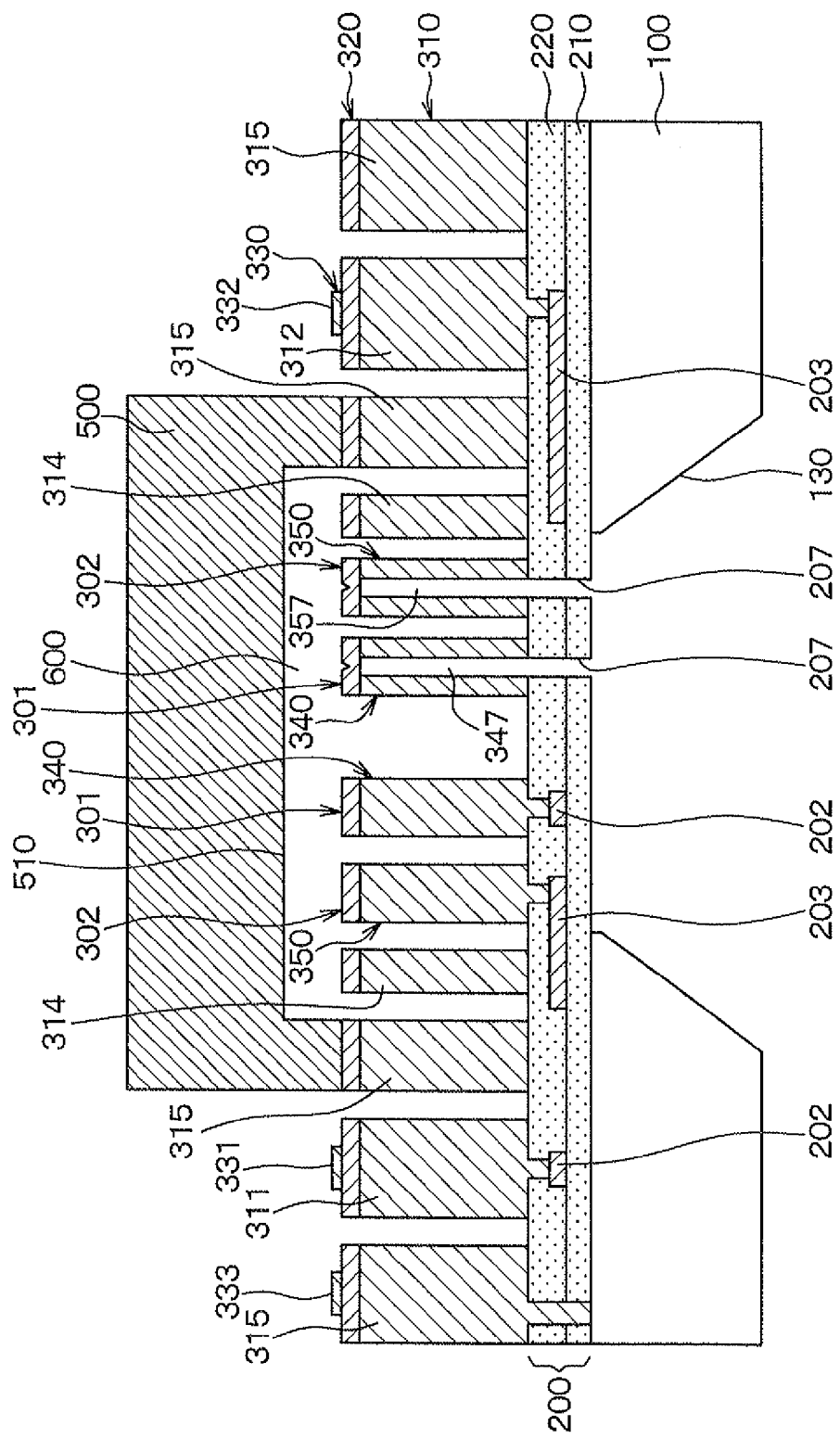
FIG. 49 is a section view taken on a line XLIX-XLIX in FIG. 48.

FIG. 48 is a plan view of a physical quantity detection device according to this embodiment. Further, FIG. 49 is a section view taken on a line G-G' in FIG. 48. In this embodiment, a plane structure on the electrode layer 300 side is the same as the 1st embodiment. Further, as shown in FIG. 49, a structure in which the peripheral part 315 is provided with the cap 500 is the same as the 9th embodiment. However, in this embodiment, the space portion 600 is hermetically sealed in such a way as to be set at a specified pressure, for example, vacuum. Although the cap 500 is not shown in this embodiment because the drawing is made complex, the cap 500 is the same as the cap shown in FIG. 45.

As shown in FIG. 49, a semiconductor substrate 100 has the downside pressure introduction hole 130 formed therein, the downside pressure introduction hole 130 reaching the insulating layer 200. This downside pressure introduction hole 130, as shown in FIG. 48, is formed in a part corresponding to a region of the semiconductor substrate 100 in which respective electrodes 301, 302 are formed.

Further, the insulating layer 200 has another downside pressure introduction hole 207 formed therein, the downside pressure introduction hole 207 connecting the respective electrodes 301, 302 to the downside pressure introduction hole 130 of the semiconductor substrate 100. In this way, the hollow portions 347, 357 of the respective electrodes 301, 302 are connected to the outside via the downside pressure introduction holes 130, 207, respectively. Hence, the respective electrodes 301, 302 detect pressure in response to a pressure difference between the space portion 600 and the hollow portions 347, 357 of the respective wall parts 340, 350. As described above, the space portion 600 is set at a vacuum, so that the physical quantity detection device according to this embodiment can be used as a pressure sensor of an absolute pressure type.

Next, a method for manufacturing the physical quantity detection device shown in FIG. 48 and FIG. 49 will be described with reference to FIGS. 50A, 50B and FIG. 51. Also in this embodiment, the physical quantity detection device is manufactured in the shape of a wafer. The respective processes of the method have been described in detail in the first embodiment, so that main points will be mainly described below.

Figure 50:
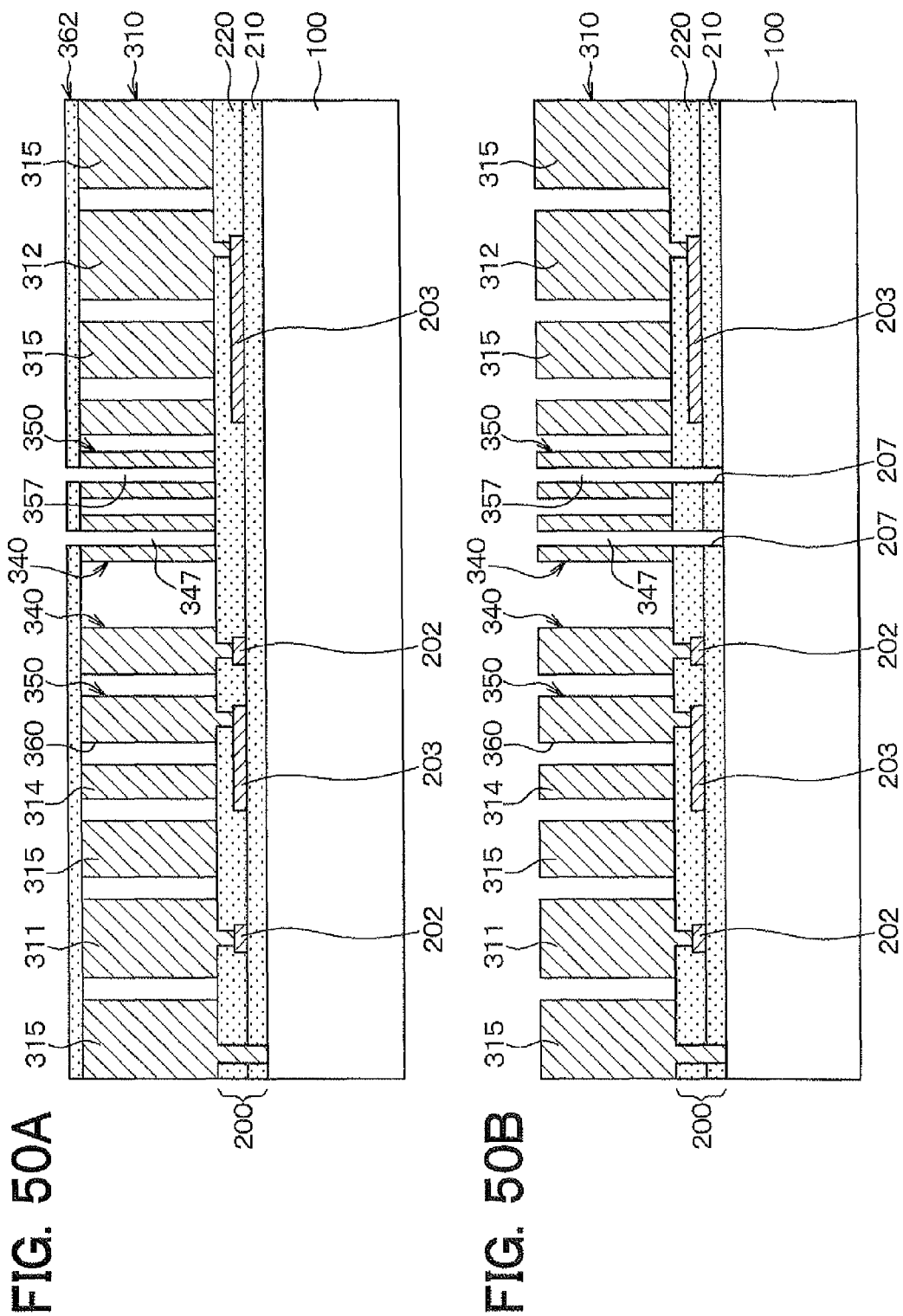
FIGS. 50A and 50B are views to show the steps of a process of manufacturing the physical quantity detection device according to the 10th embodiment.
Figure 51:
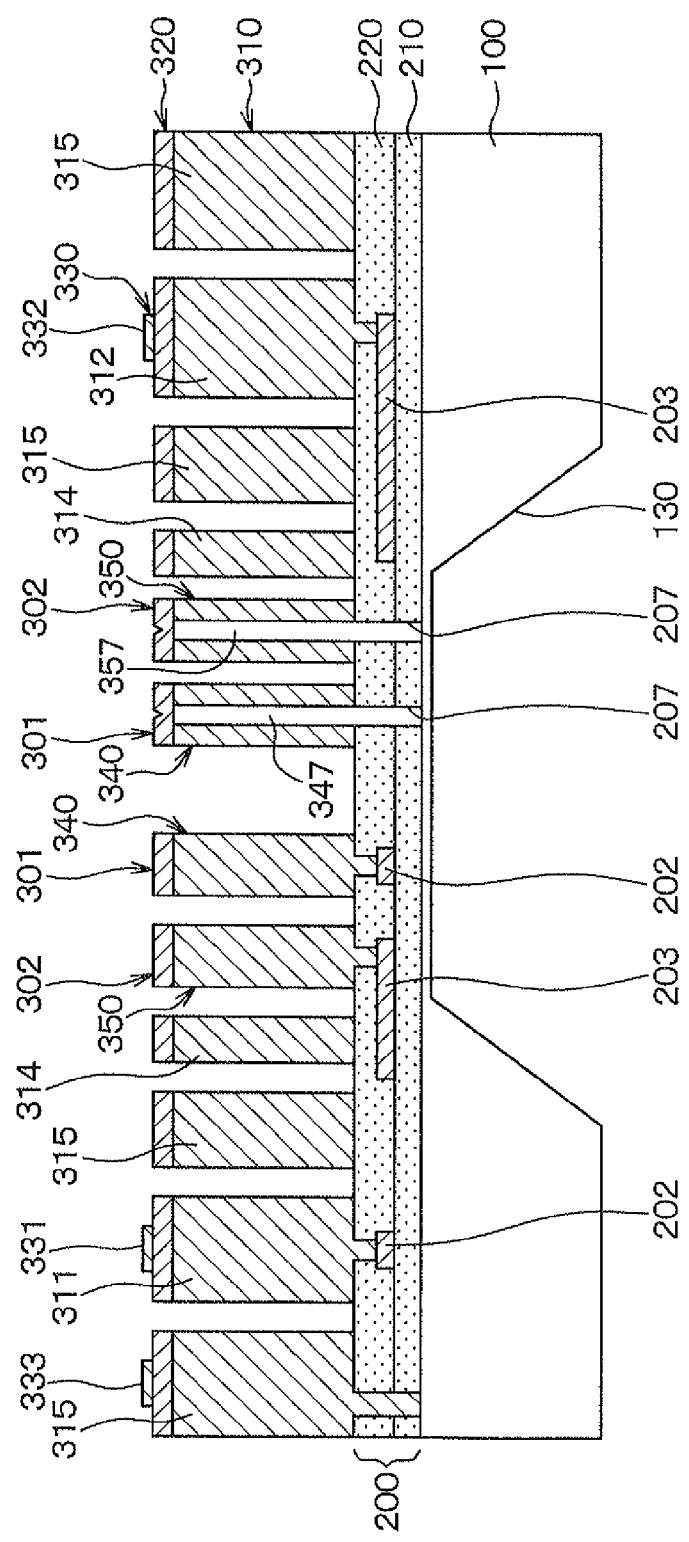
FIG. 51 is a view to show a step subsequent to the steps of the process shown in FIGS. 50A, 50B.

In the process shown in FIG. 50A, as described above, the insulating layer 200 is formed over the semiconductor substrate 100. In this case, the first insulating layer 210 and the second insulating layer 220 are formed of a plasma SiN film. This can set a stress applied to the insulating layer 200 at a value close to zero. Alternatively, a $Si_3N_4$ film having a tensile stress may be formed as the first insulating layer 210 and the second insulating layer 220 by the LPCVD method.

The first semiconductor layer 310 is formed over the insulating layer 200 and trenches 360 are formed in the first semiconductor layer 310 to form the respective wall parts 340, 350 and the like. Further, a mask 362 of a film resist or the like connecting to the hollow portion 347, 357 of the respective wall parts 340, 350 is formed over the first semiconductor layer 310.

Subsequently, of the insulating layer 200, parts not covered with the mask 362, that is, parts exposed to the hollow portions 347, 357 of the respective wall parts 340, 350 are removed. In this way, the downside pressure introduction holes 207 are formed in the insulating layer 200. Then, in the process shown in FIG. 50B, the mask 362 is removed. Thereafter, the second semiconductor layer 320 is formed over the first semiconductor layer 310 and is patterned to form the respective cover parts 321, 322 on the respective wall parts 340, 350.

In the process shown in FIG. 51, a two-stage etching is performed in the following manner: first, a hole having a specified depth is formed in a surface of the semiconductor substrate 100 by alkali etching or the like, the surface being on the opposite side of a surface having the insulating layer 200 formed thereon; and subsequently, a remaining part is removed by dry etching or the like. In this way, the downside pressure introduction hole 130 is formed which reaches the insulating layer 200 and that communicates with the downside pressure introduction hole 207 formed in the insulating layer 200.

Further, the cap 500 is joined directly to the peripheral part 315 in a vacuum at a normal temperature to hermetically seal the respective electrodes 301, 302 in the space portion 600. Thereafter, the wafer is divided into the individual physical quantity detection devices to thereby complete the structure shown in FIG. 48 and FIG. 49. The joining of the cap 500 to the peripheral part 315 may be performed before the downside pressure introduction hole 130 is formed.

As described above, the respective electrodes 301, 302 can be hermetically sealed in the vacuum space portion 600 by the cap 500, and a pressure medium can be introduced into the hollow portions 347, 357 of the respective electrodes 301, 302 via the downside pressure introduction holes 130, 207 from the semiconductor substrate 100 side. In this way, an absolute pressure can be detected by the physical quantity detection device.

As to the correspondence relationship between the description of this embodiment and the description of the scope of claims, the downside pressure introduction hole 207 of the insulating layer 200 corresponds to "a through hole" of the scope of claims.

11th Embodiment

Figure 52:
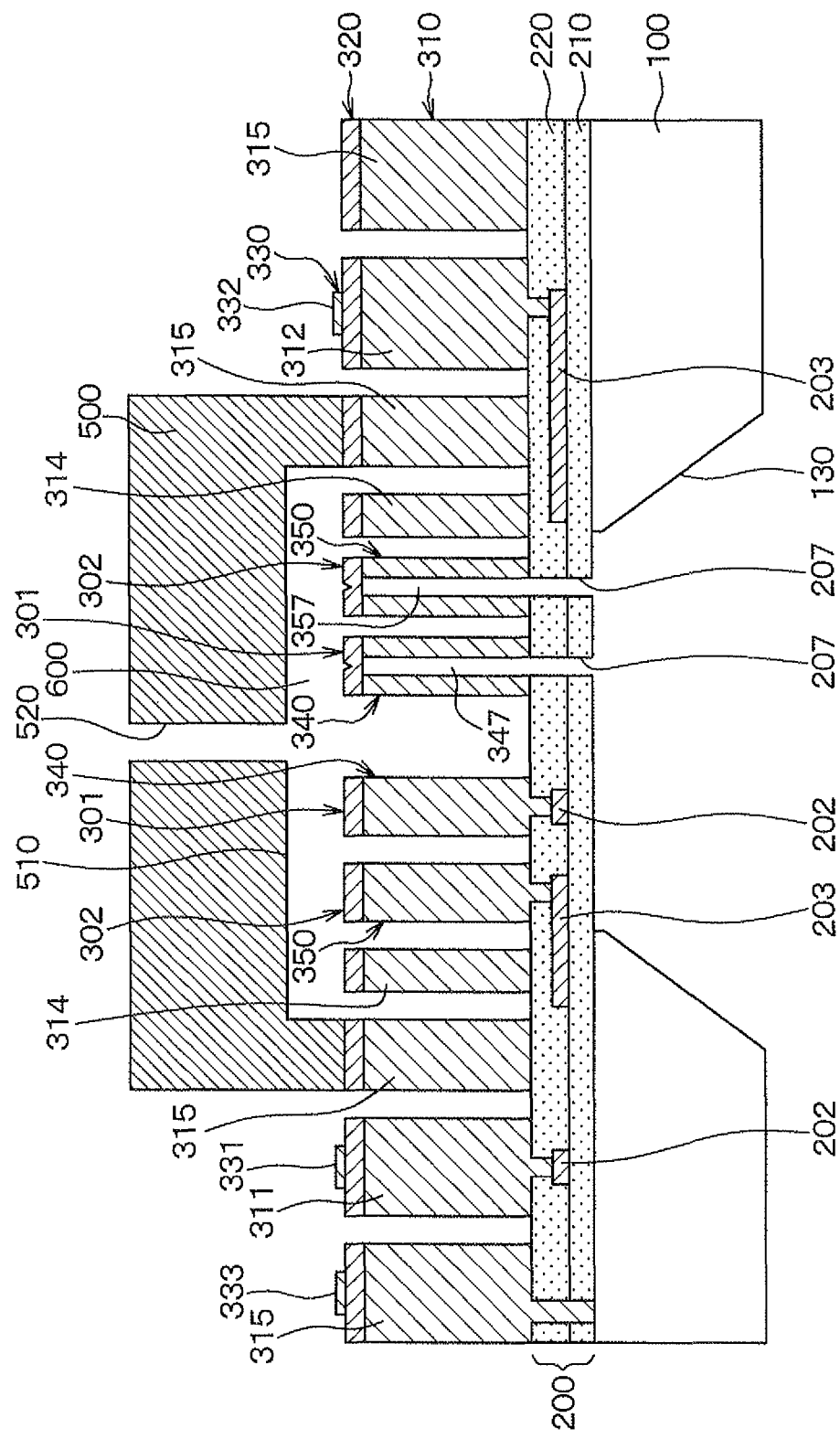
FIG. 52 is a section view of a physical quantity detection device according to an 11th embodiment.

In this embodiment, parts different from the 10th embodiment will be described, FIG. 52 is a section view of a physical quantity detection device according to this embodiment. As shown in this drawing, in comparison with the structure shown in the 10th embodiment, a pressure introduction hole 520 connecting the space portion 600 to the outside is formed in the cap 500.

According to this structure, an outside pressure is introduced into the space portion 600 via the pressure introduction hole 520 of the cap 500, whereas the outside pressure is introduced into the hollow portions 347, 357 of the respective electrodes 301, 302 via the downside pressure introduction holes 130, 207 of the semiconductor substrate 100 and the insulating layer 200. Hence, the respective electrodes 301, 302 can detect pressure according to a pressure difference between the space portion 600 and the hollow portions 347, 357 of the respective electrodes 301, 302. In this way, the physical quantity detection device according to this embodiment can be used as a pressure sensor of a relative pressure type.

As to the correspondence relationship between the description of this embodiment and the description of the scope of claims, the pressure introduction hole 520 of the cap 500 corresponds to "a through hole" of the scope of claims.

12th Embodiment

Figure 53:
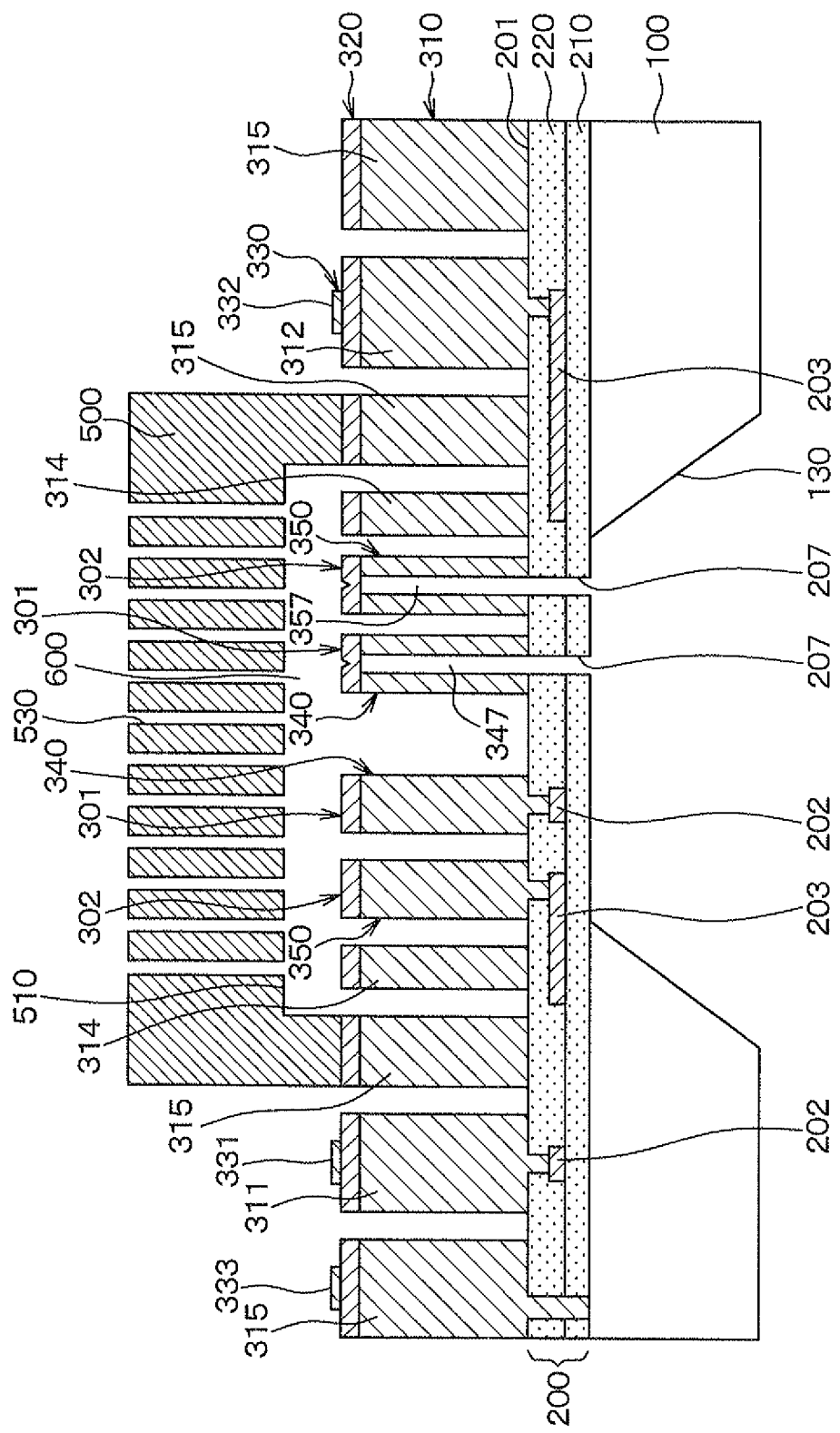
FIG. 53 is a section view of a physical quantity detection device according to a 12th embodiment.

In this embodiment, parts different from the 11th embodiment will be described. FIG. 53 is a section view of a physical quantity detection device according to this embodiment and is a view corresponding to a section view taken on a line G-G' in FIG. 48.

As shown in FIG. 53, the cap 500 has a plurality of acoustic holes 530 formed therein. These acoustic holes 530 are holes which make the space portion 600 communicate with the outside as in the case of the pressure introduction hole 520 of the cap 500 shown in the 11th embodiment.

According to this structure, the physical quantity detection device can be used as a microphone. Specifically, acoustic vibrations of voices or the like are transmitted to the space portion 600 from the cap 500 side via the acoustic holes 530 and are detected by the respective electrodes 301, 302.

As described above, the respective diaphragms 341, 342, 351, 352 constructing the respective electrodes 301, 302 are erected vertically to one surface 201 of the insulating layer 200 and hence can used as a miniature microphone.

As to the correspondence relationship between the description of this embodiment and the description of the scope of claims, the acoustic hole 530 of the cap 500 corresponds to "a through hole" of the scope of claims.

13th Embodiment

Figure 54:
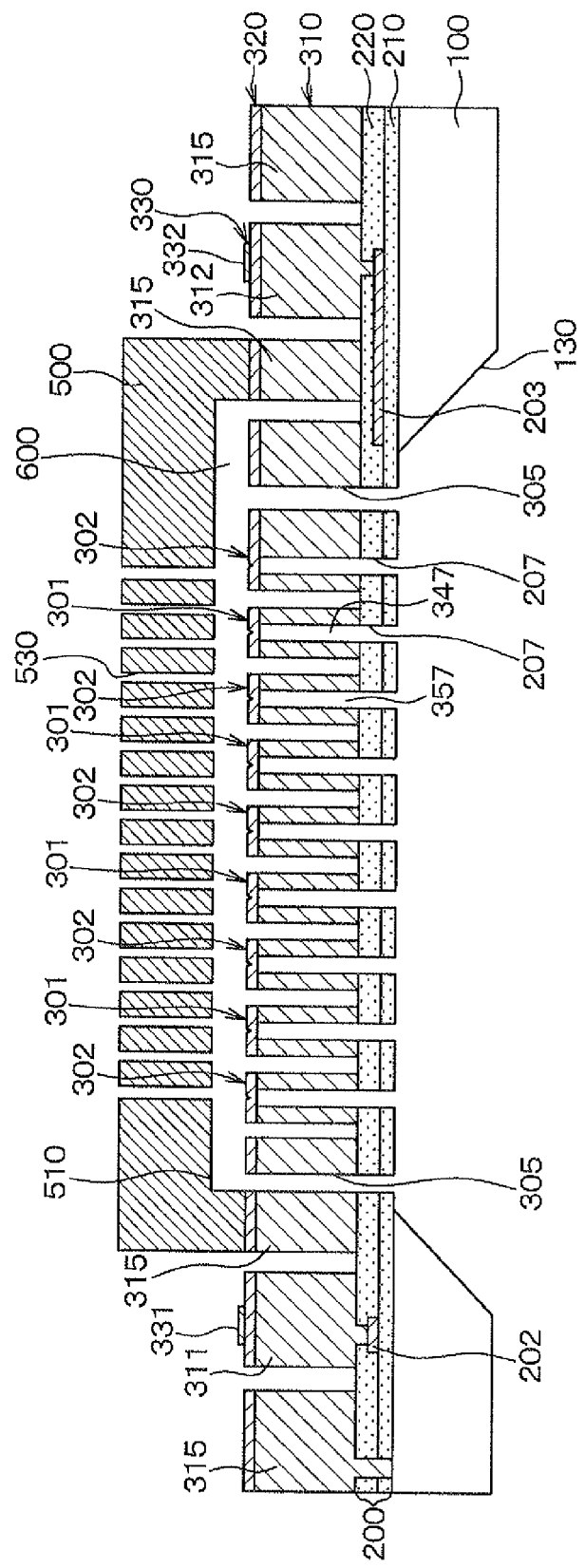
FIG. 54 is a section view of a physical quantity detection device according to a 13th embodiment.

In this embodiment, parts different from the 12th embodiment will be described. FIG. 54 is a section view of a physical quantity detection device according to this embodiment. As shown in this drawing, a plurality of first electrodes 301 and a plurality of second electrodes 302 are alternately formed. This provides a construction of detecting pressure by adjacent electrodes.

Further, the insulating layer 200 has downside pressure introduction holes 207 formed therein, the downside pressure introduction holes 207 making the hollow portions 347, 357 of the respective electrodes 301, 302 communicate with the downside pressure introduction hole 130.

In this embodiment, there are formed vent holes 305 which pass through the peripheral part 315 and the insulating layer 200 under the peripheral part 315 and which make the downside pressure hole 130 of the semiconductor substrate 100 communicate with the space portion 600. The vent holes 305 are arranged around the respective electrodes 301, 302 and are formed in the shape of a dot or a line.

Further, of the cap 500, parts opposite to the vent holes 305 do not have an acoustic hole 530 formed therein. For this reason, when acoustic vibrations are transmitted to the vent holes 305 from the semiconductor substrate 100 side, the concavity portion 510 of the cap 500 acts as a wall for the acoustic vibrations and hence can enhance an acoustic resistance. This can improve low-frequency characteristics.

14th Embodiment

Figure 55:
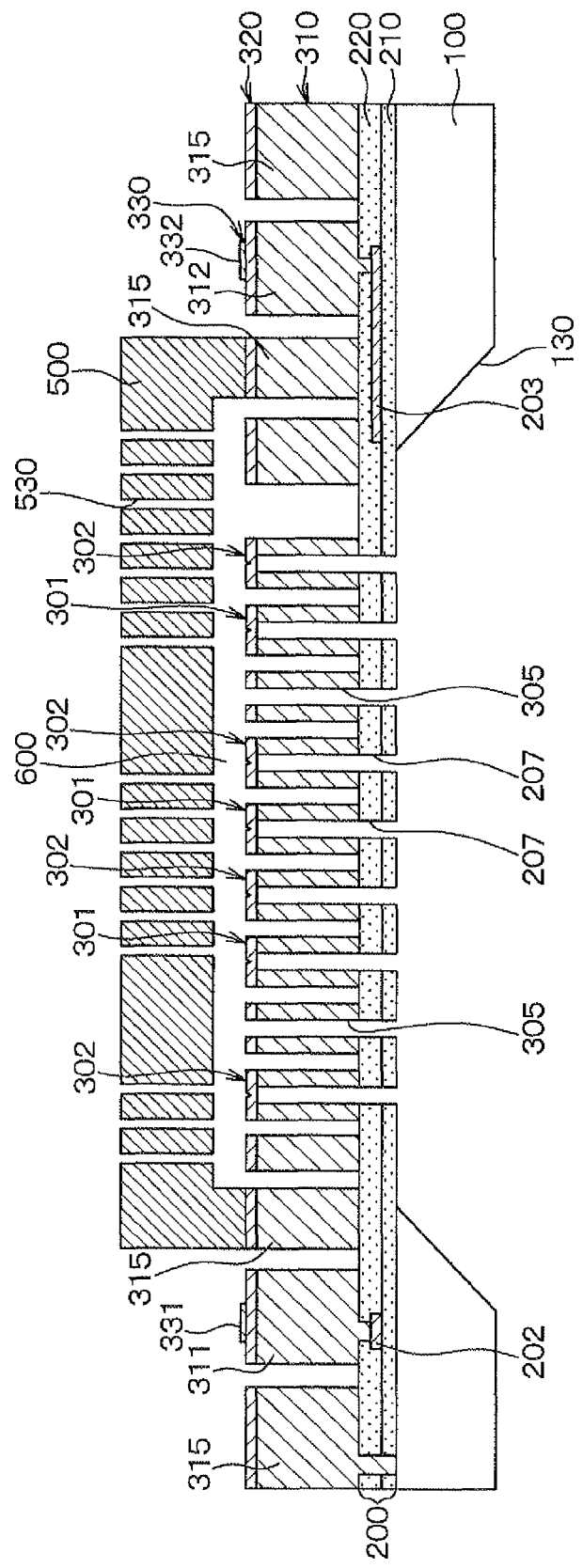
FIG. 55 is a section view of a physical quantity detection device according to a 14th embodiment.

In this embodiment, parts different from the 13th embodiment will be described. FIG. 55 is a section view of a physical quantity detection device according to this embodiment. As shown in this drawing, the respective cover parts 321, 322 of a part of the plurality of respective electrodes 301, 302 arranged alternately are opened. Hence, the hollow portions 347, 357 of the respective wall parts 340, 350 having the cover parts 321, 322 opened communicate with not only the downside pressure introduction hole 130 of the semiconductor substrate 100 but also the space portion 600. In other words, the respective electrodes 301, 302 having the cover parts 321, 322 opened function as the vent holes 305.

Of the cap 500, parts corresponding to the cover parts 321, 322 do not have the acoustic hole 530 formed therein. For this reason, acoustic vibrations transmitted from the semiconductor substrate 100 side through the hollow portions 347, 357 of the vent holes 305 strike the concavity portion 510 of the cap 500, which can hence increase the acoustic resistance and can hence improve the low-frequency characteristics.

Further, as described above, the respective diaphragms 341, 342, 351, 352 of the respective electrodes 301, 302 are formed vertically to the one surface 201 of the insulating layer 200. Hence, the respective diaphragms 341, 342, 351, 352 can have larger areas than a diaphragm formed in the plane direction of the one surface 201 of the insulating layer 200, which can hence decrease the size of the physical quantity detection device. Further, diaphragms which are different in thickness from the respective diaphragms 341, 342, 351, 352 of the respective electrodes 301, 302 or diaphragms which are different in the size of a vibration film (that is, area of deformation) from the respective diaphragms 341, 342, 351, 352 of the respective electrodes 301, 302 can be formed in the electrode layer 300, so that an optimum acoustic frequency can be designed. Further, when a plurality of diaphragms 341, 342, 351, 352 having the same characteristics are formed in the electrode layer 300, stereo recording, improvement in directionality, and noise cancellation can be performed by one device.

15th Embodiment

In this embodiment, parts different from the 1st to 14th embodiments will be described. In particular, in this embodiment, parts different from the 1st embodiment will be described.

Figure 56:
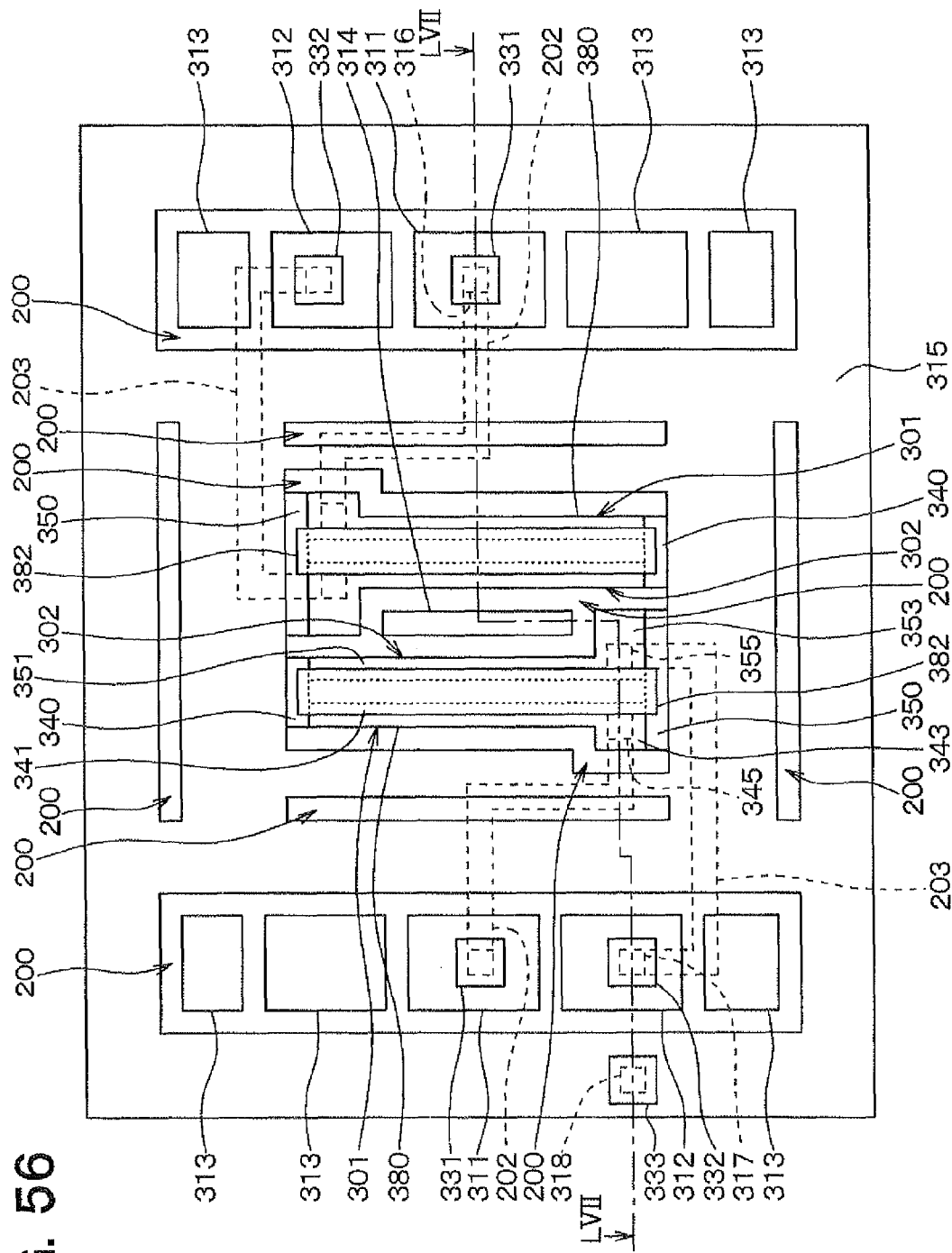
FIG. 56 is a plan view of a physical quantity detection device according to a 15th embodiment.
Figure 57:
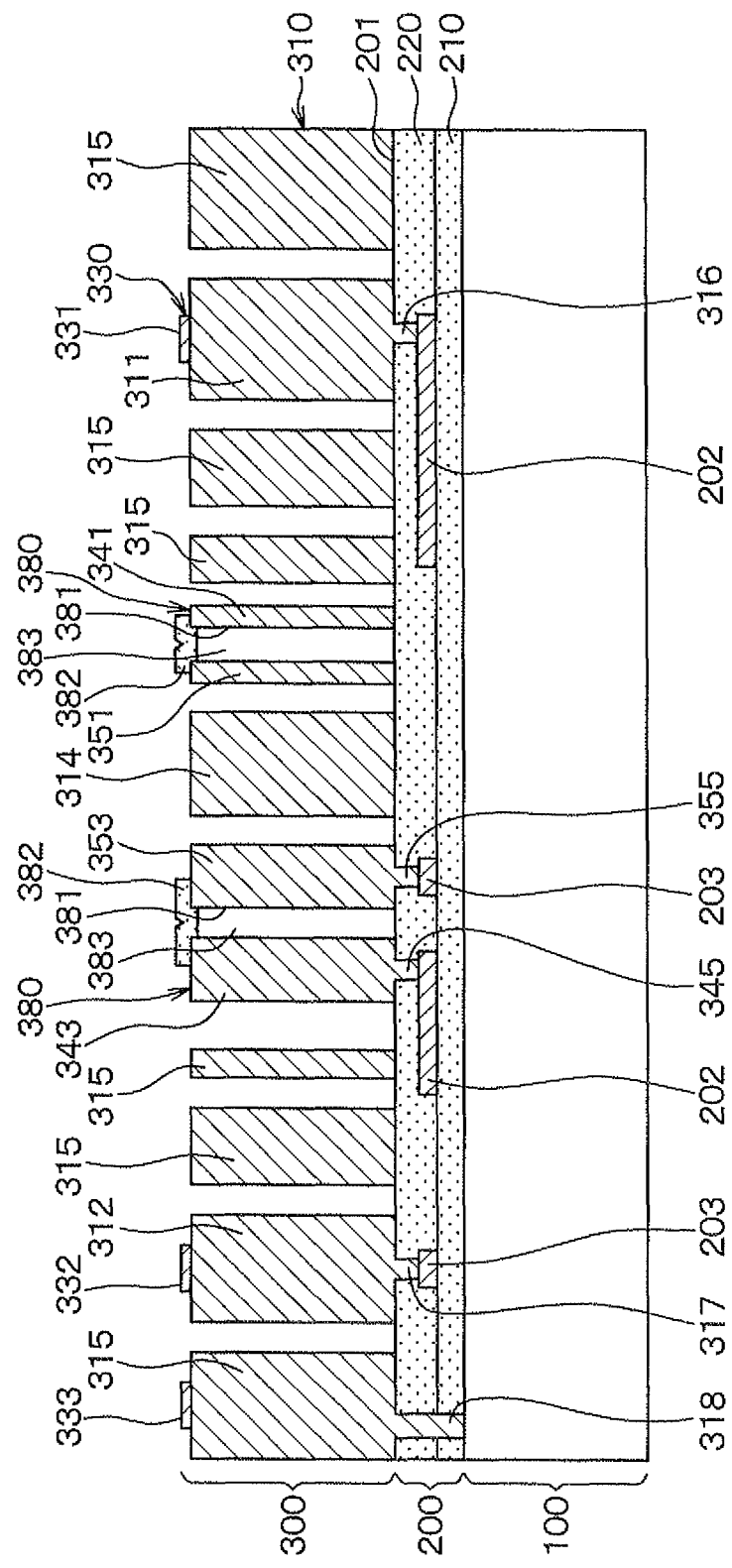
FIG. 57 is a section view taken on a line LVII-LVII in FIG. 56.
Figure 58A:
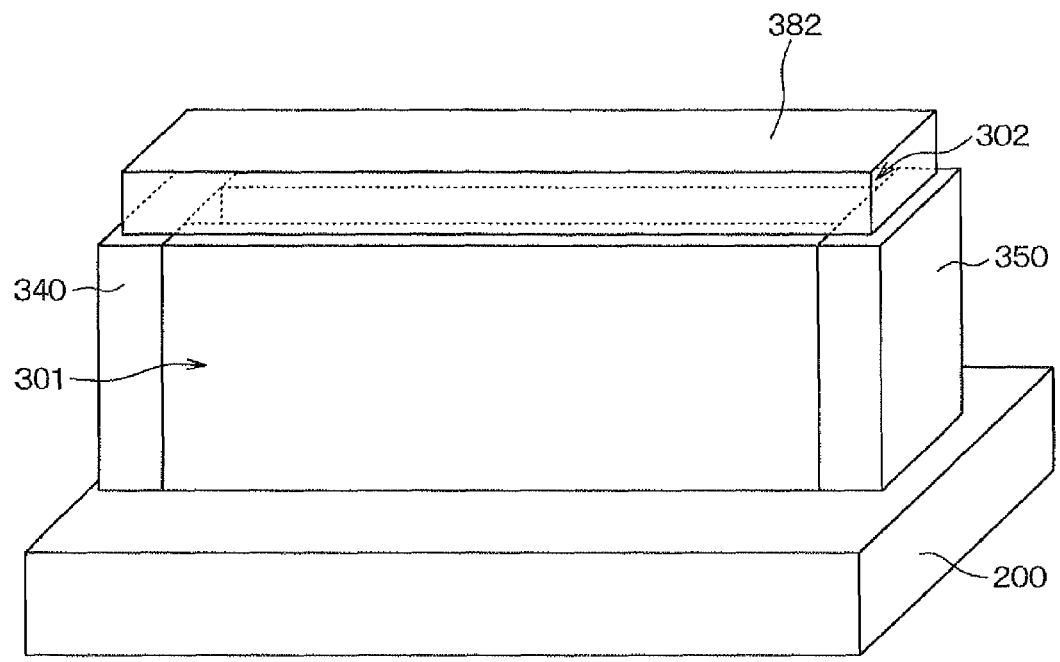
FIGS. 58A and 58B are schematic views of a first electrode and a second electrode according to the 15th embodiment.

FIG. 56 is a plan view of a physical quantity detection device according to this embodiment. FIG. 57 is a section view taken on a line H-H' in FIG. 56. FIG. 58A is a perspective view of the respective electrodes 301, 302, and FIG. 58B is a top view of the respective electrodes 301, 302.

As shown in FIG. 57, the electrode layer 300 formed over the insulating layer 200 is constructed of the first semiconductor layer 310 and the metal layer 330.

Further, as shown in FIG. 56, in this embodiment, the first electrode 301 is constructed of the diaphragm 341 and the coupling part 343, and the second electrode 302 is constructed of the diaphragm 351 and the coupling part 353. The respective diaphragms 341, 351, as shown in FIG. 57, are erected vertically to the one surface 201 of the insulating layer 200.

Figure 58B:
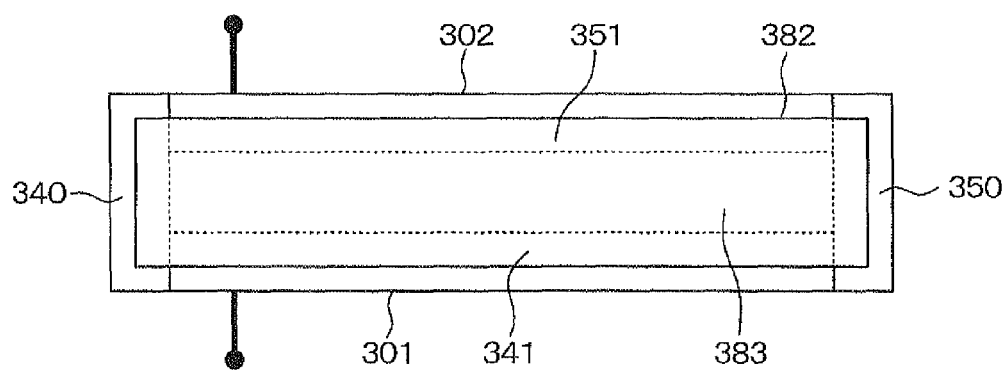

As shown in FIG. 58B, the diaphragm 341 of the first electrode 301 and the diaphragm 351 of the second electrode 302 are arranged opposite to each other, and an end portion of the diaphragm 341 of the first electrode 301 and an end portion of the diaphragm 351 of the second electrode 302 are coupled to each other by a first insulating wall part 305 and a second insulating wall part 306. In other words, the respective diaphragms 341, 351 are arranged in parallel between the respective insulating wall parts 340, 350 as the wall parts 340, 350 and are connected to the respective insulating wall parts 340, 350 as the wall parts 340, 350. In this way, a third wall part 380 formed in the shape of a hollow cylinder is constructed of the diaphragm 341 of the first electrode 301, the diaphragm 351 of the second electrode 302, the first insulating wall part 305, and the second insulating wall part 306.

The end portion of the diaphragm 341 of the first electrode 301 and the end portion of the diaphragm 351 of the second electrode 302 are side portions which are vertical to the one surface 201 of the insulating layer 200 in the respective diaphragms 341, 351 and which are parallel to a direction in which the respective diaphragms 341, 351 are arranged.

As shown in FIG. 57, there is provided a third cover part 382 for closing an opening portion 381 of the third wall part 380, the opening portion 381 being on the opposite side of the insulating layer 200 side. A hollow portion 383 of the third wall part 380 is sealed, for example, in vacuum.

In this way, as show in FIG. 58A, each of the first electrode 301 and the second electrode 302 is brought into a state in which each of them is enclosed by the insulating layer 200, each of the insulating wall parts 340, 350 as the respective wall parts 340, 350, and the third cover part 382. For this reason, the respective electrode 301, 302 are not only mechanically separated from each other but also electrically separated from each other. Hence, the respective electrode 301, 302 do not need to have an impurity region formed therein, the impurity region making the respective electrode 301, 302 function as electrodes.

The insulating layer 200, as described above, has the wiring pattern 202 and the wiring pattern 203 formed therein, the wiring pattern 202 being patterned in such a way as to connect the coupling part 343 of the first electrode 301 to one connection part 311, the wiring pattern 203 being patterned in such a way as to connect the coupling part 353 of the second electrode 302 to the other connection part 312. As shown in FIG. 56 and FIG. 57, the respective coupling parts 343, 353 are electrically connected to the wiring patterns 202, 203 via the contact parts 345, 355. Further, the respective connection parts 311, 312 are electrically connected to the wiring patterns 202, 203 via the contact parts 316, 317. When the pads 331, 332 of the respective connection parts 311, 312 have wires or the like connected thereto, the respective electrodes 301, 302 can be electrically connected to an external circuit via the wiring patterns 202, 203 and the connection parts 311, 312.

In this embodiment, as shown in FIG. 56, two sets of electrodes 301, 302 described above are formed and arranged symmetrically with respect to a point. A dummy wall part 314 is arranged between the sets. Further, the peripheral part 315 is formed in the shape of a ring in such a way as to surround the periphery of the third wall part 380 and, as shown in FIG. 57, is electrically connected to the semiconductor substrate 100 via the contact part 318. The peripheral part 315 is connected to the outside via the pad 333. As described above, also the dummy connection parts 313 are provided next to the connection parts 311, 312.

Here, the respective insulating wall parts 340, 350 as the respective wall parts 340, 350 couple the respective electrodes 301, 302 and are in contact with also the peripheral part 315. In other words, the peripheral part 315 is brought into a state in which the peripheral part 315 holds the respective insulating wall parts 340, 350 as the respective wall parts 340, 350. In this way, the strength of the respective insulating wall parts 340, 350 as the respective wall parts 340, 350 can be held.

Figure 59:
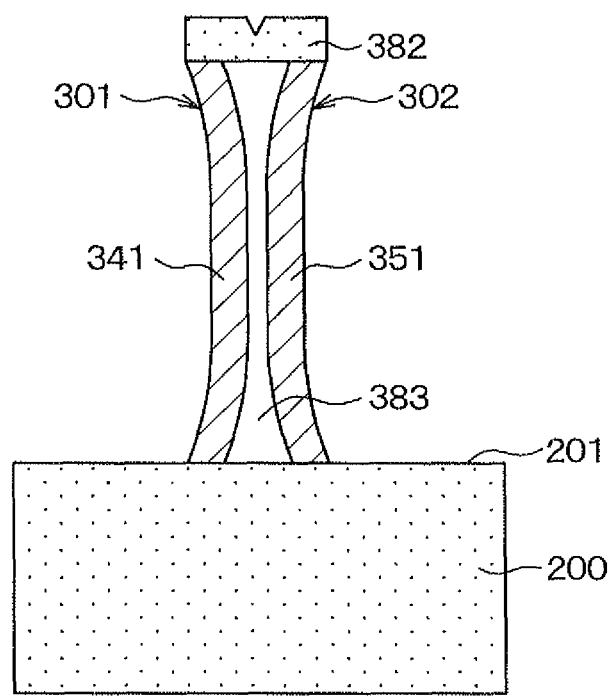
FIG. 59 is a section view of respective diaphragms when pressure is applied to the first electrode and the second electrode in the 15th embodiment.

According to this construction, when pressure is applied to the respective electrodes 301, 302, the respective diaphragms 341, 351 arranged opposite to each other are deformed respectively in response to a pressure difference between the hollow portion 383 of the third wall part 380 and the outside of the third wall part 380. This deformation is shown in FIG. 59. As shown in this drawing, the respective diaphragms 341, 351 are deformed along the plane direction of the one surface 201 of the insulating layer 200. Hence, the pressure can be detected on the base of a capacitance between the first electrode 301 and the second electrode 302, the capacitance being varied by the deformation of these diaphragms 341, 351.

Next, a method for manufacturing the physical quantity detection device shown in FIG. 56 to FIG. 58 will be described with reference to FIG. 60 to FIG. 65. Also in this embodiment, the physical quantity detection device is manufactured in the shape of a wafer.

Figure 60:
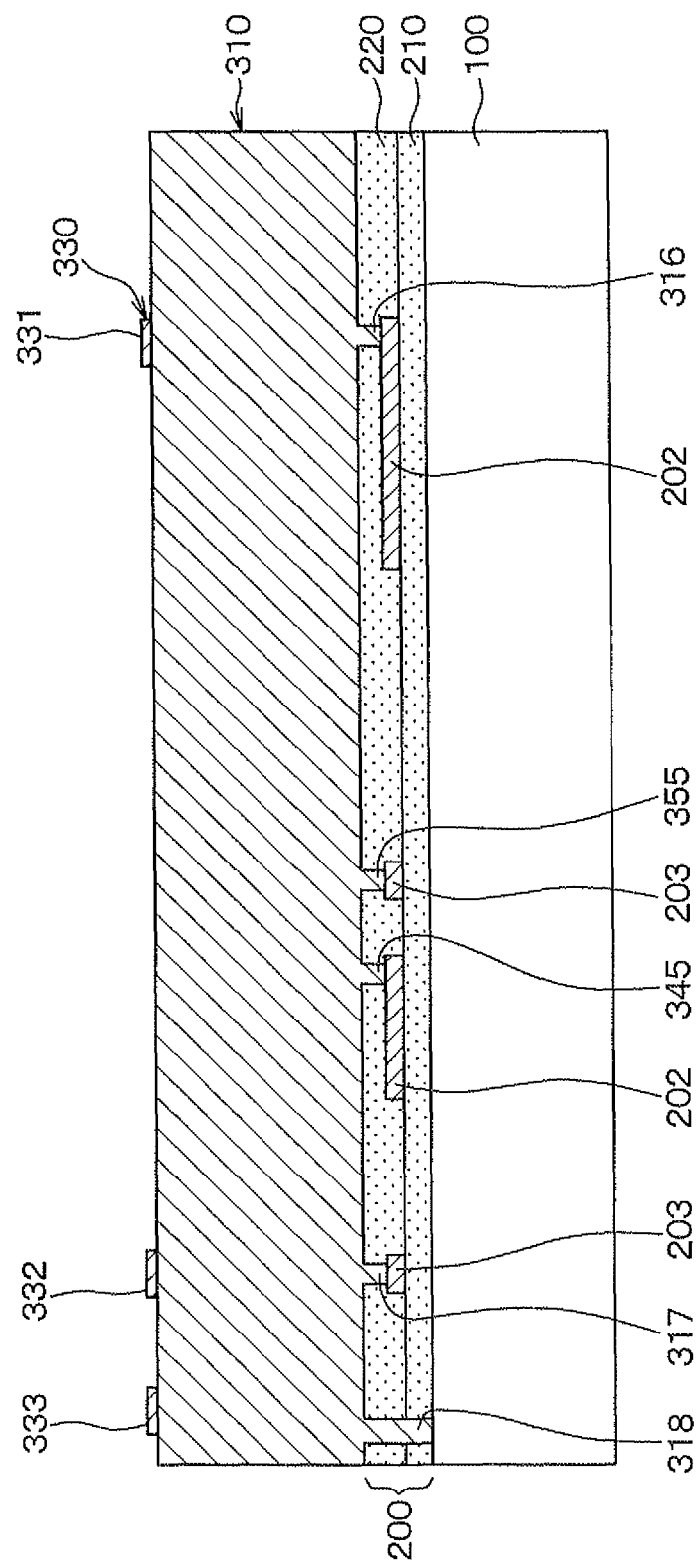
FIG. 60 is a view to show a step of a process of manufacturing the physical quantity detection device according to the 15th embodiment.

First, in the process shown in FIG. 60, as in the case of the process shown in FIG. 4 and FIG. 5, the first semiconductor layer 310 is formed over the insulating layer 200, and the metal layer 330 is formed over the first semiconductor layer 310 and is patterned in the pads 331 to 333.

Figure 61:
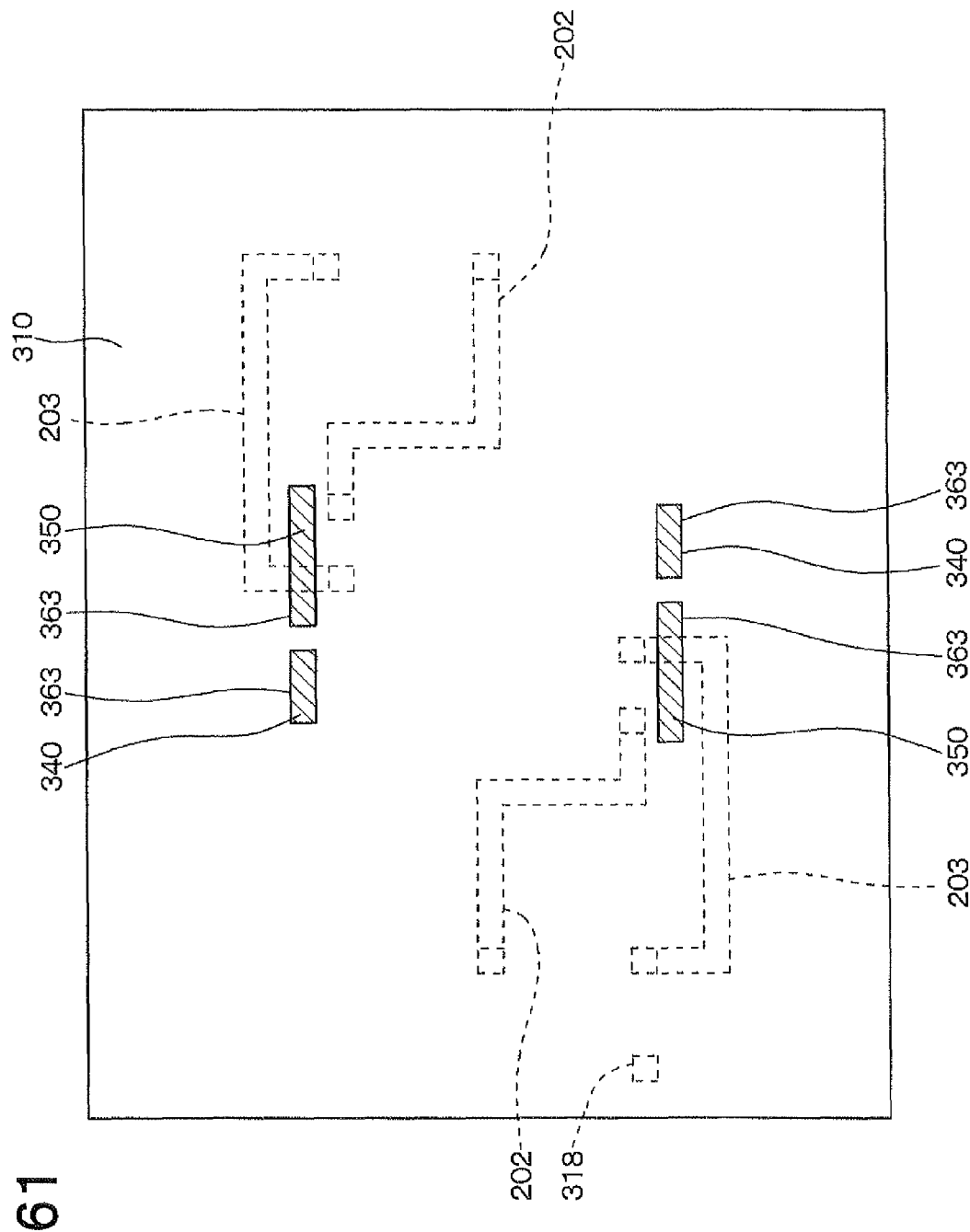
FIG. 61 is a view to show a step subsequent to the step of the process shown in FIG. 60.

Thereafter, in the process shown in FIG. 61, first trenches 363 reaching the insulating layer 200 are formed at the positions of the first semiconductor layer 310, the positions being the positions in which the respective insulating wall parts 340, 350 as the respective wall parts 340, 350 are to be formed. Then, for example, an insulating material such as a $SiO_2$ film or a SiN film is embedded in these first trenches 363 by the CVD method or the like. Then, the insulating material on the first semiconductor layer 310 is removed, whereby the insulating material is left only in the first trenches 363. In this way, the first insulating wall part 340 and the second insulating wall part 350 are formed.

In FIG. 61, portions of the respective insulating wall parts 340, 350 as the respective wall parts 340, 350 are marked with diagonal lines and the respective pads 331 to 333 are omitted. This is ditto for FIG. 61

Figure 62:
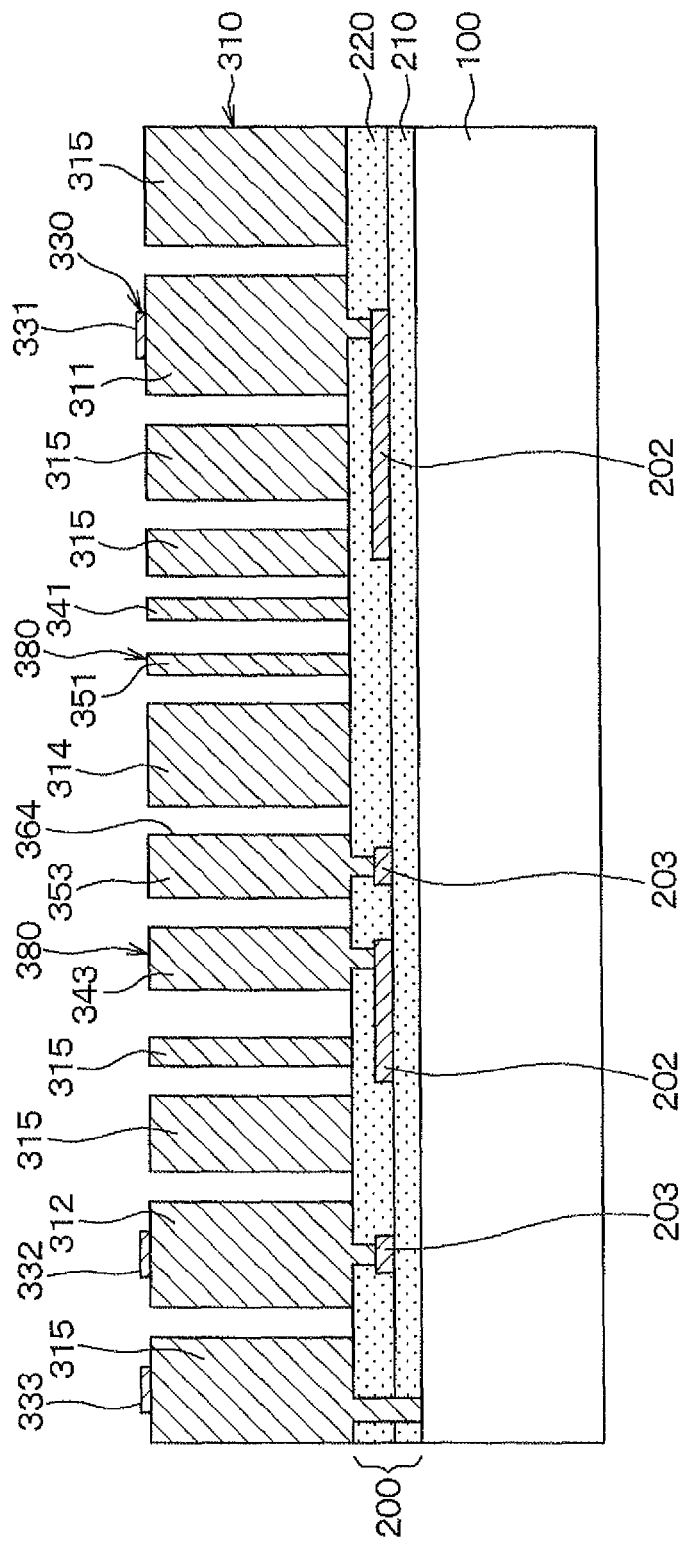
FIG. 62 is a view to show a step subsequent to the step of the process shown in FIG. 61.
Figure 63:
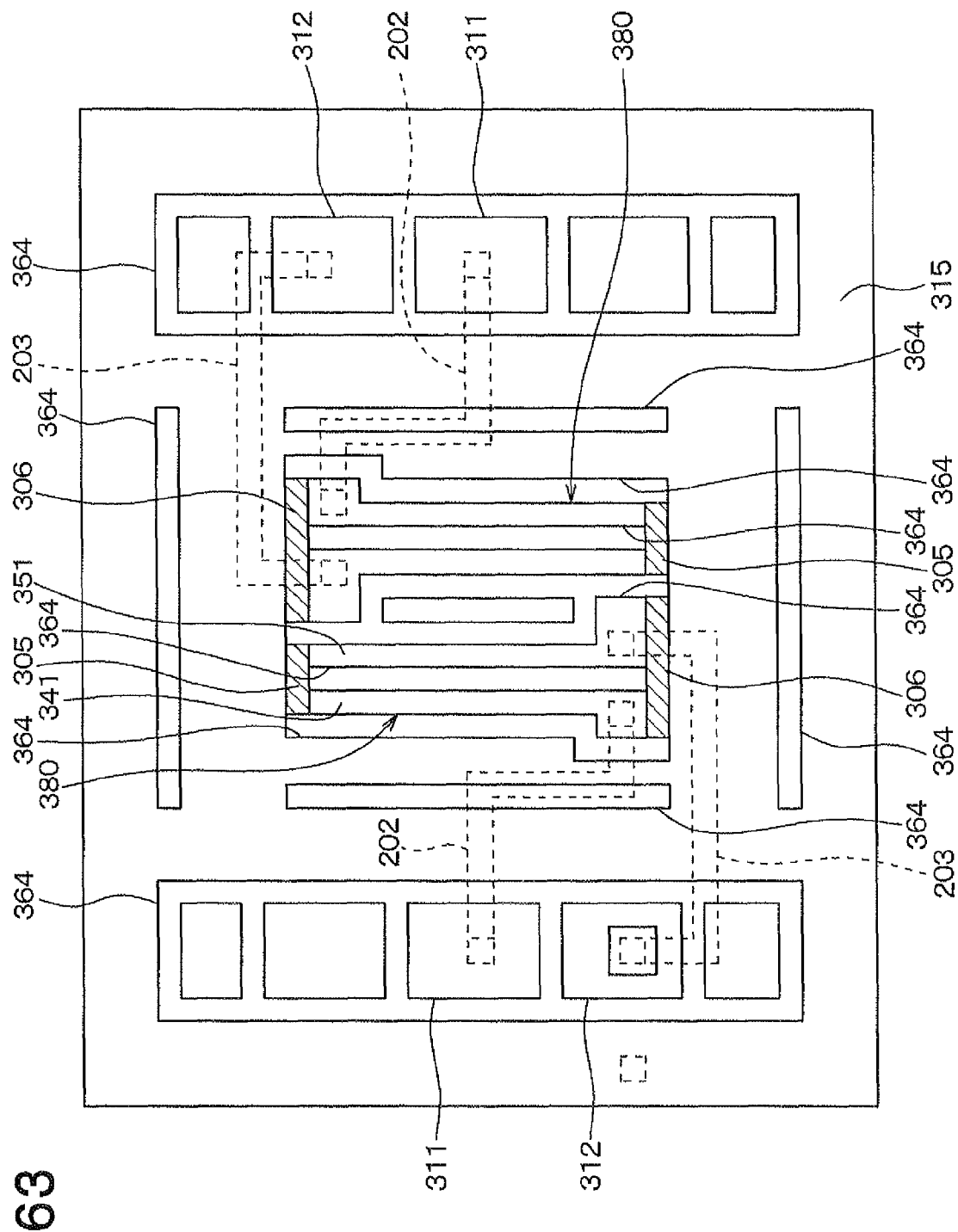
FIG. 63 is a plan view to show the step of the process shown in FIG. 62.

Subsequently, in the process shown in FIG. 62, second trenches 364 are formed in first semiconductor layer 310. In this way, as shown in FIG. 63, the first semiconductor layer 310 is partitioned into the respective diaphragms 341,351, and the connection parts 331, 312. That is, portions of the first semiconductor layer 310 are separated by the second trenches 364 and are arranged between the respective insulating wall parts 340, 350 as the respective wall parts 340, 350 and are connected to the respective insulating wall parts 340, 350 as the respective wall parts 340, 350, thereby being made the respective diaphragms 341, 351. The respective diaphragms 341, 351 are arranged opposite to each other and are formed vertically to the one surface 201 of the insulating layer 200. In this way, the third wall part 380 can be formed, in the shape of a hollow cylinder, of the respective diaphragms 341, 351 and the respective insulating wall parts 340, 350 as the respective wall parts 340, 350 of coupling the respective diaphragms 341, 351. The respective insulating wall parts 340, 350 as the respective wall parts 340, 350 are brought into a state in which they are in contact with the peripheral part 315 and are held by it.

Figure 64:
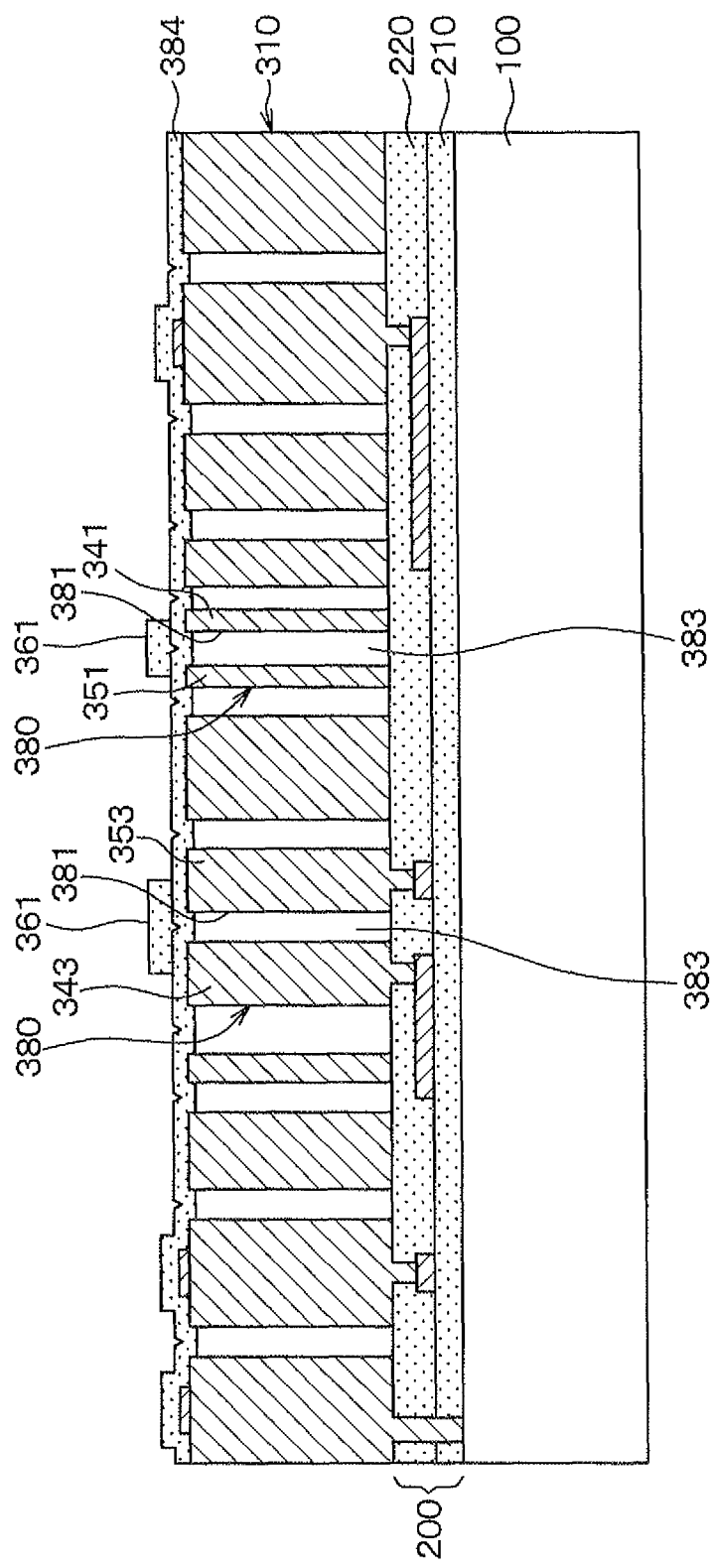
FIG. 64 is a view to show a step subsequent to the step of the process shown in FIG. 62.

In the process shown in FIG. 64, a SiN film is formed in vacuum as an insulating film 384 over the entire surface of the first semiconductor layer 310 by the plasma CVD method or the like to thereby close portions opened by the second trenches 364 of the first semiconductor layer 310. In this way, the hollow portion 383 of the third wall part 380 is sealed in vacuum. Thereafter, a resist 361 is formed over a portion of the insulating film 384 which covers the hollow portion 383 surrounded by the third wall part 380.

Figure 65:
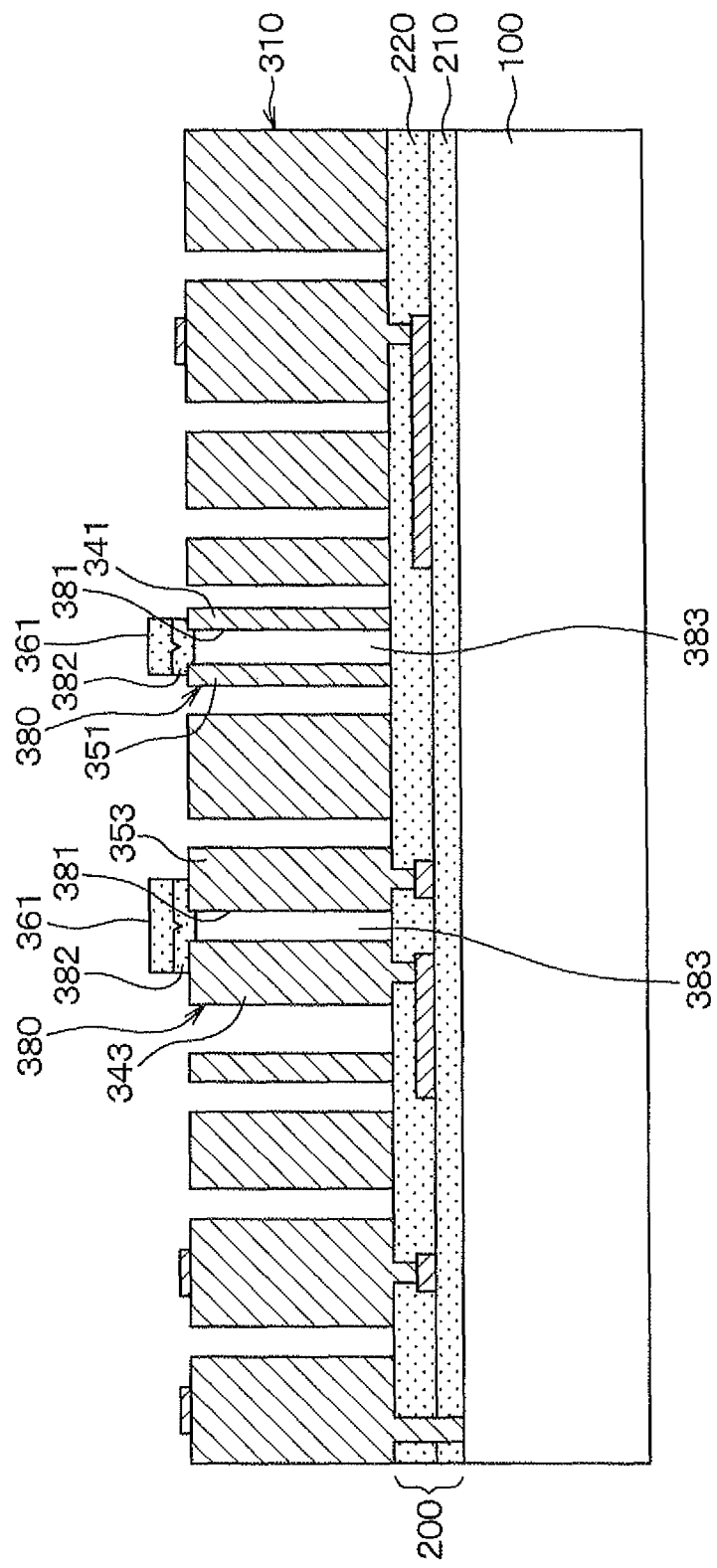
FIG. 65 is a view to show a step subsequent to the step of the process shown in FIG. 64.

In the process shown in FIG. 65, the insulating film 384 is etched off by using this resist 361 as a mask to thereby form a third cover part 382 to close the opening portion 381 of the third wall part 380, the opening portion 381 being is on the opposite side of the insulating layer 200 side.

Thereafter, the resist 361 is removed and the wafer is divided into the respective physical quantity detection devices. In this way, the physical quantity detection device shown in FIG. 56 to FIG. 58 is completed.

Figure 66:
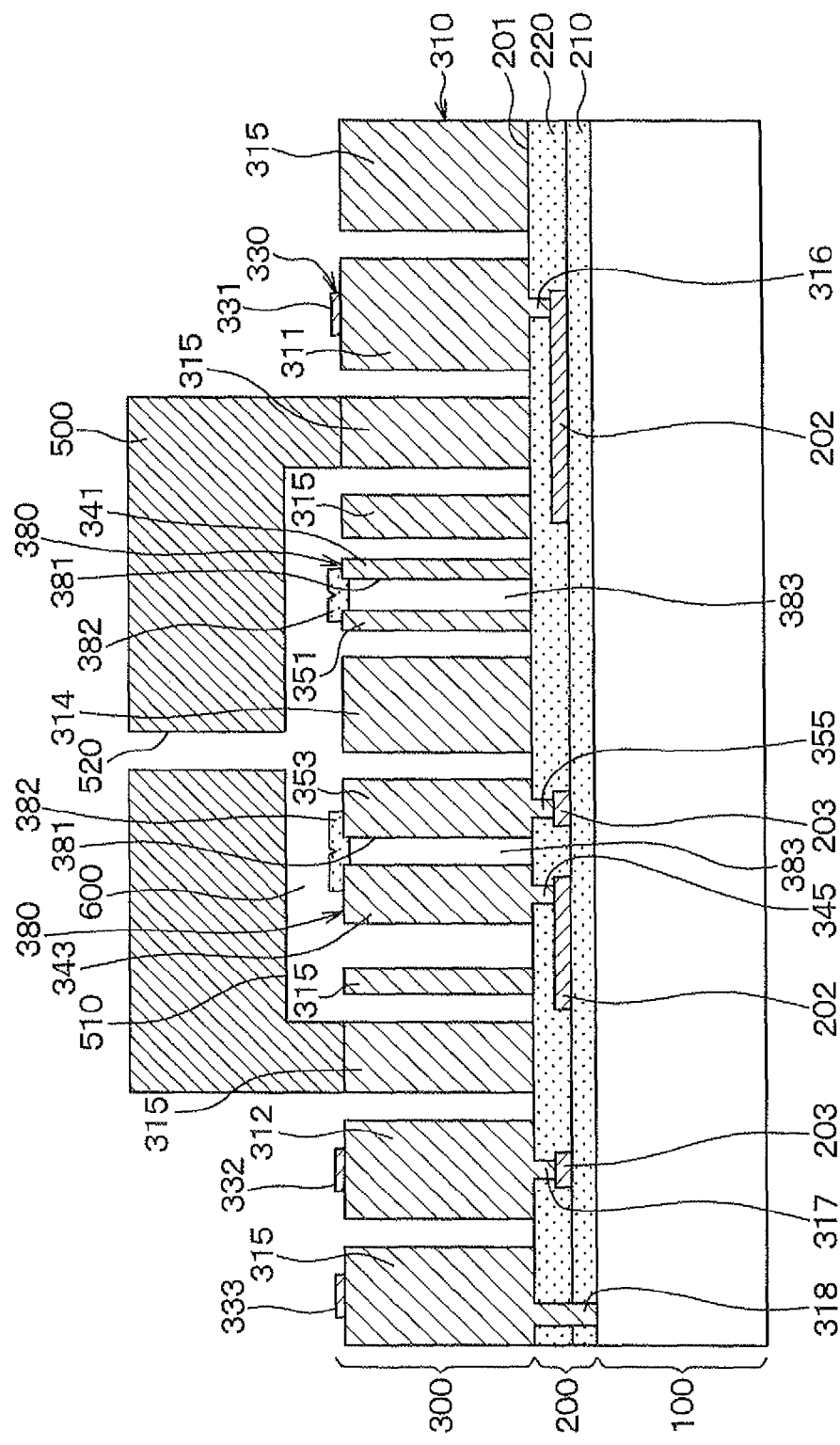
FIG. 66 is a section view in which a cap is provided after the step of the process shown in FIG. 65.

Also in the structure according to this embodiment, as shown in FIG. 66, when the cap 500 is joined directly to the peripheral part 315 at a normal temperature, the respective electrodes 301, 302 can be protected.

Further, as in the case of the 9th embodiment, when the downside pressure introduction holes 130, 319 for connecting the space portion 600 to the outside are formed in the insulating layer 200 and the peripheral part 315, an absolute pressure can be detected in response to a pressure difference between the space portion 600 and the hollow portion 383 of the third wall part 380.

On the other hand, when the space portion 600 is hermetically sealed in vacuum by the cap 500 and the downside pressure introduction holes 130, 207 for making the hollow portion 383 of the third wall part 380 communicate with the outside are formed in the semiconductor substrate 100 and the insulating layer 200, an absolute pressure can be detected in response to a pressure difference between the space portion 600 and the hollow portion 383 of the third wall part 380.

On the other hand, as shown in FIG. 66, the cap 500 has the pressure introduction hole 520 formed therein, the pressure introduction hole 520 making the space portion 600 communicate with the outside, and the semiconductor substrate 100 and the insulating layer 200 have the downside pressure introduction holes 130, 207 formed therein, the downside pressure introduction holes 130, 207 making the hollow portions 383 of the third wall part 380 communicate with the outside. A relative pressure may be detected in response to a pressure difference between the space portion 600 and the hollow portions 383 of the third wall part 380. In this case, when the cap 500 has the acoustic holes 530 formed therein, the physical quantity detection device can be also used as a microphone.

As to the correspondence relationship between the description of this embodiment and the description of the scope of claims, the first semiconductor layer 310 corresponds to "a semiconductor layer" of the scope of claims. Further, the third wall part 380 corresponds to "a wall part" of the scope of claims, and the third cover part 382 corresponds to "a cover part" of the scope of claims.

16th Embodiment

Figure 67:
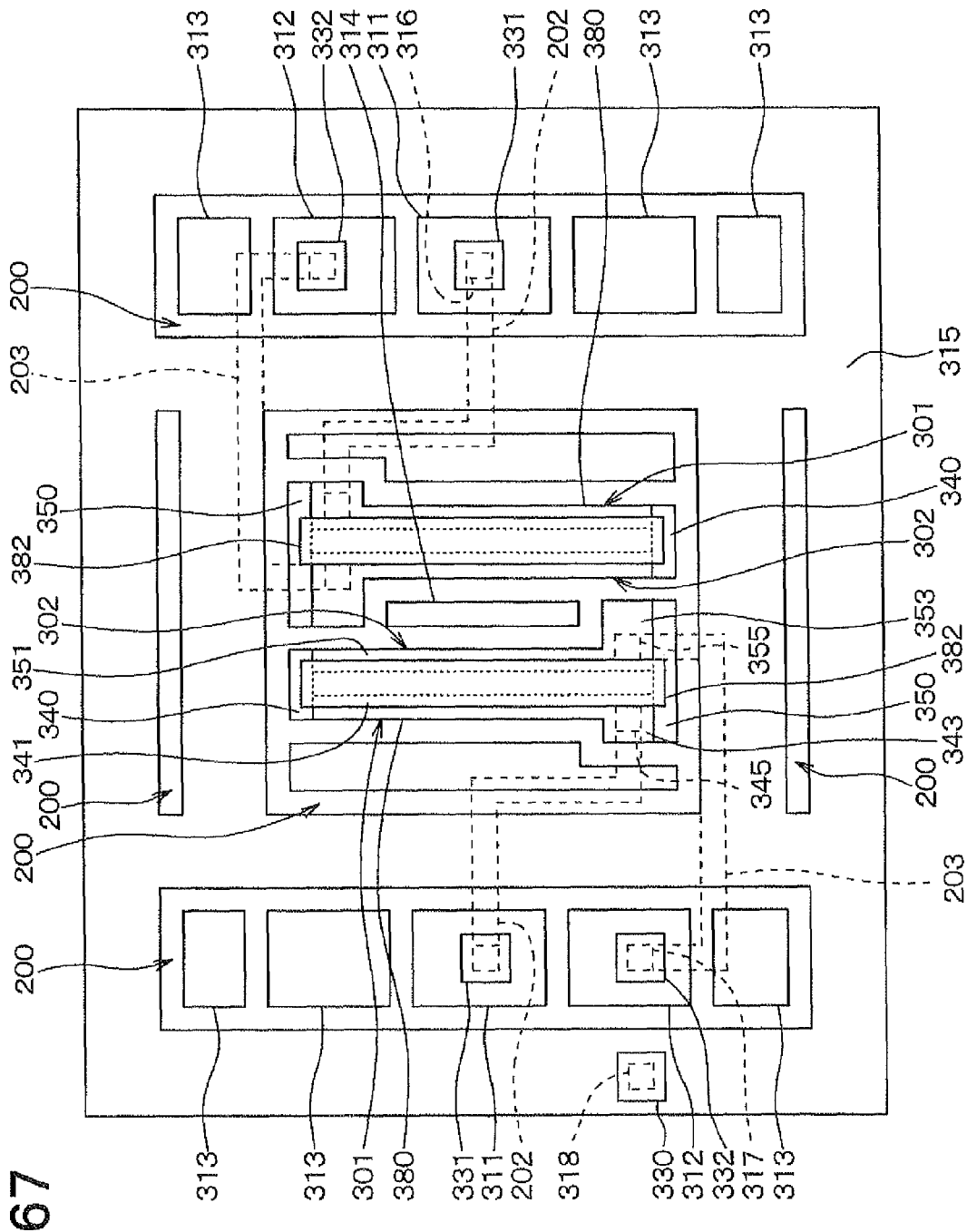
FIG. 67 is a plan view of a physical quantity detection device according to a 16th embodiment.

In this embodiment, parts different from the 15th embodiment will be described. FIG. 67 is a plan view of a physical quantity detection device according to this embodiment. As shown in this drawing, in this embodiment, the respective insulating wall parts 340, 350 as the respective wall parts 340, 350 are not in contact with the peripheral part 315 but are separated from the peripheral part 315 by the second trenches 364. According to this structure, the respective insulating wall parts 340, 350 never receive the effect of the peripheral part 315, which can hence reduce the stress that the peripheral part 315 applies to the respective electrodes 301, 302.

17th Embodiment

In this embodiment, parts different from the 1st to 16th embodiments will be described. In the respective embodiments, there are provided structures in which respective electrodes 301, 302 are electrically connected to the external circuit via the connection parts 311, 312. However, in this embodiment, there is provided a structure in which respective electrodes 301, 302 are electrically connected directly to the external circuit via the coupling parts 343, 353.

Figure 68:
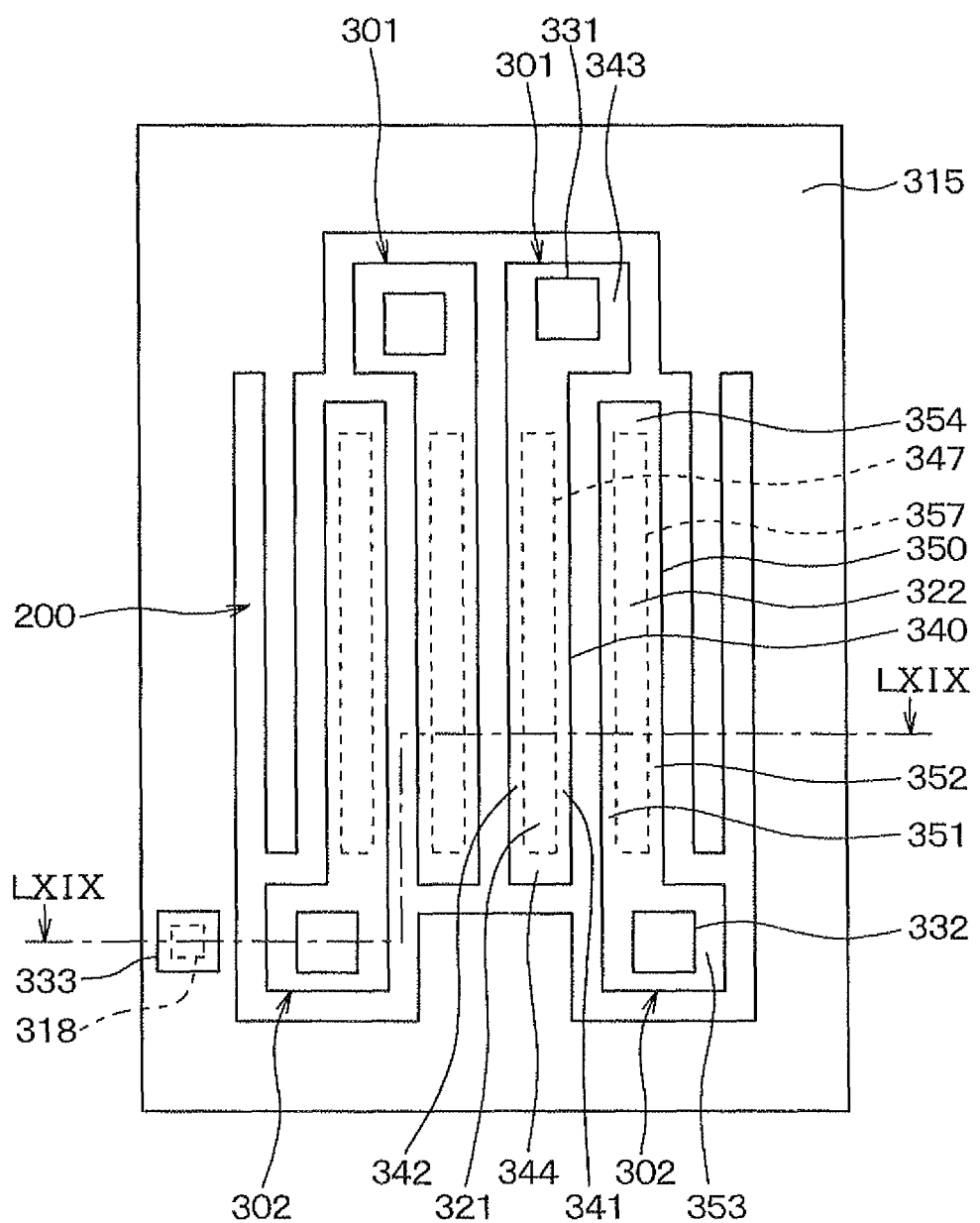
FIG. 68 is a plan view of a physical quantity detection device according to a 17th embodiment.
Figure 69:
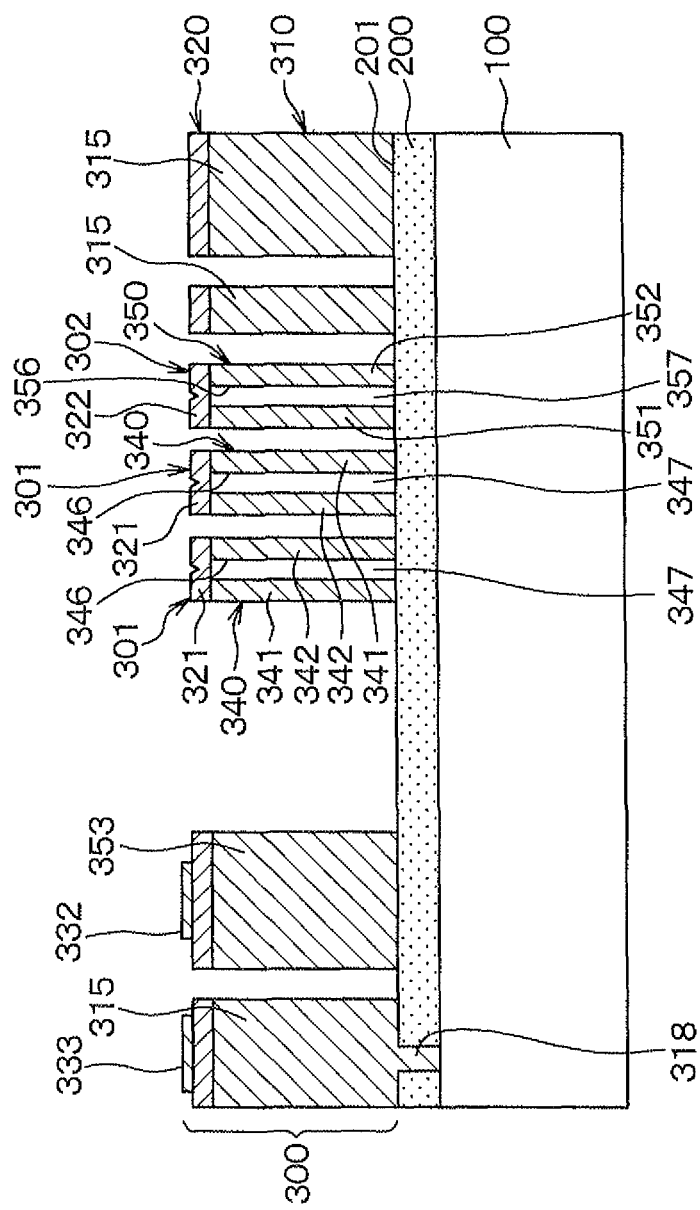
FIG. 69 is a section view taken on a line LXIX-LXIX in FIG. 68.

FIG. 68 is a plan view of a physical quantity detection device according to this embodiment. FIG. 69 is a section view taken on a line I-I' in FIG. 68.

In this embodiment, the insulating layer 200 does not need to have the wiring patterns 202, 203, so that as shown in FIG. 69, the insulating layer 200 is constructed of one film, for example, a SiO$_2$ film. The first semiconductor layer 310 and the second semiconductor layer 320 are formed as the electrode layer 300 over one surface 201 of the insulating layer 200 and are partitioned into the respective wall parts 340, 350 and the peripheral part 315. For example, two sets of respective electrodes 301, 302 are formed.

As shown in FIG. 68, the pad 331 is formed on one coupling part 343 for coupling the respective diaphragms 341, 342 in the first electrode 301. Further, the pad 332 is formed on one coupling part 353 for coupling the respective diaphragms 351, 352 in the second electrode 302. The respective pads 331, 332 have wires or the like connected thereto, whereby the respective electrodes 301, 302 are electrically connected to the external device via the coupling parts 343, 351

Further, the peripheral part 315, as shown in FIG. 69, is electrically connected to the semiconductor substrate 100 via the contact part 318. Moreover, as shown in FIG. 68, the pad 333 is formed on the peripheral part 315. In this way, the pad 333 has a bonding wire or the like connected thereto, whereby the peripheral part 315 and the semiconductor substrate 100 are electrically connected to the external device.

Next, a method for manufacturing the physical quantity detection device shown in FIG. 68 and FIG. 69 will be described with reference to FIGS. 70A, 70B, 70C, and FIGS. 71A, 70B. Also in this embodiment, the physical quantity detection device is manufactured in the shape of a wafer.

Figure 70A:
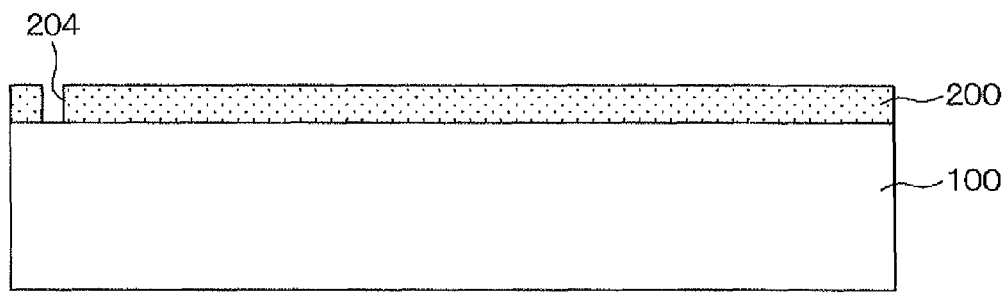
FIGS. 70A, 70B, and 70C are views to show the steps of a process of manufacturing the physical quantity detection device according to the 17th embodiment.

First, in the process shown in FIG. 70A, for example, as in the case of the processes shown in FIG. 4 and FIG. 5, a single crystal silicon substrate is prepared as the semiconductor substrate 100, and a SiO$_2$ film is formed as the insulating layer 200 over this semiconductor substrate 100. The contact hole 204 reaching the semiconductor substrate 100 is formed at a position corresponding to the peripheral part 315 of the insulating layer 200.

Subsequently, in the process shown in FIG. 70B, for example, as in the case of the processes shown in FIG. 5, polysilicon is embedded in the contact hole 204, and a polysilicon layer is formed as the first semiconductor layer 310 over the insulating layer 200.

Figure 70B:
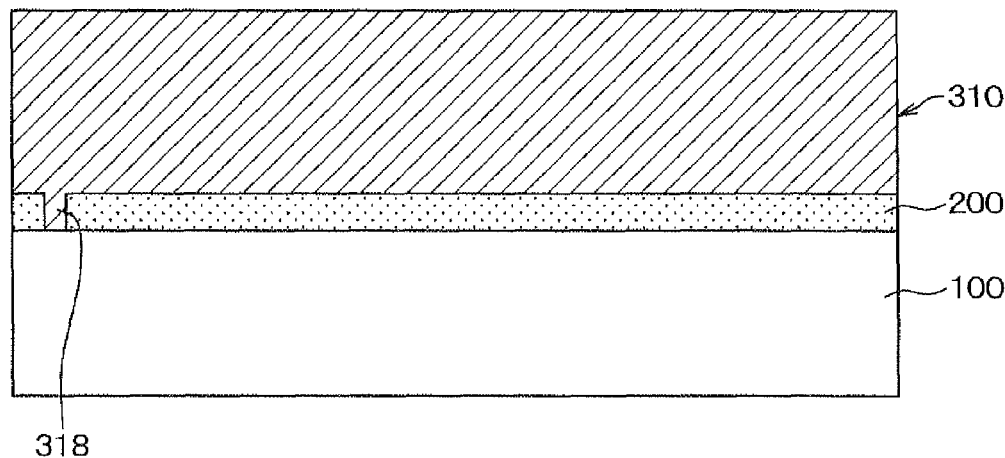
Figure 70C:
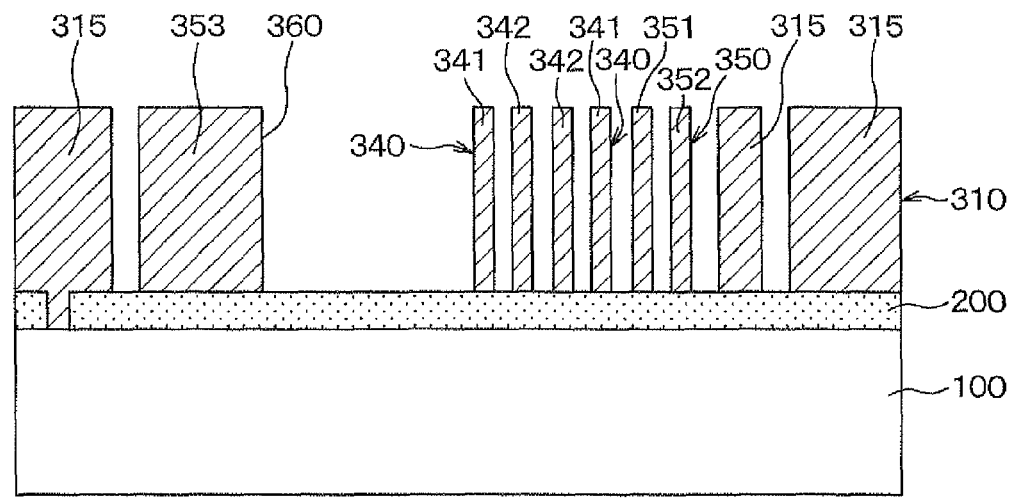

Thereafter, in the process shown in FIG. 70C, for example, as in the case of the processes shown in FIG. 6, the trench 360 is formed in the first semiconductor layer 310 to form the respective wall parts 340, 350, and the peripheral part 315.

Figure 71A:
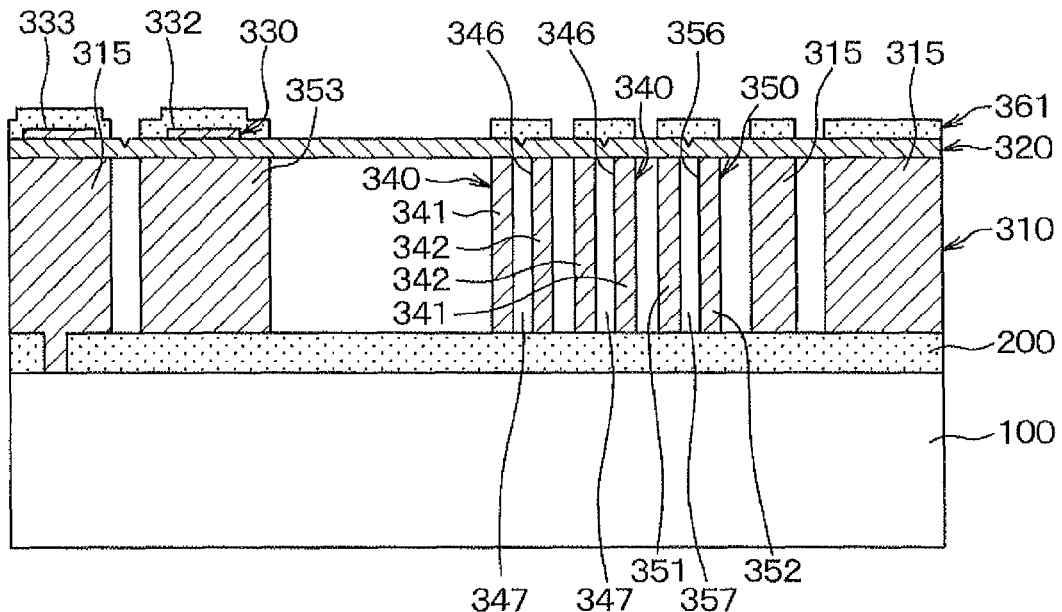
FIGS. 71A and 71B are views to show steps subsequent to the steps of the process shown in FIGS. 70A, 70B, and 70C.

In the process shown in FIG. 71A, for example, as in the case of the process shown in FIG. 7, a polysilicon layer is formed as the second semiconductor layer 320 over the first semiconductor layer 310, for example, by the LPCVD method or the like. In this way, the second semiconductor layer 320 can be formed in such a way as to close the opening portion of the trench 360, whereby the opening portions 346, 356, which are positioned on the opposite side of the insulating layer 200 side, of the respective wall parts 340, 350 are closed to seal the hollow portions 347, 357 of the respective wall parts 340, 350.

Further, for example, as in the case of the process shown in FIG. 8, an Al layer is formed as the metal layer 330 over the second semiconductor layer 320 and is patterned into the respective pads 331 to 333. Thereafter, the second semiconductor layer 320 is covered with the resist 361 in such a way that parts formed over the respective wall parts 340, 350 and the peripheral part 315 of the second semiconductor layer 320 are left. In this case, of the second semiconductor layer 320, parts corresponding to the respective hollow portions 347, 357 are also covered with the resist 361.

Figure 71B:
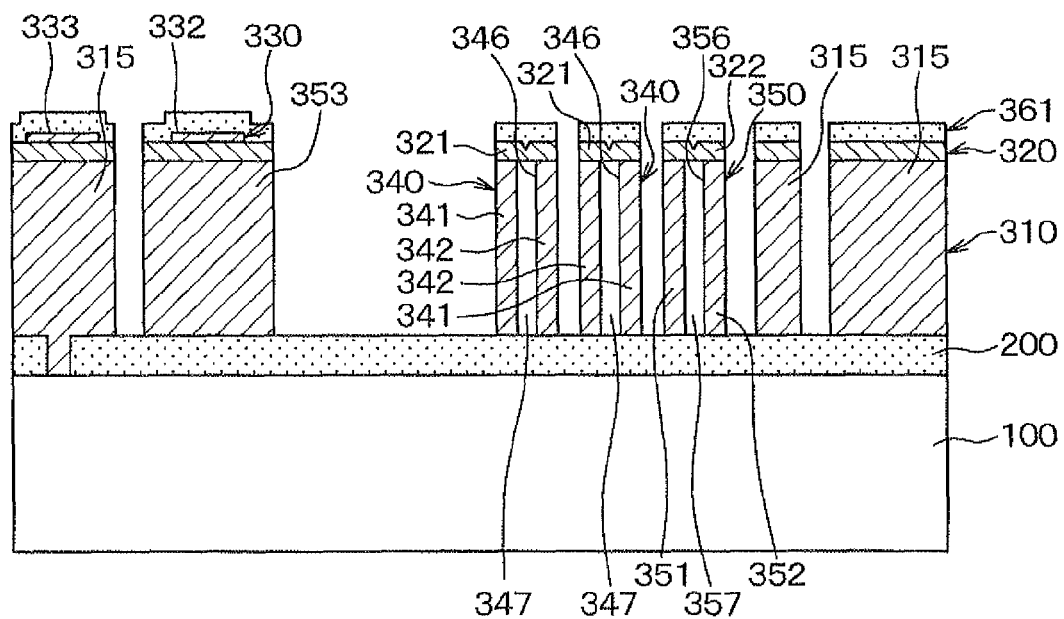

Next, in the process shown in FIG. 71B, for example, as in the case of the process shown in FIG. 9, of the second semiconductor layer 320, a part exposed from the resist 361 is removed. In this way, the first cover part 321 for closing the opening portion 346 of the first wall part 340 and the second cover part 322 for closing the opening portion 356 of the second wall part 350 can be formed, and the first electrode 301 and the second electrode 302 are constructed.

Thereafter, the resist 361 on the second semiconductor layer 320 is removed and the wafer is divided into the respective physical quantity detection devices. In this way, the physical quantity detection device shown in FIG. 68 and FIG. 69 is completed.

According to the construction described above, the insulating layer 200 does not need to have the wiring patterns 202, 203 formed therein, and the first semiconductor layer 310 does not need to have the respective connection parts 311, 312 formed therein. For this reason, the structure can be simplified and the size can be reduced. Further, since the structure can be simplified, the manufacturing cost can be reduced.

18th Embodiment

In this embodiment, parts different from the 17th embodiment will be described. In this embodiment, a physical quantity detection device is manufactured by using a single crystal silicon substrate as the first semiconductor layer 310.

Figure 72A:
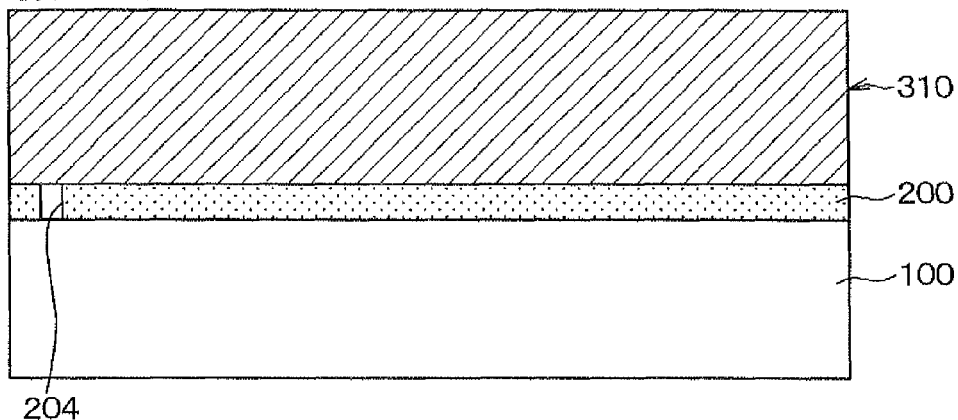
FIGS. 72A, 72B, and 72C are views to show steps of a process of manufacturing a physical quantity detection device according to an 18th embodiment.

That is, after the process shown in FIG. 70A, in the process shown in FIG. 72A, a single crystal silicon substrate having a (100) surface is joined as the first semiconductor layer 310 directly to the insulating layer 200 and is thinned to a specified thickness by grinding or the like. In this way, the contact hole 204 formed in the insulating layer 200 is covered with the first semiconductor layer 310.

Subsequently, in the process shown in FIG. 72B, the first semiconductor layer 310 is etched. At this time, the first semiconductor layer 310 is etched in such a way that surfaces opposite to the respective diaphragms 341, 342, 351, 352 are made (110) surfaces. Further, the trench 360 is formed also at a position corresponding to the contact hole 204 of the first semiconductor layer 310. In this way, the trench 360 is made to communicate with the contact hole 204. At this time, the semiconductor substrate 100 exposed to the contact hole 204 is also etched slightly by the etching.

Figure 72B:
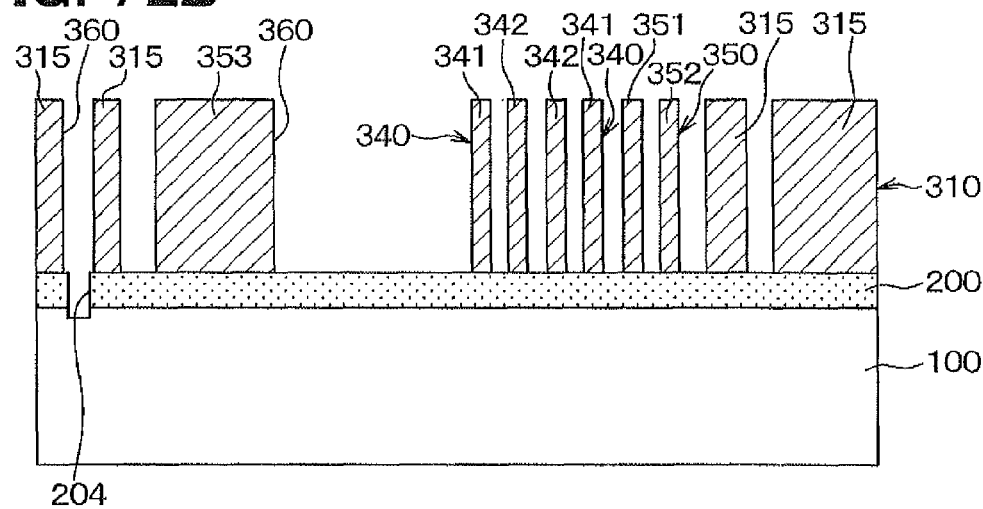
Figure 72C:
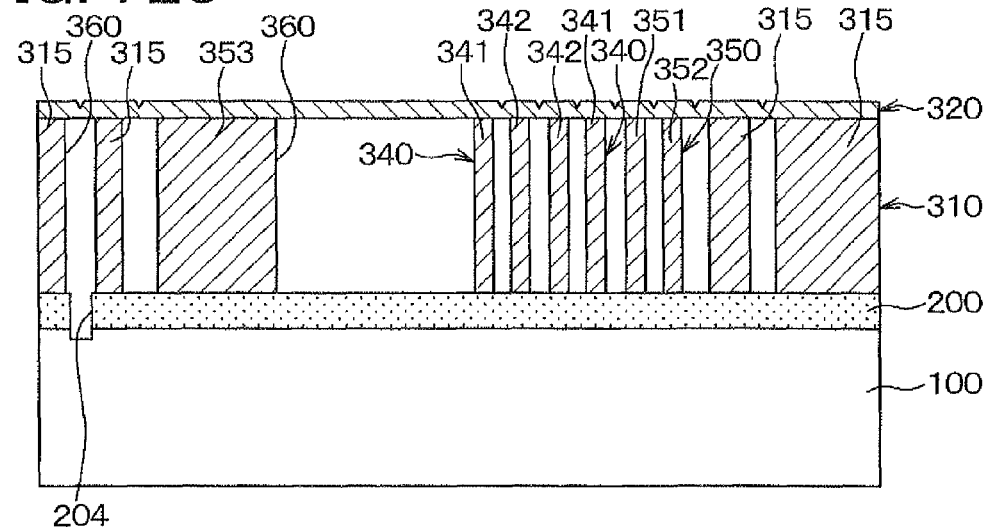

Thereafter, in the process shown in FIG. 72C, as in the case of the process shown in FIG. 71A, the second semiconductor layer 320 is formed. In this process, a single crystal silicon layer is formed as the second semiconductor layer 320. In this way, the hollow portions 347, 357 of the respective wall parts 340, 350 are closed.

Figure 73A:
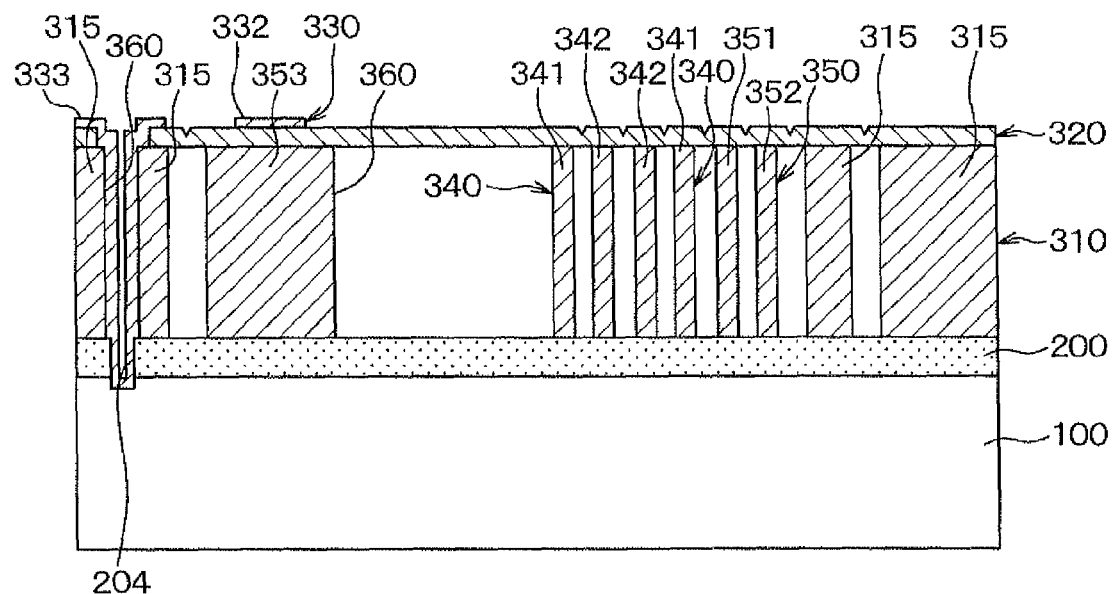
FIGS. 73A and 73B are views to show steps subsequent to the steps of the process shown in FIGS. 72A, 72B, and 72C.

In the process shown in FIG. 73A, of the second semiconductor layer 320, a part covering the trench 360 communicating with the contact hole 204 of the insulating layer 200 is opened. Then, for example, as in the case of the process shown in FIG. 8, an Al film is formed as the metal layer 330 over the second semiconductor layer 320. This Al film is formed also over the wall surface of the trench 360 communicating with the contact hole 204, the wall surface of the contact hole 204, and the semiconductor substrate 100 exposed to the contact hole 204. In this way, the Al film formed over the wall surface of the contact hole 204 is made the pad 333 of the peripheral part 315.

Figure 73B:
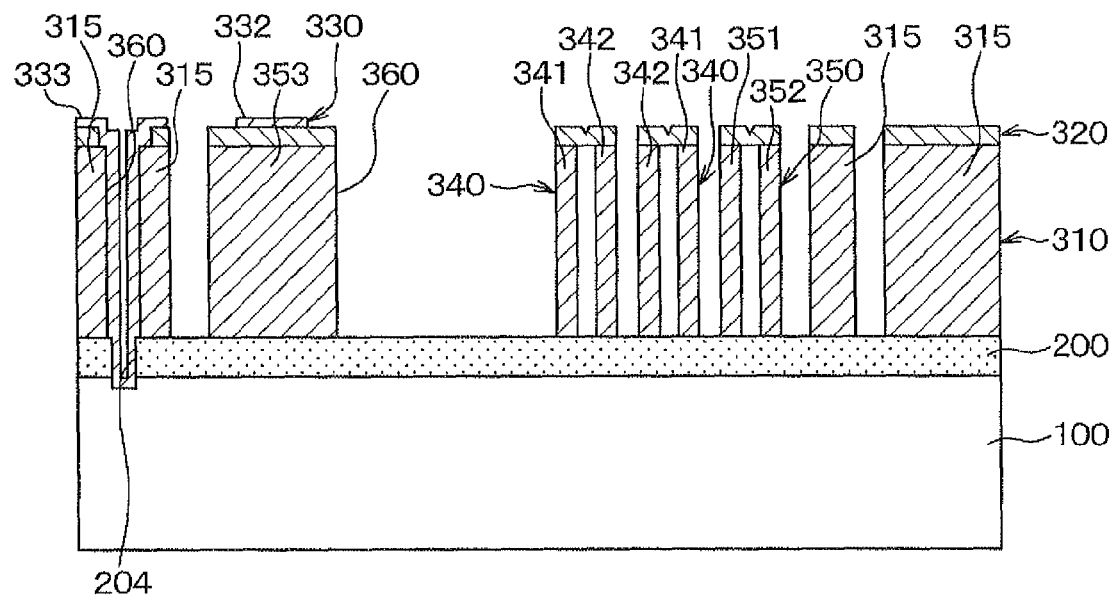

In the process shown in FIG. 73B, as in the case of the process shown in FIG. 71A, the second semiconductor layer 320 is covered with the resist 361 in such a way that parts formed over the respective wall parts 340, 350 and the peripheral part 315 of the second semiconductor layer 320 are left, and a part exposed from the resist 361 of the second semiconductor layer 320 is removed. In this way, the first electrode 301 and the second electrode 302 are constructed.

Thereafter, the resist 361 on the second semiconductor layer 320 is removed and the wafer is divided into the respective physical quantity detection devices. In this way, the physical quantity detection device shown in FIG. 68 and FIG. 69 is completed.

In this way, by forming the Al film in such a way as to reach the semiconductor substrate 100, the semiconductor substrate 100 can be electrically connected to the external device with reliability. Further, the trench 360 does not need to be completely embedded, so that the pad 333 in contact with the semiconductor substrate 100 can be easily formed.

19th Embodiment

In this embodiment, parts different from the 1st to 18th embodiments will be described. In this embodiment, there is provided a structure in which a layer constructed of an insulating material and to be made a cover is formed over the first semiconductor layer 310 and in which the first semiconductor layer 310 is sandwiched by the insulating layer 200 and the layer to be made the cover.

Figure 74:
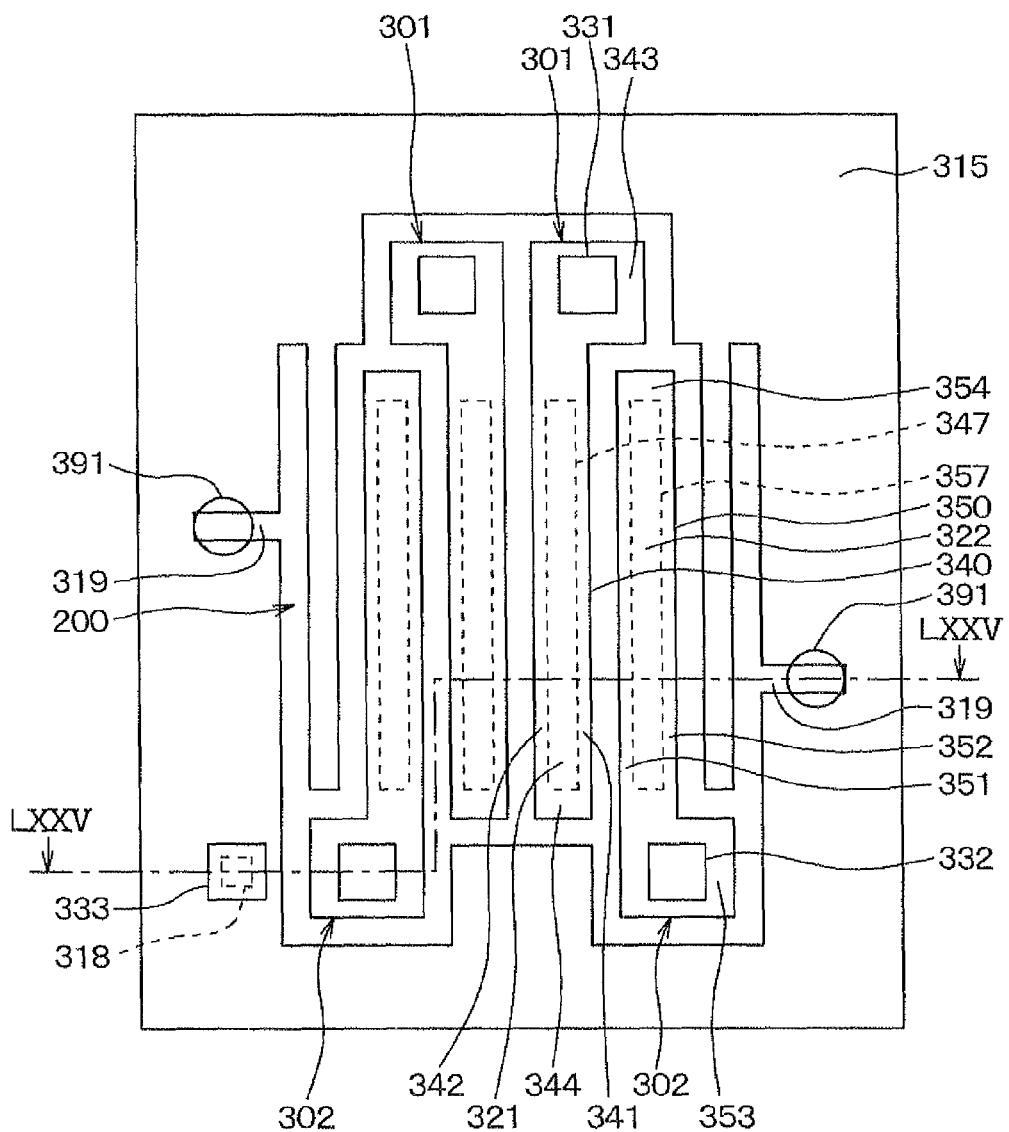
FIG. 74 is a plan view of a physical quantity detection device according to a 19th embodiment.
Figure 75:
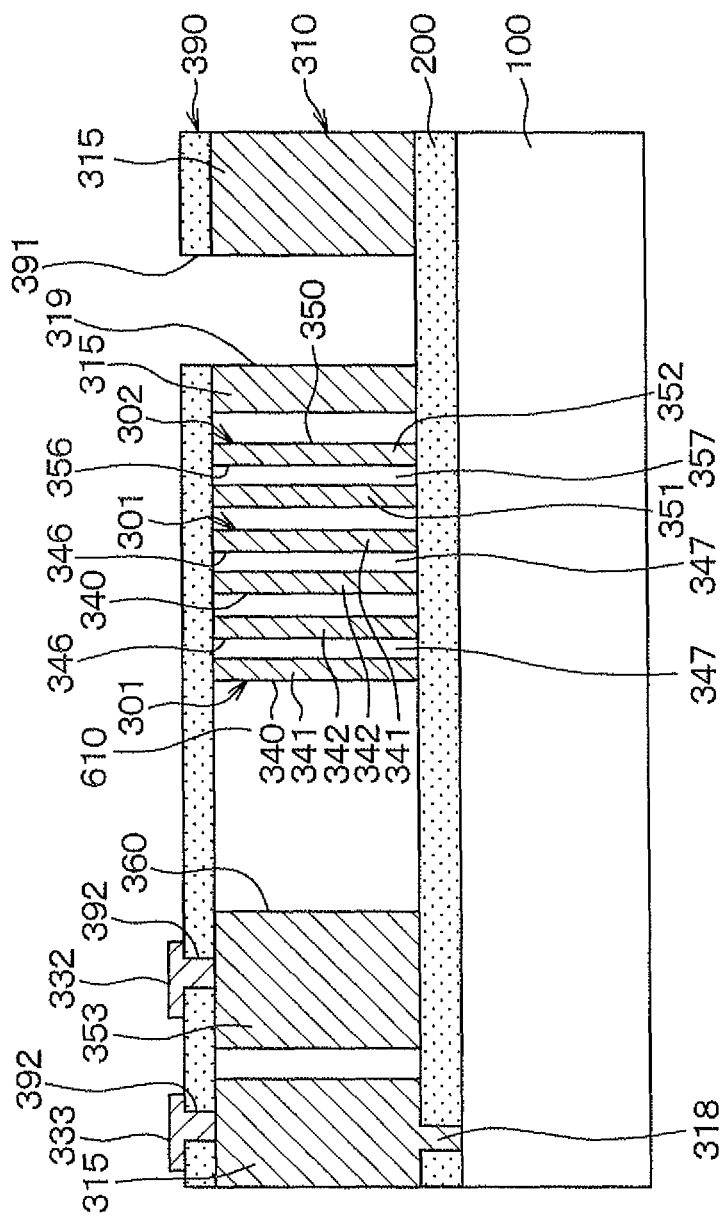
FIG. 75 is a section view taken on a line LXXV-LXXV in FIG. 74.

FIG. 74 is a plan view of a physical quantity detection device according to this embodiment. FIG. 75 is a section view taken on a line J-J' in FIG. 74.

As shown in FIG. 74, the plane structure of the physical quantity detection device, that is, the plane structure of the first semiconductor layer 310 is nearly equal to the structure shown in the 17th embodiment (see FIG. 68). However, in this embodiment, as in the case of the 9th embodiment, the peripheral part 315 has the downside pressure introduction hole 319 formed therein. For this reason, this peripheral part 315 has a width slightly enlarged as compared with the peripheral part 315 shown in FIG. 68.

Further, as shown in FIG. 75, an insulating cover layer 390 made of a $SiO_2$ film or the like is formed over the first semiconductor layer 310. In this way, of the first wall part 340, the opening portion 346 on the opposite side of the insulating layer 200 side is closed, and of the second wall part 350, the opening portion 356 on the opposite side of the insulating layer 200 side is closed. According to this, the first electrode 301 is constructed of only the first wall part 340, and the second electrode 302 is constructed of only the second wall part 350.

Further, since the insulating cover layer 390 is formed over the first semiconductor layer 310, the trench 360 is closed by the first semiconductor layer 310, and a space portion 610 which is different from the hollow portions 347, 357 of the respective electrodes 301, 302 is formed between the insulating layer 200 and the insulating cover layer 390. The insulating cover layer 390 has a pressure introduction hole 391 formed therein, the pressure introduction hole 391 making the space portion 610 communicate with the outside. In this way, the outside pressure is introduced into the space portion 610 through the pressure introduction hole 391 of the insulating cover layer 390 and the downside pressure introduction hole 319 of the peripheral part 315. Here, the trench 360 is made a pressure introduction passage.

As shown in FIG. 74, there are provided two downside pressure introduction holes 319 of the peripheral part 315 and two pressure introduction holes 391 of the insulating cover layer 390. One of the downside pressure introduction holes 319 and one of the pressure introduction holes 391 function as relief holes of the pressure medium introduced into the space portion 610. Of course, the number of the downside pressure introduction holes 319 and the number of the pressure introduction holes 391 may be one or three or more.

Further, as shown in FIG. 75, contact holes 392 are formed in the parts corresponding to the coupling parts 343, 353 of the respective electrodes 301, 302 and the peripheral part 315 of the insulating cover layer 390, and the respective pads 331 to 333 are formed in such a way as to embed these contact holes 392.

According to this construction, when pressure is introduced into the space portion 610 through the downside pressure introduction holes 319 of the peripheral part 315 and the pressure introduction holes 391 of the insulating cover layer 390 and is applied to the respective electrodes 301, 302, in response to a pressure difference between the hollow portions 347, 357 of the respective electrodes 301, 302 and the space portion 610, the diaphragms 341, 342, 351, 352 of the respective electrodes 301, 302 are deformed. Hence, the pressure can be detected by detecting a capacitance between the first electrode 301 and the second electrode 302, the capacitance being varied by the deformations of the diaphragms 341, 342, 351, 352.

Figure 76A:
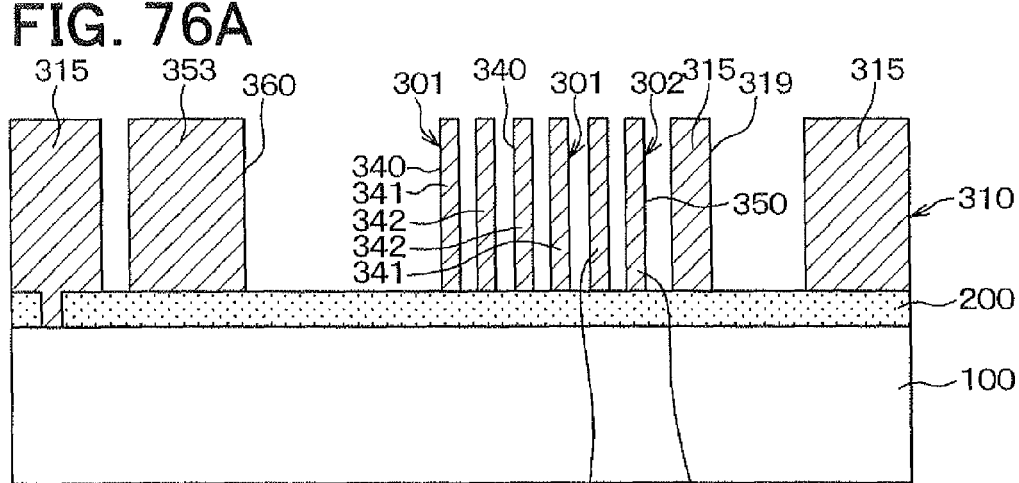
FIGS. 76A, 76B, and 76C are views to show the steps of a process of manufacturing the physical quantity detection device according to the 19th embodiment.

Next, a method for manufacturing the physical quantity detection device shown in FIG. 74 and FIG. 75 will be described with reference to FIGS. 76A, 76B, 76C. Also in this embodiment, the physical quantity detection device is manufactured in the shape of a wafer.

First, the processes shown in FIG. 70A and FIG. 70B are performed to form the first semiconductor layer 310 over the insulating layer 200. If required, the first semiconductor layer 310 is subjected to a mirror polishing process such as a CMP.

Subsequently, in the process shown in FIG. 76A, as in the case of the process shown in FIG. 70C, the trenches 360 are formed in the first semiconductor layer 310 to form the respective wall parts 340, 350 and the peripheral part 315. At this time, the trench 360 to be made the downside pressure introduction hole 319 is also formed in the peripheral part 315.

Figure 76B:
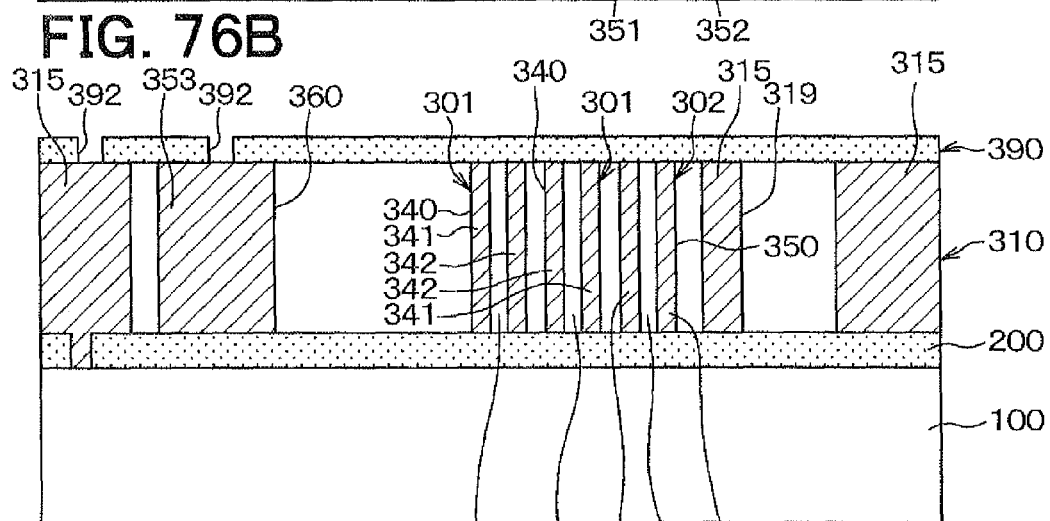

In the process shown in FIG. 76B, a $SiO_2$ film or the like is formed in vacuum as the insulating cover layer 390 over the first semiconductor layer 310 by the plasma CVD method or the like in such a way as to close the opening portions of the trenches 360. In this way, the hollow portions 347, 357 of the respective wall parts 340, 350 are hermetically sealed in vacuum. On the other hand, the space portion 610 different from the hollow portions 347, 357 of the respective electrodes 301, 302 is formed between the insulating layer 200 and the insulating cover layer 390.

Further, contact holes 392 from which the respective coupling parts 343, 353 and the peripheral part 315 are exposed are formed in the insulating cover layer 390 in such a way as to make contact with the respective coupling parts 343, 353 and the peripheral part 315.

Figure 76C:
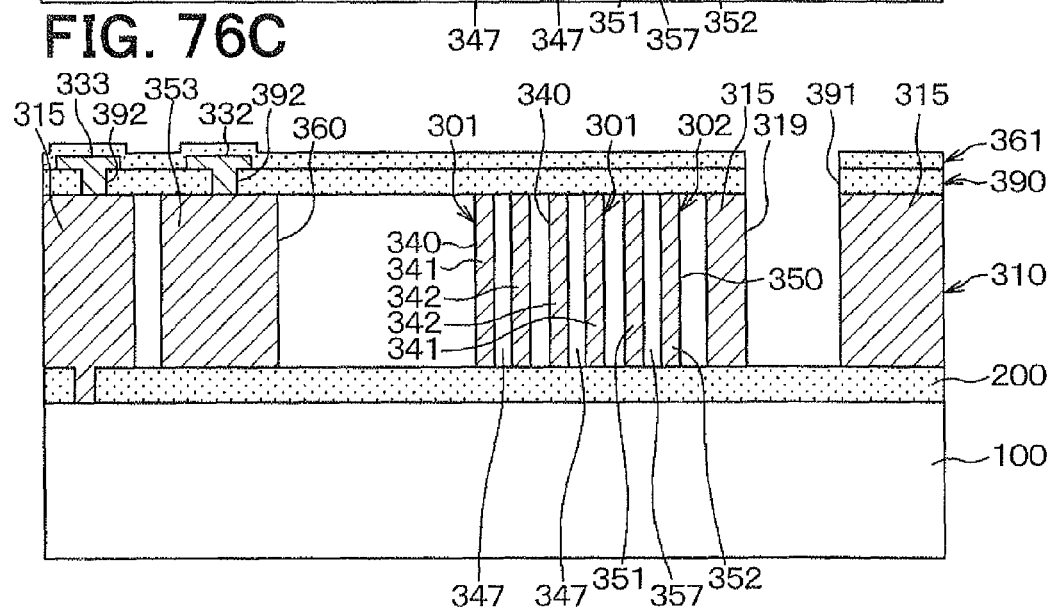

Thereafter, in the process shown in FIG. 76C, an Al film is formed over the insulating cover layer 390 in such a way as to embed the contact holes 392 and is patterned to form the respective pads 331 to 333. Then, the pressure introduction hole 391 communicating with the downside pressure introduction hole 319 is formed in insulating cover layer 390 by the photolithography etching technique using the resist 361. Here, the pressure introduction hole 391 may be formed in the insulating cover layer 390 by abrasion opening using a laser light.

Then, the resist 361 is removed and the wafer is divided into the respective physical quantity detection devices. In this way, the physical quantity detection device shown in FIG. 74 and FIG. 75 is completed.

As described above, the first semiconductor layer 310 is covered with the insulating cover layer 390, so that this insulating cover layer 390 can be made to function as the cap and hence elements formed in the first semiconductor layer 310 can be protected. Further, this is a structure in which the insulating layer 200 does not have the wiring patterns 202, 203 formed therein, so that cost reduction can be achieved.

In the above description, the insulating cover layer 390 is formed by the plasma CVD method or the like, but the insulating cover layer 390 may be formed by bonding a glass substrate, a ceramic substrate, or a silicon substrate having an insulating film (for example, thermal oxidized film ($SiO_2$ film)) formed on its surface, which have the same thermal expansion coefficient as silicon, directly to the first semiconductor layer 310 at a normal temperature. In the case where the silicon substrate is used as the insulating cover layer 390, when the pads 331 to 333 are formed, the side walls of the contact holes 392 need to be covered with an insulating film. In this way, in the case where the silicon substrate is used, the silicon substrate may have a circuit such as IC formed thereon.

As to the correspondence relationship between the description of this embodiment and the description of the scope of claims, the first semiconductor layer 310 corresponds to "a semiconductor layer" of the scope of claims. Further, the first wall part 340 and the second wall part 350 correspond to "a first electrode and a second electrode" of the scope of claims, and the pressure introduction hole 391 of the insulating cover layer 390 corresponds to "a through hole" of the scope of claims.

20th Embodiment

Figure 77:
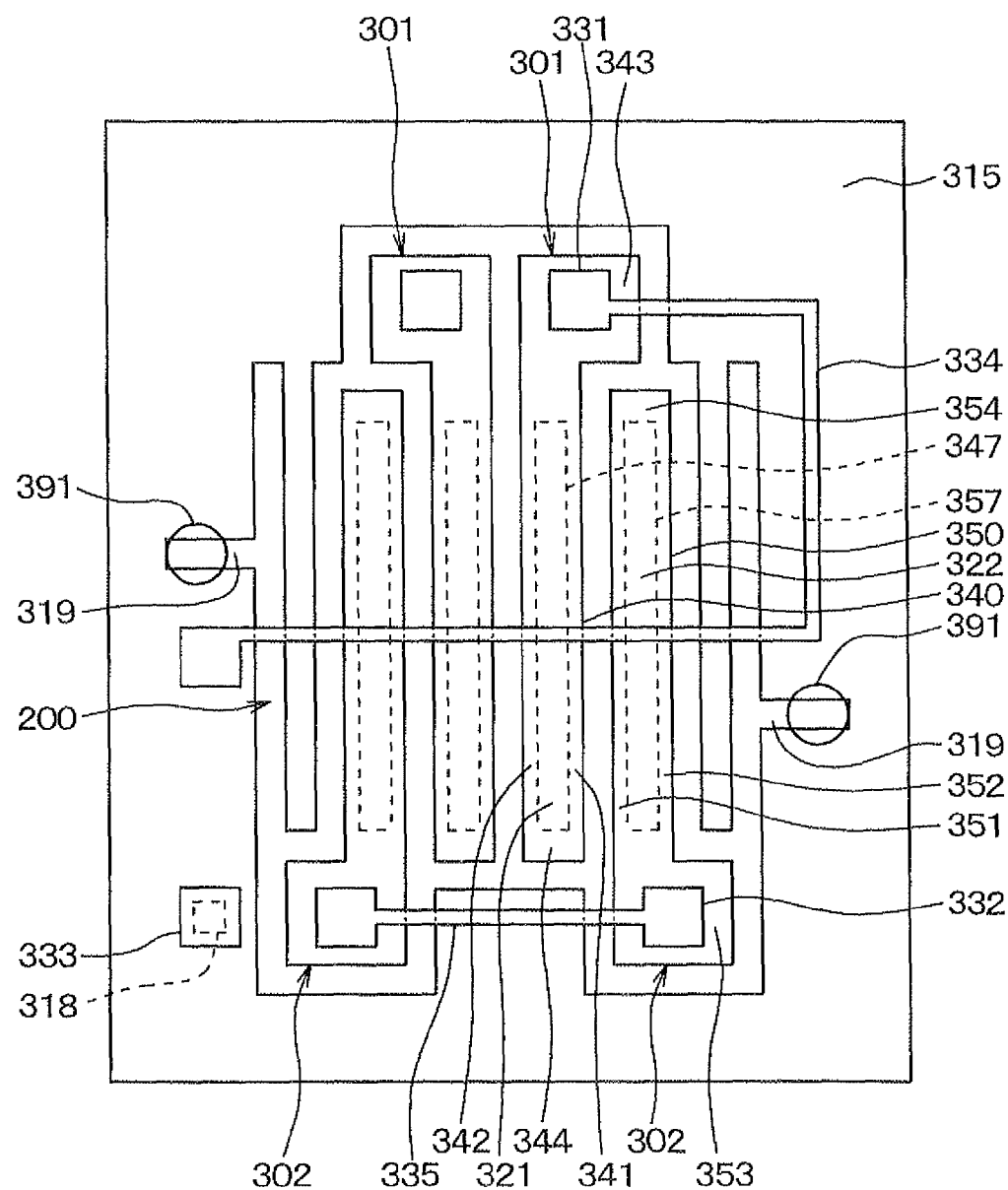
FIG. 77 is a plan view of a physical quantity detection device according to a 20th embodiment.

In this embodiment, parts different from the 19th embodiment will be described. FIG. 77 is a plan view of a physical quantity detection device according to this embodiment. As described above, the insulating cover layer 390 is formed entirely over the first semiconductor layer 310. For this reason, wiring patterns 334, 335 can be freely laid out over the insulating cover layer 390.

For example, the wiring pattern 334 can be laid out from the pad 331, which connects the first electrode 301 to the external device, to the peripheral part 315 across the respective electrodes 301, 302. Further, the pads 332 for connecting the second electrode 302 to the external device can be connected to each other by the wiring pattern 335.

As described above, the wiring patterns 334, 335 can be formed over the insulating cover layer 390 in addition to the pads 331 to 333, which can enhance also the freedom of the design.

21th Embodiment

In this embodiment, parts different from the 19th and 20th embodiment will be described. In this embodiment, a physical quantity detection device is manufactured by using a single crystal silicon substrate as the first semiconductor layer 310. Also in this embodiment, the physical quantity detection device is manufactured in the shape of a wafer.

Figure 78A:
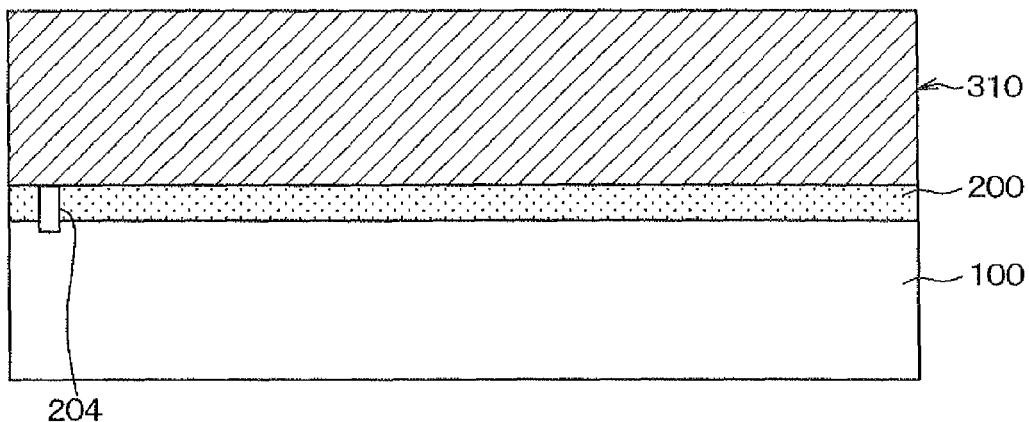
FIGS. 78A, 78B, and 78C are views to show the steps of a process of manufacturing a physical quantity detection device according to a 21st embodiment.

First, in the process shown in FIG. 78A, for example, the process shown in FIG. 70A is performed to join the single crystal silicon substrate having a (100) surface as the first semiconductor layer 310 directly to the surface of the insulating layer 200 having the contact hole 204 formed therein, and the first semiconductor layer 310 is thinned to a thin film having a specified thickness.

Figure 78B:
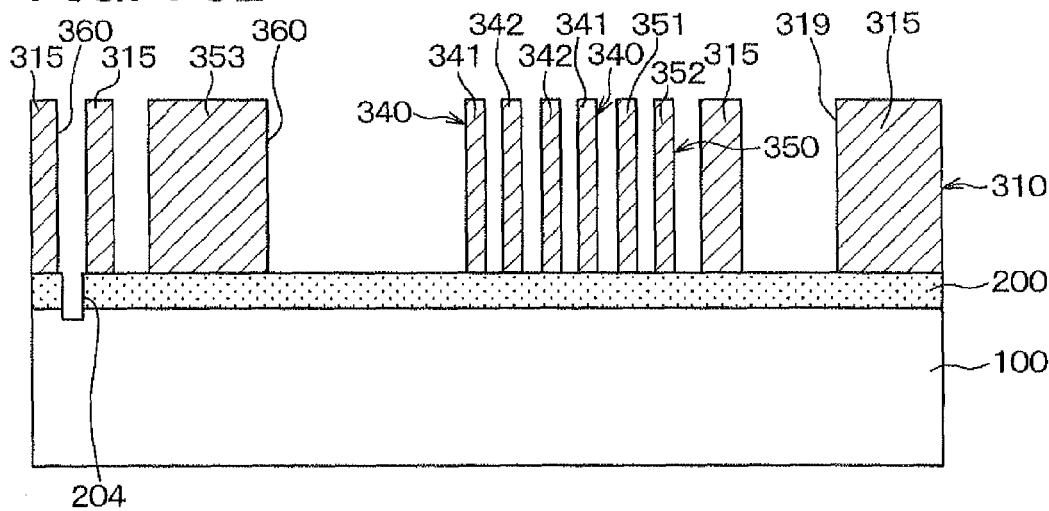

In the process shown in FIG. 78B, as in the case of the process shown in FIG. 72B, the first semiconductor layer 310 is etched in such a way as to form the respective diaphragms 341, 342, 351, 352. In this case, the trench 360 is formed also at a position corresponding to the contact hole 204 of the first semiconductor layer 310, whereby the trench 360 is made to communicate with the contact hole 204. Further, the trench 360 to be made the downside pressure introduction hole 319 is also formed.

Figure 78C:
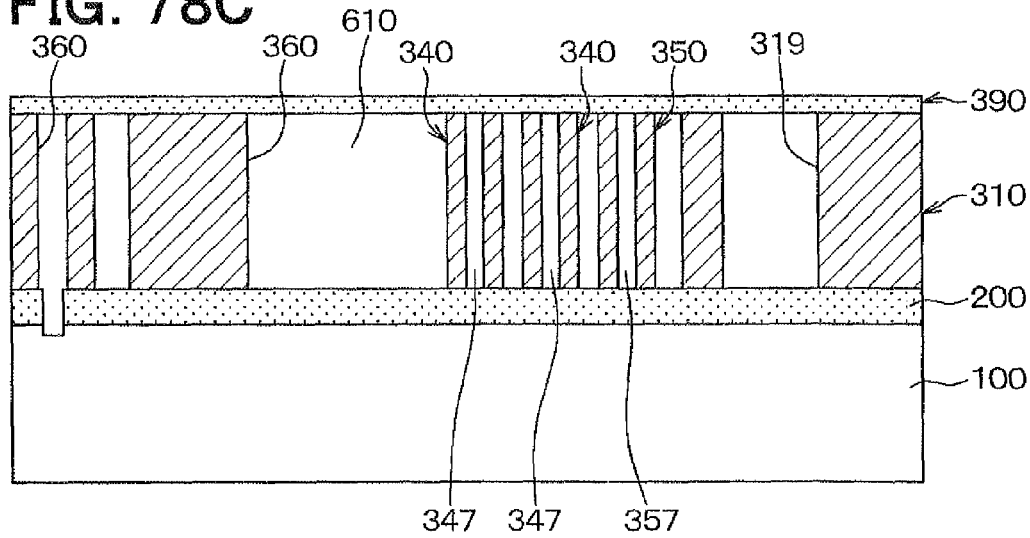

In the process shown in FIG. 78C, a SiO$_2$ film or a SiN film is formed in vacuum as the insulating cover layer 390 over the first semiconductor layer 310 by the plasma CVD method, whereby the hollow portions 347, 357 of the respective wall parts 340, 350 are closed. Further, the space portion 610 different from the hollow portions 347, 357 of the respective wall parts 340, 350 is formed between the insulating layer 200 and the insulating cover layer 390.

Figure 79A:
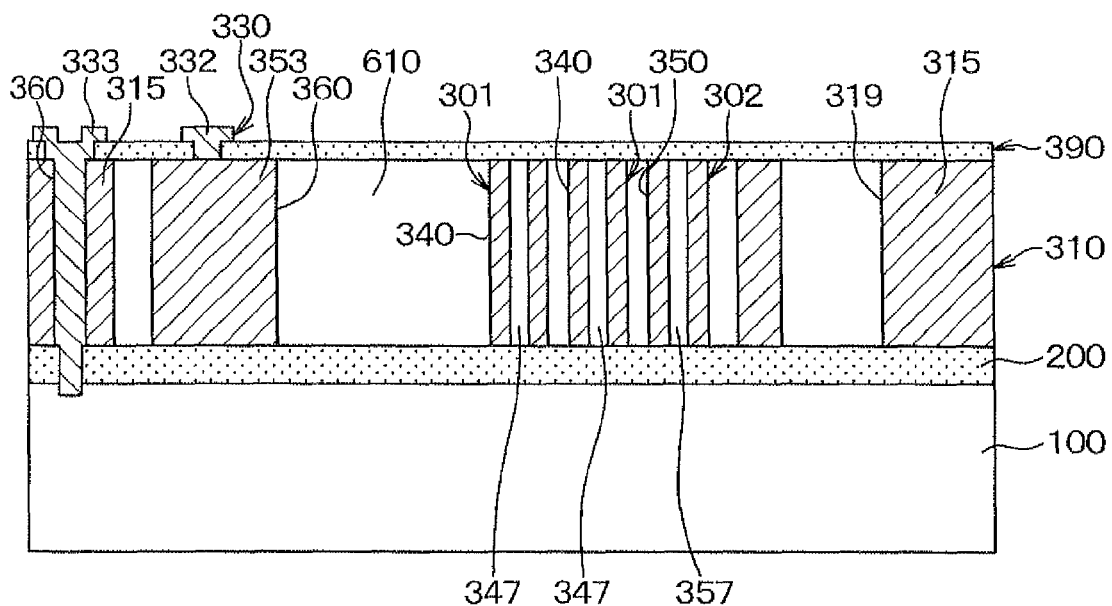
FIGS. 79A and 79B are views to show steps subsequent to the steps of the process shown in FIGS. 78A, 78B, and 78C.

Next, in the process shown in FIG. 79A, of the insulating cover layer 390, the part covering the trench 360 communicating with the contact hole 204 of the insulating layer 200 and positions in which the respective pads 331 to 333 are to be formed are opened. Thereafter, an Al film is formed as the metal layer 330 over the insulating cover layer 390. In this case, the Al film is formed in such a way as to embed the contact hole 204 and the trench 360 communicating with the contact hole 204. Then, the Al film formed on the insulating cover layer 390 is patterned to form the pads 331 to 333.

Figure 79B:
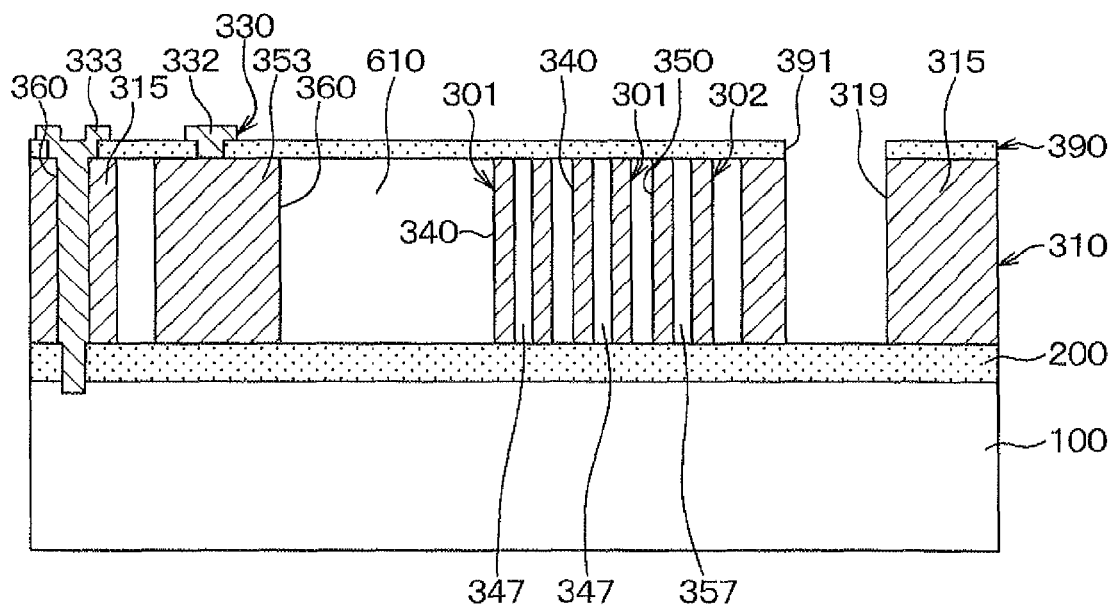

In the process shown in FIG. 79B, the pressure introduction hole 391 is formed in the insulating cover layer 390, for example, by abrasion opening using a laser light, Then, the wafer is divided into the respective physical quantity detection devices. In this way, the physical quantity detection device is completed.

As described above, in order to make contact with the semiconductor substrate 100, the trench 360 corresponding to the contact hole 204 is formed in the first semiconductor layer 310 and the Al film is embedded in this trench 360. In this way, there is provided a structure for making reliable contact with the semiconductor substrate 100.

22nd Embodiment

In this embodiment, parts different from the 1st to 20th embodiments will be described. In particular, in this embodiment, parts different from the 17th to 20th embodiments will be described.

Figure 80:
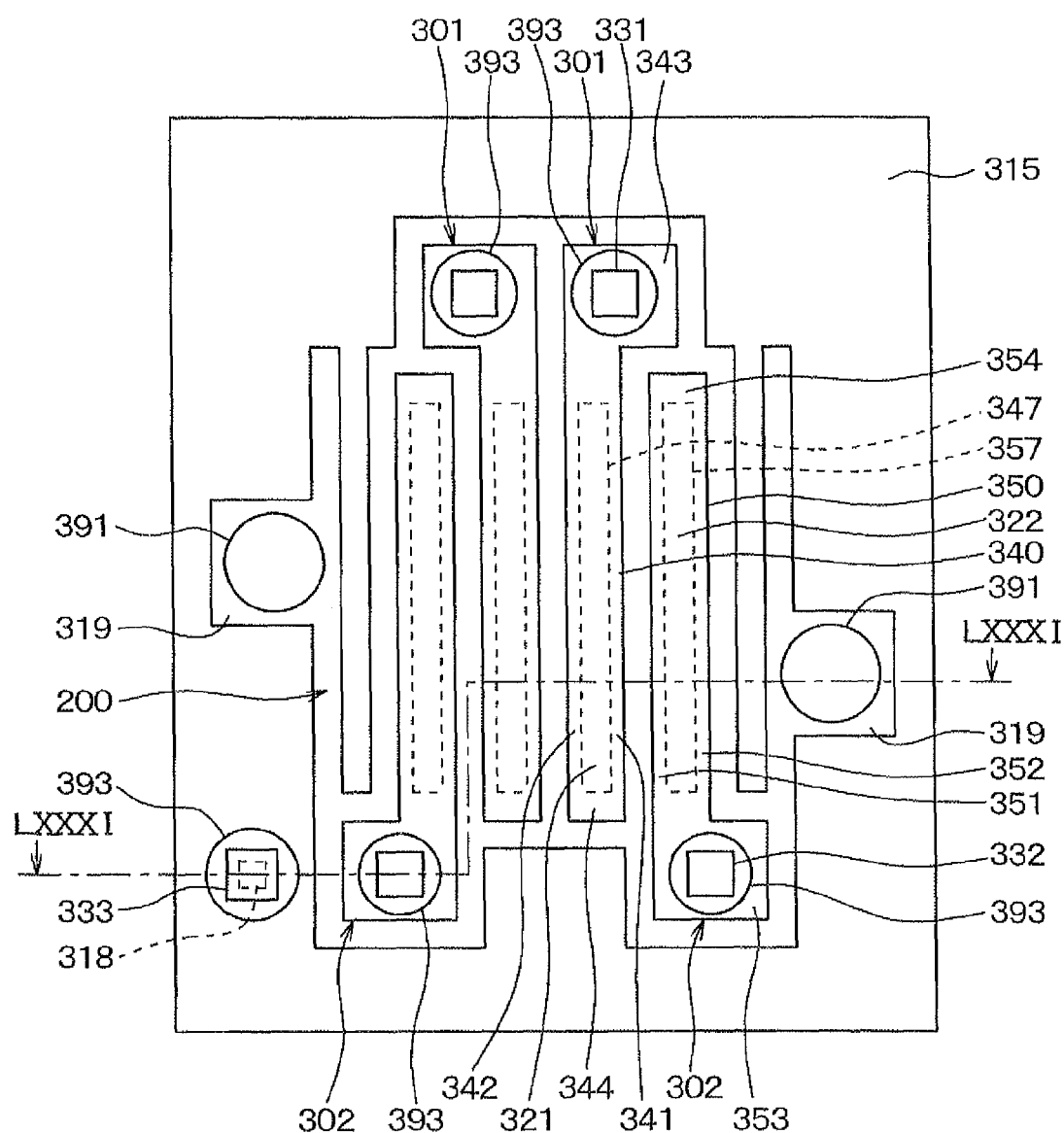
FIG. 80 is a plan view of a physical quantity detection device according to a 22nd embodiment.

FIG. 80 is a plan view of a physical quantity detection device according to this embodiment. Further, FIG. 81 is a section view taken on a line L-L' in FIG. 80.

Figure 81:
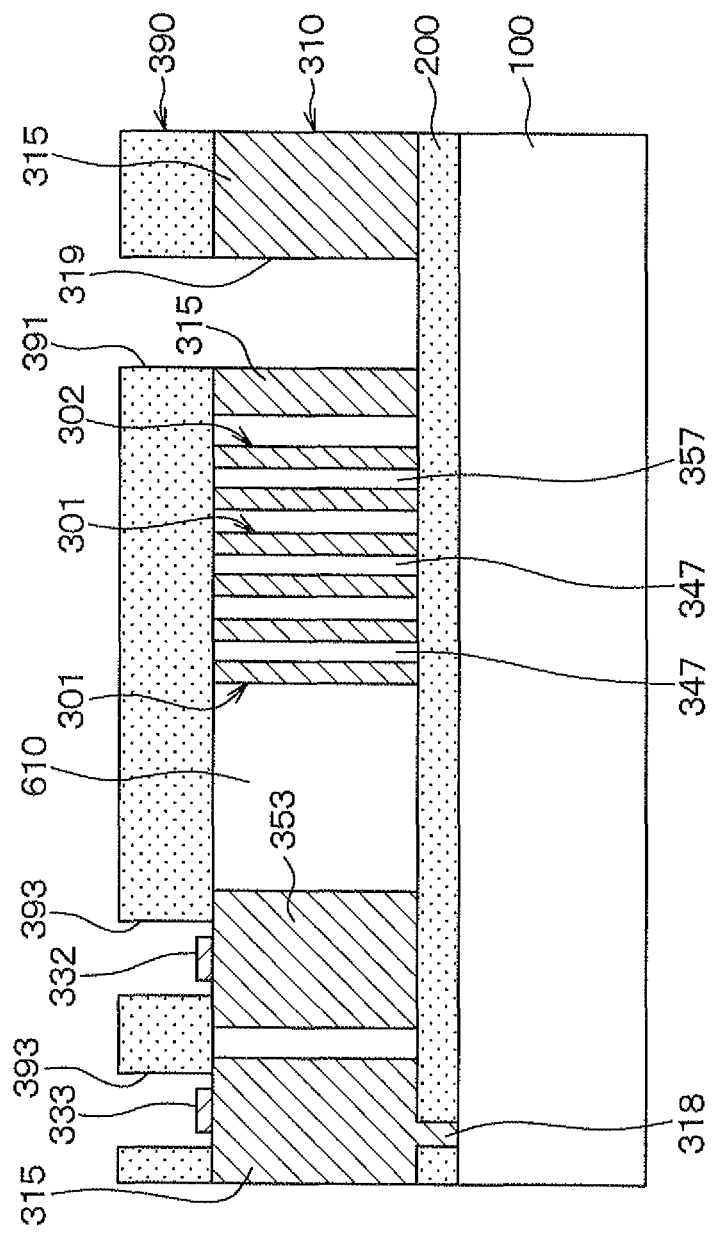
FIG. 81 is a section view taken on a line LXXXI-LXXXI in FIG. 80.

As shown in FIG. 81, in this embodiment, an insulating substrate made of glass, which is nearly equal to silicon in thermal expansion coefficient, is used as the insulating cover layer 390. For this reason, the insulating cover layer 390 according to this embodiment is thicker than the structure shown in FIG. 75. Further, as shown in FIG. 80, the insulating cover layer 390 has the contact holes 393 formed at positions corresponding to the respective pads 331 to 333, the contact hole 333 passing though insulating cover layer 390. In this way, each of the respective pads 331 to 333 can have a wire or the like connected thereto.

Next, a method for manufacturing the physical quantity detection device shown in FIG. 80 and FIG. 81 will be described with reference to FIGS. 82A, 82B and FIGS. 83A, 83B, 83C. Also in this embodiment, the physical quantity detection device is manufactured in the shape of a wafer.

Figure 82A:
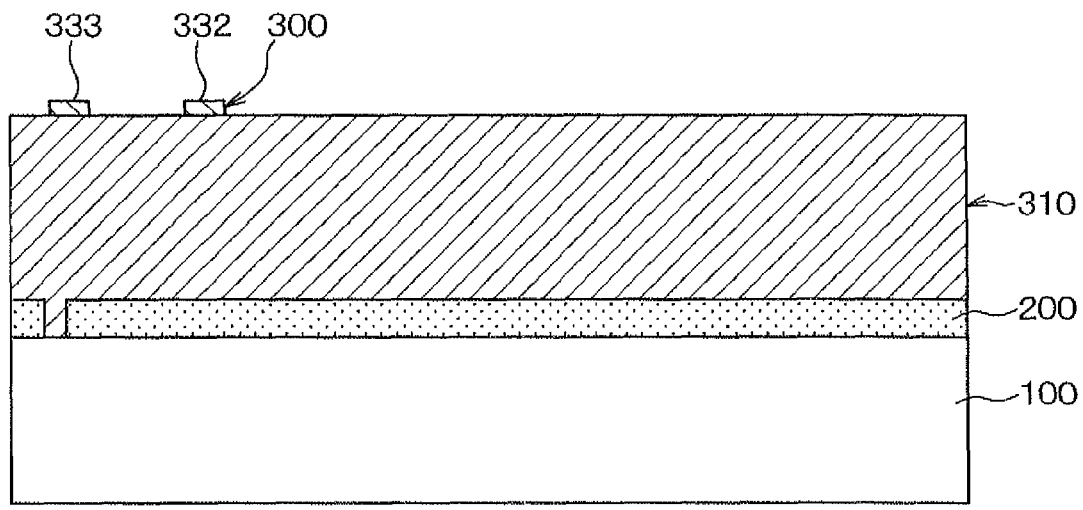
FIGS. 82A and 82B are views to show the steps of a process of manufacturing the physical quantity detection device according to the 22nd embodiment.

In the process shown in FIG. 82A, the processes shown in FIG. 70A and FIG. 70B are performed to form the first semiconductor layer 310 over the insulating layer 200. Further, an Al film is formed as the metal layer 330 over the first semiconductor layer 310 and is patterned into the respective pads 331 to 333.

Figure 82B:
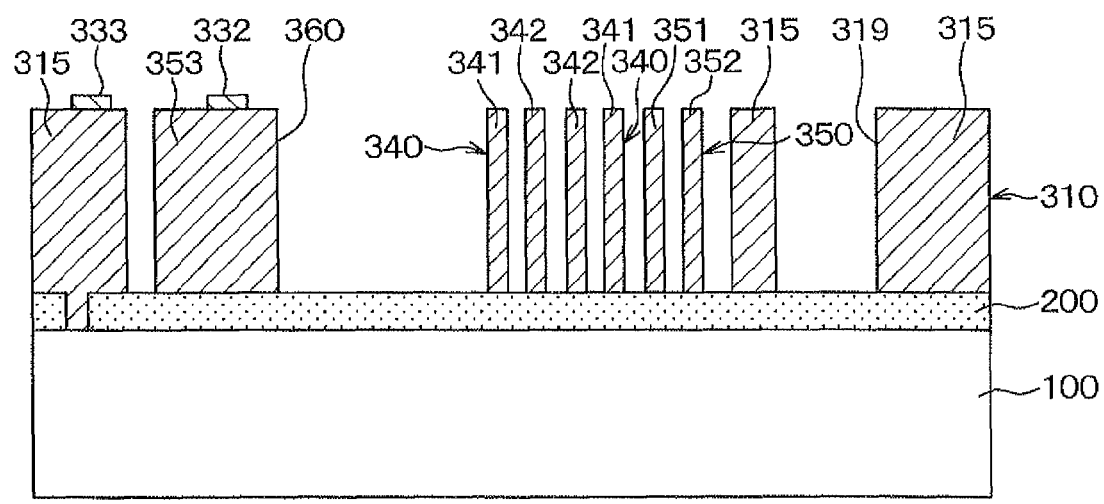

In the process shown in FIG. 82B, as in the case of the process shown in FIG. 6, the trenches 360 are formed in the first semiconductor layer 310 to form the respective wall parts 340, 350 and the peripheral part 315.

In this case, the trench 360 to be made the downside pressure introduction hole 319 is also formed. Here, as described above, the insulating cover layer 390 of the insulating substrate is formed over the first semiconductor layer 310, so that the width of the trench 360 can be made wide. That is, in the above-mentioned respective embodiments, the second semiconductor layer 320 and the insulating cover layer 390 are formed over the first semiconductor layer 310 in such a way as to close the trench 360, so that the width of the trench 360 needs to be made narrow. However, in this embodiment, the insulating substrate is bonded after this process, so that the width of the trench 360 does not need to be made narrow. For this reason, the width of the trench 360 to be made the downside pressure introduction hole 319 can be made wide as shown in FIG. 80.

Figure 83A:
FIGS. 83A, 83B, and 83C are views to show steps subsequent to the steps of the process shown in FIGS. 82A, 82B.

Subsequently, in the process shown in FIG. 83A, an insulating substrate is prepared as the insulating cover layer 390 and has the contact holes 393 formed at the parts corresponding to the respective pads 331 to 333 and has the pressure introduction hole 391 formed at the part corresponding to the downside pressure introduction hole 319.

Figure 83B:
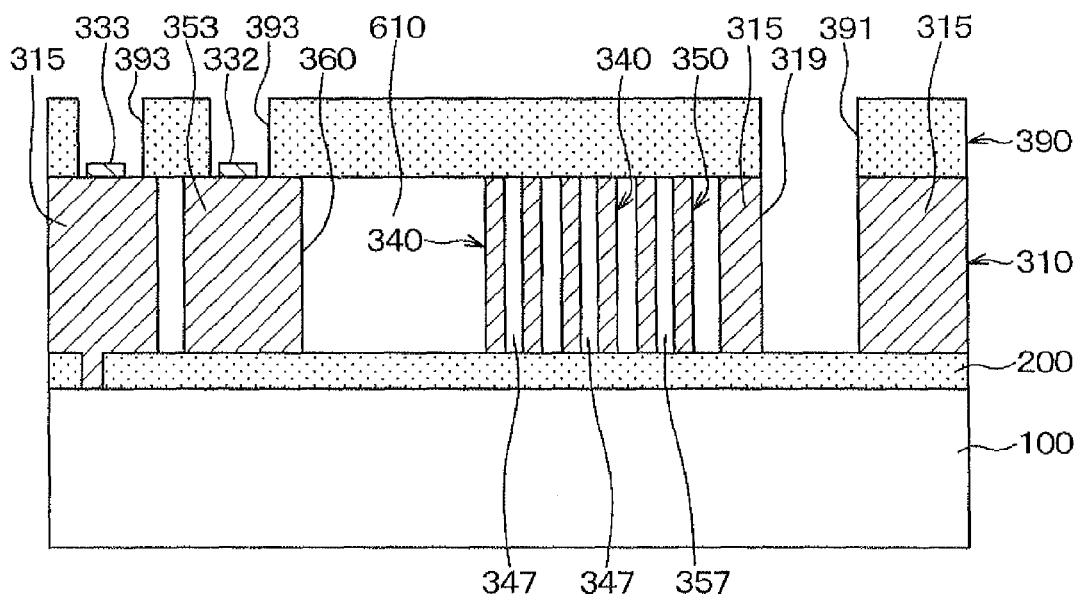

Then, in the process shown in FIG. 83B, the insulating cover layer 390 is bonded in vacuum directly to the first semiconductor layer 310 at a normal temperature, whereby the hollow portions 347, 357 of the respective electrodes 301, 302 are sealed in vacuum. Further, the space portion 610 different from the hollow portions 347, 357 of the respective electrodes 301, 302 is formed between the insulating layer 200 and the insulating cover layer 390.

Figure 83C:
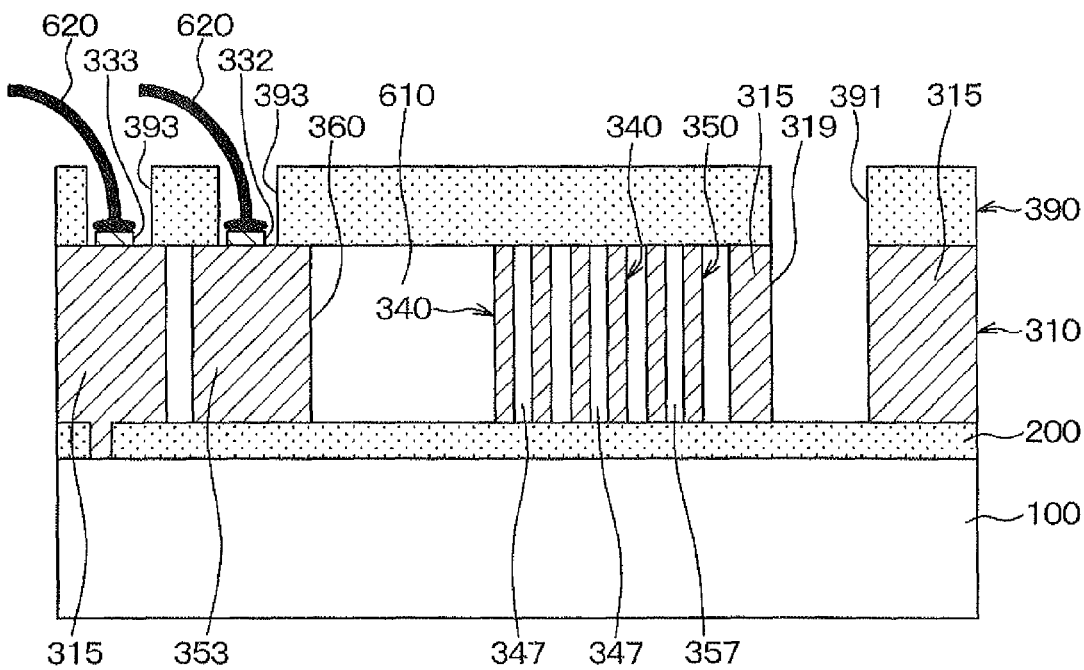

Thereafter, the wafer is divided into the respective physical quantity detection devices, and as shown in FIG. 83C, bonding wires 620 made of Au, Al, or the like are bonded to the respective pads 331 to 333. In this way, the external circuit is electrically connected to the physical quantity detection device and the physical quantity detection device is operated.

As described above, by using the insulating substrate as the insulating cover layer 390, it is also possible to freely design the width of the trench 360 formed in the first semiconductor layer 310.

23rd Embodiment

In this embodiment, parts different from the 1st to 22nd embodiment will be described. This embodiment is characterized by a construction in which both of acceleration and pressure can be detected as physical quantities by the use of the above-mentioned electrodes 301, 302.

Figure 84:
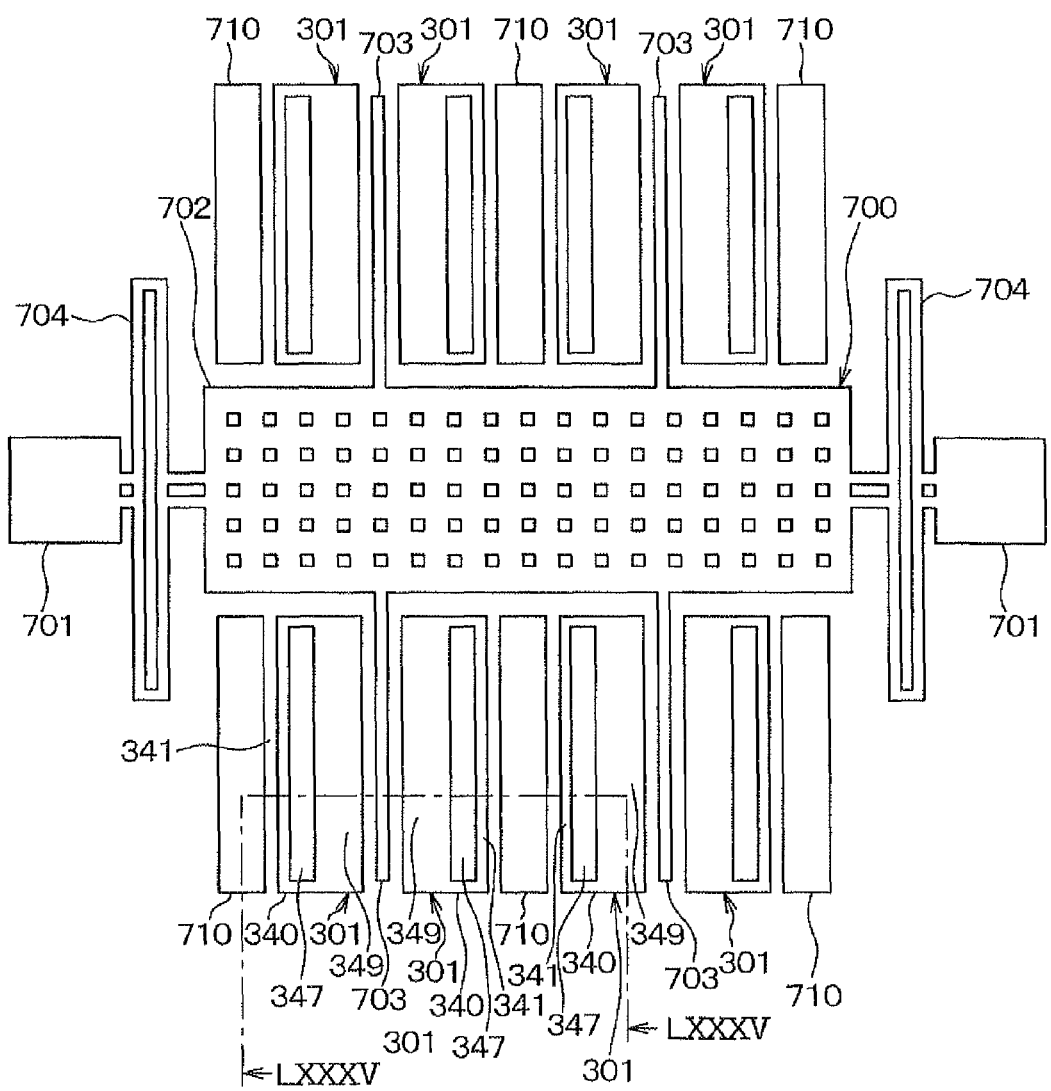
FIG. 84 is a plan view of a physical quantity detection device according to a 23rd embodiment.

FIG. 84 is a plan view of a physical quantity detection device according to this embodiment. Further, FIG. 85 is a section view taken on a line M-M' in FIG. 84.

Figure 85:
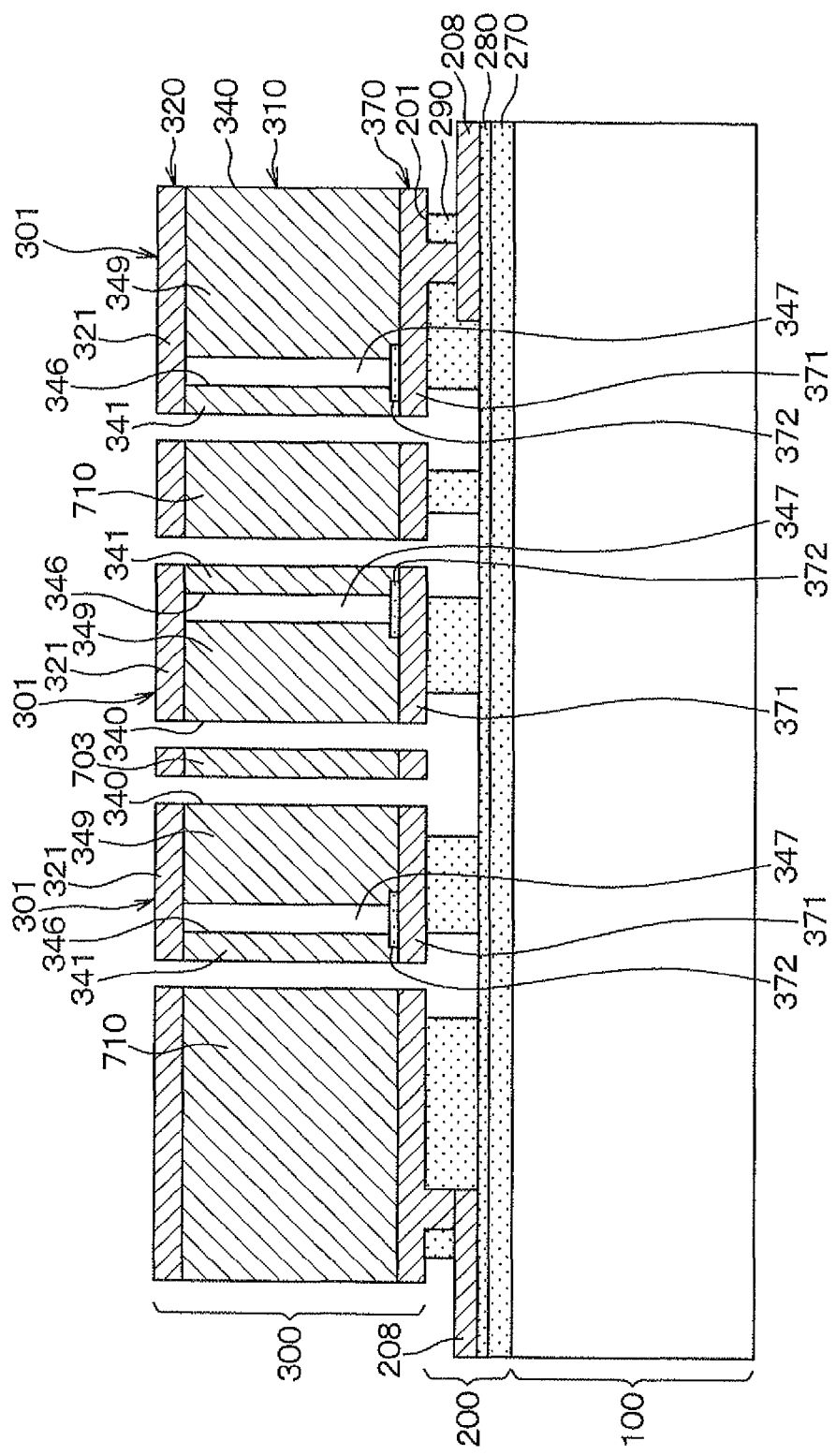
FIG. 85 is a section view taken on a line LXXXV-LXXXV in FIG. 84.

As shown in FIG. 85, the electrode layer 300 is constructed of the first to third semiconductor layers 310, 320, 370. Further, the insulating layer 200 is constructed of sixth to eighth insulating layers 270, 280, 290.

As shown in FIG. 84, the electrode layer 300 has a movable electrode 700, fixed electrodes 710, and movable electrodes 301. The movable electrode 301 corresponds to the first electrode 301 shown in the respective embodiments described above.

The movable electrode 700 is constructed of anchor parts 701, a weight part 702, movable electrodes 703, and beam parts 704. The anchor parts 701 support the weigh part 702 in a floating state with respect to a support substrate and are formed at two positions on the insulating layer 200. Further, the weight part 702 functions as a weight for moving the movable electrodes 703 with respect to the receptive anchors 701 when acceleration is applied to the physical quantity detection device. The movable electrodes 703 are provided in such a way as to extend vertically to the longitudinal direction of the weight part 702, and are plurally arranged in the shape of a comb.

The beam parts 704 connect the anchor parts 701 to the weight part 702. This beam part 704 is formed in the shape of a rectangular frame having two parallel beams coupled at their ends and has a spring function of being displaced in a direction perpendicular to the longitudinal direction of the two beams. The weight part 702 is coupled to and supported by the anchor parts 701 by these beam parts 704. In this embodiment, two beam parts 704 couple the anchor parts 701 to the weight part 702, respectively.

The eighth insulating layer 290 under the beam parts 704, the weight part 702, and the movable electrodes 703 are partially removed, whereby the beam parts 704, the weight part 702, and the movable electrodes 703 are brought into a state in which they are floated at specified intervals over the seventh insulating layer 280.

The fixed electrodes 710 are arranged between the movable electrodes 703 provided in the shape of a comb and are provided in a manner extending along the movable electrodes 703.

Each of the movable electrodes 301 has the wall part 340, which includes the diaphragm 341 and a fixed part 349 arranged opposite to the diaphragm 341 and is formed in the shape of a hollow cylinder, and the cover part 321, which closes an opening portion 346, which is positioned on the opposite side of the insulating layer 200 side, of this wall part 340. That is, the movable electrode 301 corresponds to a part in which the diaphragm 342 of the first electrode 301 shown the respective embodiments is formed in a thickness larger than the diaphragm 341 and is made the fixed part 349.

Further, as shown in FIG. 85, each of the movable electrodes 301 has the same structure as the respective electrodes 301, 302 shown in the 5th embodiment. That is, the wall part 340 is closed by the cover part 321 and the bottom part 371, whereby the hollow portion 347 of the wall part 340 is set, for example, vacuum. The insulating film 372 of the etching stopper layer is left on the bottom part 371.

Further, each of the movable electrodes 301 is arranged between each of the movable electrodes 703 and each of the fixed electrodes 710. Still further, the diaphragm 341 of the movable electrode 301 and the fixed electrode 710 are arranged opposite to each other, and the fixed part 349 of the movable electrode 301 and the movable electrode 703 are arranged opposite to each other.

The insulating layer 200 has a wiring pattern 208 formed therein, the wiring pattern 208 being connected to the anchor parts 701, the fixed electrodes 710, and the movable electrodes 301. In this way, these parts are electrically connected to the external circuit via the wiring pattern 208.

Figure 86:
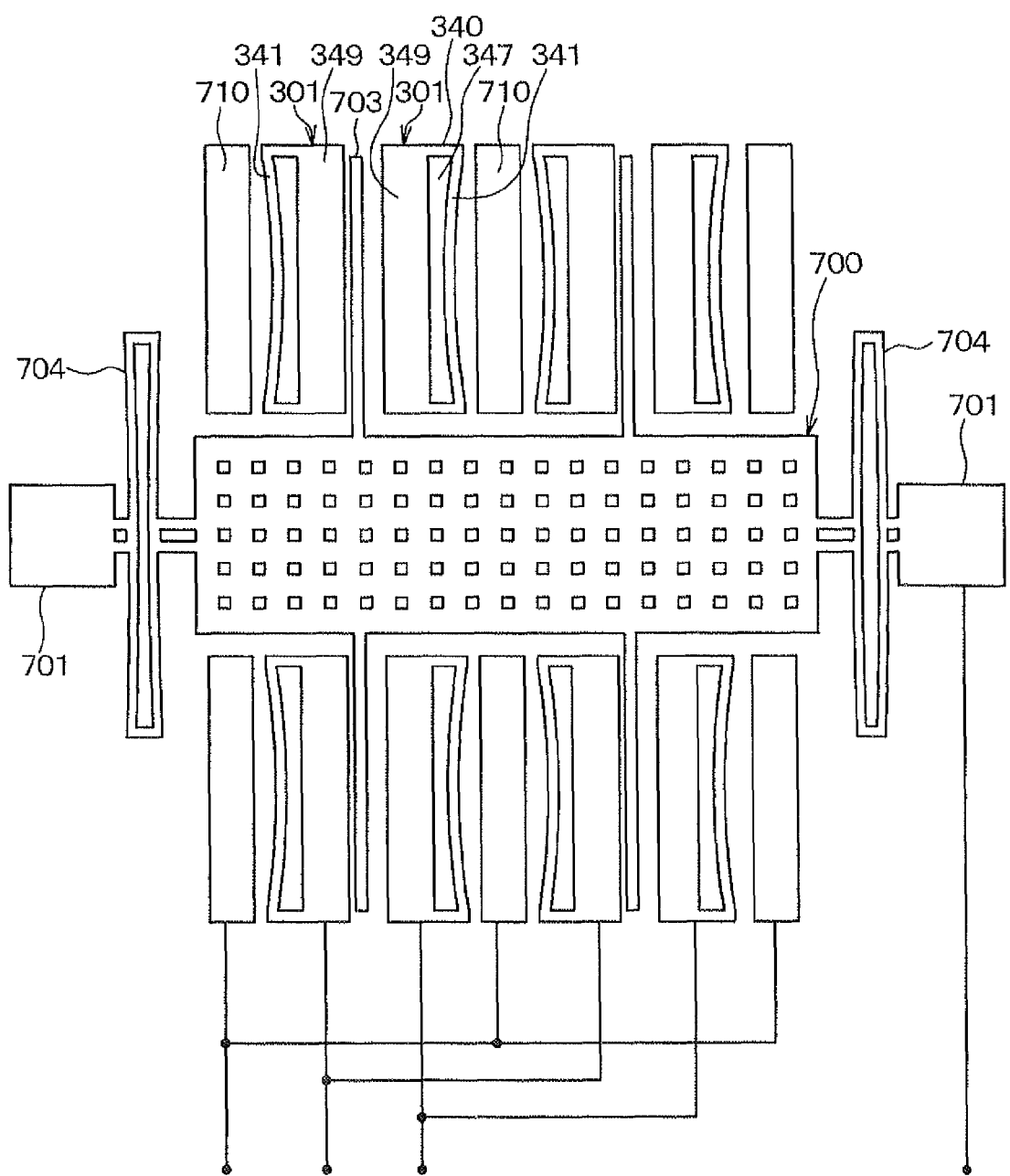
FIG. 86 is a schematic view of taking out the potentials of the respective parts in the physical quantity detection device according to the 23rd embodiment.

When pressure is applied to the diaphragms 341 of the respective movable electrodes 301, as shown in FIG. 86, the diaphragms 341 are deformed. That is, the diaphragm 341 is deformed in response to the pressure difference between the hollow portion 347 of the movable electrode 301 and the outside of the hollow portion 347, so that the pressure is detected on the basis of a capacitance between the movable electrode 301 and the fixed electrode 710, the capacitance being varied in response to the deformation of the diaphragm 341.

On the other hand, when acceleration is applied to the movable electrode 703 in a plane direction of the one surface 201 of the insulating layer 200, a distance between the movable electrode 703 and the fixed part 349 is varied, and the acceleration is detected on the basis of a capacitance between the movable electrode 703 and the fixed part 349, the capacitance being varied in response to a varied distance.

In the case of detecting the pressure and the acceleration in this way, actually, as shown in FIG. 86, three terminals of the fixed electrode 710, the diaphragm 341 of the movable electrode 301, and the fixed part 349 of the movable electrode 301 are switched, whereby the outputs of them are acquired.

As described above, when the fixed part 349 of the movable electrode 301 is used as the fixed electrode 710 for detecting the acceleration and the diaphragm 341 is used as an electrode for detecting the pressure, the pressure and the acceleration (or angular velocity) can be detected as the physical quantities.

24th Embodiment

In this embodiment, parts different from the 23rd embodiment will be described. In the 23rd embodiment, the movable part 700 is constructed of the weight parts 702 and the movable electrodes 703 formed in the shape of a comb, but in this embodiment, the movable part 700 is constructed of only the movable electrode 703.

Figure 87:
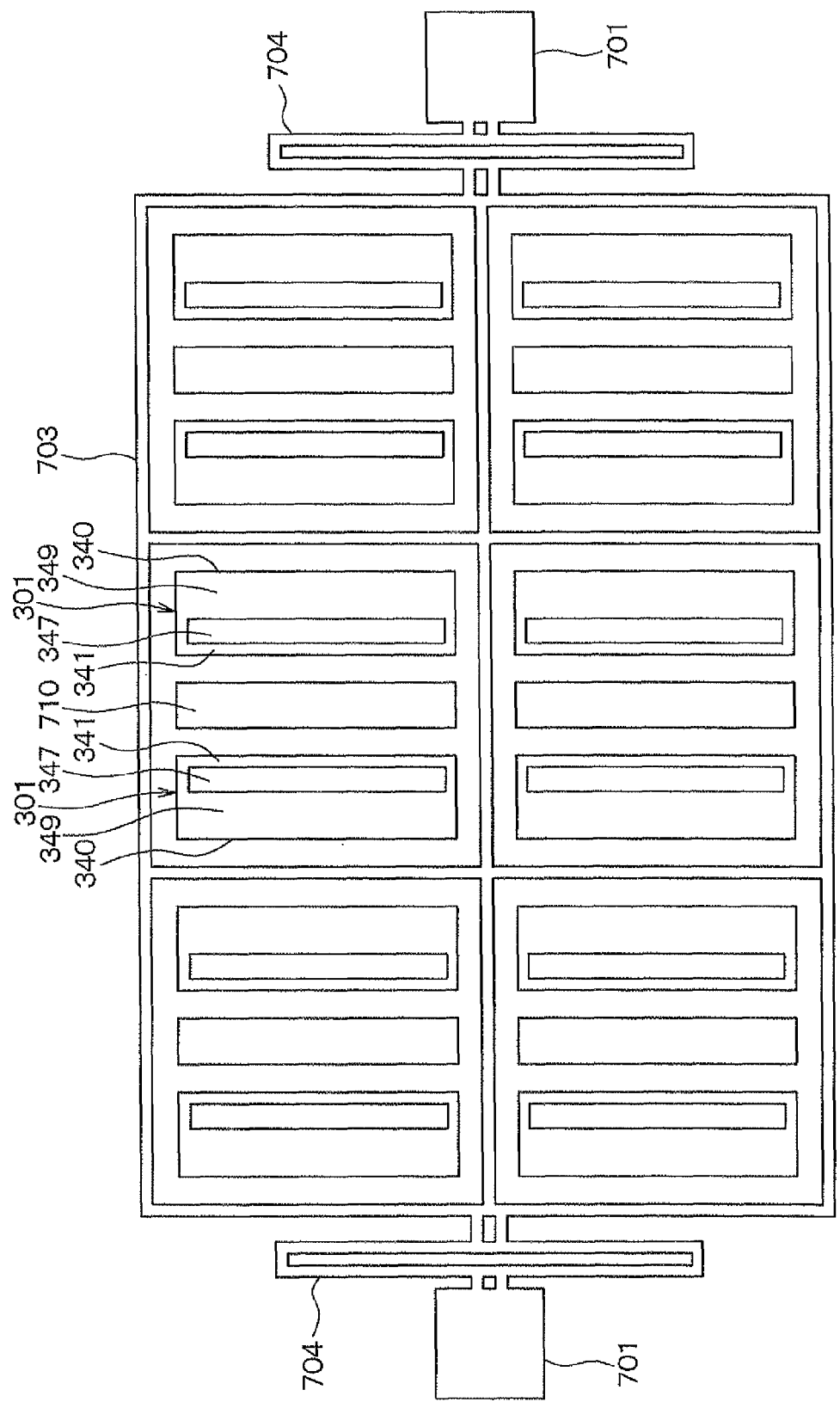
FIG. 87 is a plan view of a physical quantity detection device according to a 24th embodiment.

FIG. 87 is a plan view of a physical quantity detection device according to this embodiment. As shown in this drawing, the movable electrode 703 is formed in the shape of a frame in such a way that when acceleration is applied to the physical quantity detection device, the movable electrode 703 functions as a weight displaced with respect to the respective anchors 701 and functions as an electrode.

In this embodiment, as shown in FIG. 87, a region in one square frame is divided by straight portions in such a way that six regions are formed in the one square frame. Each of the regions has the fixed electrode 710 and the movable electrodes 301 arranged therein. In this way, a portion of the movable electrode 703 and the fixed part 349 of the movable electrode 301 are arranged in parallel in the longitudinal direction of the beam part 704 and opposite to each other, and the fixed electrode 710 sandwiched between the two movable electrodes 301 is arranged opposite to the diaphragms 341 of the respective movable electrodes 301.

Hence, when the movable electrode 703 has acceleration applied thereto and is displaced in a direction in which the respective anchor parts 701 are arranged (that is, a direction perpendicular to the longitudinal direction of the beam part 704), a distance between a straight portion extended in the longitudinal direction of the beam part 704 of the movable electrode 703 and the fixed part 349 is varied, so that the acceleration can be detected. Further, of the movable electrode 703, a part extended in a direction perpendicular to the longitudinal direction of the beam part 704 functions as a weight.

As described above, the structure of the movable electrode 703 can be formed also in the shape of a frame. In this case, the measurement and detection of the physical quantity is performed in a time division manner.

25th Embodiment

In this embodiment, parts different from the 1st to 24th embodiments will be described. In the above-mentioned respective embodiments, the respective diaphragms 341, 342, 351, 352 are formed in a direction vertical to the one surface 201 of the insulating layer 200. However, this embodiment is characterized in that the respective diaphragms 341, 342, 351, 352 are formed obliquely to the one surface 201 of the insulating layer 200. In this embodiment, the structure shown in 17th embodiment will be described as an example.

Figure 88:
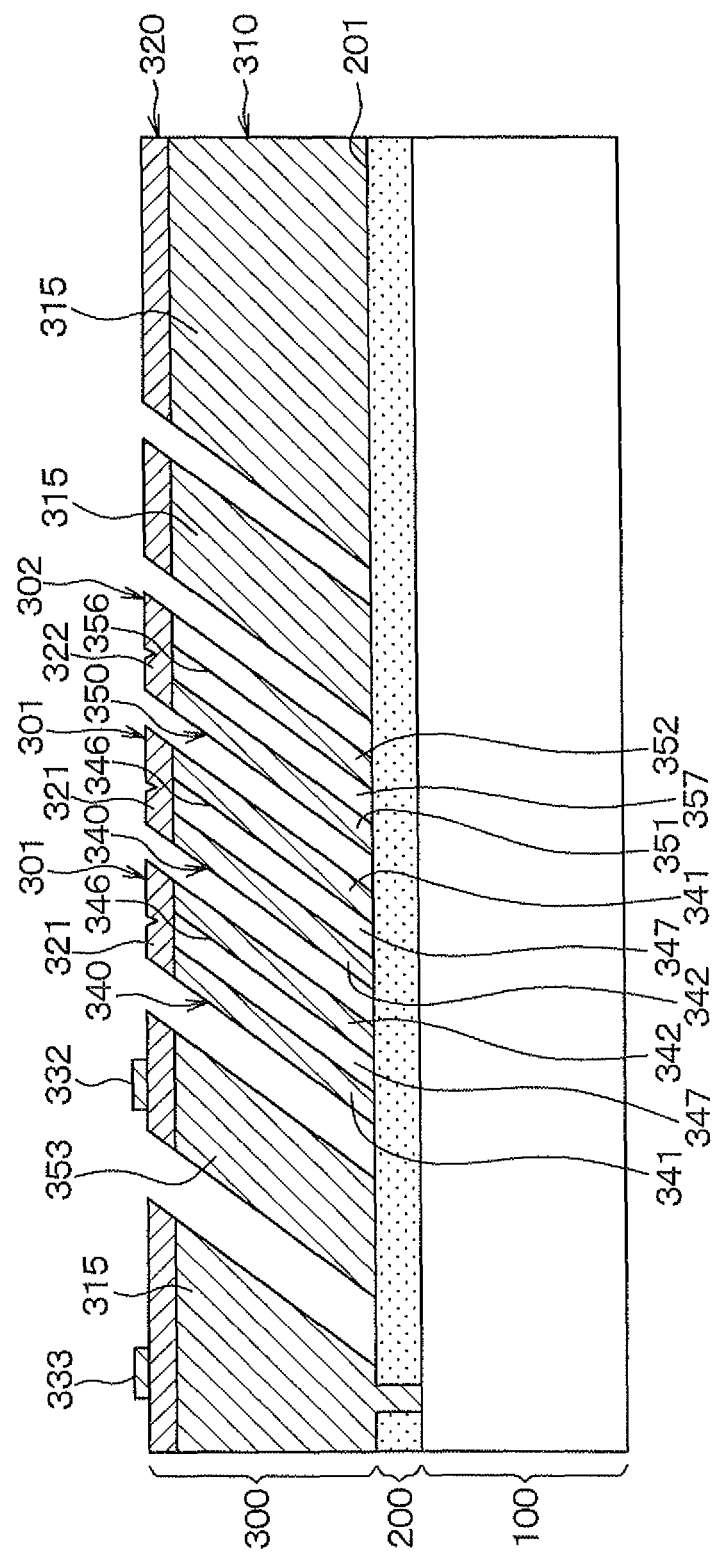
FIG. 88 is a section view of a physical quantity detection device according to a 25th embodiment.

FIG. 88 is a section view of a physical quantity detection device according to this embodiment, and is a section view corresponding to, for example, the section view taken on a line I-I' in FIG. 68. As shown in FIG. 88, the diaphragms 341, 342 of the first wall part 340 and the diaphragms 351, 352 of the second wall part 350 are formed obliquely to the one surface 201 of the insulating layer 200.

According to this structure, even if the thickness of the first semiconductor layer 310 is not increased, the area of each of the diaphragms 341, 342, 351, 352 can be increased. Hence, an output to the physical quantity detection device shown in the respective embodiments can be increased.

Figure 89A:
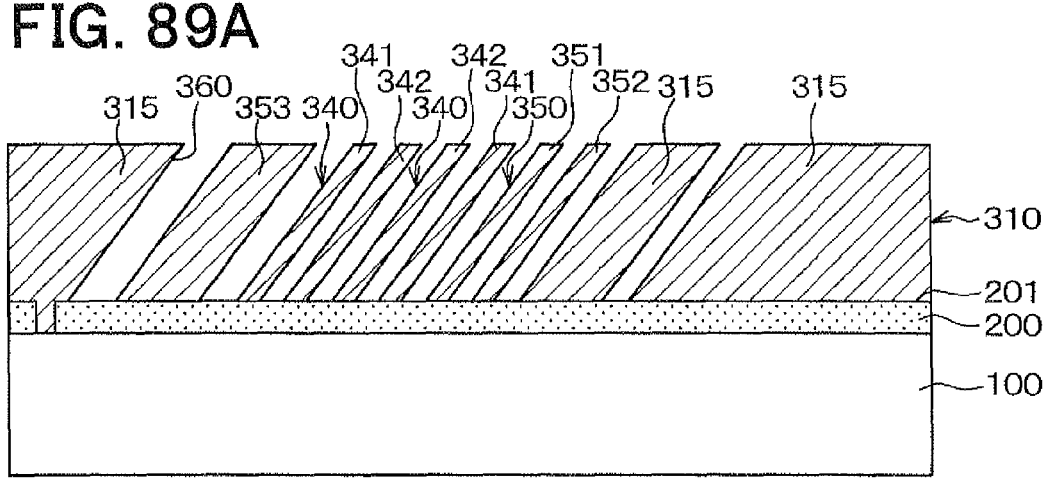
FIGS. 89A, 89B, and 89C are views to show the steps of a process of manufacturing the physical quantity detection device according to the 25th embodiment.

Next, a method for manufacturing a physical quantity detection device shown in FIG. 88 will be described with reference to FIGS. 89A, 89B, 89C. Also in this embodiment, the physical quantity detection device is manufactured in the state of a wafer.

First, the processes shown in FIG. 70A and FIG. 70B are performed to form a polysilicon layer as the first semiconductor layer 310 over the insulating layer 200.

Subsequently, in the process shown in FIG. 89A, a resist (not shown) is formed over the first semiconductor layer 310 and then is patterned to form the trenches 360 by using this resist as a mask. Here, a $ClF_3$ (chlorine trifluoride) gas is introduced into a manufacturing chamber and is expanded rapidly and adiabatically, thereby being clustered. The clustered $ClF_3$ gas is made to collide with the first semiconductor layer 310. In this way, the first semiconductor layer 310 is subjected to oblique etching. As described above, in order to make the respective diaphragms 341, 342, 351, 352 oblique to the one surface 201 of the insulating layer 200, the wafer is arranged obliquely to a direction in which the $ClF_3$ gas is introduced and the first semiconductor layer 310 is obliquely etched by the $ClF_3$ gas. In this way, the respective wall parts 340, 350 oblique to the one surface 201 of the insulating layer 200 can be formed. After the trenches 360 are formed, the resist is removed.

Figure 89B:
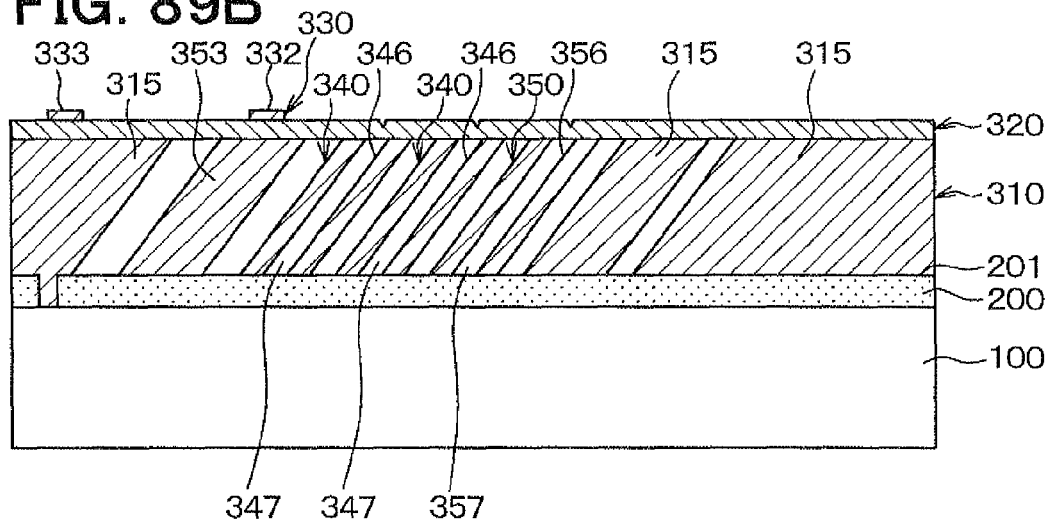

In the process shown in FIG. 89B, for example, as in the case of the process shown in FIG. 71A, the second semiconductor layer 320 is formed over the first semiconductor layer 310. Further, the metal layer 330 is formed over the second semiconductor layer 320 and is patterned into the respective pads 331 to 333.

Figure 89C:
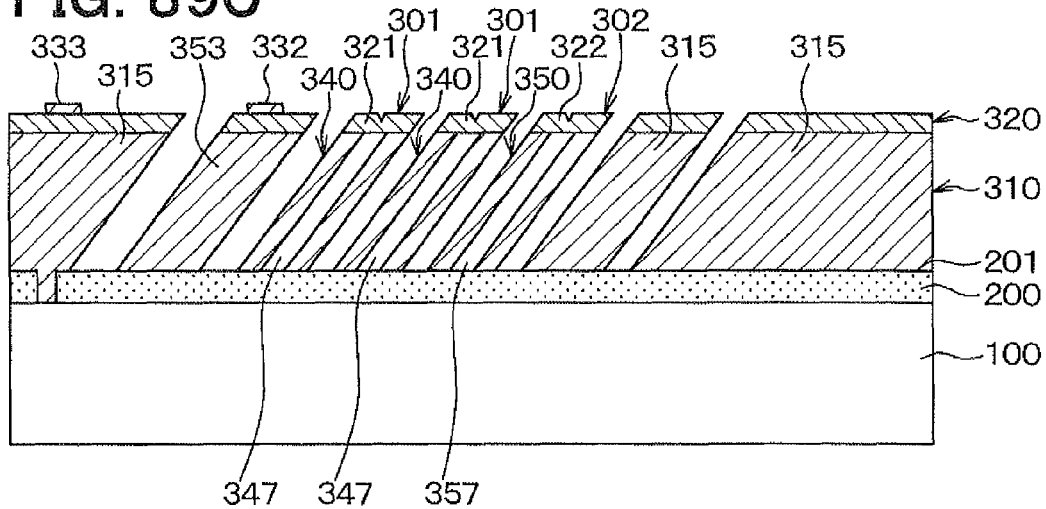

In the process shown in FIG. 89C, for example, as in the case of the process shown in FIG. 71B, the second semiconductor layer 320 is etched obliquely in such a way that parts to be made the respective cover parts 321, 322 of the second semiconductor layer 320 are left. The etching of forming the cover parts 321, 322 may be performed not by oblique etching but by usual etching because the thicknesses of the cover parts 321, 322 are thin. Thereafter, the wafer is divided into the respective physical quantity detection devices. In this way, the physical quantity detection device shown in FIG. 88 is completed.

As described above, the respective diaphragms 341, 342, 351, 352 formed in the first semiconductor layer 310 can be also formed obliquely to the one surface 201 of the insulating layer 200. The structure in which the respective diaphragms 341, 342, 351, 352 formed in the first semiconductor layer 310 are obliquely formed can be applied to the respective embodiments as appropriate.

Other Embodiments

The structures and constructions shown in the respective embodiments are examples and the constituent elements shown in the respective embodiments can be appropriately combined with each other to the utmost extent.

In the respective embodiments described above, the diaphragms 341, 342, 351, 352 of the respective electrodes 301, 302 are formed in the same thickness, but the diaphragms which are not arranged opposite to the opposing electrodes may be formed in a larger thickness. That is, of the diaphragms 341, 342 of the first wall part 340, the diaphragm 342 on the opposite side of the diaphragm 341 arranged opposite to the diaphragm 351 of the second wall part 350 may be formed in a thickness larger than the diaphragm 341 arranged opposite to the diaphragm 351 of the second wall part 350. Similarly, of the diaphragms 351, 352 of the second wall part 350, the diaphragm 352 on the opposite side of the diaphragm 351 arranged opposite to the diaphragm 341 of the first wall part 340 may be formed in a thickness larger than the diaphragm 351 arranged opposite to the diaphragm 341 of the first wall part 340. Further, when the thickness of a diaphragm deformed by the pressure is changed, the diaphragm can be made a diaphragm suitable for measuring, for example, a low pressure or a high pressure.

Figure 90:
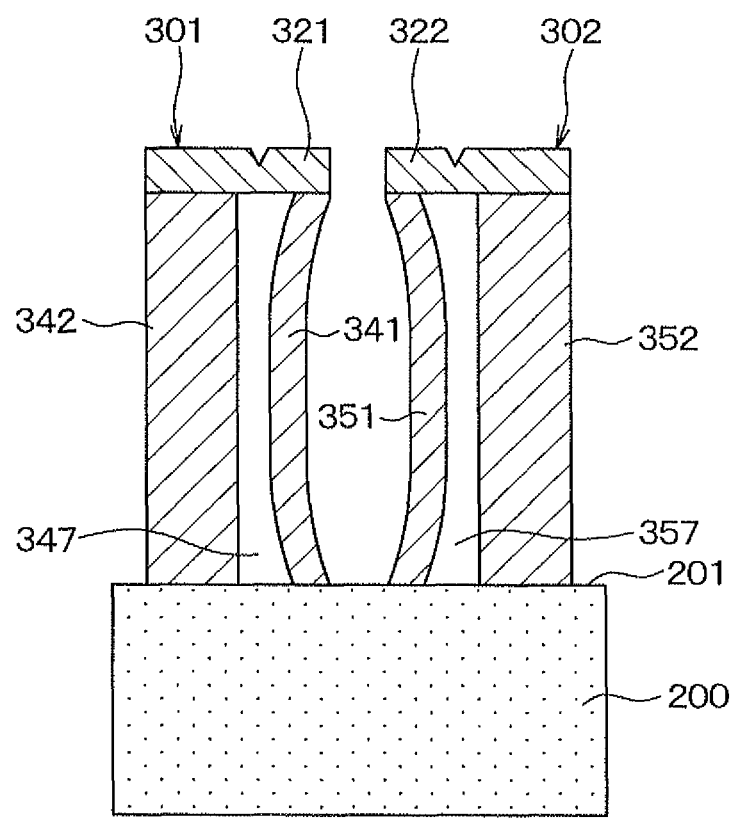
FIG. 90 is a section view in which the diaphragms which are not arranged opposite to each other are made thick in the other embodiment.

In this way, when the thickness of the diaphragm 342 of the first electrode 301 and the thickness of the diaphragm 352 of the second electrode 302 are made larger, as shown in FIG. 90, the diaphragm 341 of the first electrode 301 and the diaphragm 351 of the second electrode 302 are deformed along the plane direction of the one surface 201 of the insulating layer 200, respectively. According to this structure, the respective wall part 340, 350 can be reliably fixed to the insulating layer 200 by the diaphragms 342, 352, so that the respective electrodes 301, 302 can be made stable on the insulating layer 200.

In FIG. 90, there is shown a structure in which the respective cover parts 321, 322 are formed of the second semiconductor layer 320, but this structure can be applied also to a structure in which the respective cover parts 321, 322 are formed of the insulating cover layer 390 or the like.

Further, the shapes of the respective diaphragms 341, 342, 351, 352 are not limited to those shown in the respective embodiments, but can be other shapes. FIGS. 91A to 91E are plan views to show variations of the shape of the diaphragm and show examples in which the diaphragm 341 of the first electrode 301 and the diaphragm 351 of the second electrode 302 are coupled by the first insulating wall part 305 and the second insulating wall part 306.

In the shape shown in FIG. 91A, of the diaphragms 341, 342, regions except for portions coupled to the first insulating wall part 305 and the second insulating wall part 306 are made thicker than the portions coupled, respectively. In this case, of the diaphragm 341 of the first electrode 301, a surface on the opposite side of a surface opposite to the diaphragm 351 of the second electrode 302 is protruded outward, whereby the diaphragm 341 is made thicker. This is ditto for the diaphragm 351 of the second electrode 302. In this way, the portions coupled are bent in response to the pressure applied to the respective electrodes 301, 302, but the opposite surfaces of the respective diaphragms 341, 351 can be held parallel, so that the accuracy of detection of the capacitance can be improved.

In the shape shown in FIG. 91B, contrarily to the shape shown in FIG. 91A, of the diaphragm 341 of the first electrode 301, a surface opposite to the diaphragm 351 of the second electrode 302 is protruded to the second electrode 302 side, whereby the diaphragm 341 is made thicker. This is ditto for the diaphragm 351 of the second electrode 302. Even in this shape, the respective diaphragms 341, 351 can be held parallel to each other.

In the shape shown in FIG. 91C, the diaphragm 341 of the first electrode 301 is the same as the shape shown in FIG. 91A, whereas the diaphragm 351 of the second electrode 302 is formed in a larger thickness. In this way, only the diaphragm 341 of the first electrode 301 is deformed and the diaphragm 351 of the second electrode 302 is not deformed because it is thick, so that the respective diaphragms 341, 351 can be held parallel to each other.

In the shape shown in FIG. 91D, in each of the diaphragms 341, 351 of the respective electrodes 301, 302, a section in a direction parallel to the one surface 201 of the insulating layer 200 is formed in the shape of a letter H. In this way, of the respective diaphragms 341, 352, parts coupled to the respective insulating wall parts 340, 350 are bent, but parts positioned between the respective electrodes 301, 302 can be held parallel to each other.

In the shape shown in FIG. 91E, the respective diaphragms 341, 351 have their opposite surfaces formed in the shape of a comb, and the portions, which are formed in the shape of a comb, of the respective diaphragms 341, 351 are opposite to each other. In this way, when the respective diaphragms 341, 351 are deformed, the areas of the portions formed in the shape of a comb are greatly varied. For this reason, a variation in the capacitance can be detected with high accuracy.

Of course, varied shapes of the respective diaphragms 341, 351 shown in FIGS. 91A to 91E can be applied also to the first electrode 301 constructed of the diaphragms 341, 342 arranged opposite to each other and the second electrode 302 constructed of the diaphragms 351, 352 arranged opposite to each other, as shown in FIG. 1. Hence, varied shapes of the respective diaphragms 341, 351 shown in FIGS. 91A to 91E can be applied appropriately to the respective electrodes 301, 302 shown in the respective embodiments.

Figure 92:
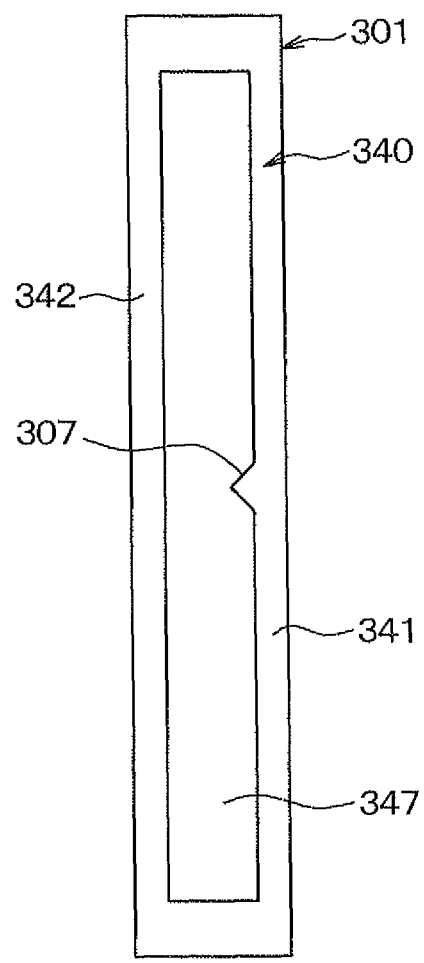
FIG. 92 is a plan view in which a diaphragm is provided with a protruding portion in the other embodiment.

Further, FIG. 92 is a plan view of the first electrode 301 (first wall part 340). As shown in this drawing, in the first wall part 340, of the diaphragms 341, 342 constructing the hollow portion 347 and arranged opposite to each other, one diaphragm 341 has a protruding portion 307 formed on a wall surface thereof. Here, the wall surface of the diaphragm 341 is a surface opposite to the diaphragm 342. Since the diaphragm 341 has the protruding portion 307 formed on the wall surface, the protruding portion 307 can prevent the diaphragms 341, 342 from being brought into contact with each other. The protruding portion 307 can be similarly formed also on the diaphragms 351, 352 constructing the second electrode 302.

In the respective embodiments, the insulating layer 200 is formed over the semiconductor substrate 100 and the respective electrodes 301, 302 are formed over this insulating layer 200. However, when at least the respective electrodes 301, 302 are formed over the insulating layer 200, the physical quantity detection device can be completed, so that the semiconductor substrate 100 does not always need to be provided.

The above disclosure has the following aspects.

According to a first aspect of the present disclosure, a physical quantity detection device includes: an insulating layer; a semiconductor layer disposed on a surface of the insulating layer; and a first electrode and a second electrode for detecting a physical quantity disposed in the semiconductor layer. The first electrode has a first wall part disposed in the semiconductor layer and protruding along with a direction crossing the surface of the insulating layer. The second electrode has a second wall part disposed in the semiconductor layer and protruding along with a direction crossing the surface of the insulating layer. At least one of the first wall part and the second wall part includes a pair of diaphragms and a cover part. The pair of diaphragms faces each other so that a hollow cylinder having an opening opposite to the insulating layer is provided. The cover part covers the opening of the hollow cylinder. One of the pair of diaphragms faces the other one of the first wall part and the second wall part or one of a pair of diaphragms in the other one of the first wall part and the second wall part. The hollow cylinder provides a hollow portion having a predetermined reference pressure. A distance between the one of the pair of diaphragms and the other one of the first wall part and the second wall part or a distance between the one of the pair of diaphragms and the one of the pair of diaphragms in the other one of the first wall part and the second wall part is changed in accordance with pressure difference between the predetermined reference pressure and a pressure of an outside of the hollow portion when a physical quantity is applied to the pair of diaphragms. The physical quantity is detected based on a capacitance between the first electrode and the second electrode, the capacitance being varied with the distance.

According to the above device, in the first electrode and the second electrode, the respective wall parts formed in the semiconductor layer are independent of each other over the insulating layer and are electrically separated from each other, so that the respective wall parts do not need a semiconductor region for making the respective wall parts function as respective electrodes. For this reason, a PN junction part is not formed in the respective wall parts, which can prevent capacitance detection characteristics from being made unstable by this PN junction part. Hence, the capacitance detection characteristics can be held very stable for the temperature of the physical quantity detection device and disturbance such as the outside atmosphere.

Alternatively, the pair of diaphragms may protrude along with the direction perpendicular to the surface of the insulating layer.

Alternatively, the pair of diaphragms may protrude along with the direction obliquely to the surface of the insulating layer. According to this case, in comparison with a case in which the diaphragms are formed in a direction vertical to the one surface of the insulating layer, the areas of the diaphragms can be made larger while the first semiconductor layer is held constant in thickness. For this reason, the accuracy of detection of a variation in the capacitance can be increased.

Alternatively, the cover part may be made of a same semiconductor material as the semiconductor layer. According to this case, the wall part and the cover part are formed of the same semiconductor material, so that the property of the whole of the first electrode and the second electrode can be made stable.

Alternatively, the one of the first electrode and the second electrode may further include a bottom part, which is disposed on the insulating layer so that an end of the hollow cylinder opposite to the cover part is covered with the bottom part. The bottom part is made of a same material as the semiconductor layer. According to this case, the entire hollow portion of the wall part formed in a shape of a hollow cylinder is surrounded by the same semiconductor material, so that the reliability of the hollow portion can be enhanced.

Alternatively, the one of the pair of diaphragms in the one of the first wall part and the second wall part may have a thickness, which is smaller than the other one of the pair of diaphragms in the one of the first wall part and the second wall part. According to this case, it is possible that when a physical quantity is applied to the diaphragms, only the diaphragm arranged opposite to the other wall part is deformed.

Alternatively, the semiconductor layer may further include a first support part and a second support part, which are disposed over the insulating layer. The first electrode is supported by the first support part so that the first electrode is spaced apart from the insulating layer, and the second electrode is supported by the second support part so that the second electrode is spaced apart from the insulating layer. According to this case, the first electrode and the second electrode are not brought in contact with the insulating layer but are separated from the insulating layer. Hence, the effect of a parasitic capacitance formed by the contact of the first electrode and the insulating layer can be reduced, and the effect of a parasitic capacitance formed by the contact of the second electrode and the insulating layer can be reduced. Further, the effect of a stress which each of the first electrode and the second electrode receives from a peripheral part thereof can be reduced.

Alternatively, the physical quantity detection device may further include: a cap having a concavity portion, which is concaved from a surface of the cap facing the semiconductor layer. The semiconductor layer has a peripheral part, which surrounds the first electrode and the second electrode. A periphery of the cap around the concavity portion is bonded to the peripheral part of the semiconductor layer so that a space portion is provided by the concavity portion, the peripheral part and the insulating layer. The first electrode and the second electrode are arranged in the space portion. According to this case, a physical quantity can be detected in response to a pressure difference between the space portion and the hollow portions of the respective electrodes. Further, the respective electrodes can be protected by the cap.

Alternatively, the insulating layer may include a through hole, and the peripheral part includes another through hole, which is connected to the through hole in the insulating layer so that the space portion communicates with an outside of the space portion. The physical quantity is detected based on pressure difference between the space portion and the hollow portion of the one of the first wall part and the second wall part.

Further, the space portion may be hermetically sealed by the cap. The insulating layer has a through hole, which couples between the hollow portion and an outside of the hollow portion so that the hollow portion is connected to an outside of the hollow portion, and the physical quantity is detected based on pressure difference between the space portion and the hollow portion.

Alternatively, the cap may further include a through hole for connecting between the space portion and an outside of the space portion. The insulating layer further includes another through hole for connecting between the hollow portion and an outside of the hollow portion, and the physical quantity is detected based on pressure difference between the space portion and the hollow portion. According to this case, the physical quantity detection device can be used as a microphone. In this case, when a voice is inputted into the space portion from the cap side, the vibration of air is transmitted to the diaphragms of the electrode, which is formed in a shape of a hollow cylinder, of the respective electrodes and hence can be detected.

Alternatively, at least one of the pair of diaphragms in the one of the first wall part and the second wall part may have a wall surface facing an inside of the hollow portion. The wall surface includes a protruding portion thereon. According to this case, the protruding portion can prevent the diaphragms, which are arranged opposite to each other in the wall part formed in a shape of a the hollow cylinder, from being brought into contact with each other.

According to a second aspect of the present disclosure, a physical quantity detection device includes: an insulating layer; a semiconductor layer disposed on a surface of the insulating layer; a first electrode and a second electrode for detecting a physical quantity disposed in the semiconductor layer; a first insulating wall part and a second insulating wall part; and a cover part made of insulating material. The first electrode has a first diaphragm in the semiconductor layer, which extends vertically to the surface of the insulating layer. The second electrode has a second diaphragm in the semiconductor layer, which extends vertically to the surface of the insulating layer. The first diaphragm and the second diaphragm face each other. One end of the first diaphragm and a corresponding end of the second diaphragm are coupled with each other via the first insulating wall part. The other end of the first diaphragm and a corresponding end of the second diaphragm are coupled with each other via the second insulating wall part. The first insulating wall part and the second insulating wall part face each other. The first diaphragm, the second diaphragm, the first insulating wall part and the second insulating wall part provide a wall part having a hollow cylinder with an opening opposite to the insulating layer. The cover part covers the opening of the wall part. When a physical quantity is applied to the first electrode and the second electrode, the first diaphragm and the second diaphragm are deformed according to pressure difference between a hollow portion of the wall part and an outside of the hollow portion. The physical quantity is detected on the basis of a capacitance between the first electrode and the second electrode, which is varied with deformation of the first diaphragm and the second diaphragm.

According to the above device, the diaphragm of the first electrode and the diaphragm of the second electrode are independent of each other and electrically separated from each other over the insulting layer, so that the respective diaphragms do not need a semiconductor region for making the respective diaphragms function as the electrodes. For this reason, a PN junction part is not formed in the respective electrodes, which can prevent capacitance detection characteristics from being made unstable by this PN junction part. Hence, the capacitance detection characteristics can be held very stable for the temperature of the physical quantity detection device and disturbance such as the outside atmosphere. Further, each of the electrodes is constructed of one of the diaphragms, so that the electrode can be reduced in size in a plane direction of the one surface of the insulating layer.

Alternatively, the physical quantity detection device may further include: a cap having a concavity portion, which is concaved from a surface of the cap facing the semiconductor layer. The semiconductor layer has a peripheral part surrounding the first electrode and the second electrode. A periphery of the cap around the concavity portion is bonded to the peripheral part of the semiconductor layer so that a space portion is provided by the concavity portion, the peripheral part and the insulating layer. The first electrode and the second electrode are arranged in the space portion. According to this case, a physical quantity can be detected in response to a pressure difference between the space portion and the hollow portion constructed of the respective electrodes. Further, the respective electrodes can be protected by the cap.

Alternatively, the insulating layer may include a through hole, and the peripheral part includes another through hole, which is connected to the through hole in the insulating layer so that the space portion communicates with an outside of the space portion. The physical quantity is detected based on pressure difference between the space portion and the hollow portion of the one of the first wall part and the second wall part. According to this case, an absolute pressure can be detected.

Alternatively, the space portion may be hermetically sealed by the cap. The insulating layer has a through hole, which couples between the hollow portion and an outside of the hollow portion so that the hollow portion is connected to an outside of the hollow portion, and the physical quantity is detected based on pressure difference between the space portion and the hollow portion. According to this case, an absolute pressure can be detected.

Alternatively, the cap may further include a through hole for connecting between the space portion and an outside of the space portion. The insulating layer further includes another through hole for connecting between the hollow portion and an outside of the hollow portion, and the physical quantity is detected based on pressure difference between the space portion and the hollow portion. According to this case, a physical quantity detection device can be used as a microphone. In this case, when a sound is inputted into the space portion from the cap side, the vibration of air is transmitted to the respective diaphragms of the respective electrodes and hence can be detected.

Alternatively, at least one of the first diaphragm and the second diaphragm may have a wall surface facing an inside of the hollow portion. The wall surface includes a protruding portion thereon. According to this case, the protruding portion can prevent the diaphragms, which are arranged opposite to each other in the wall part, from being brought into contact with each other.

Alternatively, the insulating layer may further include a wiring pattern so that the insulating layer provide a stacking structure. The wiring pattern electrically couples between each of the first electrode and the second electrode and an external circuit. According to this case, the wiring parts are formed in the insulating layer different from a layer having the respective electrodes formed therein, so that the layout of the wiring can be made simple.

According to a third aspect of the present disclosure, a physical quantity detection device includes: an insulating layer; a semiconductor layer disposed on a surface of the insulating layer; a first electrode and a second electrode for detecting a physical quantity disposed in the semiconductor layer; and an insulating cover layer. The first electrode extends along with a direction crossing the surface of the insulating layer. The first electrode extends along with a direction crossing the surface of the insulating layer. At least one of the first electrode and the second electrode includes a pair of diaphragms. The pair of diaphragms faces each other so that a hollow cylinder having an opening opposite to the insulating layer is provided. One of the pair of diaphragms faces the other one of the first electrode and the second electrode or one of a pair of diaphragms in the other one of the first electrode and the second electrode. The insulating cover layer is disposed on semiconductor layer, and covers the opening of the hollow cylinder. The insulating layer and the insulating cover layer provide a space portion between the insulating layer and the insulating cover layer. The space portion is independent from a hollow portion of the hollow cylinder. The insulating cover layer has a through hole for connecting the space portion and an outside of the space portion. The hollow portion has a predetermined reference pressure. A distance between the one of the pair of diaphragms and the other one of the first electrode and the second electrode or a distance between the one of the pair of diaphragms and one of a pair of diaphragms in the other one of the first electrode and the second electrode is changed in accordance with pressure difference between the hollow portion and the space portion when a physical quantity is applied to the pair of diaphragms. The physical quantity is detected based on a capacitance between the first electrode and the second electrode, the capacitance being varied with the distance.

According to the above device, the respective electrodes are independent of each other and hence electrically separated from each other between the insulating layer and the insulating cover layer, so that the respective electrodes formed in the semiconductor layer do not need to have a semiconductor region. For this reason, the respective electrodes do not have a PN junction part formed therein, which can prevent capacitance detection characteristics of the respective electrodes from being made unstable by the PN junction part. Hence, the capacitance detection characteristics of can be held very stable for the temperature of the physical quantity detection device and disturbance such as the outside atmosphere.

Alternatively, the pair of diaphragms may extend along with the direction perpendicular to the surface of the insulating layer.

Alternatively, the pair of diaphragms may extend along with the direction obliquely to the surface of the insulating layer. According to this case, even if the thickness of the semiconductor layer is not increased, the areas of the diaphragms can be increased, so that the accuracy of detection of a variation in capacitance can be enhanced.

According to a fourth aspect of the present disclosure, a physical quantity detection device includes: an insulating layer; a semiconductor layer disposed on a surface of the insulating layer; and a variable electrode, a movable electrode and a fixed electrode, which are disposed in the semiconductor layer, for detecting a physical quantity. The variable electrode has a wall part and a cover part. The wall part has a hollow cylinder with a diaphragm and a fixed part. The diaphragm is disposed on the surface of the insulating layer and extending along with a direction perpendicular to the surface of the insulating layer. The fixed part faces the diaphragm. The cover part covers an opening of the wall part, which is opposite to the insulating layer. The diaphragm faces the fixed electrode, and the fixed part faces the movable electrode. The diaphragm is deformable in accordance with pressure difference between a hollow portion of the variable electrode and an outside of the hollow portion. A physical quantity is detected on the basis of a capacitance between the variable electrode and the fixed electrode, the capacitance being varied with deformation of the diaphragm. When another physical quantity is applied to the movable electrode in a planar direction of the surface of the insulating layer, a distance between the movable electrode and the fixed part is varied with the another physical quantity. The another physical quantity is detected on the basis of a capacitance between the movable electrode and the fixed part, the capacitance being varied with the distance between the movable electrode and the fixed part.

According to the above device, pressure, acceleration, or angular velocity can be detected as a physical quantity, respectively. Further, the movable electrode is independent of and electrically separated from the movable electrode and the fixed electrode on the insulating layer, so that the diaphragm and the fixed part do not need to have a semiconductor region for making the diaphragm and the fixed part function as the electrodes. For this reason, a PN junction part is not formed in the diaphragm and the fixed part. Hence, this can prevent capacitance detection characteristics of the diaphragm and the fixed, part from being made unstable by the PN junction part. Therefore, the capacitance detection characteristics can be held very stable for the temperature of the physical quantity detection device and disturbance such as the outside atmosphere.

According to a fifth aspect of the present disclosure, a method of manufacturing a physical quantity detection device includes: forming a semiconductor layer on a surface of an insulating layer so that a stacking structure is provided; forming a trench in the semiconductor layer so that a first wall part and a second wall part are provided, wherein the first wall part extends along with a direction crossing the surface of the insulating layer, and the second wall part extends along with a direction crossing the surface of the insulating layer, wherein at least one of the first wall part and the second wall part includes a pair of diaphragms, wherein the pair of diaphragms faces each other so that a hollow cylinder having an opening opposite to the insulating layer is provided, and wherein one of the pair of diaphragms faces the other one of the first wall part and the second wall part or one of a pair of diaphragms in the other one of the first wall part and the second wall part; and forming a cover part to cover the opening of the hollow cylinder.

According to the above method, in the first electrode and the second electrode, the respective wall parts formed in the semiconductor layer are independent of each other over the insulating layer and are electrically separated from each other, so that the respective wall parts do not need a semiconductor region for making the respective wall parts function as respective electrodes. For this reason, a PN junction part is not formed in the respective wall parts, which can prevent capacitance detection characteristics from being made unstable by this PN junction part. Hence, the capacitance detection characteristics can be held very stable for the temperature of the physical quantity detection device and disturbance such as the outside atmosphere.

According to a sixth aspect of the present disclosure, a method of manufacturing a physical quantity detection device includes: forming a first semiconductor layer on a surface of an insulating layer so that a stacking structure is provided; forming a stopper film on the first semiconductor layer; forming a second semiconductor layer over the first semiconductor layer to cover the stopper film; etching the first semiconductor layer and the second semiconductor layer with using the stopper film as a stopper in order to form a first wall part and a second wall part, wherein the first wall part is disposed over a first bottom part of the first semiconductor layer and extends along with a direction crossing the surface of the insulating layer, wherein the second wall part is disposed over a second bottom part of the first semiconductor layer and extends along with a direction crossing the surface of the insulating layer, wherein the etching of the first semiconductor layer is stopped at the stopper film so that at least one of the first wall part and the second wall part includes a pair of diaphragms, wherein the pair of diaphragms faces each other so that a hollow cylinder having an opening opposite to the insulating layer is provided, and wherein one of the pair of diaphragms faces the other one of the first wall part and the second wall part or one of a pair of diaphragms in the other one of the first wall part and the second wall part; forming a third semiconductor layer over the second semiconductor layer, the third semiconductor layer covering a hollow portion of the hollow cylinder; and etching the third semiconductor layer to form a cover part over the at least one of the first wall part and the second wall part so as to cover the opening of the hollow cylinder.

According to the above method, the diaphragm of the first electrode and the diaphragm of the second electrode are independent of each other and electrically separated from each other over the insulting layer, so that the respective diaphragms do not need a semiconductor region for making the respective diaphragms function as the electrodes. For this reason, a PN junction part is not formed in the respective electrodes, which can prevent capacitance detection characteristics from being made unstable by this PN junction part. Hence, the capacitance detection characteristics can be held very stable for the temperature of the physical quantity detection device and disturbance such as the outside atmosphere. Further, each of the electrodes is constructed of one of the diaphragms, so that the electrode can be reduced in size in a plane direction of the one surface of the insulating layer.

Alternatively, the etching of the first semiconductor layer and the second semiconductor layer may includes: forming a first support part coupled with the first wall part; and forming a second support part coupled with the second wall part. The first support part and the second support part are formed over the insulating layer. The etching of the third semiconductor layer includes: etching a portion of the insulating layer under each of the first bottom part and the second bottom part so as to separate a first electrode and a second electrode from the insulating layer, the first electrode being provided by the first wall part and the second electrode being provided by the second wall part. According to this case, a structure can be manufactured in which the respective electrodes are floated with respect to the one surface of the insulating layer.

Alternatively, the pair of diaphragms may extend along with a direction perpendicular to the surface of the insulating layer.

Alternatively, the pair of diaphragms may extend along with a direction oblique to the surface of the insulating layer.

According to a seventh aspect of the present disclosure, a method of manufacturing a physical quantity detection device includes: forming a semiconductor layer on a surface of an insulating layer so that a stacking structure is provided; forming a pair of first trenches in the semiconductor layer and embedding an insulating material in each first trench to form a first insulating wall part and a second insulating wall part; forming a second trench in the semiconductor layer to form a pair of diaphragms between the first insulating wall part and the second insulating wall part, wherein each diaphragm contacts a corresponding one of the first insulating wall part and the second insulating wall part, faces each other, and extends along with a direction perpendicular to the surface of the insulating layer, and wherein the pair of diaphragms, the first insulating wall part and the second insulating wall part provide a wall part having a hollow cylinder with an opening opposite to the surface of the insulating layer; and forming a cover part made of an insulating material to cover the opening portion of the wall part.

According to the above method, the respective electrodes are independent of each other and hence electrically separated from each other between the insulating layer and the insulating cover layer, so that the respective electrodes formed in the semiconductor layer do not need to have a semiconductor region. For this reason, the respective electrodes do not have a PN junction part formed therein, which can prevent capacitance detection characteristics of the respective electrodes from being made unstable by the PN junction part. Hence, the capacitance detection characteristics of can be held very stable for the temperature of the physical quantity detection device and disturbance such as the outside atmosphere.

According to an eighth aspect of the present disclosure, a method of manufacturing a physical quantity detection device includes: forming a semiconductor layer on a surface of an insulating layer so that a stacking structure is provided; forming a first electrode and a second electrode in the semiconductor layer in such a manner that the first electrode and the second electrode extend along with a direction crossing the surface of the insulating layer, wherein at least one of the first electrode and the second electrode includes a pair of diaphragms, which faces each other and provides a hollow cylinder with an opening opposite to the surface of the insulating layer, wherein one of the pair of diaphragms faces the other one of the first electrode and the second electrode or one of a pair of diaphragms in the other one of the first electrode and the second electrode; forming an insulating cover layer over the semiconductor layer to cover the opening of the hollow cylinder so that a hollow portion of the hollow cylinder is hermetically sealed and to form a space portion between the insulating layer and the insulating cover layer, wherein the space portion is different from the hollow portion; and forming a through hole in the insulating cover layer for coupling between the space portion and an outside of the space portion.

According to the above method, pressure, acceleration, or angular velocity can be detected as a physical quantity, respectively. Further, the movable electrode is independent of and electrically separated from the movable electrode and the fixed electrode on the insulating layer, so that the diaphragm and the fixed part do not need to have a semiconductor region for making the diaphragm and the fixed part function as the electrodes. For this reason, a PN junction part is not formed in the diaphragm and the fixed part. Hence, this can prevent capacitance detection characteristics of the diaphragm and the fixed part from being made unstable by the PN junction part. Therefore, the capacitance detection characteristics can be held very stable for the temperature of the physical quantity detection device and disturbance such as the outside atmosphere.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A physical quantity detection device comprising:
an insulating layer;
a semiconductor layer disposed on a surface of the insulating layer; and
a first electrode and a second electrode for detecting a physical quantity disposed in the semiconductor layer,
wherein the first electrode has a first wall part disposed in the semiconductor layer and protruding along with a direction crossing the surface of the insulating layer,
wherein the second electrode has a second wall part disposed in the semiconductor layer and protruding along with a direction crossing the surface of the insulating layer,
wherein at least one of the first wall part and the second wall part includes a pair of diaphragms and a cover part,
wherein the pair of diaphragms faces each other so that a hollow cylinder having an opening opposite to the insulating layer is provided,
wherein the cover part covers the opening of the hollow cylinder,
wherein one of the pair of diaphragms faces the other one of the first wall part and the second wall part or one of a pair of diaphragms in the other one of the first wall part and the second wall part,
wherein the hollow cylinder provides a hollow portion having a predetermined reference pressure,
wherein a distance between the one of the pair of diaphragms and the other one of the first wall part and the second wall part or a distance between the one of the pair of diaphragms and the one of the pair of diaphragms in the other one of the first wall part and the second wall part is changed in accordance with pressure difference between the predetermined reference pressure and a pressure of an outside of the hollow portion when a physical quantity is applied to the pair of diaphragms, and
wherein the physical quantity is detected based on a capacitance between the first electrode and the second electrode, the capacitance being varied with the distance.

2. The physical quantity detection device according to claim 1,
wherein the pair of diaphragms protrudes along with the direction perpendicular to the surface of the insulating layer.

3. The physical quantity detection device according to claim 1,
wherein the pair of diaphragms protrudes along with the direction obliquely to the surface of the insulating layer.

4. The physical quantity detection device according to claim 1,
wherein the cover part is made of a same semiconductor material as the semiconductor layer.

5. The physical quantity detection device according to claim 1,
wherein the one of the first electrode and the second electrode further includes a bottom part, which is disposed on the insulating layer so that an end of the hollow cylinder opposite to the cover part is covered with the bottom part, and wherein the bottom part is made of a same material as the semiconductor layer.

6. The physical quantity detection device according to claim 1,
wherein the one of the pair of diaphragms in the one of the first wall part and the second wall part has a thickness, which is smaller than the other one of the pair of diaphragms in the one of the first wall part and the second wall part.

7. The physical quantity detection device according to claim 1,
wherein the semiconductor layer further includes a first support part and a second support part, which are disposed over the insulating layer,
wherein the first electrode is supported by the first support part so that the first electrode is spaced apart from the insulating layer, and
wherein the second electrode is supported by the second support part so that the second electrode is spaced apart from the insulating layer.

8. The physical quantity detection device according to claim 1, further comprising:
a cap having a concavity portion, which is concaved from a surface of the cap facing the semiconductor layer,
wherein the semiconductor layer has a peripheral part, which surrounds the first electrode and the second electrode, and
wherein a periphery of the cap around the concavity portion is bonded to the peripheral part of the semiconductor layer so that a space portion is provided by the concavity portion, the peripheral part and the insulating layer, and
wherein the first electrode and the second electrode are arranged in the space portion.

9. The physical quantity detection device according to claim 8,
wherein the insulating layer includes a through hole, and the peripheral part includes another through hole, which is connected to the through hole in the insulating layer so that the space portion communicates with an outside of the space portion, and
wherein the physical quantity is detected based on pressure difference between the space portion and the hollow portion of the one of the first wall part and the second wall part.

10. The physical quantity detection device according to claim 8,
wherein the space portion is hermetically sealed by the cap,
wherein the insulating layer has a through hole, which couples between the hollow portion and an outside of the hollow portion so that the hollow portion is connected to an outside of the hollow portion, and
wherein the physical quantity is detected based on pressure difference between the space portion and the hollow portion.

11. The physical quantity detection device according to claim 8,
wherein the cap further includes a through hole for connecting between the space portion and an outside of the space portion,
wherein the insulating layer further includes another through hole for connecting between the hollow portion and an outside of the hollow portion, and
wherein the physical quantity is detected based on pressure difference between the space portion and the hollow portion.

12. The physical quantity detection device according to claim 1,
wherein at least one of the pair of diaphragms in the one of the first wall part and the second wall part has a wall surface facing an inside of the hollow portion, and
wherein the wall surface includes a protruding portion thereon.

13. A physical quantity detection device comprising:
an insulating layer;
a semiconductor layer disposed on a surface of the insulating layer;
a first electrode and a second electrode for detecting a physical quantity disposed in the semiconductor layer;
a first insulating wall part and a second insulating wall part; and
a cover part made of insulating material,
wherein the first electrode has a first diaphragm in the semiconductor layer, which extends vertically to the surface of the insulating layer,
wherein the second electrode has a second diaphragm in the semiconductor layer, which extends vertically to the surface of the insulating layer,
wherein the first diaphragm and the second diaphragm face each other,
wherein one end of the first diaphragm and a corresponding end of the second diaphragm are coupled with each other via the first insulating wall part,
wherein the other end of the first diaphragm and a corresponding end of the second diaphragm are coupled with each other via the second insulating wall part,
wherein the first insulating wall part and the second insulating wall part face each other,
wherein the first diaphragm, the second diaphragm, the first insulating wall part and the second insulating wall part provide a wall part having a hollow cylinder with an opening opposite to the insulating layer,
wherein the cover part covers the opening of the wall part,
wherein, when a physical quantity is applied to the first electrode and the second electrode, the first diaphragm and the second diaphragm are deformed according to pressure difference between a hollow portion of the wall part and an outside of the hollow portion, and
wherein the physical quantity is detected on the basis of a capacitance between the first electrode and the second electrode, which is varied with deformation of the first diaphragm and the second diaphragm.

14. The physical quantity detection device according to claim 13, further comprising:
a cap having a concavity portion, which is concaved from a surface of the cap facing the semiconductor layer,
wherein the semiconductor layer has a peripheral part surrounding the first electrode and the second electrode, and
wherein a periphery of the cap around the concavity portion is bonded to the peripheral part of the semiconductor layer so that a space portion is provided by the concavity portion, the peripheral part and the insulating layer, and
wherein the first electrode and the second electrode are arranged in the space portion.

15. The physical quantity detection device according to claim 14,
wherein the insulating layer includes a through hole, and the peripheral part includes another through hole, which is connected to the through hole in the insulating layer so that the space portion communicates with an outside of the space portion, and wherein the physical quantity is detected based on pressure difference between the space portion and the hollow portion of the one of the first wall part and the second wall part.

16. The physical quantity detection device according to claim 14,
wherein the space portion is hermetically sealed by the cap,
wherein the insulating layer has a through hole, which couples between the hollow portion and an outside of the hollow portion so that the hollow portion is connected to an outside of the hollow portion, and
wherein the physical quantity is detected based on pressure difference between the space portion and the hollow portion.

17. The physical quantity detection device according to claim 14,
wherein the cap further includes a through hole for connecting between the space portion and an outside of the space portion,
wherein the insulating layer further includes another through hole for connecting between the hollow portion and an outside of the hollow portion, and
wherein the physical quantity is detected based on pressure difference between the space portion and the hollow portion.

18. The physical quantity detection device according to claim 13,
wherein at least one of the first diaphragm and the second diaphragm has a wall surface facing an inside of the hollow portion, and
wherein the wall surface includes a protruding portion thereon.

19. The physical quantity detection device according to claim 13,
wherein the insulating layer further includes a wiring pattern so that the insulating layer provide a stacking structure, and
wherein the wiring pattern electrically couples between each of the first electrode and the second electrode and an external circuit.

20. A physical quantity detection device comprising:
an insulating layer;
a semiconductor layer disposed on a surface of the insulating layer;
a first electrode and a second electrode for detecting a physical quantity disposed in the semiconductor layer; and an insulating cover layer,
wherein the first electrode extends along with a direction crossing the surface of the insulating layer,
wherein the first electrode extends along with a direction crossing the surface of the insulating layer,
wherein at least one of the first electrode and the second electrode includes a pair of diaphragms,
wherein the pair of diaphragms faces each other so that a hollow cylinder having an opening opposite to the insulating layer is provided,
wherein one of the pair of diaphragms faces the other one of the first electrode and the second electrode or one of a pair of diaphragms in the other one of the first electrode and the second electrode,
wherein the insulating cover layer is disposed, on semiconductor layer, and covers the opening of the hollow cylinder,
wherein the insulating layer and the insulating cover layer provide a space portion between the insulating layer and the insulating cover layer,
wherein the space portion is independent from a hollow portion of the hollow cylinder,
wherein the insulating cover layer has a through hole for connecting the space portion and an outside of the space portion, and
wherein the hollow portion has a predetermined reference pressure,
wherein a distance between the one of the pair of diaphragms and the other one of the first electrode and the second electrode or a distance between the one of the pair of diaphragms and one of a pair of diaphragms in the other one of the first electrode and the second electrode is changed in accordance with pressure difference between the hollow portion and the space portion when a physical quantity is applied to the pair of diaphragms, and
wherein the physical quantity is detected based on a capacitance between the first electrode and the second electrode, the capacitance being varied with the distance.

21. The physical quantity detection device according to claim 20,
wherein the pair of diaphragms extends along with the direction perpendicular to the surface of the insulating layer.

22. The physical quantity detection device according to claim 20,
wherein the pair of diaphragms extends along with the direction obliquely to the surface of the insulating layer.

23. A physical quantity detection device comprising:
an insulating layer;
a semiconductor layer disposed on a surface of the insulating layer; and
a variable electrode, a movable electrode and a fixed electrode, which are disposed in the semiconductor layer, for detecting a physical quantity,
wherein the variable electrode has a wall part and a cover part,
wherein the wall part has a hollow cylinder with a diaphragm and a fixed part,
wherein the diaphragm is disposed on the surface of the insulating layer and extending along with a direction perpendicular to the surface of the insulating layer,
wherein the fixed part faces the diaphragm,
wherein the cover part covers an opening of the wall part, which is opposite to the insulating layer,
wherein the diaphragm faces the fixed electrode, and the fixed part faces the movable electrode,
wherein the diaphragm is deformable in accordance with pressure difference between a hollow portion of the variable electrode and an outside of the hollow portion,
wherein a physical quantity is detected on the basis of a capacitance between the variable electrode and the fixed electrode, the capacitance being varied with deformation of the diaphragm,
wherein, when another physical quantity is applied to the movable electrode in a planar direction of the surface of the insulating layer, a distance between the movable electrode and the fixed part is varied with the another physical quantity, and
wherein the another physical quantity is detected on the basis of a capacitance between the movable electrode and the fixed part, the capacitance being varied with the distance between the movable electrode and the fixed part.

24. A method of manufacturing a physical quantity detection device comprising:

forming a semiconductor layer on a surface of an insulating layer so that a stacking structure is provided;

forming a trench in the semiconductor layer so that a first wall part and a second wall part are provided, wherein the first wall part extends along with a direction crossing the surface of the insulating layer, and the second wall part extends along with a direction crossing the surface of the insulating layer, wherein at least one of the first wall part and the second wall part includes a pair of diaphragms, wherein the pair of diaphragms faces each other so that a hollow cylinder having an opening opposite to the insulating layer is provided, and wherein one of the pair of diaphragms faces the other one of the first wall part and the second wall part or one of a pair of diaphragms in the other one of the first wall part and the second wall part; and forming a cover part to cover and close the opening of the hollow cylinder and form a hollow portion therein with a predetermined reference pressure, wherein a distance between the one of the pair of diaphragms and the other one of the first wall part and the second wall part or a distance between the one of the pair of diaphragms and the one of the pair of diaphragms in the other one of the first wall part and the second wall part is changed in accordance with pressure difference between the predetermined reference pressure and a pressure of an outside of the hollow portion when a physical quantity is applied to the pair of diaphragms.

25. A method of manufacturing a physical quantity detection device comprising:

forming a first semiconductor layer on a surface of an insulating layer so that a stacking structure is provided;

forming a stopper film on the first semiconductor layer;

forming a second semiconductor layer over the first semiconductor layer to cover the stopper film;

etching the first semiconductor layer and the second semiconductor layer with using the stopper film as a stopper in order to form a first wall part and a second wall part, wherein the first wall part is disposed over a first bottom part of the first semiconductor layer and extends along with a direction crossing the surface of the insulating layer, wherein the second wall part is disposed over a second bottom part of the first semiconductor layer and extends along with a direction crossing the surface of the insulating layer, wherein the etching of the first semiconductor layer is stopped at the stopper film so that at least one of the first wall part and the second wall part includes a pair of diaphragms, wherein the pair of diaphragms faces each other so that a hollow cylinder having an opening opposite to the insulating layer is provided, and wherein one of the pair of diaphragms faces the other one of the first wall part and the second wall part or one of a pair of diaphragms in the other one of the first wall part and the second wall part;

forming a third semiconductor layer over the second semiconductor layer, the third semiconductor layer covering a hollow portion of the hollow cylinder; and etching the third semiconductor layer to form a cover part over the at least one of the first wall part and the second wall part so as to cover the opening of the hollow cylinder.

26. The method of manufacturing a physical quantity detection device according to claim 25, wherein the etching of the first semiconductor layer and the second semiconductor layer includes:

forming a first support part coupled with the first wall part; and forming a second support part coupled with the second wall part wherein the first support part and the second support part are formed over the insulating layer, and wherein the etching of the third semiconductor layer includes:

etching a portion of the insulating layer under each of the first bottom part and the second bottom part so as to separate a first electrode and a second electrode from the insulating layer, the first electrode being provided by the first wall part and the second electrode being provided by the second wall part.

27. The method of manufacturing a physical quantity detection device according to claim 25, wherein the pair of diaphragms extends along with a direction perpendicular to the surface of the insulating layer.

28. The method of manufacturing a physical quantity detection device according to claim 25, wherein the pair of diaphragms extends along with a direction oblique to the surface of the insulating layer.

29. A method of manufacturing a physical quantity detection device comprising:

forming a semiconductor layer on a surface of an insulating layer so that a stacking structure is provided;

forming a pair of first trenches in the semiconductor layer and embedding an insulating material in each first trench to form a first insulating wall part and a second insulating wall part;

forming a second trench in the semiconductor layer to form a pair of diaphragms between the first insulating wall part and the second insulating wall part, wherein each diaphragm contacts a corresponding one of the first insulating wall part and the second insulating wall part, faces each other, and extends along with a direction perpendicular to the surface of the insulating layer, and wherein the pair of diaphragms, the first insulating wall part and the second insulating wall part provide a wall part having a hollow cylinder with an opening opposite to the surface of the insulating layer; and forming a cover part made of an insulating material to cover the opening portion of the wall part.

30. A method of manufacturing a physical quantity detection device comprising:

forming a semiconductor layer on a surface of an insulating layer so that a stacking structure is provided;

forming a first electrode and a second electrode in the semiconductor layer in such a manner that the first electrode and the second electrode extend along with a direction crossing the surface of the insulating layer, wherein at least one of the first electrode and the second electrode includes a pair of diaphragms, which faces each other and provides a hollow cylinder with an opening opposite to the surface of the insulating layer, wherein one of the pair of diaphragms faces the other one of the first electrode and the second electrode or one of a pair of diaphragms in the other one of the first electrode and the second electrode;

forming an insulating cover layer over the semiconductor layer to cover the opening of the hollow cylinder so that a hollow portion of the hollow cylinder is hermetically sealed and to form a space portion between the insulating layer and the insulating cover layer, wherein the space portion is different from the hollow portion; and forming a through hole in the insulating cover layer for coupling between the space portion and an outside of the space portion.

* * * * *